US010534530B2

(12) United States Patent
Angelov et al.

(10) Patent No.: US 10,534,530 B2
(45) Date of Patent: Jan. 14, 2020

(54) METHOD AND SYSTEM FOR INK DATA GENERATION, INK DATA RENDERING, INK DATA MANIPULATION AND INK DATA COMMUNICATION

(71) Applicant: Wacom Co., Ltd., Saitama (JP)

(72) Inventors: Branimir Angelov, Sofia (BG); Stefan Yotov, Sofia (BG); Heidi Wang, Krefeld (DE); Plamen Petkov, Sofia (BG)

(73) Assignee: Wacom Co., Ltd., Saitama (JP)

( * ) Notice: Subject to any disclaimer, the term of this patent is extended or adjusted under 35 U.S.C. 154(b) by 319 days.

(21) Appl. No.: 15/099,038

(22) Filed: Apr. 14, 2016

(65) Prior Publication Data

US 2016/0224239 A1 Aug. 4, 2016

Related U.S. Application Data

(63) Continuation of application No. PCT/JP2014/005833, filed on Nov. 19, 2014.
(Continued)

(51) Int. Cl.
*G06F 3/0488* (2013.01)
*G06F 3/0354* (2013.01)
(Continued)

(52) U.S. Cl.
CPC .......... *G06F 3/04883* (2013.01); *G06F 3/038* (2013.01); *G06F 3/0346* (2013.01);
(Continued)

(58) Field of Classification Search
None
See application file for complete search history.

(56) References Cited

U.S. PATENT DOCUMENTS 5,425,109 A    6/1995 Saga et al.
6,111,588 A    8/2000 Newell
(Continued)

FOREIGN PATENT DOCUMENTS

CN    102081803 A    6/2011
CN    102937849 A    2/2013
(Continued)

OTHER PUBLICATIONS

World Wide Web Consortium (W3C); "Ink Markup Language;" W3C Recommendation Sep. 20, 2011; hosted by the MIT Computer Science and Artificial Intelligence Laboratory (MIT CSAIL) in the USA, the European Research Consortium for Informatics and Mathematics (ERCIM) headquartered in France, Keio University in Japan, and Beihang University in China.*

(Continued)

*Primary Examiner* — Edward Martello
(74) *Attorney, Agent, or Firm* — Seed IP Law Group LLP

(57) ABSTRACT

A method implemented in a device including a position input sensor is provided, for generating ink data including stroke objects that are vector data configured to reproduce paths formed by operating a pointer. The method includes generally three step. The first step receives pen event data representative of a user's hand-drawn motion on a sensor surface. The second step generates a stroke object based on the pen event data, generates a metadata object that describes the stroke object based on the pen event data and context information received from an application supporting the pen event data, and generates a drawing style object that defines how to draw the stroke object based on the pen event data and the context information. The third step outputs the stroke object, the metadata object, and the drawing style object in association with each other in a recording format or in a transmission format.

18 Claims, 123 Drawing Sheets

Related U.S. Application Data

(60) Provisional application No. 62/042,747, filed on Aug. 27, 2014, provisional application No. 61/973,161, filed on Mar. 31, 2014, provisional application No. 61/908,647, filed on Nov. 25, 2013, provisional application No. 61/906,334, filed on Nov. 19, 2013.

(51) Int. Cl.
| | | |
|---|---|---|
| *G06Q 10/10* | (2012.01) | |
| *G06K 9/52* | (2006.01) | |
| *G06T 11/20* | (2006.01) | |
| *G06F 3/038* | (2013.01) | |
| *G06F 3/041* | (2006.01) | |
| *G06K 9/22* | (2006.01) | |
| *G06F 3/044* | (2006.01) | |
| *G06F 3/0346* | (2013.01) | |
| *G06K 9/00* | (2006.01) | |

(52) U.S. Cl.
CPC ........ *G06F 3/0354* (2013.01); *G06F 3/03545* (2013.01); *G06F 3/044* (2013.01); *G06F 3/0412* (2013.01); *G06F 3/0414* (2013.01); *G06K 9/00416* (2013.01); *G06K 9/222* (2013.01); *G06K 9/52* (2013.01); *G06Q 10/101* (2013.01); *G06T 11/203* (2013.01); *G06F 2203/0383* (2013.01); *G06F 2203/04105* (2013.01); *G06F 2203/04106* (2013.01)

(56) References Cited

U.S. PATENT DOCUMENTS

| | | | |
|---|---|---|---|
| 6,278,445 B1 * | 8/2001 | Tanaka | G06F 3/04883 345/177 |
| 6,970,935 B1 | 11/2005 | Maes | |
| 7,057,615 B2 | 6/2006 | Wang et al. | |
| 7,450,125 B2 | 11/2008 | Wang et al. | |
| 7,542,603 B2 | 6/2009 | Rosel | |
| 8,102,397 B2 | 1/2012 | Perry et al. | |
| 9,134,821 B2 | 9/2015 | Zou et al. | |
| 9,640,144 B2 | 5/2017 | Shimizu et al. | |
| 10,078,445 B2 | 9/2018 | Petkov et al. | |
| 2002/0054026 A1 | 5/2002 | Stevenson et al. | |
| 2003/0025713 A1 | 2/2003 | Wang et al. | |
| 2004/0028274 A1 | 2/2004 | Kawakami et al. | |
| 2004/0233197 A1 | 11/2004 | Liu et al. | |
| 2005/0088427 A1 | 4/2005 | Kolmykov-Zotov et al. | |
| 2005/0175238 A1 | 8/2005 | Rosel | |
| 2006/0290698 A1 | 12/2006 | Wang et al. | |
| 2007/0176893 A1 | 8/2007 | Sato | |
| 2010/0017758 A1 | 1/2010 | Zotov et al. | |
| 2010/0188408 A1 | 7/2010 | Perry et al. | |
| 2011/0025693 A1 | 2/2011 | Merry | |
| 2011/0083109 A1 | 4/2011 | Hildebrandt et al. | |
| 2011/0126129 A1 | 5/2011 | Nagahara et al. | |
| 2011/0175916 A1 * | 7/2011 | Noris | G06K 9/00416 345/441 |
| 2011/0199297 A1 * | 8/2011 | Antonyuk | G06F 3/04883 345/157 |
| 2012/0092277 A1 | 4/2012 | Momchilov | |
| 2013/0027404 A1 | 1/2013 | Sarnoff | |
| 2013/0257769 A1 | 10/2013 | Sheik-Nainar | |
| 2013/0257792 A1 | 10/2013 | Trent et al. | |
| 2013/0263027 A1 | 10/2013 | Petschnigg et al. | |
| 2013/0305146 A1 | 11/2013 | Hashiba et al. | |
| 2013/0314337 A1 | 11/2013 | Asano | |
| 2014/0043547 A1 | 2/2014 | Marhefka | |
| 2014/0081610 A1 * | 3/2014 | DiVerdi | G06T 11/203 703/6 |
| 2014/0240322 A1 * | 8/2014 | Brumer | G06T 11/203 345/442 |
| 2014/0247276 A1 | 9/2014 | Pedreira et al. | |

FOREIGN PATENT DOCUMENTS

| | | |
|---|---|---|
| CN | 103310474 A | 9/2013 |
| JP | 2-191018 A | 7/1990 |
| JP | 4-207833 A | 7/1992 |
| JP | 5-274412 A | 10/1993 |
| JP | 5-324921 A | 12/1993 |
| JP | 6-96178 A | 4/1994 |
| JP | 6-162159 A | 6/1994 |
| JP | 7-21099 A | 1/1995 |
| JP | 10-293859 A | 11/1998 |
| JP | 11-85381 A | 3/1999 |
| JP | 2001-331802 A | 11/2001 |
| JP | 2003-141100 A | 5/2003 |
| JP | 2003-330605 A | 11/2003 |
| JP | 2004-234647 A | 8/2004 |
| JP | 2005-222554 A | 8/2005 |
| JP | 2006-18760 A | 1/2006 |
| JP | 2006-91938 A | 4/2006 |
| JP | 2006-526958 A | 11/2006 |
| JP | 2007-233339 A | 9/2007 |
| JP | 2009-93274 A | 4/2009 |
| JP | 2010-170097 A | 8/2010 |
| JP | 2010-204745 A | 9/2010 |
| JP | 2010-271855 A | 12/2010 |
| JP | 2011-129092 A | 6/2011 |
| JP | 2012-58799 A | 3/2012 |
| JP | 2012-190303 A | 10/2012 |
| JP | 2013-109680 A | 6/2013 |
| JP | 2013-238915 A | 11/2013 |
| WO | 2006/093116 A1 | 9/2006 |
| WO | 2011/044677 A1 | 4/2011 |
| WO | 2013/121455 A1 | 8/2013 |

OTHER PUBLICATIONS

Non-Final Office Action dated Dec. 5, 2016, for corresponding U.S. Appl. No. 15/099,311, 28 pages.
Extended European Search Report, dated Jul. 19, 2017, for European Application No. 14863146.8-1879 / 3072036, 8 pages.
Extended European Search Report, dated Jul. 19, 2017, for European Application No. 14863515.4-1879, 9 pages.
Extended European Search Report, dated Jul. 26, 2017, for European Application No. 14863939.6-1879, 11 pages.
Angelov et al., "Method and System for Ink Data Generation, Ink Data Rendering, Ink Data Manipulation and Ink Data Communication," Office Action, dated Apr. 25, 2016, for U.S. Appl. No. 14/838,182, 17 pages.
Extended European Search Report, dated Jun. 29, 2017, for European Application No. 14864011.3-1879 / 3072039, 10 pages.
W3C, Recommendation 20, Sep. 2011, "Ink Markup Language (InkML)" (URL—http://www.w3.org/TR/2011/Rec-InkML-20110920/).
Microsoft Corporation, et al., "Ink Serialized Format Specification" 2007 (URL—http://download.microsoft.com/download/0/B/E/0BE8BDD7-E5E8-422A-ABFD-4342ED7AD886/InkSerializedFormat(ISF)Specification.pdf).
W3C Working Draft, Feb. 11, 2014, "Scalable Vector Graphics (SVG) 2" (URL—http://www.w3.org/TR/SVG2/); W3C Recommendation, Aug. 16, 2011, "Scalable Vector Graphics (SVG) 1.1 (Second Edition)" (URL—ttp://www.w3.org/TR/2011/REC-SVG11-201110816/).
W3C, "HTML5 a vocabulary and associated APIs for HTML and XHTML W3C Recommendation Oct. 28, 2014" (URL—http://www.w3.org/TR/html5/).
Slate Corporation, et al., "JOT—A Specification for an Ink Storage and Interchange Format", Version 1.0, Sep. 1996.
International Search Report, dated Feb. 17, 2015, issued in corresponding International Application No. PCT/JP2014/005833, filed Nov. 19, 2014, 2 pages.
Ken Hinckley et al., "Pen + Touch = New Tools," UIST' 10, Oct. 3-6, 2010, New York, New York, 10 pages.
Japanese publication, p. 197 describing "Eraser Tool" and "Path Eraser Tool", and p. 243 describing "Knife Tool", cited in Japanese Office Action, dated Jan. 31, 2017, for Japanese Application No. 2016-222846, 8 Pages.

(56) References Cited

OTHER PUBLICATIONS

Japanese publication, pp. 42-43 describing "Scissors Tool," "Knife Tool," "Path Eraser Tool" and "Eraser Tool," and p. 43 describing configuration and size of the "Eraser Tool," cited in Japanese Office Action, dated Jan. 31, 2017, for Japanese Application No. 2016-222846, 5 Pages.
Japanese publication, pp. 108-109, 111 describing "Eraser Tool" and "Object Division," and pp. 39, 100-102 describing input by pen-tablet device, cited in Japanese Office Action, dated Jan. 31, 2017, for Japanese Application No. 2016-222846, 12 Pages.
European Office Action, dated Jul. 19, 2017, for European Application No. 14863515.4-1879 / 3072037, 9 pages.
International Search Report, dated Feb. 10, 2015, issued in International Application No. PCT/JP2014/005830, filed Nov. 19, 2014, 2 pages.
Japanese Search Report, dated Jun. 29, 2018, for Japanese Application No. 2017-026874, 45 pages (with machine generated English Translation).
Japanese Office Action, dated Aug. 6, 2019, for Japanese Application No. 2018-228833, 11 pages. (with English translation).
Japanese Office Action, dated Aug. 20, 2019, for Japanese Application No. 2016-511845, 8 pages. (with English translation).
Japanese Office Action, dated Sep. 10, 2019, for Japanese Application No. 2018-223599, 10 pages. (with English translation).

\* cited by examiner

```
01: package strokefileformat;

02: message Document {
03:   repeated float viewBox = 1;
04:   optional Uint32 decimalPrecision = 2 [default = 2];
05:   repeated Style styles = 3;
06:   repeated Stroke strokes = 4;
07: }

08: message Style {
09:   optional float strokeWidth = 1 [default = 4];
10: }

11: message Stroke {
12:   repeated sint32 point              = 1 [packed = true];
13:   optional float startParameter      = 2 [default = 0];
14:   optional float endParameter        = 3 [default = 1];
15:   repeated sint32 variableStrokeWidth = 4 [packed = true];
16:   optional float strokeWidth = 5;
17: }
```

Fig. 10

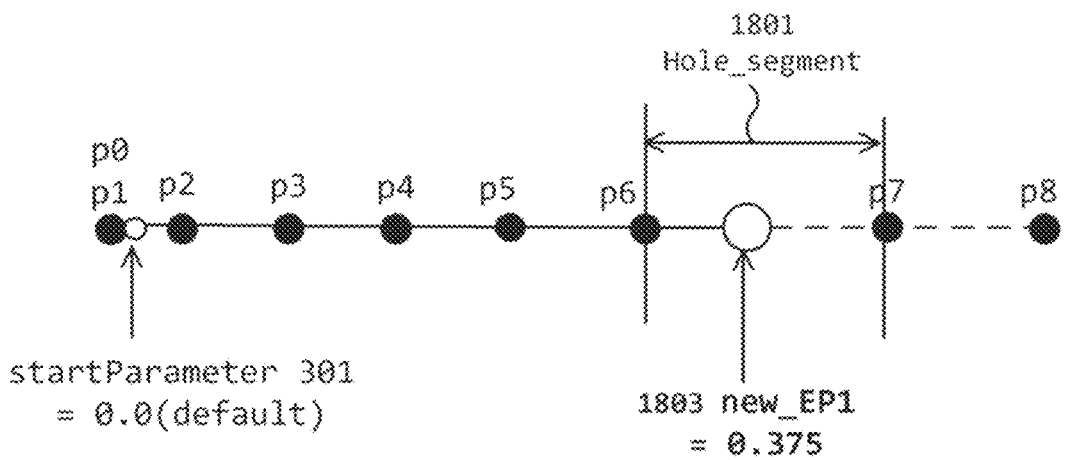
Fig. 16A
```
11:    class Slice {
12:        int slice_fromIndex;        // 0
13:        int slice_toIndex;          // 8
14:        float slice_startParameter; // 0.0
15:        float slice_endParameter;   // 0.375
16:    }
```
Fig. 16B
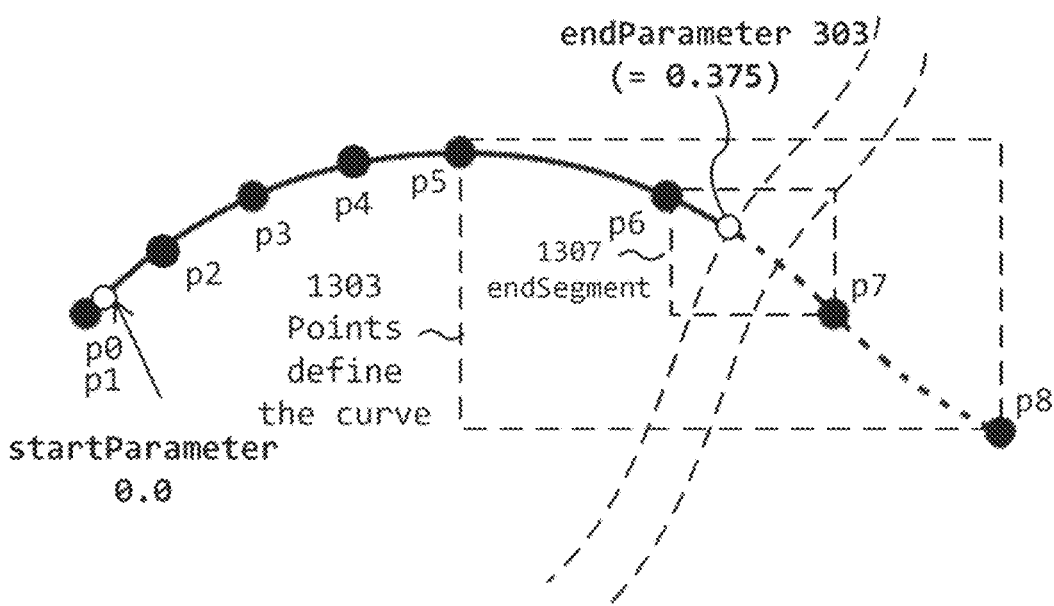
Fig. 16C

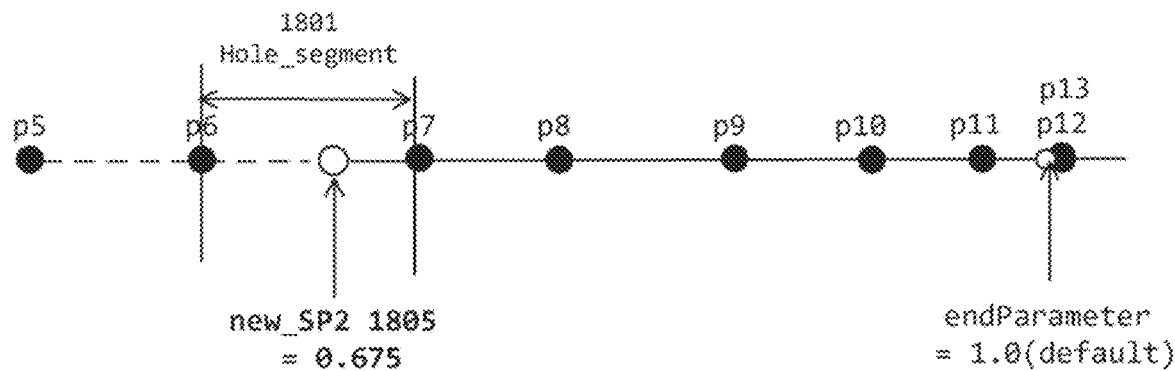
Fig. 17A
[Fig. 17B]
```
21:   class Slice {
22:       int slice_fromIndex;        // e.g., 5
23:       int slice_toIndex;          // e.g., 13
24:       float slice_startParameter; // e.g., 0.625
25:       float slice_endParameter;   // e.g., 1.0
26:   }
```
Fig. 17B
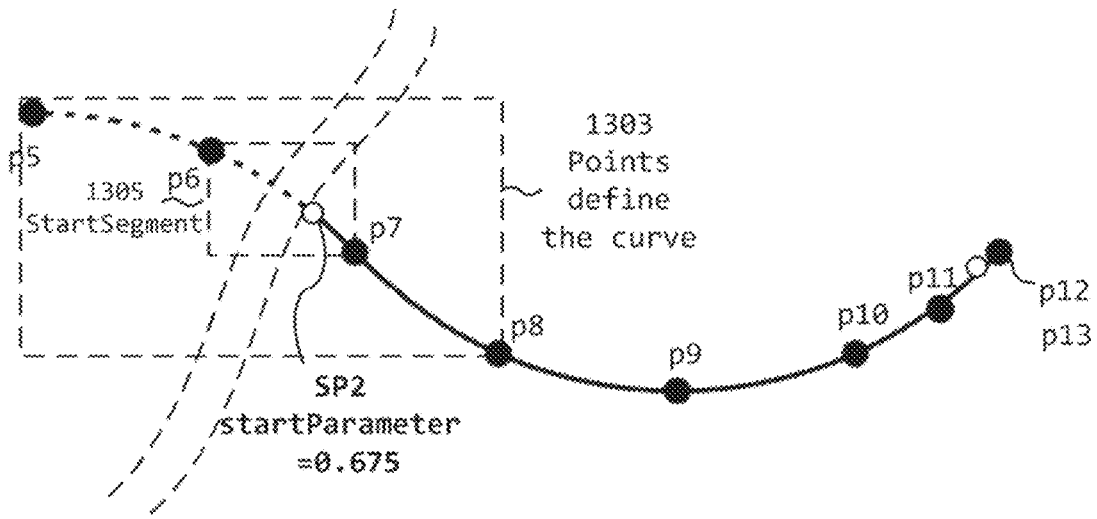
Fig. 17C

```
01: class Hole_segment {
02:     int     hole_fromIndex;        // e.g., 6
03:     float   hole_endParameter;     // e.g., 0.375
04:     int     hole_toIndex;          // e.g., 7
05:     float   hole_startParameter;   // e.g., 0.625
06: }
```

Fig. 18 B

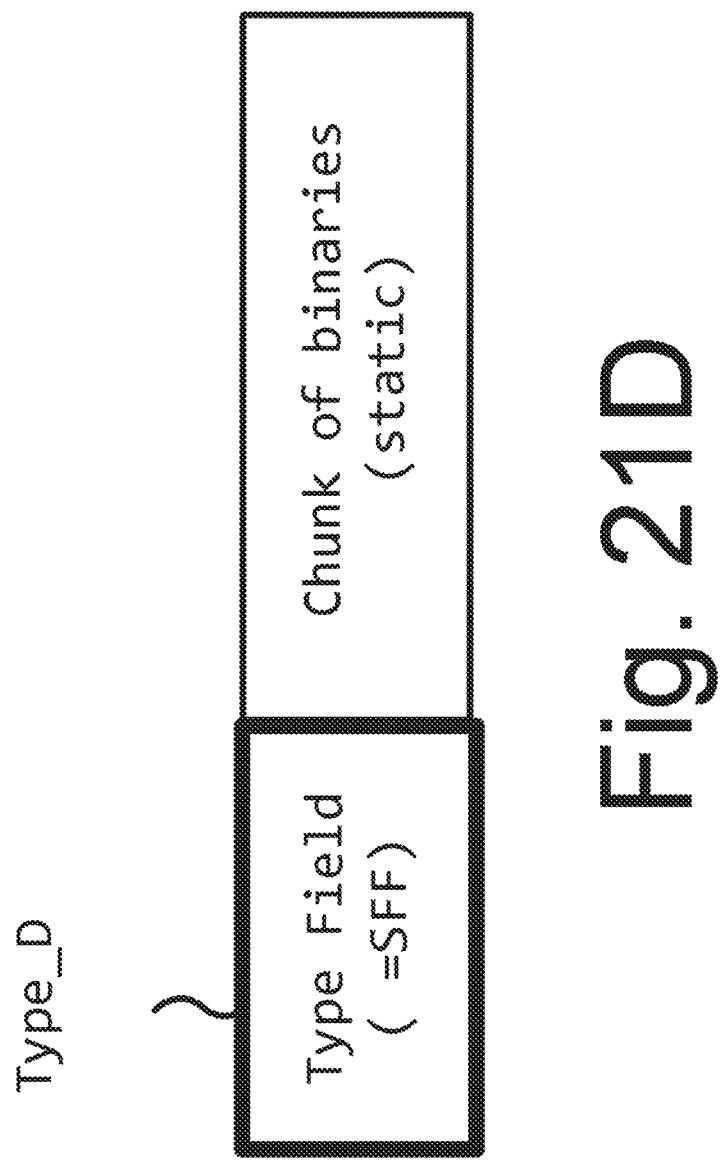

524_1

| Type | (Length) | Value | |
| --- | --- | --- | --- |
| | | Tx | Rx |
| (524_1a) Packet Retransmission | 2 | TRUE | FALSE |
| (524_1b) MTU, MSS | 16 | 1460 | 1460 |
| (524_1c) StrokeData fragment Enable | 2 | TRUE | FALSE |
| (524_1d) maximum Rx delay | 8 | 100 [msec] | |
| (524_1e) Message Encryption | 2 | TRUE | FALSE |
| (524_1f) Message Retransmission | 2 | ENABLE | DISABLED |
| (524_1g) Audio Sync ENABLE | 2 | ENABLE | ENABLE |
| (524_1z) Other Parameter set identifier | 2 | #15 | |

| Type | Length | Value |
| --- | --- | --- |
| (524_2a) Drawing area ID | 8 | #123 |
| (524_2b) User_local_canvas_setting (offset, Rotation, Scaling) | 24 | (200, 30) |
| | | 0 [degree] |
| | | x1 |
| (524_2d) Drawing Tool Set_id | 8 | Default_pentool_set |

| Type | Length | Value |
|---|---|---|
| (524_3a) User Account Priority | 2 | High |
| (524_3b) Block User List | 8n | DENY: User_10_m |
| | | DENY: User_10_n |
| | | ACCEPT: ALL |

Fig. 30C

| Type Field (ALLOS_REQ) | Drawing Area ID Field | Stroke ID Field | mess age CRC |
|---|---|---|---|

1503 DATA_INK_ALLOS_REQ

Fig. 39B

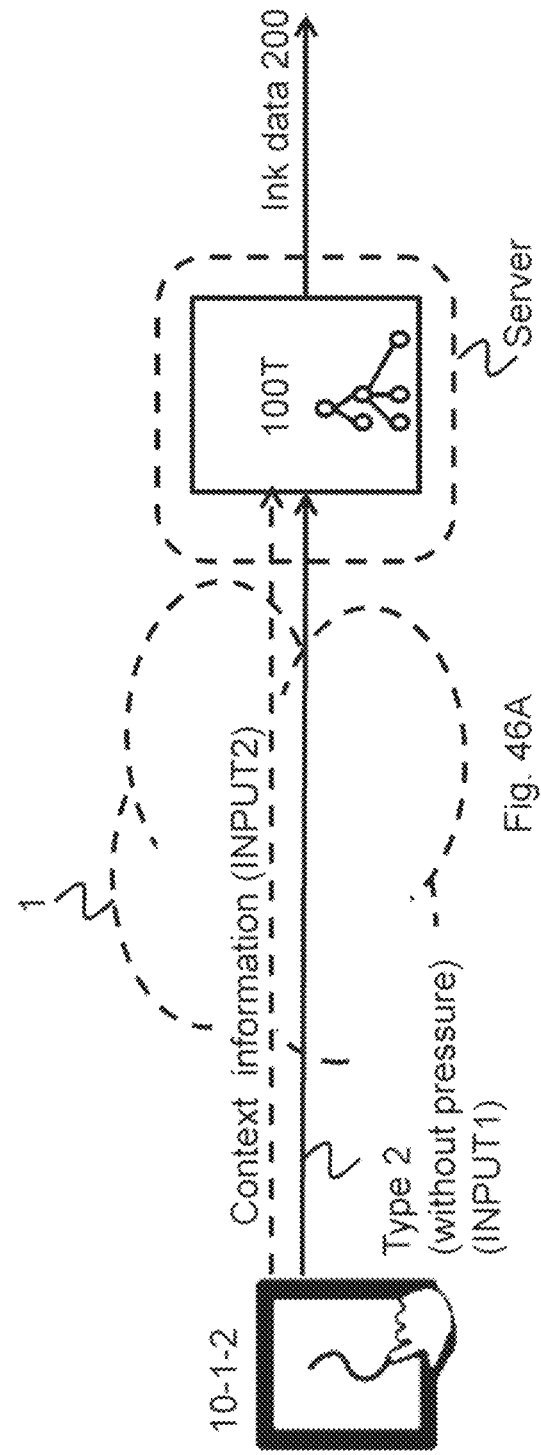

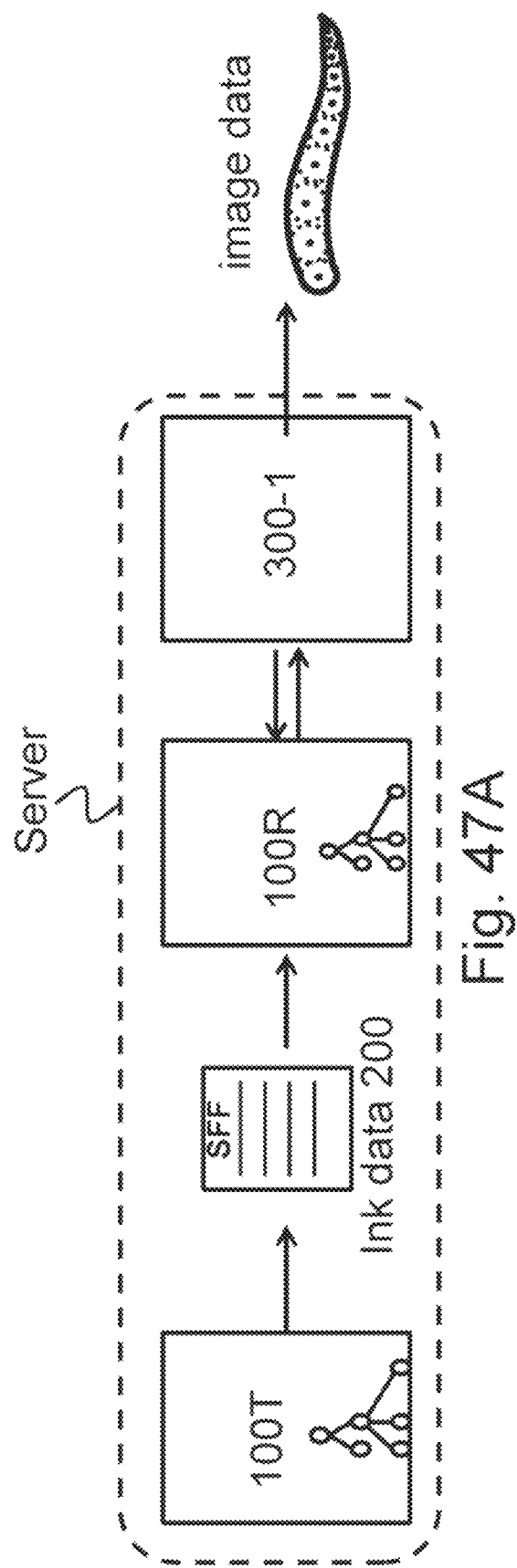

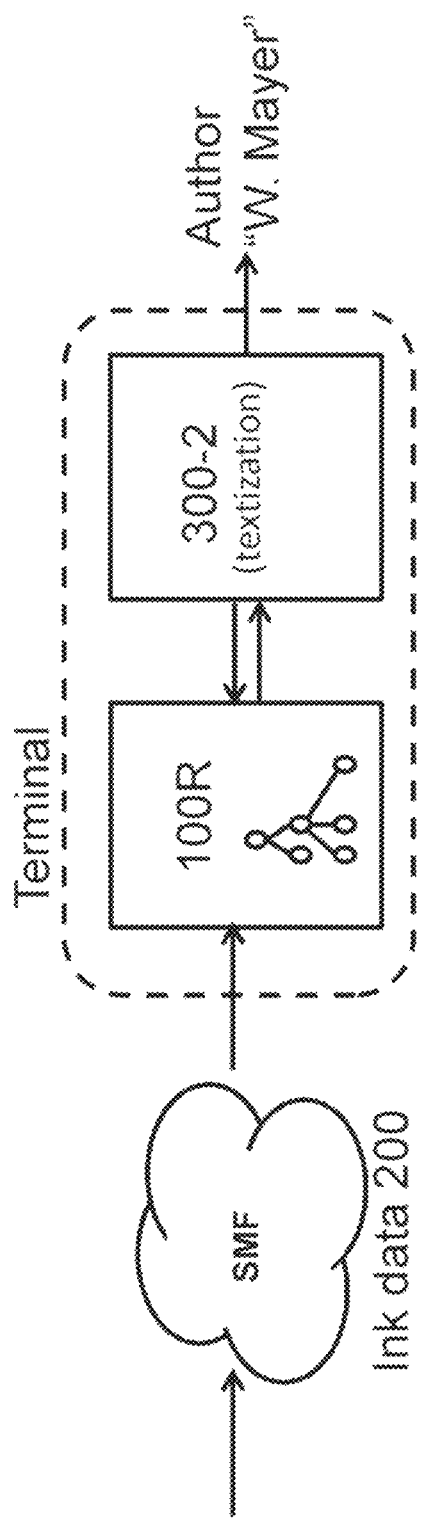

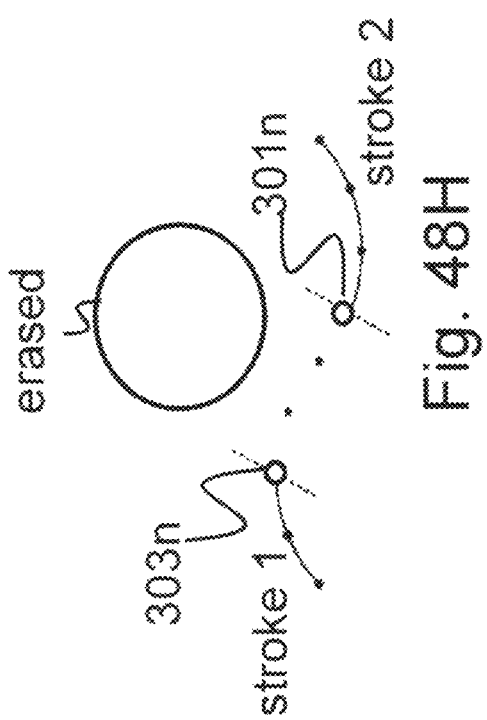

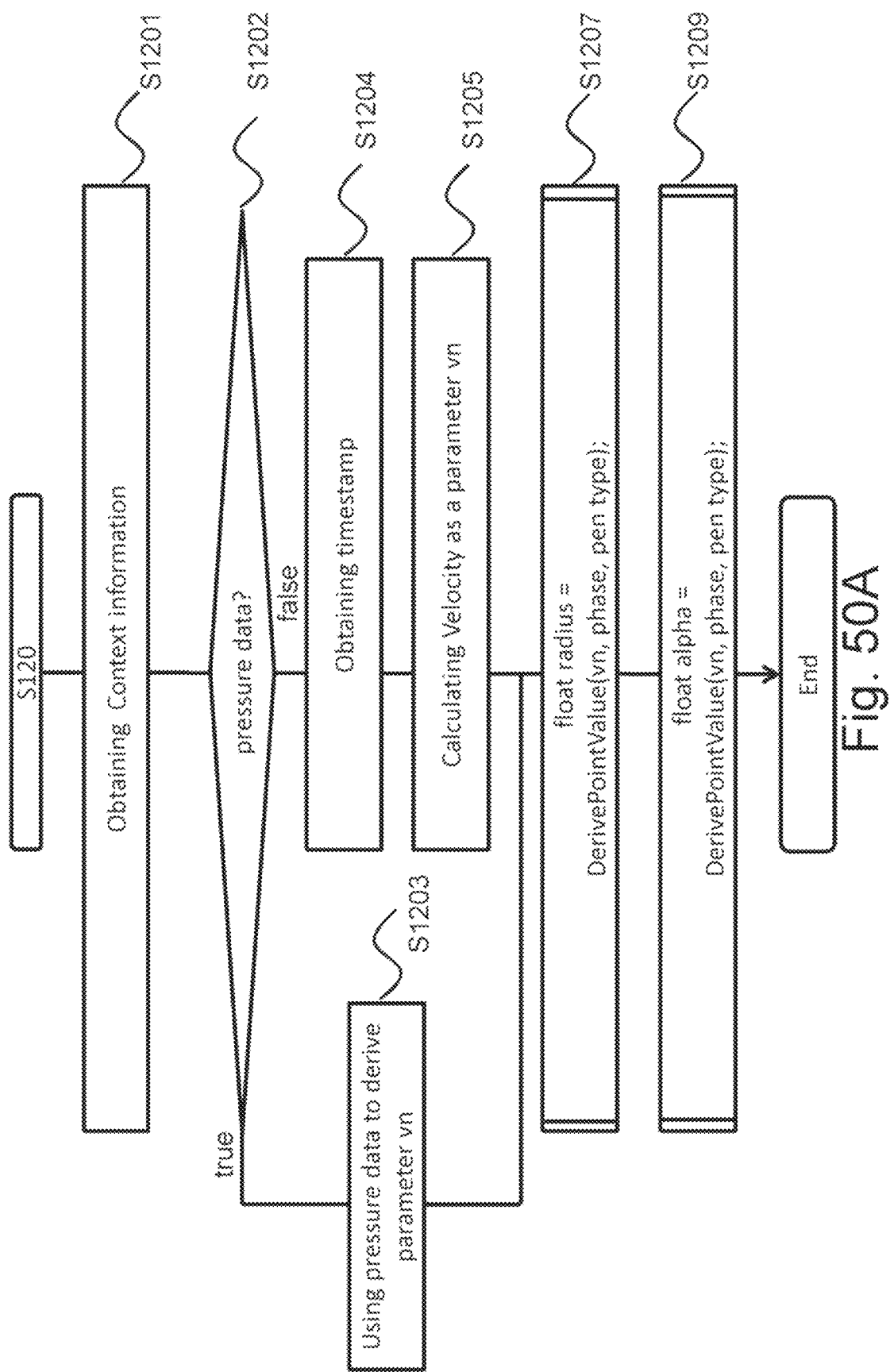

S1411
```
01: void encode4D (inputPointType *input, Point4D *out, unsignedint decimalPrecision)
02: {
03:     out->x      = (int)(input->x          * decimalPrecision);
04:     out->y      = (int)(input->y          * decimalPrecision);
05:     out->radius = (int)(input->radius     * decimalPrecision);
06:     out->alpha  = (unsigned short)(input->alpha * TWO_TO_16_MINUS_1);
07: }
```

S1413
```
08: void encode3D (inputPointType * input, Point3D *out, unsignedint decimalPrecision)
09: {
10:     out->x      = (int) (input ->x      * decimalPrecision);
11:     out->y      = (int) (input ->y      * decimalPrecision);
12:     out->radius = (int) (input ->radius * decimalPrecision);
13) }
```

Fig. 58

```
S2011
01 point4D_Unpack()
02: {
03:   out->x      = (float)input->x / decimalPrecision;
04:   out->y      = (float)input->y / decimalPrecision;
05:   out->radius = (float)input->radius / decimalPrecision;
06:   out->alpha  = (float)input->alpha / TWO_TO_16_MINUS_1;
07: }

S2013
08: point3D_Unpack ()
09: {
10:   out->x      = (float)input->x / decimalPrecision;
11:   out->y      = (float)input->y / decimalPrecision;
12:   out->radius = (float)input->r / decimalPrecision;
13:   out->alpha  = 1.0;
14: }
```

Fig. 66

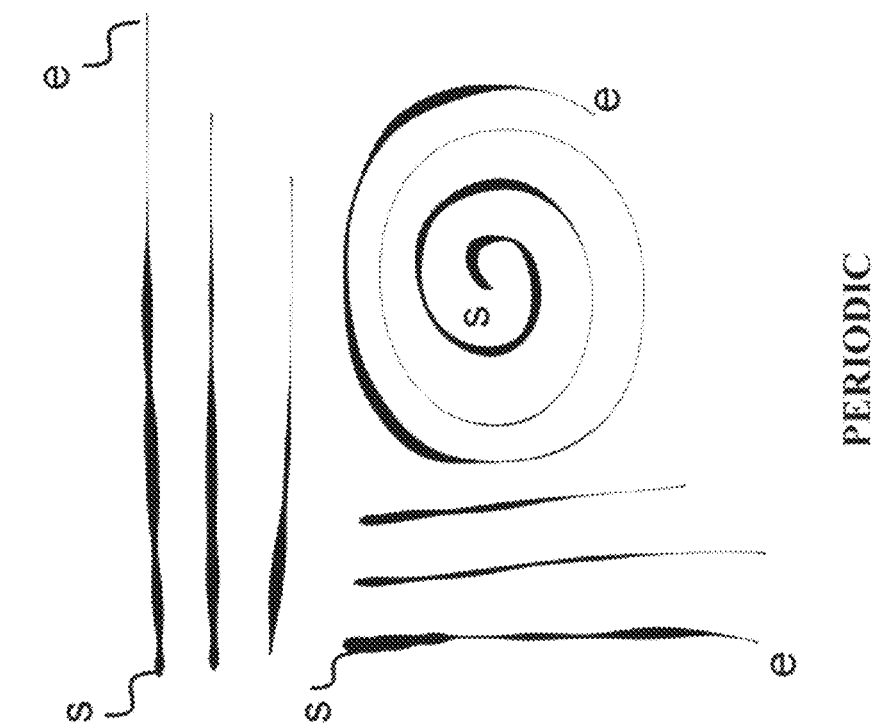
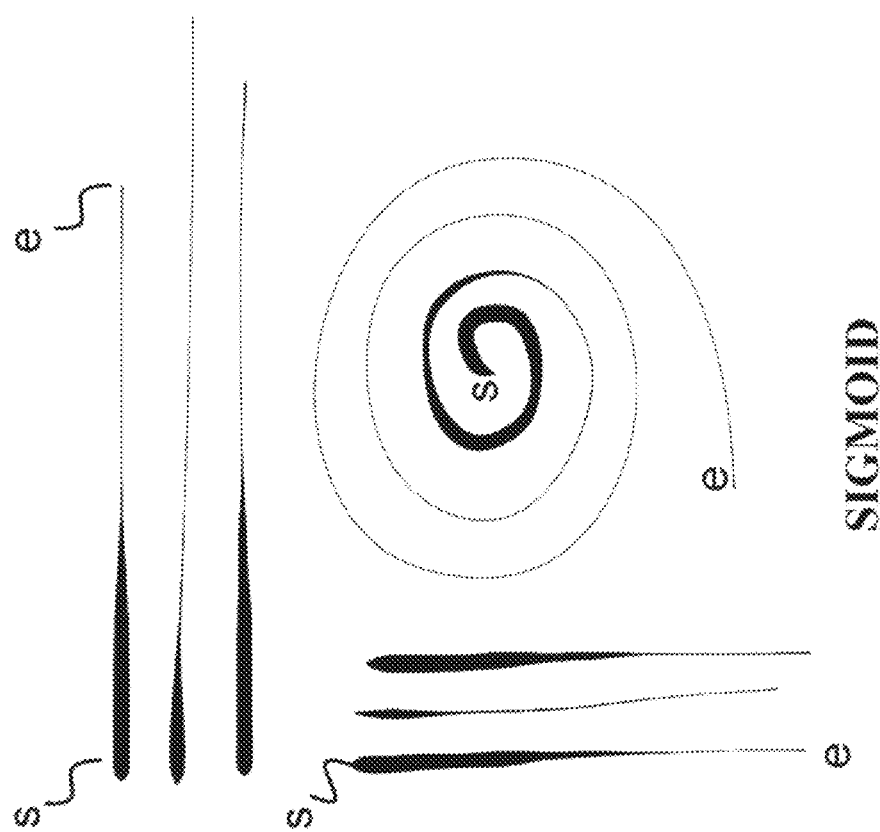
Fig. 71

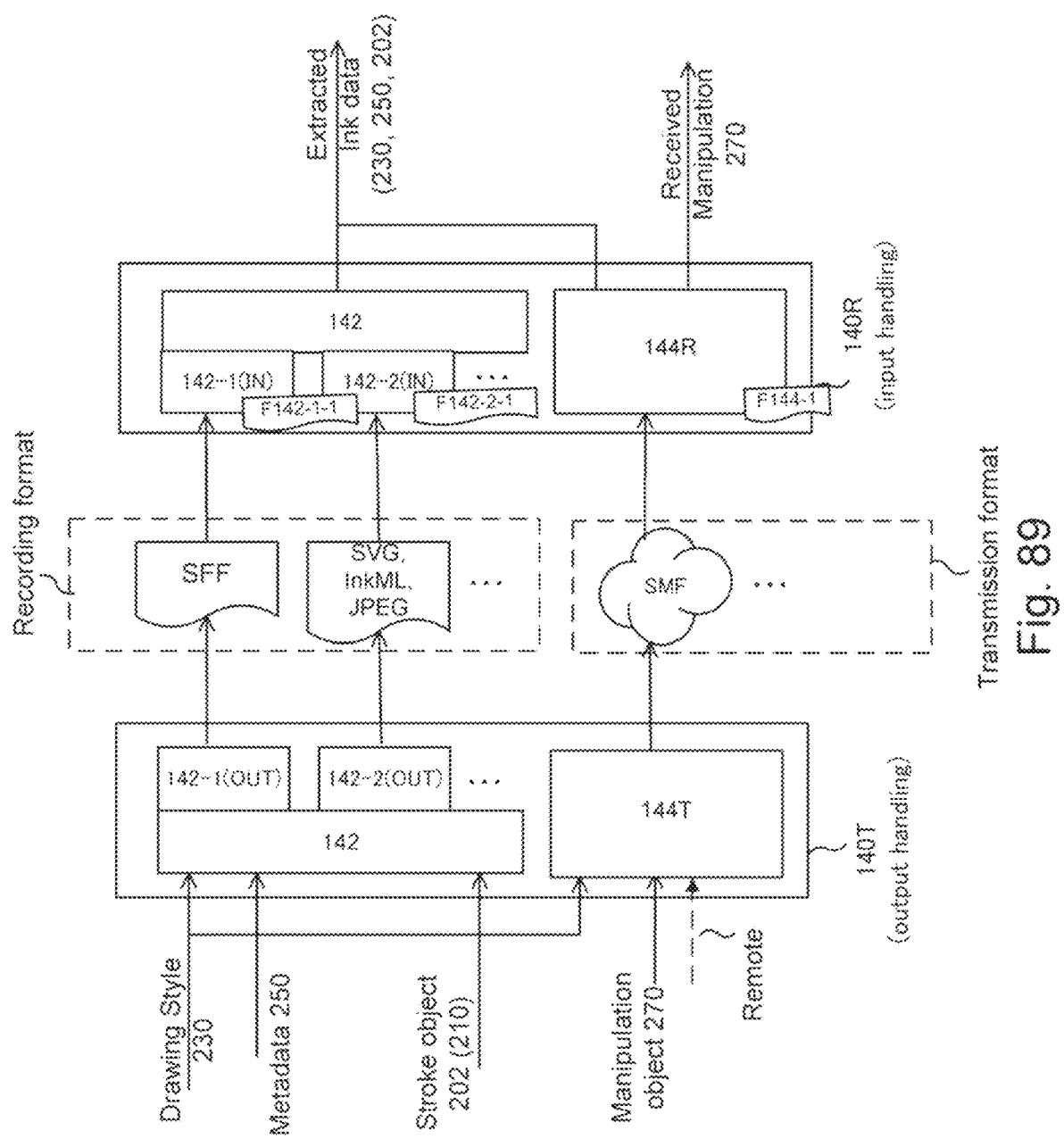

METHOD AND SYSTEM FOR INK DATA GENERATION, INK DATA RENDERING, INK DATA MANIPULATION AND INK DATA COMMUNICATION

BACKGROUND

1. Technical Field

The present invention is directed to methods and systems for generating, rendering, manipulating and communicating ink data that reproduces a path of hand-drawn (freehand) stroke data and renders the path with style.

2. Description of the Related Art

Various handwriting input systems are known, which allow a user to input hand-drawn (or freehand) data by using a pen-shaped device. For example, electromagnetic resonance type pen-tablet input systems are known, which allow input of hand-drawn data including associated pen pressure and pen tilt data. As further examples, electrostatic type pen input systems are known, which generate capacitance between an implement and a (tablet) sensor surface similarly to how capacitance is created between a finger and the sensor surface. Still further, input systems that output relatively simple information such as gesture information derived from a collection of determined positions are also known.

Typically, hand-drawn data or stroke (path or trace) data inputted by a pen-shaped implement is usable in a single drawing application to generate raster data such as pixel data or image data. A need exists for methods and systems that permit hand-drawn data or stroke data generated by operating a variety of types of devices and applications, such as ink messaging, ink archiving and retrieval applications, e-mail, photo annotation, remote video conferencing applications, etc., to be shared amongst various devices. Digital ink or ink data (hereinafter "ink data") is proposed to address such need. Typically raster data such as direct pixel data or image data is used, which is generated according to the setting of a particular application used to support a user's stroke input operation on an input device. The ink data, on the other hand, is intermediate data, which exists prior to rasterization of stroke data and which is in the form of vector data usable by a variety of applications. Sample ink data types are described in the following non-patent literature DOCUMENTS (D1) through (D4):

(D1) W3C, Recommendation 20, September 2011, "Ink Markup Language (InkML)" (URL—http://www.w3.org/TR/2011/REC-InkML-20110920/)

(D2) Microsoft Corporation, et al., "Ink Serialized Format Specification" 2007 (URL—http//download.microsoft.com/download/0/B/E/0BE8BDD7-E5E8-422A-ABFD-4342ED7AD886/InkSerializedFormat(ISF)Specification.pdf)

(D3) W3C Working Draft 11, February 2014, "Scalable Vector Graphics (SVG) 2" (URL—http://www.w3.org/TR/SVG2/); W3C Recommendation, 16 Aug. 2011, "Scalable Vector Graphics (SVG) 1.1 (Second Edition)" (URL—http://www.w3.org/TR/2011/REC-SVG11-201110816/)

(D4) W3C, "HTML5 A vocabulary and associated APIs for HTML and XHTML W3C Recommendation 28 Oct. 2014" (URL—http://www.w3.org./TR/html5/)

(D5) Slate Corporation, et al., "JOT—A Specification for an Ink Storage and Interchange Format", Version 1.0, September 1996

Briefly, the InkML (D1) and ISF (D2) data structures represent stroke data inputted by a pen-type device in a manner sharable amongst different applications. SVG (D3) provides a Web standard that permits drawing of a path defined by user-input control points as vector data, regardless of what type of pen device is used as an input device.

The ink data described in (D1) through (D4) all define geometric information needed to reproduce a trace (or path) formed by movement of a pen or a finger. Such information is herein collectively called a "stroke object."

(D1) describes the ink data that is currently most widely known. (D1) defines an object called "trace" as follows: "<trace> is the basic element used to record the trajectory of a pen as the user writes digital ink."

For example,

<ink><trace>x1 y1, x2 y2, . . . xn yn</trace></ink> describes a path of a stroke object that extends from a point x1, y1 to a point xn, yn.

(D2) describes the ink data generated by an ink function usable on Microsoft™ Windows™ applications. (D2) defines an object called "stroke" as follows: "As described earlier in the simple example, Strokes are the most fundamental and important property in ISF. Strokes contain the packet data that make up the individual points in a stroke and potentially other per-stroke properties as well."

(D3) describes a standard of a vector data supported by various browsers and drawing software, though (D3) does not assume pen input. (D3) defines information called "path" as follows: "Paths represent the outline of a shape which can be filled, stroked, used as a clipping path or any combination of the three." In SVG (D3), a path object is interpolated based on interpolation curves such as the Poly-Bezier (Cubic Bezier, Quadratic Bezier) Curves well known in the art.

For example,

<path stroke="green" stroke-width="5" d="M100,200 C100,100 300,100 300,200"/> describes a path starting from a beginning control point (100,200) to an ending control point (300,200), using two control points (100,100) and (300,100), and having a path width of "5" and color green.

(D4) defines a class called "Canvas Path," which can utilize, for example, a Quadratic Curve command and a Bezier Curve command to generate interpolated curves.

In the present description, the term "stroke object" is used as a general term that encompasses the "trace," "stroke," "path" and "Canvas Path" of (D1) through (D4) above.

A stroke object is vector data information whose data structure includes a set of point or control point coordinates that are used collectively to reproduce a trace (or a path) formed by movement of a pen or a finger. According to various embodiments, the present invention offers methods and systems for generating, manipulating (e.g., slicing), rendering and communicating ink data that represent hand-drawn (freehand) stroke data on and between various applications. Each of the embodiments provide technical solutions that were not available in the prior art of (D1)-(D5) above. It should be noted that, while the following description is organized to disclose generally four (4) embodiments of the invention, various aspects of the embodiments may be combined, supplemented, interchanged, switched or modified among and between the embodiments to produce further embodiments, as will be apparent to those skilled in the art. For example, various methods and systems of each embodiment may employ the definition of ink data, as well as the methods of generating, reproducing, drawing (rendering), manipulating and communicating the ink data and the ink data structures (data objects and data formats) as described in connection with one or more of the other embodiments disclosed herein.

Each of the following embodiments 1-4, in various examples, addresses one or more of the aspects described below.

[ASPECT ONE] Introduction of manipulation objects that partially or wholly transform pre-existing stroke objects in several computers.

According to one aspect, the invention is directed to providing manipulation objects. The previously known ink data models described above include semantics and syntax usable only for processing static stroke data, to process one stroke object as one aggregate. Thus, the previously known ink data models are not capable of selecting or slicing a portion of a stroke object. Also, the previously known ink data models allow manipulation of a stroke object on one processor, and are incapable of allowing multiple processors to share the manipulation (e.g., editing) operation executed on the stroke object in real time.

FIG. 91 illustrates an example of a manipulation object 270, a "slice" object, according to an embodiment of the present invention. A slice object 274 capable of manipulating (slicing) a portion of a stroke object is generated and transmitted. In the illustrated example, a portion of one stroke object 9101 on one computer is sliced, and a manipulation data 9103 indicative of the sliced portion is shared by other computers such that the stroke object 9101 on the other computers too can be manipulated in the same manner. Modification or manipulation (e.g., slicing) of a portion of a stroke object will be described in detail below in the first and fourth embodiments of the present invention. Sharing of one manipulation object 270 amongst multiple computers to share the edited, up-to-date status of the ink data among them will be described in detail below in the first, second and fourth embodiments of the present invention.

[ASPECT TWO] Abstracting the definition of pen event input information to absorb device differences (and making SVG more pen-input-oriented to improve SVG's pent-input expression capability).

According to a further aspect, the invention is directed to making hand-drawn input data abstract so as to absorb any differences that exist among different input devices. This is achieved by abstracting pre-existing input attributes of strokes, such as pen pressure and pen angle information, to higher-level-concept attributes defined in a novel model. In general, the information that needs to be reproduced based on hand-drawn input data is not "how" the hand-drawn data was inputted, such as at what angle a pen (stylus) was held, at what point in time what coordinate was obtained, and how much pen pressure was applied, etc. Instead, the information that needs to be captured is vector data that can reproduce the "result" of such pen (style) operation or drawing operation that was carried out with certain pen pressure, pen speed, etc.

Currently various hand-drawn input devices exist, ranging from a high-performance input device (e.g., 9202C in FIG. 92) capable of obtaining pen pressure, pen angle, pen rotational angle data, etc., to a widely used electrostatic tablet or other simpler input devices capable of receiving input by a finger but not capable of obtaining pen pressure, pen tilt angle, etc. (e.g., 9202A in FIG. 92). Thus, it is desirable to convert any device-dependent attributes of hand-drawn input data (shown as "Device dependent Pen Event Data" of 9202A-9202C in FIG. 92, for example) to device-independent abstracted vector data (9204 in FIG. 92), which can be used to reproduce the "result" of a pen event.

The ink data defined in such an abstracted form may be organized in vector data, to ultimately produce raster data (image data) as shown in 9208 in FIG. 92. SVG11 (D3) discussed above defines vector data, and is shown as 9206 in FIG. 92. SVG11 (D3) does not permit varying or adjusting the stroke width, color and transparency (opacity) and, as a result, is not particularly suited for reproducing the "result" of a pen event. Also, SVG includes data other than the stroke object path coordinates data, such as control points used to generate Bezier curves, and thus are not suited for use with various applications 9220 other than specialized drawing applications.

In addition to producing raster image data (9208, FIG. 92), it is also desirable to organize the ink data in a more abstracted form in vector, for use in a signature verification application, in an annotation application, etc. In this regard, abstraction is preferably not too image-oriented, but should result in abstract attributes that may be used to define ink data in both raster form and in vector form. Abstracting device-dependent pen event data 9202 of Type 1 (including pen pressure data) and of Type 2 (not including pen pressure data) to the generalized ink data, which is the intermediate data 9204 in FIG. 92, will be described in detail below in the first and third embodiments of the present invention.

[ASPECT THREE] Extending the life cycle of an ink data ecosystem by separating a language (information model) from a format.

For example, contents of raster data such as digital photos are often used not only by a single service or on a single application, but by multiple services and applications and are shared by or transferred amongst all in a chained manner on a particular "ecosystem" (though they may be processed in various formats such as JPEG, GIF, TIFF, etc.). These various formats may be used because raster data includes a common information model which conceptually describes a collection of pixel values.

According to a still further aspect, the invention is directed to facilitating ink data exchange and transfer between different formats, based on adoption of the common language (stroke language (SL)). The stroke language (SL) is an information model that defines semantics of the ink data of the present invention, as opposed to the formats of the ink data. That is, the ink data thus defined by abstracted attributes may be processed into different raster image formats (PNG, JPEG, etc.), exchanged between different vector graphics formats (SVG, InkML, HTML5, etc.), or produced in different stream formats (ISF, InkML, etc.) that define stroke structures. FIG. 93 conceptually describes this aspect of the invention. To add flexibility to output format types as well as input format types, and to accommodate a variety of output and input format types, the common language (or the information model that defines the common language) preferably resides in the intermediary between a device driver level that generates the language and an output level at which the generated language is outputted into a file, packets, etc. In particular, the ink data processing section 100 according to various embodiments of the invention includes an ink data generation section 120 that generates ink data based on the abstracted language (stroke language), and an ink data formatting section 140 that handles input and output of the ink data in various formats, as two separate components. Since the function of ink data generation and the function of ink data formatting for input/output purposes are separated, the ink data processing section 100 is suited to be used as a building block of the ink data ecosystem to spread use of the ink data amongst various devices. This aspect of the invention will be described in detail below in the fourth embodiment.

These three aspects of the invention as described in FIGS. 91-93 will be discussed again after the description of the first through fourth embodiments of the present invention below.

BRIEF DESCRIPTION OF THE SEVERAL VIEWS OF THE DRAWINGS

FIG. 10 illustrates a sample stroke file format (SFF) file written in the Interface Definition Language (IDL), which may be outputted at point "E" of the ink data processing device of FIG. 5.

FIG. 16A illustrates a first one of two slices resulting from slicing a stroke object, derived in step S1415 of FIG. 14.

FIG. 16B illustrates a data structure of parameters that define the first slice of FIG. 16A.

FIG. 16C illustrates a rendered path of the newly-created first stroke object.

FIG. 17A illustrates a second one of the two slices resulting from slicing the stroke object, derived in step S1415 of FIG. 14.

FIG. 17B illustrates a data structure of parameters that define the second slice of FIG. 17A.

FIG. 17C illustrates a rendered path of the newly-created second stroke object.

FIG. 18B illustrates a data structure of parameters that define a hole segment object, according to first embodiments of the present invention.

FIGS. 21A-21D illustrate different transmission message types (Type A, Type B, Type C and Type D) that may be used to transmit ink data in connection with a slicing operation.

FIGS. 30A-30C illustrate communications parameters, drawing parameters, and user policy parameters, respectively, which collectively describe or define a transmission device's communications and graphics environment.

FIG. 39B illustrates a sample data transmission format of DATA_INK_ALLOS_REQ, which is a message that requests the stroke object data of an entire stroke when the stroke ID is known.

FIGS. 46A-46C illustrate three configuration examples of ink data generating methods according to third embodiments of the present invention.

FIGS. 47A and 47B illustrate two configuration examples of ink data reproducing methods according to third embodiments of the present invention.

FIG. 48H is a diagram that explains operation of a manipulation (erase) object.

FIG. 50A is a flow diagram illustrating a process executed in a "ink data generation section" of FIG. 49 to output radius and alpha information as attributes of a point object, according to third embodiments of the present invention.

FIG. 58 illustrates an implementation example of steps S1411 and S1413 of FIG. 57, according to third embodiments of the present invention.

FIG. 66 illustrates an implementation example of steps S2011 and S2013 of FIG. 65, according to third embodiments of the present invention.

FIG. 71 illustrates drawing rendering examples, which show effects of other functions (sigmoid and periodic functions) of FIG. 54, according to third embodiments of the present invention.

FIG. 89 is a functional block diagram that explains input processing of data (SFF/JPEG and SMF) that have been outputted in various file formats and messaging formats.

DETAILED DESCRIPTION

Figure 1:
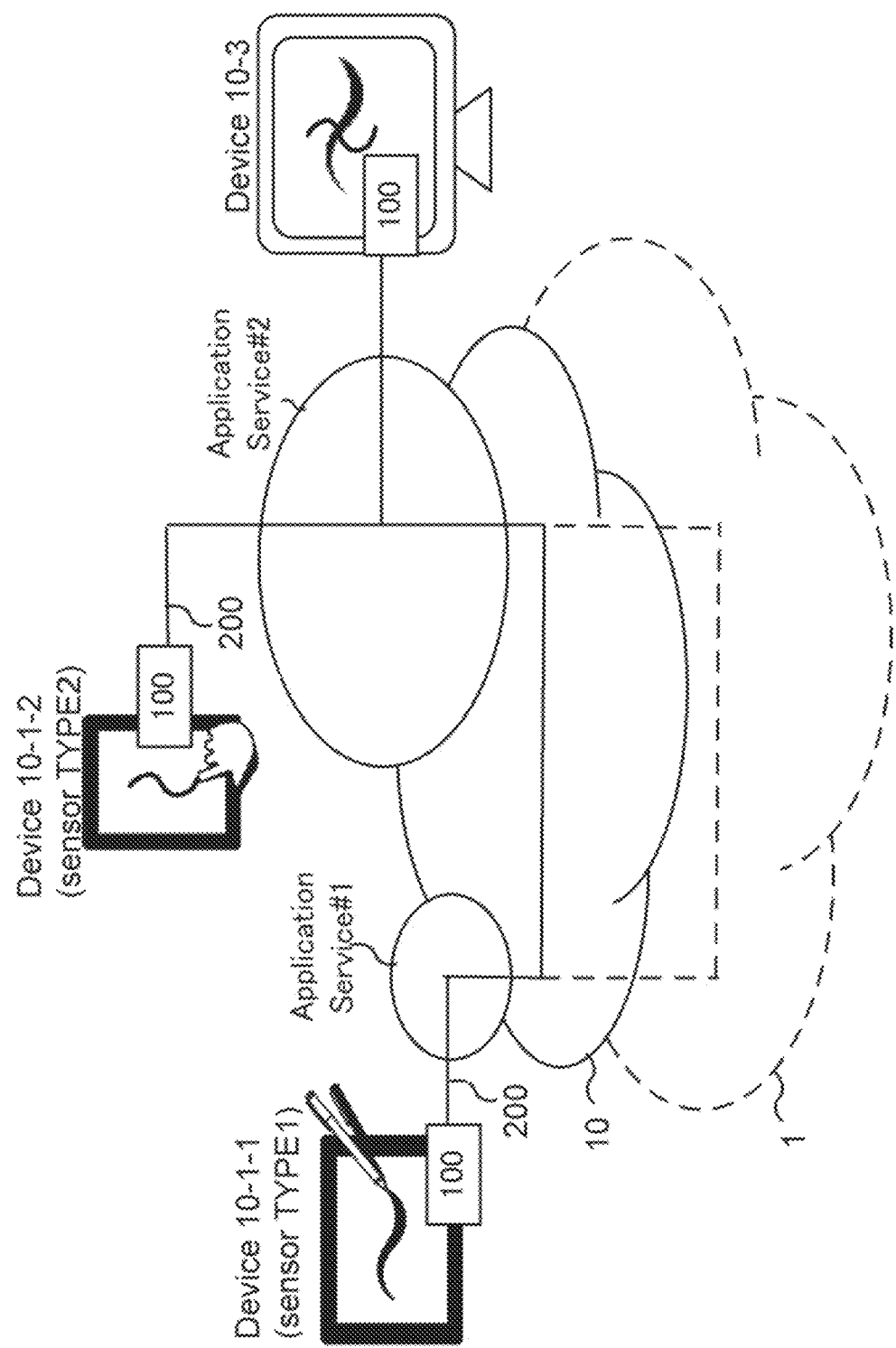
FIG. 1 is a diagram illustrating an overall system in which ink data are generated and utilized, according to various embodiments of the present invention.

As used herein, and unless otherwise specifically defined in a particular context to be applicable only to a particular embodiment, the following terms have the following meaning throughout the various embodiments described herein.

"Pen event data" (INPUT1) means data inputted based on a user's hand drawing motion. Pen event data may be the raw data as inputted by a given input device, or data that has been processed from the raw data. While all pen event data are expected to have at least the positional information (e.g., XY coordinates) of each stroke drawn by a user, pen event data is device-dependent and includes attributes (e.g., pen pressure data, pen rotation or tilt angle data, etc.) that are specific to each type of input device. For example, pen event data received from input devices capable of detecting pen pressure is different from pen event data received from input devices incapable of detecting pen pressure.

"Ink data" (200) means a collection of objects that are derived from pen event data. Ink data 200 captures paths (strokes) formed based on pen event data and is in the form of vector data, which is a type of intermediate data that describes properties (color, pen type, etc.) of each path. Ink data 200 is device-independent in that it can be shared by those devices that support pen pressure and/or pen rotation/tilt angle attributes and by those devices that do not support these attributes. Ink data 200 according to embodiments of the invention includes stroke objects 210, metadata objects 250, drawing style objects 230, and manipulation objects 270. Ink data 200 will be described in detail below in FIGS. 2, 3A-4B, 25, 48A-48I, etc.

"Stroke object" (210) is one type of object or data included in the ink data 200. The "stroke," "path," "trace" and "CanvasPath" described in (D1)-(D4) above are all stroke objects 210. A stroke object 210 describes a shape of a path (stroke) obtained by a user operation of an input device.

"Metadata object" (250) is one type of object included in the ink data 200, and include non-drawing related information that describes a stroke object 210, such as authorship, pen ID, locally obtained date and time information, location information obtained by GPS, etc.

"Drawing style object" (230) is one type of object included in the ink data 200, and includes information necessary to control the shape (stroke width, stroke style/pattern) and color of a stroke object 210 when rendered (drawn, expressed, rasterized) on a display. In short, the drawing style object controls rendering (drawing) of a stroke object 210.

"Manipulation object" (270) is one type of object included in the ink data 200 and executes a manipulative/modification operation (e.g., slicing operation) on the whole of, or a part of, each of one or more pre-existing stroke objects 210. Application of a manipulation object 270 to a part of a stroke object will be described in detail below in the first embodiment.

"Stroke language (SL)" is an information model that defines attributes and meanings of various objects that form the ink data 200.

"Stroke file format (SFF)" is a type of recording format, in which the ink data 200 to be outputted are serialized in a recording format. Details of SFF will be described below in reference to FIGS. 10, 11, 19, 28, 48J, 48K, 48L, 57, 65 and 86.

"Recording format" means a format suitable for persisting ink data 200, such as the SFF format and the SVG format. Ink data 200 in a recording format can be recorded in storage (HDD, network storage, etc.) as a file or database and its serialized data stream can be retrieved and deserialized therefrom.

"Stroke message format (SMF)" is one type of a message transmission format included in a transmission packet or frame, for use in transmitting the ink data 200 using a defined transmission protocol. Details of SMF will be described below in reference to FIGS. 12, 21, 34, 35A, 35B, 39A, 39B and 88.

"Transmission format" means a message format suitable for transmitting (messaging) ink data 200 over a network, such as the SMF format.

"Image data" means rasterized images, such as GIF and JPEG images, containing pixel data, which can be produced (drawn) based on ink data 200. Image-format data which is not intermediate cannot be reverted back to ink data 200.

Figure 5:
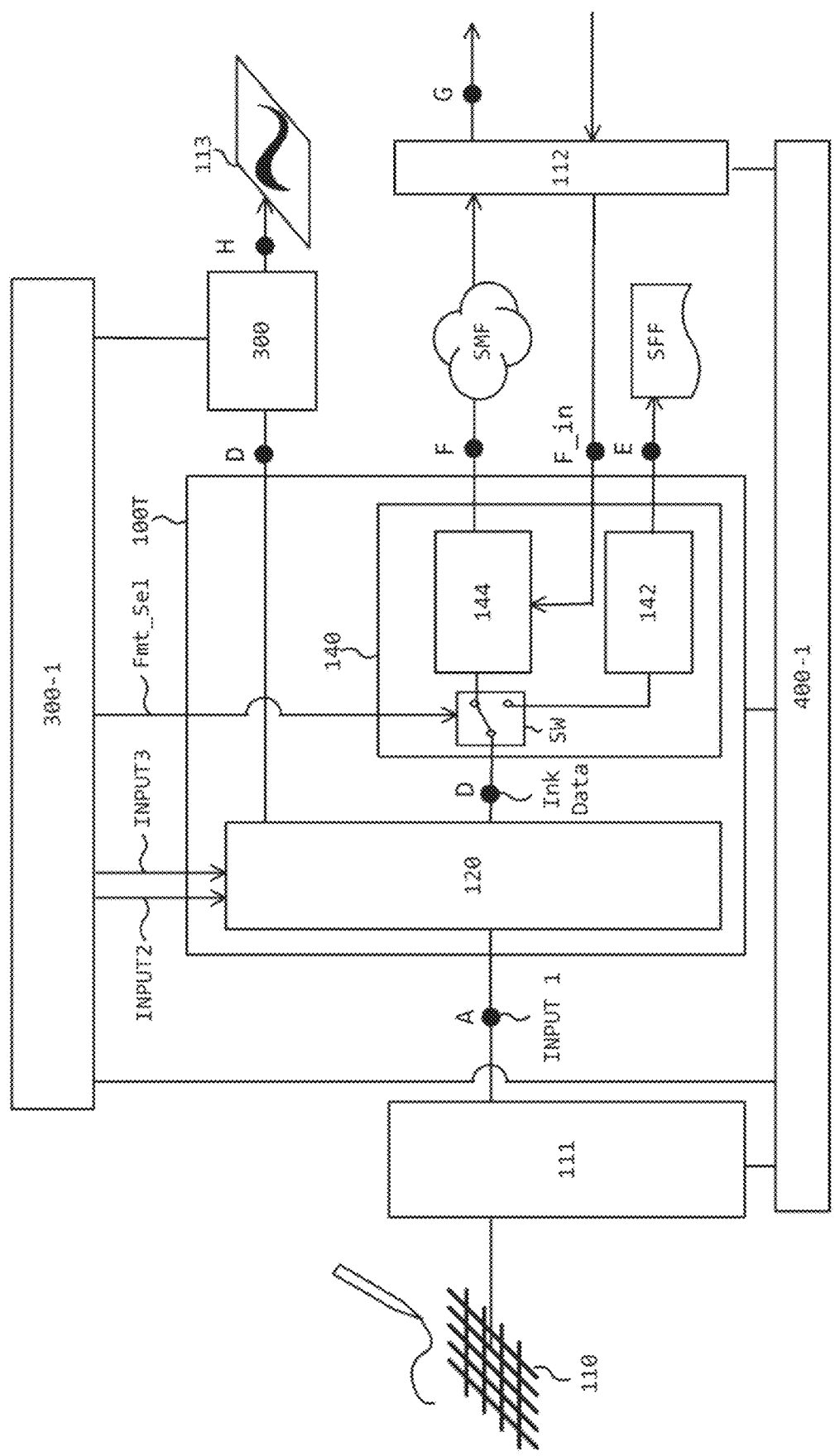
FIG. 5 is a functional block diagram of an ink data processing device according to first embodiments of the present invention.

The following terms are used to describe several main structures and components used to process the ink data 200, as shown in FIG. 5 for example.

"Ink data processing section" (100) means a processor that generates, stores, and processes the ink data 200. In the description, the ink data processing section that is used to generate the ink data 200, based on pen event data, and to arrange the ink data 200 in a defined format may be indicated by a reference numeral 100T, while the ink data processing section that is used to reproduce the ink data 200, which has been generated and arranged in a defined format, within a computer may be indicated by a reference numeral 100R. Details of the ink data processing section 100 will be described below in reference to FIGS. 5 and 75, and additionally in reference to FIGS. 6, 22, 27, 31, 49 and 74. The ink data processing section 100 generally inputs/includes/receives three types of information: 1) PenEvent (type input) information ("INPUT 1"), 2) Context information ("INPUT 2"), and 3) Manipulation information ("INPUT 3").

"Ink data generation section" (120) produces the ink data 200 or extracts the ink data 200. In the description, the ink data generation section that generates the ink data 200 based on input signal received from an input sensor may be indicated by a reference numeral 120T, and the ink data generation section that extracts the already-generated ink data 200 and restores it in memory may be indicated by a reference numeral 120R.

"Ink data formatting section" (140) processes the ink data 200 arranged in the recording format or in the transport format for the purpose of input and output. In the description, the ink data formatting section that outputs the ink data 200 in a defined format may be indicated by a reference numeral 140T, and the ink data formatting section that inputs the ink data 200 in a defined format may be indicated by a reference numeral 140R.

First Embodiment

A first embodiment of the present invention is directed to generating, rendering, manipulating (e.g., slicing) and communicating stroke objects 210 that form ink data 200. In particular, manipulation of a portion of a stroke object 210, as described above in reference to FIG. 91, as well as sharing (transmission) of the manipulation operation amongst multiple processors will be described.

Background of the First Embodiment

The stroke objects described in (D1) through (D4) include points or control points, which are necessary for generating interpolated curves or paths by using a predetermined interpolation curve algorithm.

(D1) and (D2) do not specify any particular interpolation curve algorithm, i.e., any suitable interpolation curve algorithm can be used.

(D3) and (D4) use the Poly-Bezier (Cubic Bezier) Curves. In the Poly-Bezier Curve, the start point Pi and the end point Pi+1 of single curve segment (path segment) are used as control points. In addition, at least one more control point is required to define a curvature of the curve segment between point Pi and point Pi+1 (the start point and the end point), wherein the control point is different from either Pi or Pi+1 and is not on the curve that includes the curve segment (i.e., outside the curve). For example, the Cubic Bezier Curve requires two control points located outside a curve to define a curve segment.

For example, XML notation <stroke-width="5" d="M 100, 200 C100, 100 300, 100 300, 200"/> used for the Cubic Bezier Curve means:

Start point of (100, 200) is used as a control point; End point (300, 200) is used as another control point; and Two more control points (100, 100) and (300, 100) are used to define a curve segment (between the start point and the end point but outside the curve segment).

Recently the W3C SVG Working Group responsible for SVG (D3) above has been discussing possible use of the Catmull-Rom Curve to interpolate curves. Unlike the Poly- Bezier Curve, the Catmull-Rom Curve does not have control points that are outside the curve (i.e., not on the curve). The Catmull-Rom Curve defines each curve segment with four control points: a start point (Pi), an end point (Pi+1), a point "before" the start point (Pi−1), and a point "after" the end point (Pi+2). All of the control points are on the curve. In other words, the Catmull-Rom Curve passes through all of its control points. (Though, because each curve segment requires two control points "before" and "after" the curve segment, the curve segments at the two extreme ends of a stroke object are undefined.)

Summary of the First Embodiment

Figure 24A:
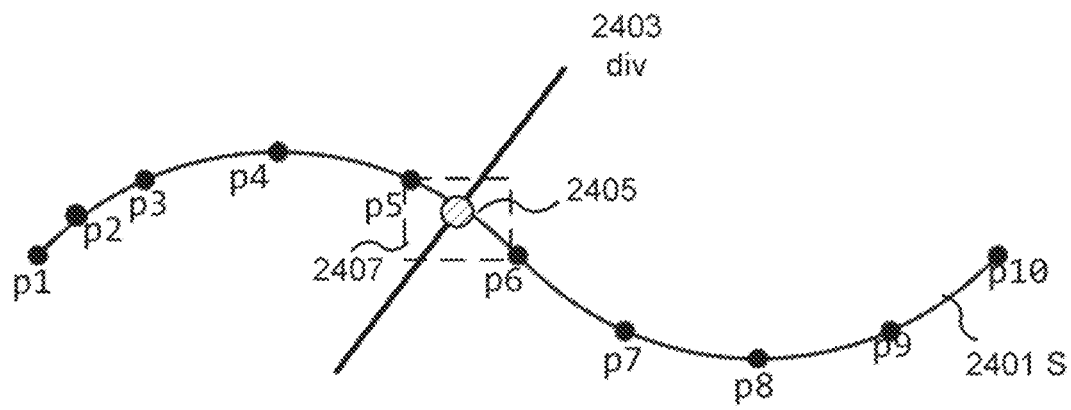
FIGS. 24A and 24B illustrate a technical problem associated with the prior art.
Figure 24B:
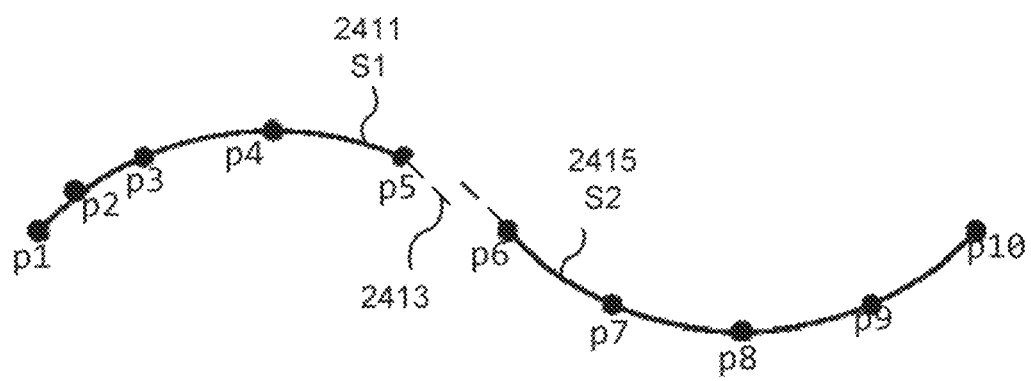

FIGS. 24A and 24B illustrate one technical problem encountered in the ink data definition in the prior art D1 to D5. FIG. 24A illustrates a curve 2401S represented by a stroke object, to which a slicing operation 2403 is applied. The stroke object representing the curve 2401S includes a set of point coordinates (p1~p10) inputted via an input sensor.

In FIG. 24A, the slicing operation 2403 is applied to slice a curve segment of the stroke object between point coordinates p5 and p6 along a division line that passes through a cross-point 2405. FIG. 24B illustrates two segmented curves 2411 S1 and 2415 S2, which result from the slicing operation 2403. The curve 2411 S1 includes point coordinates p1 through p5, and the curve 2415 S2 includes point coordinates p6 through p10. As shown, the segmented curve 2411 S1 displayed as a solid line ends at the point coordinate p5 and, thus, is shorter than the actual segmented curve that extends to the cross-point 2405. Similarly, the segmented curve 2415 S2 displayed as a solid line starts at the point coordinate p6 and is shorter than the actual segmented curve that starts at the cross-point 2405. In FIG. 24B, partial curve segments 2413 shown in broken line indicate those segments of the curve that are lost due to the slicing operation 2403.

It is possible to add a new control point at the cross-point 2405 and further control points to define the newly-created partial curve segments 2413 between p5 and the cross-point 2405 and between the cross-point 2405 and p6. Calculating the positions of new control points to represent the precise shape of the partial curve segments 2413 to an end point 2405 is computationally intensive and is no easy task. For example, when an interpolation curve such as the Cubic Bezier Curve is used, two control points outside the curve (or path) need to be calculated to define each new segment. When the Catmull-Rom Curve is used, two control points along the curve need to be calculated (or recalculated) to define each new segment, which will lead to cascade recalculation of all previous control points in order to maintain the actual curvature. Both types of calculation are highly complex and too time-consuming to support real-time implementation of a slicing operation in a graphics or drawing application.

A need exists for a method and system that allow a user to slice a stroke object forming ink data, wherein each of the two slices resulting from the slicing operation represents the actual segmented curve sliced from the original stroke object. Preferably the method and system do not require calculating new positions of control points used for interpolating curves because such calculation is complex and often too computationally intensive to support real-time application.

According to one aspect, the present invention provides methods and systems for generating, drawing, manipulating (e.g., slicing), and communicating ink data including stroke objects 210, wherein the stroke object 210 includes or is associated with range information that defines a particular portion of the stroke object 210 to be rendered (displayed). When the range information indicates full display, the stroke object 210 is displayed in its entirety, and when the range information indicates partial display, one or both ends of the stroke object 210 is partially designated to be not displayed. When a slicing operation is applied to an original stroke object 210 to produce two new stroke objects 210, the first new stroke object 210 is associated with range information that designates a new "end" point at which rasterizing (or rendering or consequently displaying) of the first new stroke ends. Correspondingly, the second new stroke object 210 is associated with range information that designates a new "start" point from which display of the second new stroke starts. Both the first and second new stroke objects 210 retain the same structure and the same control points (albeit partially) as the original stroke object and, thus, display of the first and second new stroke objects 210 precisely follows the shape of the original stroke object 210 and, also, it is not necessary to calculate new control points.

According to another aspect, methods and systems are provided that output a stroke object 210 to form ink data 200. The stroke object includes a plurality of point objects, which represent a plurality of coordinate positions. At least some of the point objects serve as control points used to generate interpolated curve segments, which together form a path of the stroke object 210. The stroke object 210 further includes range information that defines a start point in a starting curve segment at which display of the stroke object 210 starts, and an end point in an ending curve segment at which display of the stroke object 210 ends. When an original stroke object 210 is sliced to generate two new stroke objects 210, each of the two new stroke objects 210 includes a partial set of the point objects duplicated from the original stroke object 210 as well as its own range information, i.e., parameters indicating its own start point and its own end point.

According to another aspect, methods and systems are provided that draw (render on a display) the ink data structured as above, wherein each stroke object 210 includes a plurality of point objects and range information. At least some of the point objects are control points used to generate interpolated curve segments. The methods and systems draw each stroke object 210 on a display by interpolating curve segments based on the control points to generate a path of the stroke object 210 and by displaying a portion of the stroke object 210 designated by the range information. In other words the methods and systems start to display the stroke object 210 at a start point indicated in the range information and stop displaying the stroke object 210 at an end point indicated in the range information.

According to a further aspect, methods and systems are provided that allow a user to slice a stroke object 210 of the ink data structured as above. When a user performs a slicing operation on a stroke object 210, the methods and systems calculate the position of a cross-point between the slicing path and the stroke object 210. (See 2405 in FIG. 24A). The methods and systems generate two new stroke objects 210 resulting from the slicing operation: a first stroke object 210 and a second stroke object 210. The first stroke object 210 includes a first set of point objects and first range information that indicates a display start point and a display end point, wherein the display end point is derived from the calculated cross-point. The second stroke object 210 includes a second set of point objects and second range information that includes a display start point and a display end point, wherein the display start point is derived from the calculated cross-point. Typically the first range information of the first stroke object 210 retains the same display start point as that of the original stroke object 210, and the second range information of the second stroke object 210 retains the same display end point as that of the original stroke object 210.

The ink data structured as above may be readily communicated between different devices or applications capable of processing the ink data such that multiple users can share the experience of drawing and manipulating (slicing) strokes on a common drawing area (common "canvas") in real time.

According to various methods and systems of the present invention, the ink data structured as above are generated/outputted, drawn on a display, used to allow a user to slice a stroke object 210, and shared amongst different users. Use of the range information to display only a portion of the actual curve segments included in a stroke object 210 makes it possible to display sliced (newly-created) stroke objects 210 that precisely follow the shape of the original stroke object 210 to its end. Also, because the sliced stroke objects 210 retain the same structure and the same control points (albeit partially) as the original stroke object 210, there is no need to calculate or recalculate new control points in connection with a slicing operation.

The methods and systems of the present invention may be applied in ink data in which curve segments are interpolated according to various types curve interpolation algorithms, such as the Poly-Bezier Curve (Cubic Bezier, Quadratic Bezier) algorithm and the Catmull-Rom Curve algorithm known in the art.

Description of the First Embodiment

FIG. 1 is a diagram illustrating an overall system in which ink data 200 are utilized, according to embodiments of the present invention. In FIG. 1, a cloud portion 1 outlined in broken lines represents an infrastructure such as the Internet, on which a system that utilizes ink data 200 of the present invention may operate. The Internet as an exemplary infrastructure is built on a standardized set of internet protocol suites (e.g., IP, TCP, HTTP) and libraries and software that implement various Web and mail data formats (HTML, MIME) and their communications methods (HTTP, SMTP), which absorb differences amongst vendor-proprietary hardware configurations and operating systems. In FIG. 1, arrows in broken lines that pass through the infrastructure portion 1 illustrate data exchange occurring based on these infrastructure technologies. In FIG. 1, a cloud portion 10 outlined in solid lines represents an infrastructure for exchanging ink data 200, which is realized by establishing a common information model (language) regarding ink data 200. Ink data 200 are generalized so as to be commonly usable by a variety of application services (or ecosystems) and variety of devices. For example, Application Service #1 and Application Service #2 in FIG. 1 may both utilize and exchange the ink data 200 via the ink data exchange infrastructure 10, which may be realized as necessary libraries for ink data processing section 100 that are distributedly supported by several kinds of computers, e.g., mobile terminals and servers. Arrows in solid lines that pass through the data exchange infrastructure 10 illustrate exchange of ink data 200 amongst various applications provided for several application services utilizing a group of libraries for utilizing ink data 200. By establishing a common information model in the area (domain) of ink data 200, various types of applications and services can share and exchange ink data 200.

In FIG. 1, Device 10-1 includes, as an input sensor, a pen-tablet-type input device capable of outputting pen pressure data, and generates ink data using Application #1 provided for Application Service #1 provided by a first provider/software vendor. The generated ink data 200 may then be outputted in a suitable output form (e.g., SMF in packets) corresponding to the destination media (e.g., a network).

Device 10-1-2 is a tablet-type input device capable of receiving hand-drawn input made by a user's finger. The sensor of Device 10-1-2 is not capable of outputting pen pressure data, and generates ink data 200 that does not utilize pen pressure information using Application #2 provided for Application Service #2 or in a suitable output form corresponding to the destination media.

Device 10-3 is yet another type of computer (e.g., a desktop-type PC) that uses to Application Service #2. Device 10-3 may combine (synthesize) the ink data 200 respectively provided from Device 10-1-1 and Device 10-1-2. Device 10-3 may render (draw) on its screen the ink data 200 outputted from Device 10-1-1 and Device 10-1-2 that are superimposed on one another.

Figure 2:
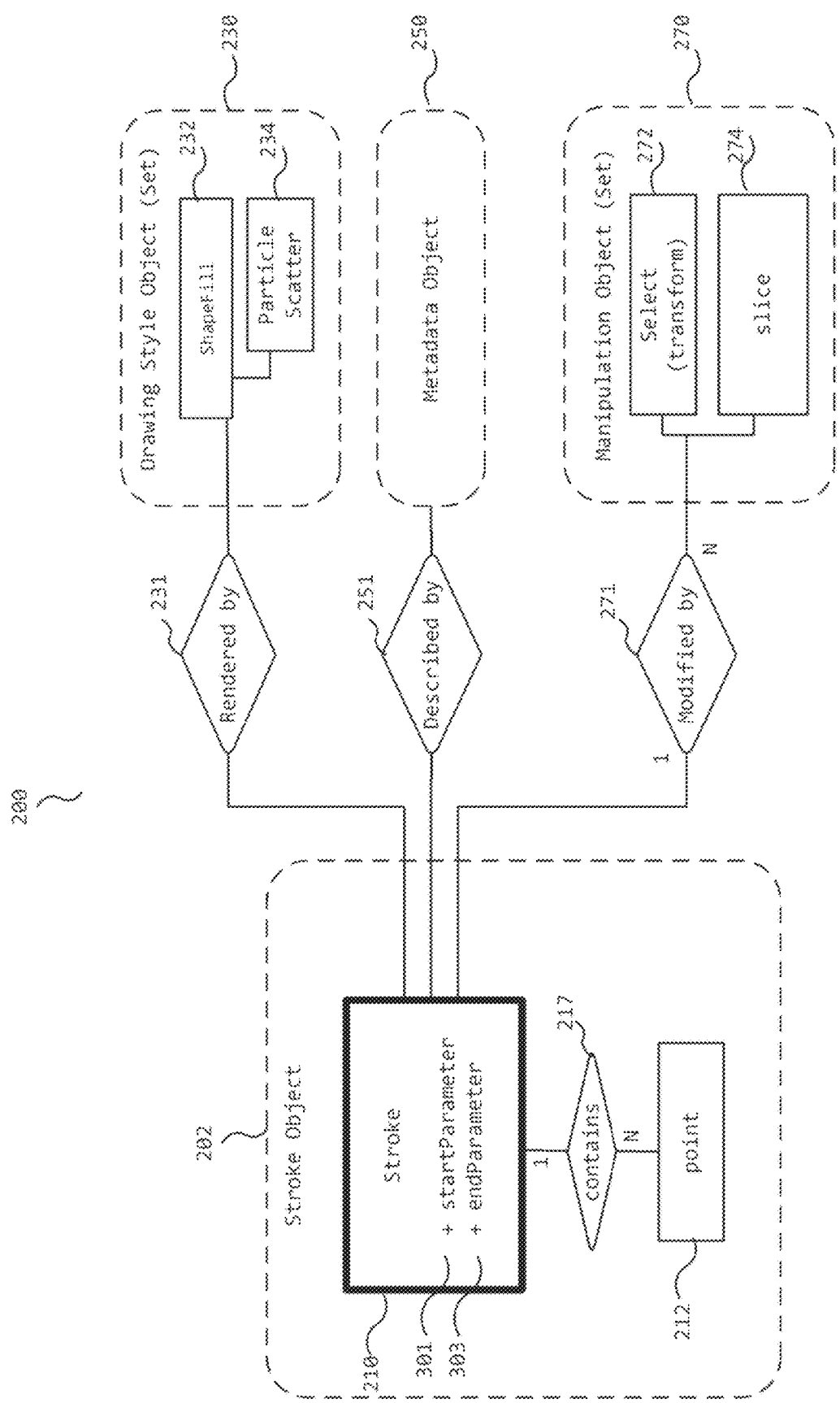
FIG. 2 is an entity relationship diagram of an ink data structure, suitable for use in embodiments of the present invention.

FIG. 2 is an entity relationship diagram of an ink data model. The ink data 200 according to embodiments of the present invention include a stroke object set 202, a drawing style object (set) 230 including information needed to control the shape and color of a stroke object 210 when rendered (drawn, expressed, rasterized) on a screen or display, a metadata object 250 including non-drawing related information that describes the stroke object 210 (e.g., authorship), and a manipulation object (set) 270 including information needed to manipulate (e.g., slice, rotate) a pre-existing stroke object 210.

The stroke object 210 in a stroke object set 202 includes information necessary to reproduce a stroke 210 (or trace, path) formed by movement of a pointer (finger, pen, etc.). The stroke contains (217) multiple ("N" number of) point objects 212 (Point_1 . . . Point_N). In other words, the stroke is supported by coordinates of the multiple point objects, which are obtained from sampling pen event data (pointer operation) generated by movement of a pointer. The point object may take any form, such as an absolute or relative coordinate value form or a vector form, as long as it may indicate a position of the point object in a 2D, 3D . . . ND space. In various embodiments, the plurality of point objects serve as control points, which can be used to interpolate curve segments therebetween to thereby form a path (stroke) of the stroke object 210.

According to embodiments of the present invention, the stroke object 210 further includes range information that defines which portion of the stroke object 210 is to be displayed. In the illustrated embodiment, the range information includes a first parameter "start Parameter" 301, which defines a start point in a starting curve segment of the stroke object 210, and a second parameter "end Parameter" 303, which defines an end point in an ending curve segment of the stroke object 210. The range information is generated for the stroke object 210 after the point objects have been generated. For example, when a manipulation operation such as a slicing operation is performed on a stroke object 210 to generate two new stroke objects 210, two sets of point objects that respectively form the two new stroke objects 210 are obtained, and range information is added to each of the two new stroke objects 210.

As used herein, the starting curve segment and the ending curve segment mean those segments at which drawing (display) operation starts and ends, respectively. Thus, a very first curve segment of a stroke object 210, which is designated not to be displayed at all, is not a "starting" curve segment as used herein. Similarly, a very last curve segment, which is designated not to be displayed at all, is not an "ending" curve segment.

There are generally two methods for generating (x, y) coordinates of multiple point objects. First, the coordinate points derived from pen event data (pen operation) may be outputted, while the pen event data is being inputted, as points of "raw value type." Second, after all points forming a complete stroke are entered, a Cubic Spline function such as a Bezier Curve function or a higher-order function (e.g., Lagrange polynomial) representative of a fitted curve for the stroke is generated, and a minimum number of point objects needed to express the fitted curve may be obtained as of "optimized point type." In the following description, it is assumed that the point objects are generated as of the "raw value type" according to the first method, though the present invention may use the point objects of the "optimized point type" according to the second method also.

The drawing style object (set) 230 includes information necessary to control the shape (stroke width, stroke style/pattern) and color of a stroke object 210 when rendered (drawn, expressed, rasterized) on a display. In short, the drawing style object 230 controls rendering of a stroke object 210. The drawing style object (set) 230 of the illustrated example includes a Shape Fill object 232 and a Particle Scatter object 234.

Figure 3A:
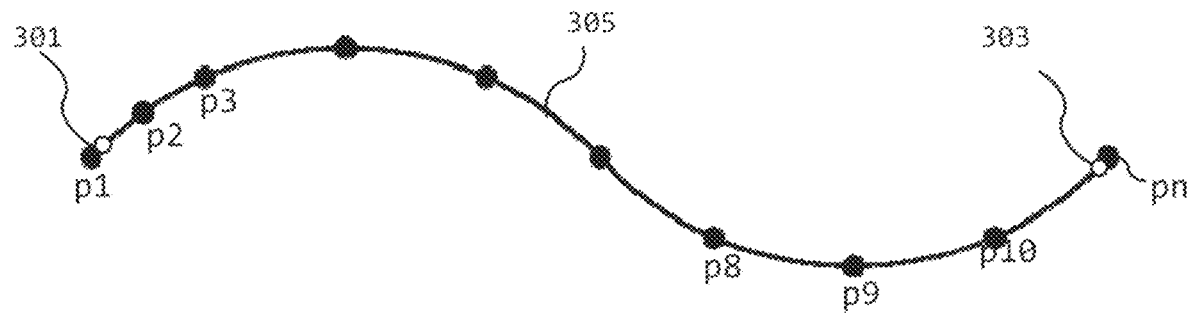
FIG. 3A illustrates a stroke object, which is defined by multiple point objects.
Figure 3B:
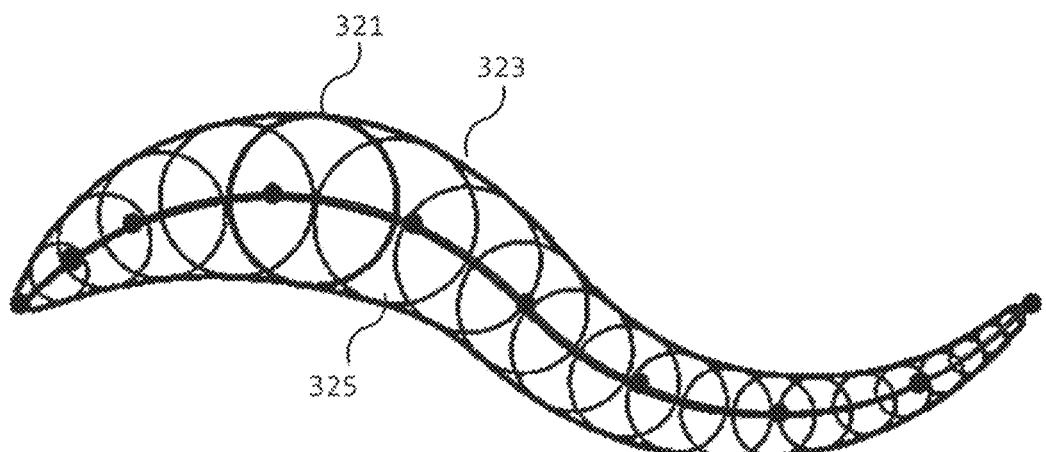
FIGS. 3B and 3C illustrate two rendering (drawing) results of the stroke object of FIG. 3A according to two different drawing style objects.
Figure 3C:
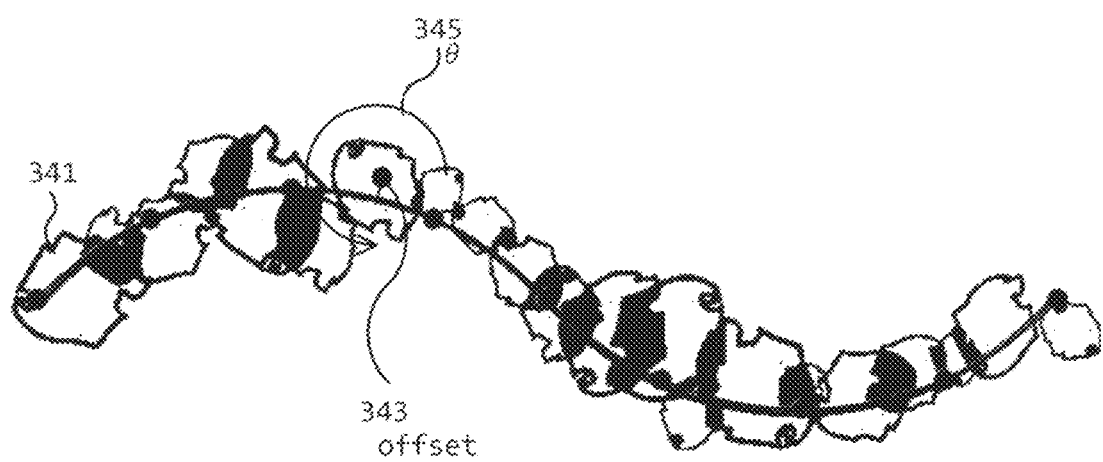

FIGS. 3B and 3C respectively illustrate two rendering (drawing) results according to two different drawing style objects of the same stroke object 210 of FIG. 3A.

FIG. 3B illustrates a rendering (drawing) result of the Shape Fill object 232, which represents the stroke object 210 as a collection of circles 321 having various radii or widths. The centers of the circles are aligned along the trace represented by the stroke object 210 and the outer peripheries of the collection of the circles are used to generate (calculate) envelopes 323 and 325. The envelopes 323 and 325 are then used to draw the stroke object 210 of FIG. 3A on a screen or display.

FIG. 3C illustrates a rendering (drawing) result of the Particle Scatter object 234, which draws the stroke object 210 of FIG. 3A as a collection of point sprites, which are shaped particles 341 (flakes) having a center, varying in size, and a rotational angle 345 (θ) relative to a defined axis of the flake. Each flake of varying size is rotated by θ relative to the defined axis, and its center is shifted by an offset 343 from the trace in a direction perpendicular to the trace direction. The offset 343 is a random value derived from a predetermined seed.

A metadata object 250 (see FIG. 2) includes non-drawing related information that describes a stroke object 210, such as authorship, pen ID, locally obtained date and time information, location information obtained by GPS, etc.

Figure 4A:
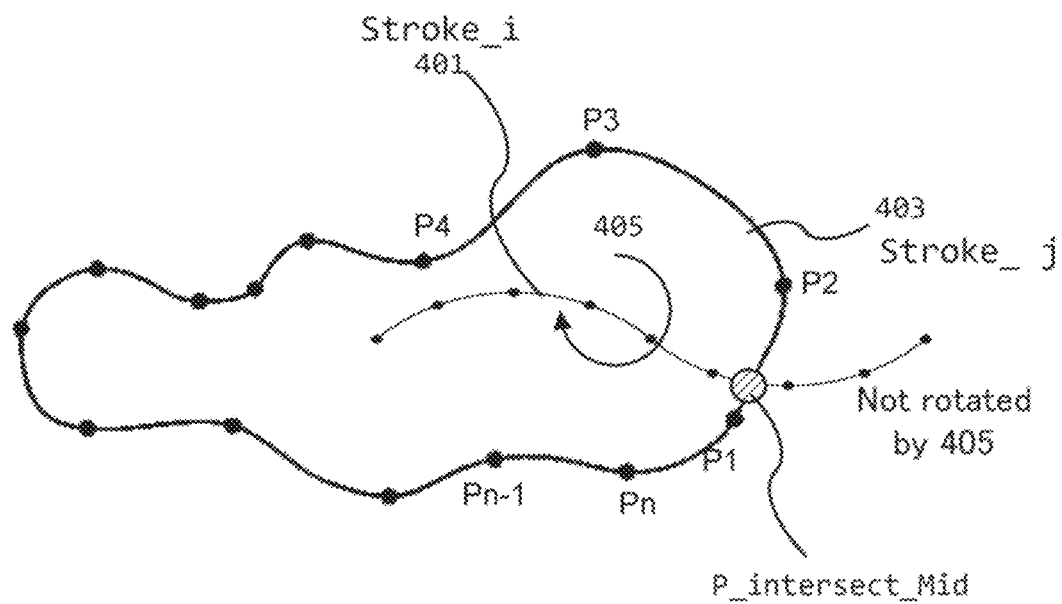
FIG. 4A illustrates operation of a "select" manipulation object used to select and transform (e.g., rotate) a stroke object.

A manipulation object (set) 270 includes information necessary to manipulate (e.g., select, transform/rotate, slice, etc.) a pre-existing stroke object 210 in whole or in part. Such information is organized in the form of manipulation objects, each of which is executable on the entirety of, or on a part of, a stroke object 210 to effect desired manipulation of the stroke object 210. Each manipulation object 270 includes parameters that define and control a specific manipulation operation. For example, a Select object 272 includes parameters used to select and transform (e.g., rotate by a transformation matrix) a stroke object 210 as shown in FIG. 4A. A Slice object 274 includes parameters used to slice a stroke object 210 as shown in FIG. 4B.

FIG. 4A illustrates operation of the Select object 272. The target to be selected and transformed is a pre-existing stroke object 210 "Stroke_i", which in FIG. 4A is selected by another Stroke_j (j>i). Stroke_j is newly entered based on newly and continuously inputted pen event data and includes point objects P1-Pn. Stroke_j is entered to define an area that surrounds the pre-existing Stroke_i (hatched area in FIG. 4A) to thereby select the pre-existing Stroke_i. The Select object 272 may apply a defined transformation matrix to transform (rotate) the selected Stroke_i, as illustrated by arrow 405 in FIG. 4A. There are various methods to determine whether and how Stroke_i is selected by Stroke_j. For example, if Stroke_j intersects Stroke_i at a single position (P_intersect_Mid) between p1 and p2, then only a right portion of Stroke_i can be selected and be transformed by 405. The remaining left portion of the Stroke_i is not selected, and thus is maintained without being transformed by transform 405. This can be achieved by simultaneously applying Slice manipulation on Stroke_i using Stroke_j (i.e., Stroke_j is used to trigger the generation of both the Select object 272 and the Slice object 274 for Stroke_i 401). In this case Stroke_i is split into two newly generated strokes. One of these newly generated strokes is completely surrounded by Stroke_j and therefore selected.

Figure 4B:
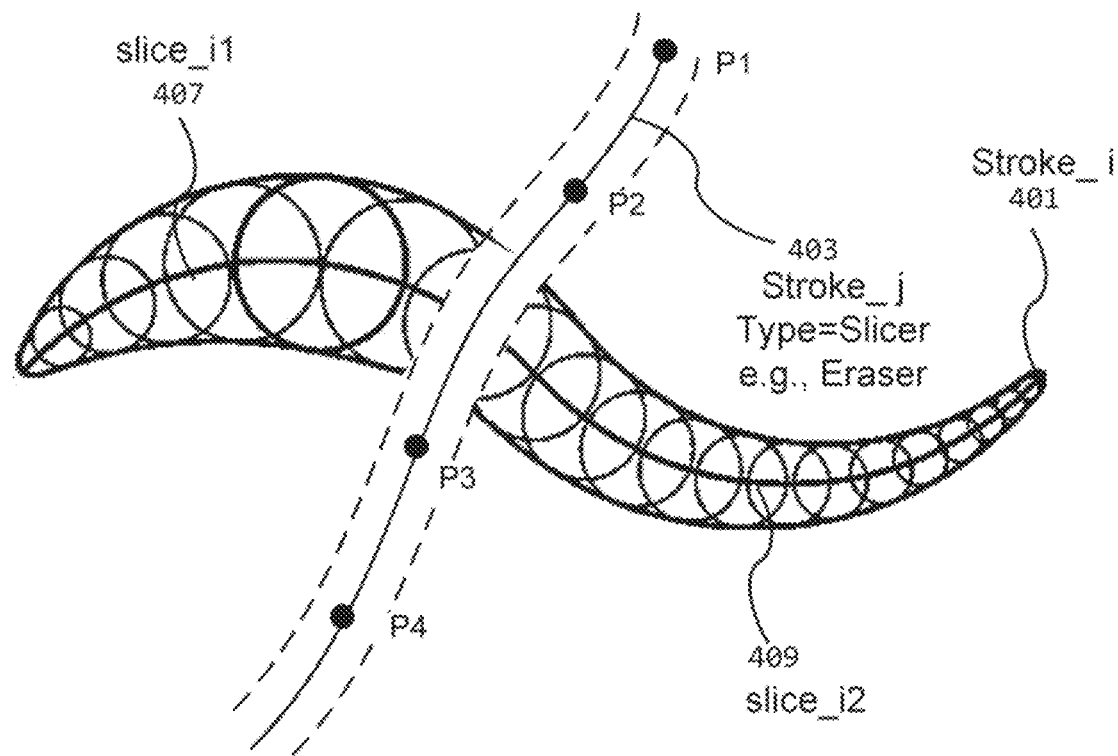
FIG. 4B illustrates operation of a "slicing" manipulation object used to slice a stroke object.

FIG. 4B illustrates operation of the Slice object 274. The Slice object 274, which is a partial manipulation for the Stroke_i 401, is generated by a new stroke object 403 (Stroke_j) containing point objects P1-P4. The stroke object 403 is associated with type information indicating that it is not a normal stroke object 210 but is a manipulation object configured to perform a defined manipulative operation on a pre-existing stroke object 210. For example, the stroke object 403 (Stroke_j) may be labeled as of "INPUT 3" (manipulation object) type, as will be more fully described below in reference to FIG. 5. As illustrated in FIG. 4B, the Slice object 274 (embodied in Stroke_j of "INPUT 3" type) is inputted to slice a pre-existing stroke object 401 (Stroke_i). To this end, the Slice object 274 includes parameters needed to slice the pre-existing stroke object 401 (Stroke_i) into two slices: slice_i1 407 and slice_i2 409. The Slice object 274 may function as a slicer, an eraser, a portion extractor, etc., in various applications. After the slice operation is performed to generate the two new slices 407 and 409, these slices may be "committed" (or finalized) into becoming two fully-defined stroke objects 210. At this point, the original stroke object 401 (Stroke_i) need not be retained nor the (uncommitted) slices 407 and 409 and the Slice object 274 (Stroke_j) itself used to generate the slices.

FIG. 5 is a functional block diagram of an ink data processing device capable of outputting, manipulating, drawing, and communicating (transmitting/receiving) the ink data according to embodiments of the present invention. The device generally corresponds to Device 10-1-1 (Sensor type 1) or Device 10-1-2 (Sensor type 2) in FIG. 1.

The device in this example is a computing device including an input sensor 110, an input processing section 111, an ink data processing section 100, an application section 300-1, a graphic processing section 300, a display 113, and a communications section 112 ("Tx, Rx"), all controlled by an operating system 400-1 executed by a CPU coupled to memory device(s). The device may be a personal computer (PC), a mobile terminal device, etc., including or coupled to an input sensor 110 in the form of a pen-tablet sensor.

The input sensor 110 detects a user's handwriting motion (via a pointer such as a pen and a finger) and generates input data signal representative of the detected handwriting motion. For example, an electrostatic sensor, a pressure-sensitive sensor, an electromagnetic resonance (EMR) based sensor may be used.

The input processing section 111 receives input data from the input sensor 110, where the input data is of the type dependent on each input sensor, and converts the input data to "pen event data" amenable for further processing to generate ink data 200. The generated "pen event data" is inputted as "INPUT 1" (see point "A" in FIG. 5) to the ink data processing section 100. The pen event data ("INPUT 1") includes at least the sensed coordinate positions, and may additionally include pen pressure data, pen tilt data, etc., depending on whether the input sensor 110 has pressure/tilt detection capabilities. Thus, the pen event data outputted from the input processing section 111 are also device/sensor dependent. The input processing section 111 is typically realized as a driver software program of the input sensor 110, such as the input subsystem that runs on Android® operation system. The configuration of the input sensor 110 and the input processing section 111 is not limited to that which is illustrated. For example, some or all of the input sensor 110 and the input processing section 111 may be provided as a digital stationery device such as a pen-shaped device.

The ink data processing section 100 includes an ink data generation section 120 and an ink data formatting section 140. The ink data processing section 100 (more specifically the ink data generation section 120) is responsible for generating ink data 200 based on the pen event data ("INPUT 1") received from the input processing section 111, context information ("INPUT 2") and manipulation information ("INPUT 3") received from the application section 300-1. The ink data processing section 100 is typically realized as a set of libraries that are dynamically and/or statically linked to the application section 300-1.

The context information ("INPUT 2") is information describing the context or environment of the pen event data ("INPUT 1") and may indicate, for example, a used pen tip type (e.g., brush, crayon, pencil), used pen colors (red, green, blue), etc. The context information is selected by the application section 300-1 typically prior to entry of input data into the input sensor 110.

The manipulation information ("INPUT 3") specifies that the next input from the input sensor 110 is not to be treated as typical pen event data (a normal stroke object 210) but is a command to apply some manipulation operation (e.g., slicing, erasing, extracting, deleting, copying, enlarging, etc.) to a pre-existing stroke object 210. When INPUT 3 is received, the ink data generation section 120 generates a new stroke object #j and manipulation object to be applied to pre-existing stroke objects #0~#i caused by the new stroke object #1. Manipulation information ("INPUT 3") may be generated and inputted to the ink data generation section 120 by user selection of a defined switch, button, etc., in an application supported in the application section 300-1.

The ink data generation section 120 receives the pen event data ("INPUT 1"), the context information ("INPUT 2"), and the manipulation information ("INPUT 3") and generates "ink data" (ink data 200) (at point "D" in FIG. 5) including a stroke object 210, a drawing style object 230, a manipulation object 270 and a metadata object 250. Further details of the ink data generation section 120 will be described below in reference to FIG. 6.

Still referring to FIG. 5, the ink data formatting section 140 of the ink data processing section 100 receives the ink data from the ink data generation section 120, via point "D," and outputs the ink data in a format selected according to format selection information (Fmt-Sel) received from the application section 300-1.

Specifically, the ink data formatting section 140 includes an ink data communication section 144 and a recording format data processing section 142. The ink data communication section 144 is configured to transmit (via "F" in FIG. 5) and receive (via "F_in" in FIG. 5) the ink data 200 in a stroke message format (SMF), which is a format suited for communicating the ink data 200 (in real time, for example) to other (remote) devices over a network. The recording format data processing section 142 is configured to format the ink data in a stroke file format (SFF) (see "E" in FIG. 5), which is a format suited for storing the ink data 200 in a more permanent storage medium.

The graphic processing section 300 receives the ink data 200 including stroke objects 210, drawing style objects 230, manipulation objects 270 and metadata objects 250, via "D," and outputs, via "H," a set of pixel values at a defined resolution level including color (e.g., RGB) values of the pixels. For example, the graphic processing section 300 receives point objects (p1~pn) that form a stroke object 210 (see FIG. 3A), interpolates curves between the point objects used as control points according to a curve interpolation algorithm, and draws (renders) the resulting path of the stroke object 210 on the display 113 using associated GPU libraries such as DirectX® and OpenGL® libraries.

According to various embodiments, the graphic processing section 300 uses the point objects contained in the received stroke object 210 as control points to interpolate curves according to a suitable curve interpolation algorithm such as the Catmull-Rom Curve algorithm and the Poly-Bezier Curve algorithm known in the art.

Furthermore, in accordance with exemplary embodiments of the present invention, the graphic processing section 300 displays a stroke object 210 in reference to the "start Parameter" value 301 and the "end Parameter" value 303 included in the stroke object 210. In other words, the graphic processing section 300 renders (displays) only a portion of the stroke object 210 delineated (bound) by the "start Parameter" value 301 and the "end Parameter" value 303. As used herein, (to be) displayed means being displayed in the end. Various methods may be used to set whether a defined portion is to be displayed or not. For example, a method may be used not to include vertex information, to be supplied to a GPU library, for the defined portion not to be displayed, to thereby not generate pixel data for the defined portion. As another example, a method may be used to set the transparency of the defined portion not to be displayed, in a fully reproduced stroke object 210, at 100%.

The application section 300-1 includes one or more user applications, such as Application #1 of FIG. 1, which dynamically or statically link the ink data processing section 100. For example, the application section 300-1 may include a real-time conference application, a document generation application, a drawing application, etc., which may all use the ink data 200 according to embodiments of the present invention. The applications in the application section 300-1 provide, for example, a user interface (UI) that allows a user to enter manipulation information ("INPUT 3") to the ink data processing section 100.

Figure 6:
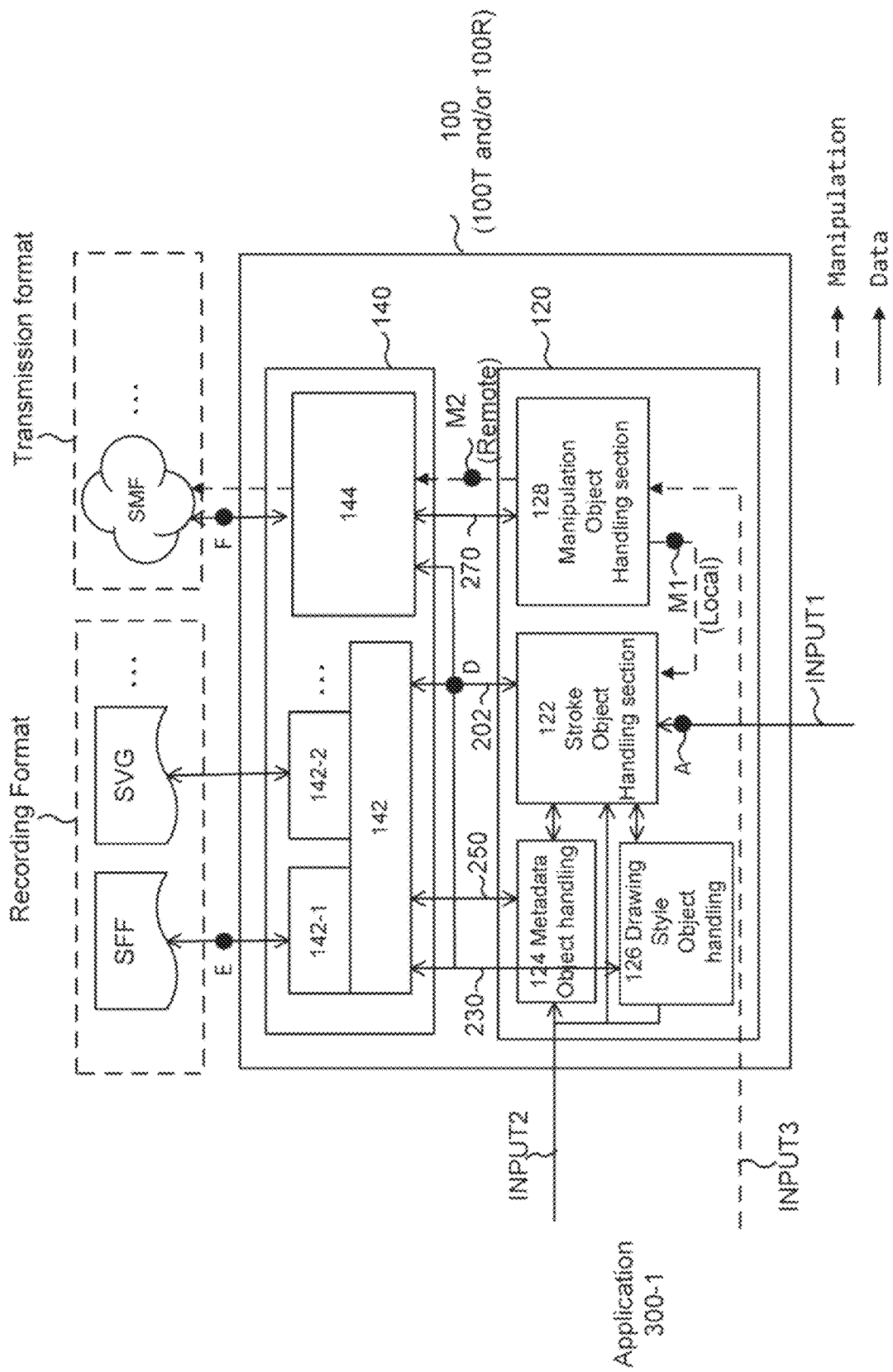
FIG. 6 is a functional block diagram of an ink data processing section (100) of the ink data processing device of FIG. 5 according to first embodiments of the present invention.

FIG. 6 is a functional block diagram of the ink data processing section 100, which includes the ink data generation section 120 and the ink data formatting section 140.

The ink data generation section 120 includes a stroke object handling section 122, a metadata object handling section 124, a drawing style object handling section 126, and a manipulation object handling section 128, which are respectively configured to handle and generate stroke objects 210, metadata objects 250, drawing style objects 230, and manipulation objects 270 that collectively form the ink data 200 according to embodiments of the present invention.

The stroke object handling section 122 receives the pen event data ("INPUT 1") and generates a stroke object 210 (see "D" in FIG. 6). The stroke object handling section 122 generates point objects of the raw value type, as described above, to form a stroke object 210. In exemplary embodiments, the stroke object handling section 122 continuously generates the point objects as pen event data are inputted, instead of waiting to receive the entire pen event data before starting to generate the point objects. The stroke object handling section 122 continuously outputs the generated point objects to the graphic processing section 300 (see FIG. 5) or to the ink data formatting section 140, via "D," as will be more fully described below in reference to FIG. 7. Application 300-1 may control stroke object handling section 122 to switch between outputting ink data 200 of raw value type and outputting ink data 200 of optimized value type depending on, for example, whether application 300-1 performs real time communication or needs highly-compressed vector data.

The metadata object handling section 124, upon receipt of the pen event data ("INPUT 1") indicative of start of a pen stroke (i.e., "pen down") or upon generation of a new stroke object 210 (upon slicing, for example), processes the context information ("INPUT 2") to extract non-drawing related information such as author information, date and time information, etc. The metadata object handling section 124 creates a metadata object 250 including the extracted metadata in association with the corresponding stroke object 210.

The drawing style object handling section 126, upon receipt of the pen event data ("INPUT 1") indicative of pen down or upon generation of a new stroke object 210, processes the context information ("INPUT 2") to extract drawing-related information necessary to express the stroke object 210 on a display. The drawing style object handling section 126 creates a drawing style object 230 (e.g., the Shape Fill object 232 and the Particle Scatter object 234) in association with the corresponding stroke object 210.

The manipulation object handling section 128, upon receipt of the manipulation information ("INPUT 3"), generates a manipulation object 270 that defines a manipulative or transformative operation (e.g., the "Select (transform)" object 272 and the Slice object 274 in FIG. 2) to be applied to the whole or, or to a part of, a pre-existing stroke object 210.

In FIG. 6, two broken-line arrows "M1 (Local)" and "M2 (Remote)" indicate the direction of manipulation operation, i.e., where the target stroke object 210 is to be manipulated or transformed. As shown, manipulation operation defined by a manipulation object 270 may be applied locally (M1) to a stroke object 210 existing in the stroke object handling section 122, or remotely (M2) via the ink data formatting section 140 to a stroke object 210 existing on an external network such as in a remote reception device coupled to the network.

In FIG. 6, the stroke object 210, the metadata object 250, and the drawing style object 230 are illustrated to be inputted to the recording format data processing section 142 and the ink data communication section 144 of the ink data formatting section 140, while the manipulation object 270 is inputted only to the ink data communication section 144 and not inputted to 142. The first three are preferably permanently or semi-permanently stored and thus are formatted in the stroke file format (SFF), SVG format, InkML format, etc., which are suited for storage. Also, when a new stroke object 210 is generated, the stroke object 210 and its associated metadata and drawing style objects are communicated to the receiving side over a network and thus are processed in both of the ink data communication section 144 and the recording format data processing section 142. The manipulation object 270, on the other hand, is transitory by nature because it defines some manipulative operation to be applied to a pre-existing stroke object 210. Once the manipulative operation is applied (committed) to the pre-existing stroke object 210, the manipulation object 270 is flushed from memory. Thus, the manipulation object 270 is typically formatted in the stroke message format (SMF) suited for transmission over a network, and is not included in the stroke file format (SFF).

The recording format data processing section 142 of the ink data formatting section 140 includes multiple processing sections 142-1, 142-2, etc., for respectively outputting the ink data 200 in different recording formats (SFF, InkML of (D1), SVG of (D3), HTML5 of (D4), etc.). For example, the processing section 142-1 is configured to output the ink data 200 in the SFF and may employ Google's Protocol Buffers (https://developers.google.com/protocol-buffers/) and Message, to serialize the SFF file-formatted data. The processing section 142-2 may perform format transformation processing to absorb any differences between the SFF file, InkML of (D1), and SVG of (D3), such as any differences between the definitions of "trace" in (D1) and the definition of "path" in (D3) or "Canvas Path" in (D4.)

Figure 7:
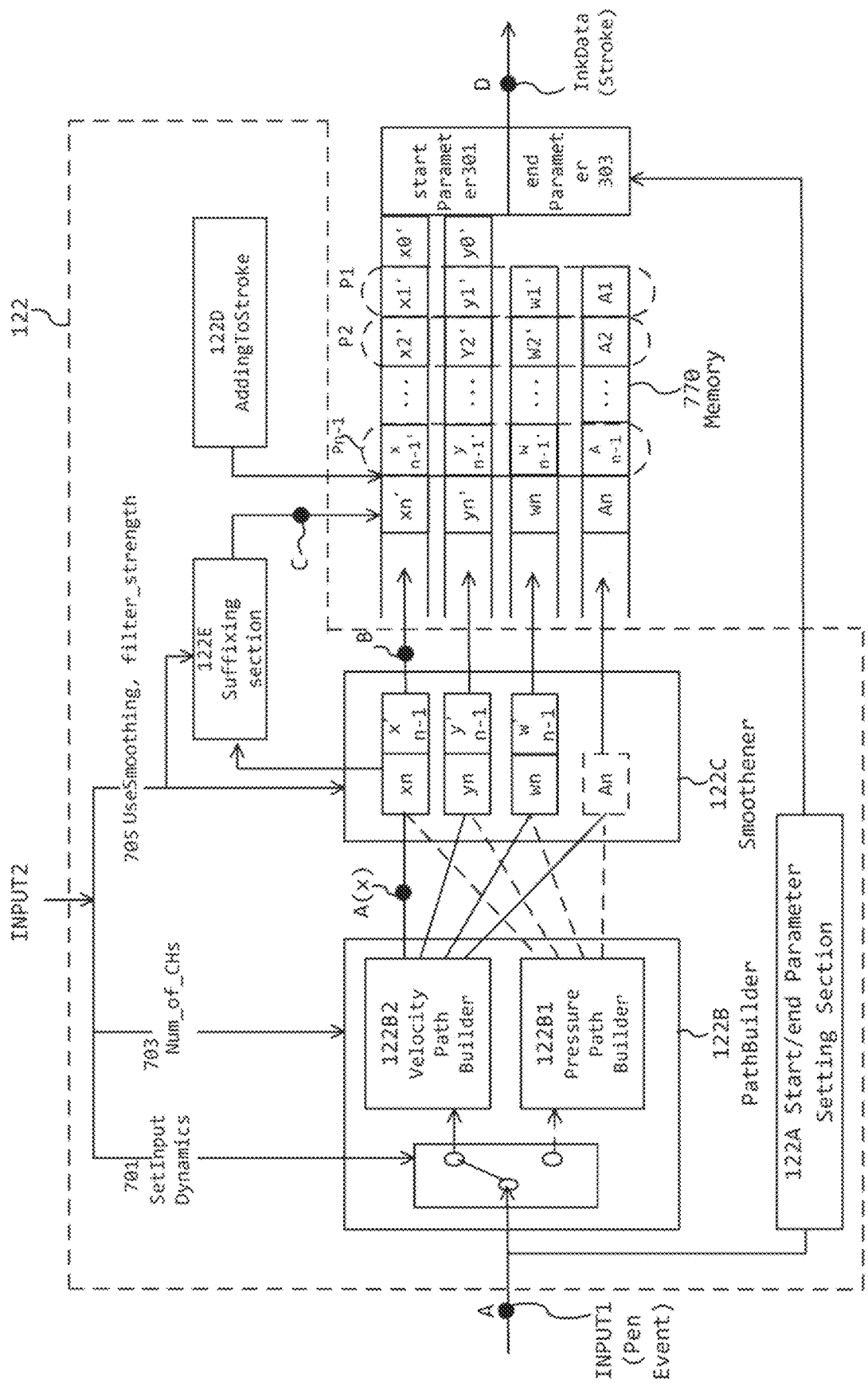
FIG. 7 is a functional block diagram of a stroke object handling section (122) of the ink data processing section of FIG. 6 according to first embodiments of the present invention.

FIG. 7 is a functional block diagram of the stroke object handling section 122 in the ink data processing section 100. The stroke object handling section 122 is capable of continuously outputting point objects, which form a stroke object 210 in the "raw value type", to the graphic processing section 300 or to the ink data formatting section 140 as an increasing amount of the pen event data is inputted. The stroke object handling section 122 includes or is coupled to a memory device 770.

The stroke object handling section 122 includes a start/end parameter setting section 122A, which sets start point and end point parameters, a path builder section 122B, which selects a suitable path builder based on a device type, an adding to stroke section 122D, which controls how many point objects should be added to a partially formed stroke object 210, and a suffixing section 122E, which fills in a gap ("Lag" in FIG. 8) at an end of a stroke object 210.

Fragmented data generated and stored in memory 770 are used for real time transmission as fragments of a stroke object 210. Fragmented data are transmitted per unit of byte or time, as will be more fully described below in the second embodiment.

The start/end parameter setting section 122A, upon detection of a pen down event (start of a pen stroke) and a pen up event (end of a pen stroke), sets the start Parameter 301 and the end Parameter 303 to their initial default values. For example, upon a pen down event, the start Parameter 301 is set to its default value of "0" and, upon a pen up event, the end Parameter 303 is set to its default value of "1." The initial values of these parameters need not be stored in the memory device 770, and may be set, for example, in the form of a flag that implicitly indicates that these parameters are set to their default values.

The path builder section 122B is configured to select one path builder suited for a particular type of pen event data outputted from the input processing section 111, based on a SetInputDynamics value 701 included in the context information ("INPUT 2"). For example, if pen event data includes pen pressure values, a PressurePath builder 122B1 is selected that includes a first (pressure) function f1 capable of deriving the stroke width (W) and transparency (A) based on the pen pressure values. On the other hand, if pen event data does not include pen pressure values, a Velocity Path builder 122B2 is selected. The Velocity Path builder 122B2 includes a second (velocity) function f2 capable of deriving the stroke width (W) and transparency (A) based on the pen movement speed, which is determined from the amount of change in the point coordinates or time stamps included in the pen event data. In other words, the Velocity Path builder 122B2 substitutes velocity values for pressure values used in the Pressure Path builder 122B1. Since all pen event data may be categorized into either a type including pressure information (Type 1) or a type not including pressure information (Type 2), all types of pen event data may be processed by either the PressurePath builder 122B1 or the Velocity Path builder 122B2. This reason and how Pressure-Path builder 122B1 and VelocityPathBuilder 122B2 operates will be described below in reference to the third embodiment.

The stroke object handing section 122 also includes a smoothener 122C, which starts to apply smoothing operation to a stroke object 210 as it is generated before the stroke object 210 is completed, based on Use Smoothing information 705 included in the context information ("INPUT 2"). Any suitable smoothing operation such as acceleration averaging, weight averaging, exponential smoothing, double-exponential smoothing, etc., may be used.

Figure 8:
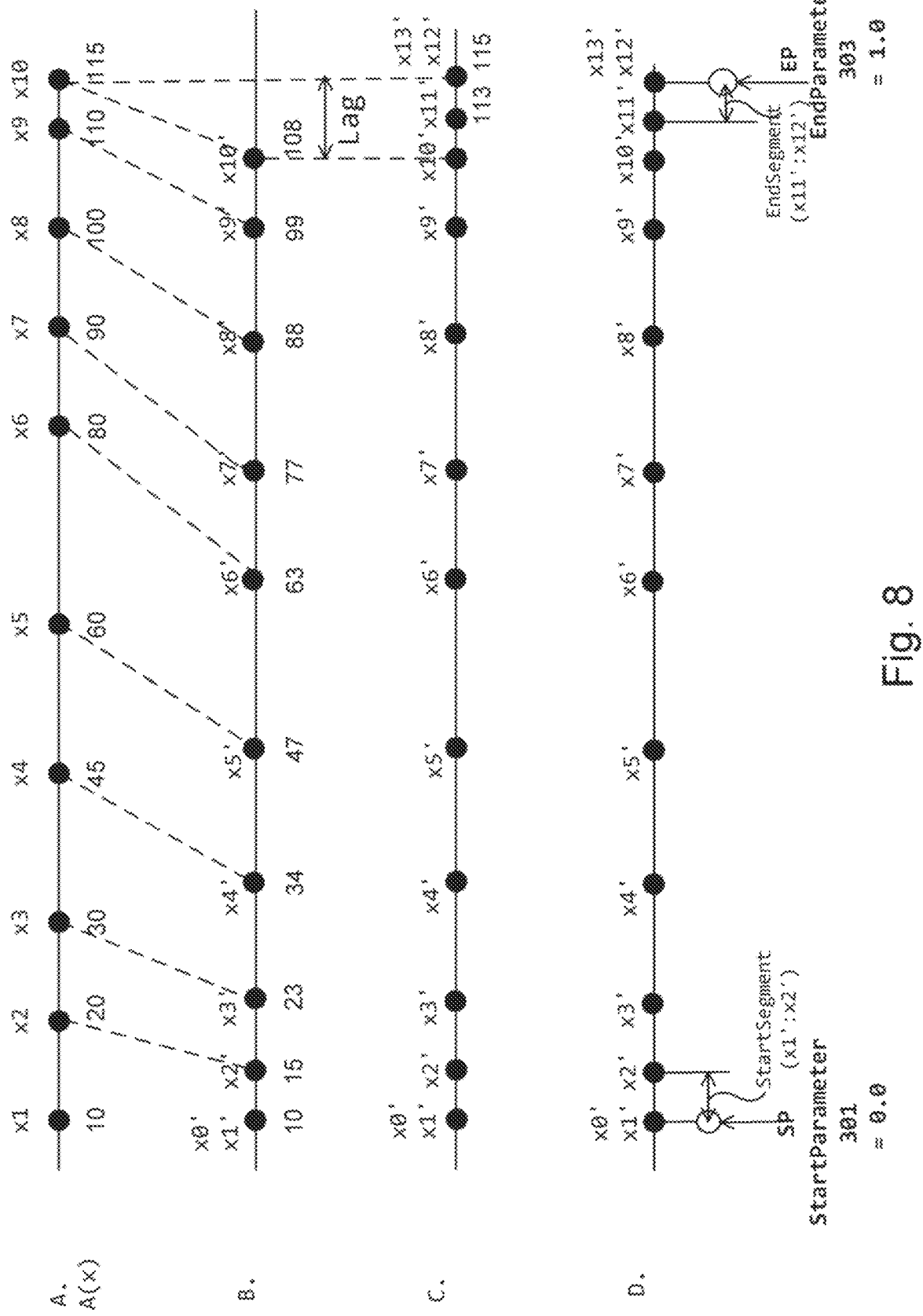
FIG. 8 illustrates the processing performed at points "A" through "D" in the stroke object handling section of FIG. 7.

FIG. 8 illustrates a smoothing operation performed by the smoothener 122C in row A and row B. Row A corresponds to point "A" in FIG. 7 (before smoothing) and row B corresponds to point "B" in FIG. 7 (after smoothing). In row A, x1~x10 represent X coordinates of 10 points obtained from the pen event data. In FIG. 8, x1~x10 are (10, 20, 30, 45, 60, 80, 90, 100, 110, 115).

In row B, x1'~x10' represent X coordinates of the 10 points after a smoothing operation has been applied. In the illustrated example, the following exponential smoothing function is applied:

$$X_1' = \alpha * X_{(t-1)} + (1-\alpha) * X_{(t-1)}'$$ (Eq. 1)

where the filter strength $\alpha=0.5$.

In FIG. 8, x1'~x10' are (10, 15, 23, 34, 47, 63, 77, 88, 99, 108).

The smoothing operation performed by the smoothener 122C is applied on a rolling basis to each of the points as their point coordinates are derived, to continuously output modified (smoothed) positions of these points. Thus, from the time when a pen down event is detected, the stroke object handling section 122 starts to generate and output stroke object 210 with "raw value type" instead of waiting to detect a pen up event as a whole.

In row B, point x0' is added in this case where the Catmull-Rom Curve is used to define an interpolation curve between each pair of control points. As discussed above, the Catmull-Rom Curve defines each curve segment with four control points including a start point (Pi) and an end point (Pi+1), and a point "before" the start point (Pi−1), and a point "after" the end point (Pi+2). Thus, to define a starting curve segment between points x1' and x2', the start point x1' is duplicated to create a new point x0' (at the same position as x1') that may be used with points x1', x2' and x3' as control points for defining the curve segment between x1' and x2'. The position of the new point x0' may be adjusted to a position where the Catmull-Rom Curve between x1' and x2' best fits the inputted stroke. By simply duplicating a value of x1' (p1) to create a value of x0' (p0), the process can instantly define a position of x0' and set components of a vector from x0' (p0) to x1' (p1) as zero. The process is suited for real-time implementation (no need to wait for p2 to generate p0), and does not unduly influence (e.g., pushing to one side or another) the curvature of the curve segment between x1' (p1) and x2' (p2).

Referring back to FIG. 7, the adding to stroke section 122D determines how many of the point objects are established and stored in the memory device 770 and thus can be added to a partial data of the stroke object 210 to be outputted. In the illustrated embodiment, point objects P1~Pn−1 are established in the memory device 770 and determined to be added to the partial data of the stroke object 210 to be outputted to the graphic processing section 300 or to the ink data formatting section 140 (instead of waiting for the entire stroke object to be completed). The graphic processing section 300 is capable of displaying the partially formed stroke object. In other words the graphic processing section 300 displays the stroke object starting with an initial dot as it continues to grow. The ink data formatting section 140 (or the ink data communication section 144) is capable of formatting and sending the established partial data, as fragmented data of a stroke object, in a transmission format. The transmission method of the fragmented data will be explained in greater detail in embodiment two.

Referring to FIGS. 7 and 8, the suffixing section 122E fills in a gap (or "Lag") between the inputted position at the end of a stroke object 210 (x10, row A) and the smoothed position at the end of the stroke object 210 (x10', row B). In FIG. 8, row C illustrates the "Lag" filling (suffixing) operation. In the illustrated example, after the smoothing operation, a "Lag" is created between the originally inputted position x10 (115) and the smoothed position x10' (108) at the end of the stroke object 210. Depending on the content of the Use Smoothing information 705 included in the context information ("INPUT 2"), the stroke object handling section 122 determines to either perform or not perform the suffixing operation. The suffixing operation can be also invoked every time when a new point object is added to the stroke object 210. In this case the suffixing operation provides the graphic processing section 300 with point objects that can be used as a temporary visual preview. The newly generated points by the suffixing operation are not yet part of the final stroke object 210 and are, therefore, ignored by the ink data formatting section 140 (or the ink data communication section 144) until it is expressly added.

If the suffixing operation is to be performed, in the illustrated embodiment, the stroke object handling section 122 adds new point objects at x11', x12' and x13'. Point x12' is added at the same position as the originally inputted last position x10 (115) of row A. Point x11' is added at a smoothed point between points x10' and x12'. Finally, because in this example the Catmull-Rom Curve is used to define an interpolation curve between each pair of control points, the end point x12' is duplicated to create a new point x13' (at the same position as x12'), which is needed to define an ending curve segment between x11' and x12' as the Catmull-Rom Curve. The position of the new point x13' may be adjusted to a position where the Catmull-Rom Curve between x11' and x12' best fits the inputted stroke. Also, even when the suffixing operation is not to be performed, if the Catmull-Rom Curve is used, the last smoothed point x10' in row B may be duplicated to create a new point x10' (new), which may be used with points x8', x9' and x10' as control points to define the last curve segment between x9' and x10' in this case. By simply duplicating a value of x9' x10' (old) to create a value of x10' (new), the process can instantly define a position of x10' at a neutral position, without unduly influencing (e.g., pushing to one side or another) the curvature of the curve segment between x8' (p8) and x9' (p9).

In FIG. 8, row D illustrates the stroke object 210, which has been smoothed (from row A to row B), suffixed at the end (from row B to row C), and continuously outputted under the control of the adding to stroke section 122D. The stroke object 210 in this example is defined to generate interpolation curves according to a Catmull-Rom Curve algorithm, wherein each curve segment (Pi–Pi+1) is defined by four control points (Pi−1, Pi, Pi+1, Pi+2) and the resulting curve passes through all of the control points. Thus, the stroke object 210 includes a starting curve segment (x1'-x2') defined by four control points x0', x1', x2', x3, and includes an ending curve segment (x11'-x12') defined by four control points x10', x11', x12', x13'. The stroke object 210 also includes the start parameter 301 for the starting curve segment (x1'-x2'), which is set to a default value of "0.0" by the start/end parameter setting section 122A. The default value of "0.0" means that the starting curve segment (x1'-x2') is to be fully displayed (rendered, expressed) from the initial point x1'. The stroke object 210 further includes the end parameter 303 for the ending curve segment (x11'-x12'), which is set to a default value of "1.0" by the start/end parameter setting section 122A. The default value of "1.0" means that the ending curve segment (x11'-x12') is to be fully displayed to the last point x12'.

Figure 9:
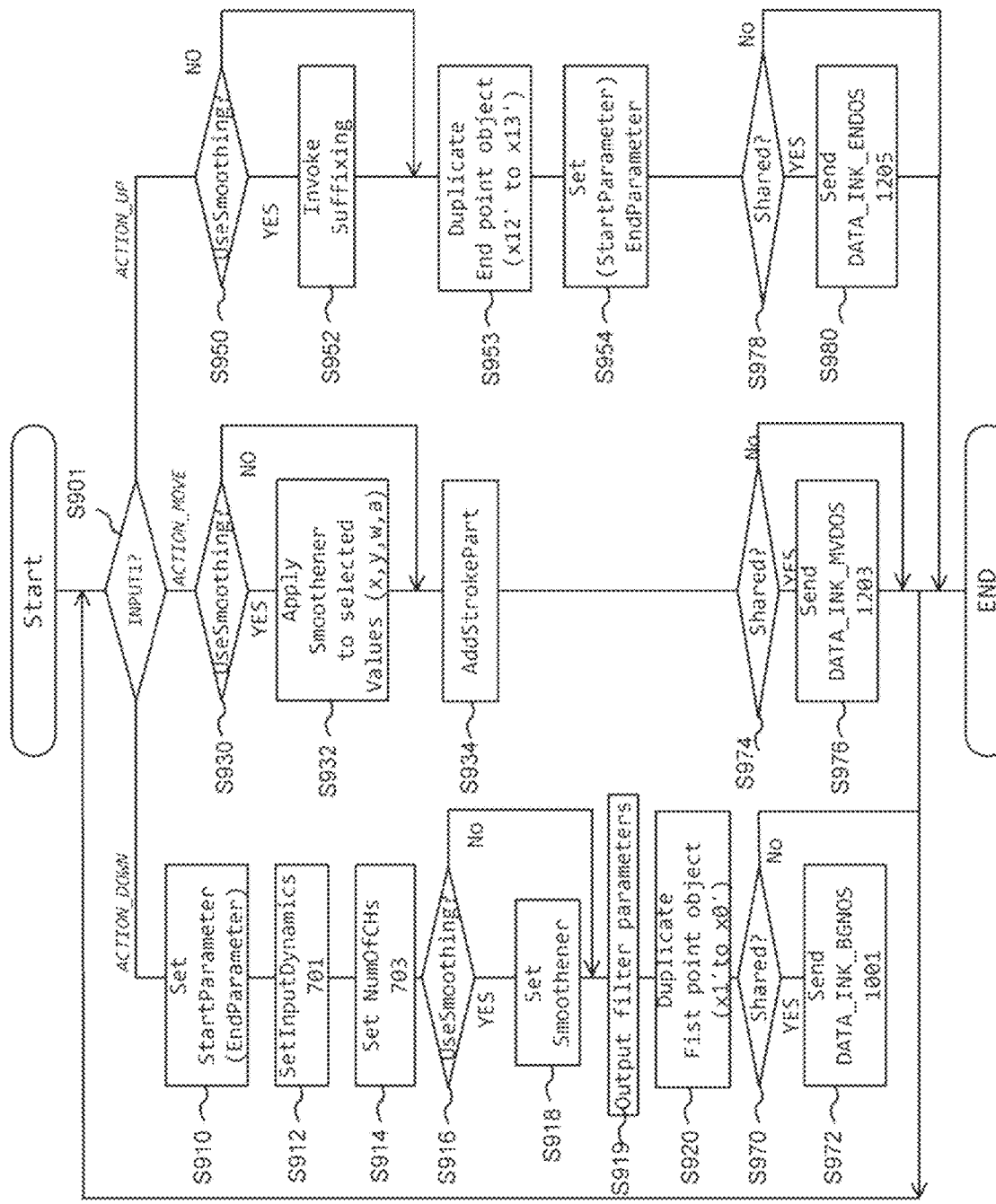
FIG. 9 is a flow chart illustrating a sample routine performed by the ink data processing section of FIG. 6.

FIG. 9 is a flow chart illustrating a sample process performed by the ink data processing section 100 of FIG. 6 to generate ink data 200. The process starts with the ink data generation section 120 receiving pen event data ("INPUT 1"). In step S901, the stroke object handling section 122 receives the pen event data as INPUT 1, which includes position coordinates (x, y) and timing information indicative of one of the following three types of timing, and carries out processing according to the determined timing:

1) Pen down time; when a pointer such as a finger or a pointing device (e.g., pen-type device) comes into contact with another (sensing) object;
2) Pen moving time; between a pen down time and a pen up time;
3) Pen up time; when a pointer is moved away (detached) from another (sensing) object.

<1. A Processing Flow at Pen Down Time>

When the event type is "ACTION_DOWN" indicating a pen down event, in step S910, the stroke object handling section 122 sets the start parameter 301 of a starting curve segment of a stroke object 210 to be newly created to a default value ("0.0"). As described above, the default value ("0.0") defines that the starting curve segment is to be fully displayed from its initial point. At the same time, the stroke object handling section 122 may also set the end parameter 303 of an ending curve segment of the stroke object 210 to a default value ("1.0") to define that the ending curve segment too is to be fully displayed to its last point.

In step S912, the stroke object handling section 122, based on a SetInputDynamics parameter 701 included in the context information ("INPUT 2" in FIG. 7), selects one path builder (e.g., 122B1 or 122B2 in FIG. 7) out of a plurality of path builders to use to build the stroke object 210.

In step S914, the stroke object handling section 122, based on a Num_of_CHs parameter 703 included in the context information ("INPUT 2"), determines a set of parameters to be outputted from the path builder selected in step S912 above. A set of parameters to be outputted may be, for example, (x, y, W, A), (x, y, W), (x, y, A), or (x, y), where (x, y) are x, y coordinates of the point objects, W is a stroke width value, and A is alpha (a) indicative of transparency (or opacity). In addition to the 2D coordinates (x, y), a "z" value may be added to produce 3D coordinates.

In step S916, the stroke object handling section 122, based on the Use Smoothing parameter 705 included in the context information ("INPUT 2"), determines whether smoothing operation is to be applied to the set of parameters outputted from the selected path builder. The Use Smoothing parameter 705 may also indicate to which ones of the parameters the smoothing operation is applied.

When application of the smoothing is indicated (YES to step S916), in step S918, the indicated smoothing process is performed. FIG. 7 illustrates a case in which the smoothing process is applied to (x, y, W) parameters, but is not applied to "A" (alpha) parameters. The context information ("INPUT 2") may additionally include sampling rate information of the input sensor 110, which the stroke object handling section 122 may use to select a smoothing process of desired strength level. For example, when the sampling rate of the input sensor 110 is lower (e.g., 10's of samples per second as opposed to 100's of samples per second), a stronger smoothing process having a greater smoothness value (effect) may be selected.

In step S919, setting parameters used above are outputted as attributes of the ink data 200. The parameters indicate, for example, whether the point objects included in a stroke object 210 are smoothed (whether S916 is YES or NO) or the type or strength of smoothing filter that may be used. Based on the parameters, it can be determined whether the point objects included in the stroke object 210 are smoothed or not, should be (further) smoothed or not, or can be treated as the exact input data that may be used, for example, in signature verification applications, etc.

In step 920, as illustrated above in reference to FIG. 8, row B, the initial point (control point) x1' is duplicated to generate a new control point x0' for defining a starting curve segment between x1' and x2' as a Catmull-Rom Curve.

In step S970, the ink data processing section 100 determines whether another (remote) user or computer exists, who may be sharing (e.g., receiving, manipulating) the ink data 200 generated by the ink data processing section 100 local computer.

If such other user exists, in step S972, the ink data processing section 100, based on the Fmt-Sel parameter received from the application section 300-1 (see FIG. 5), controls the ink data communication section 144 to format the ink data 200 to be outputted in the stroke message format (SMF). The ink data communication section 144 first outputs a message DATA_INK_BGNOS 1201 (see FIG. 12), which is a partial (fragmented) message including initial point coordinates and a drawing style object 230 necessary for the remote user's reception device to draw the (partial) stroke object 210. The reception device that receives the DATA_INK_BGNOS message 1201 may immediately start to render (display) the initial portion of the stroke object 210 in the specified shape, color, etc., using the received drawing style object 230, before receiving the remainder of the stroke object 210.

<2. A Processing Flow at Pen Moving Time>

Returning back to the initial step S901 of the flow chart, the ink data generation section 120 receives another new event data ("INPUT 1") and determines which type it is: pen down event, pen moving event, or pen up event. When the event type is "ACTION_MOVE" indicating that a pen is moving in the middle of the stroke object 210 between a start point and an end point, the ink data generation section 120 receives the x, y coordinate values as well as time stamp and/or pen pressure information as included in the pen event data depending on a particular input device used, and proceeds to step S930.

In step S930, the stroke object handling section 122, based on a Use Smoothing parameter 705 included in the context information ("INPUT 2"), determines whether smoothing operation is to be applied to the received set of parameters, (x, y, W, A) for example. The Smoothing parameter 705 may additionally indicate to which ones of the parameters the smoothing operation is applied. Operation of step S930 is the same as that of step S916 described above.

When application of the smoothing is indicated (YES to step S930), in step S932, the indicated smoothing process is performed.

In step S934, the stroke object handling section 122 uses the adding to stroke section 122D to determine how many of the point objects are established and stored in the memory device 770 to be added to a partial data of the stroke object 210 to be outputted. In this step the adding to stroke section 122D may also change the values of the point objects before adding them to partial data. For example, the adding to stroke section 122D may change the value of alpha parameter on a random basis to simulate a ball pen that runs out of ink.

In step S974, similarly to step S970 described above, the ink data processing section 100 determines whether another (remote) user exists who is sharing the ink data 200 generated by the ink data processing section 100 in real time.

If such other user exists, in step S976, the ink data processing section 100 uses the ink data communication section 144 to generate and output a message DATA_INK_MVDOS 1203 (see FIG. 12), which is a partial (fragmented) message including point objects subsequent to the initial point object(s) included in the DATA_INK_BGNOS 1201 generated in step S972 above. The number of point objects to be added to the message DATA_INK_MVDOS 1203 is determined by the adding to stroke section 122D in step S934 above. Multiple DATA_INK_MVDOS messages may be generated and outputted depending on size of the stroke object 210. The remote user's reception device that receives the DATA_INK_MVDOS message(s) 1203 may continue to render (display) the middle portion of the stroke object 210 in continuation to the initial portion of the stroke object 210.

<3. A Processing Flow at Pen Up Time>

Returning back to the initial step S901 of the flow chart, the ink data generation section 120 receives another new event data ("INPUT 1") and determines which type it is. When the event type is "ACTION_UP" indicating a pen up event (i.e., drawing of a stroke object 210 is completed and a pointer is removed), in step S950, the stroke object handling section 122 determines whether the smoothing operation is to be applied to the received set of parameters, (x, y, W, A) for example, as well as to which ones of the parameters the smoothing operation is applied. Operation of step S950 is the same as that of steps S916 and S930 described above.

When application of the smoothing is indicated (YES to step S950), in step S952, the indicated smoothing process is performed. Also, when the Use Smoothing parameter 705 so indicates, the stroke object handling section 122 additionally performs the suffixing operation as shown in FIG. 8, row C. Depending on the content of the Use Smoothing parameter 705, the suffixing operation is not necessarily performed. Also, when smoothing operation is not performed, the suffixing operation is not necessary and is not performed.

In step S953, also as illustrated in FIG. 8, row C, the end point (control point) x12' is duplicated to generate a new control point x13' for defining an ending curve segment between x11' and x12' as a Catmull-Rom Curve.

In step S954, the stroke object handling section 122 sets the end parameter 303 of the ending curve segment (x11'-x12') to a default value ("1.0") indicating that the ending curve segment is to be fully displayed to its end point x12'. This step may be skipped when the end parameter 303 is already set to its default value in step S910 above.

In step S978, similarly to steps S970 and S978 described above, the ink data processing section 100 determines whether another (remote) user exists who is sharing the ink data 200 generated by the ink data processing section 100 in real time.

If such other user exists, in step S980, the ink data processing section 100 uses the ink data communication section 144 to generate and output a message DATA_INK_ENDOS 1205 (see FIG. 12), which is the last partial (fragmented) message including the last set of (suffixed) point objects of the stroke object 210. The remote user's reception device that receives the DATA_INK_ENDOS message 1205 may recognize that it is the last message for the stroke object 210 and completes the drawing operation of the stroke object 210.

The methods and systems for generating and communicating ink data 200 according to embodiments of the present invention described above are capable of continuously inputting pen event data and simultaneously outputting a partial stroke object 210 as it is built. A remote user's reception device that receives the ink data 200 from the ink data processing section 100 starts to display each stroke object 210 and continues to display the stroke object 210 as it grows without having to wait to receive the entire stroke object 210.

According to various embodiments of the present invention, the smoothing operation is selectively applied to the inputted pen event data parameters. A suitable curve interpolation algorithm such as the Catmull-Rom Curve algorithm is applied to build interpolated curves using the smoothed point objects as control points.

FIG. 10 illustrates a sample stroke file format (SFF) proto (schema) file written in the Interface Definition Language (IDL), which may be outputted to point "E" from the recording format data processing section 142 of the ink data processing device of FIG. 5. The proto (schema) file describes how ink data 200 is serialized in a stroke file format as a byte sequence. Lines 02-07 of the illustrated proto file include data that describes the information included in a drawing area (or drawing "canvas"). For example, Line 06 enclosed in a broken-line rectangle defines that a stroke object 210 is repeated multiple times in the drawing area. Line 04 "decimalPrecision" defines the calculation accuracy/resolution of a point object of the stroke object 210.

"decimal Precision" in Line 04 is preferably a logarithmic value indicative of desired accuracy and/or resolution.

Lines 11-17 of the illustrated proto file represent a stroke object 210. For example, Line 12 indicates that the stroke object 210 includes a repeated plurality of "sint32"-type (variable byte size packet) point objects.

In some embodiments, a parameter of the second and subsequent point objects is defined by an offset (delta) value relative to the corresponding parameter value of the initial point object or the immediately preceding point object. Use of offset (relative) values, as opposed to absolute values, may help reduce the amount of data needed to define the second and subsequent point objects that form a stroke object 210.

For example, coordinates (x, y) of a point in Line 12 are determined based on the following processing that utilizes the decimalPrecision.

1. Converted from float to int32 by the following conversion:

$$x_{int} = (int)x_{float} * 10^{decimalPrecission};$$

2. To the integer values is performed delta encoding:

$$x_{encoded}[0] = x_{int}[0];$$

$$x_{encoded}[i] = x_{int}[i-1] - x_{int}[i]; \; i > 0$$

Processing 1: xfloat is float stored in a computing device. The coordinates of point object 212 are stored in the memory 770 as a floating decimal type value having relatively many bits, such as the float type and the double type. Xfloat is multiplied by $10^{decimal \; Precision}$. The data type of the resulting value, xfloat is converted (cast) to an integer type to thereby produce xint.

Processing 2: offsets of xint are derived. The derived offsets are encoded as "sint32"-type data.

Lines 13-14 enclosed in a broken-line rectangle define the start Parameter 301 and the end Parameter 303 of the stroke object 210. As illustrated, these parameters 301 and 303 are defined separately from the point objects that form the stroke object 210 as defined in Line 12. In the illustrated example, the start and end parameters 301 and 303 are expressed as float type values, and are set to their default values of "0" and "1," respectively. As described later, when a manipulation (slicing) operation is applied to the stroke object 210, the start and/or end parameters may be changed to new value(s).

Line 15 "variableStrokeWidth" stores the width values of the plurality of points objects included in the stroke object 210. Similar to the point at Line 12, it uses "sint32"-type and the second and subsequent point objects' width is defined by an offset (delta). The presence of this parameter implies that each of the point objects included in the stroke object 210 is individually associated with its own width value. In other words, if this parameter does not exist, the stroke object 210 has a fixed width stored in "strokeWidth" property at Line 16.

Figure 11:
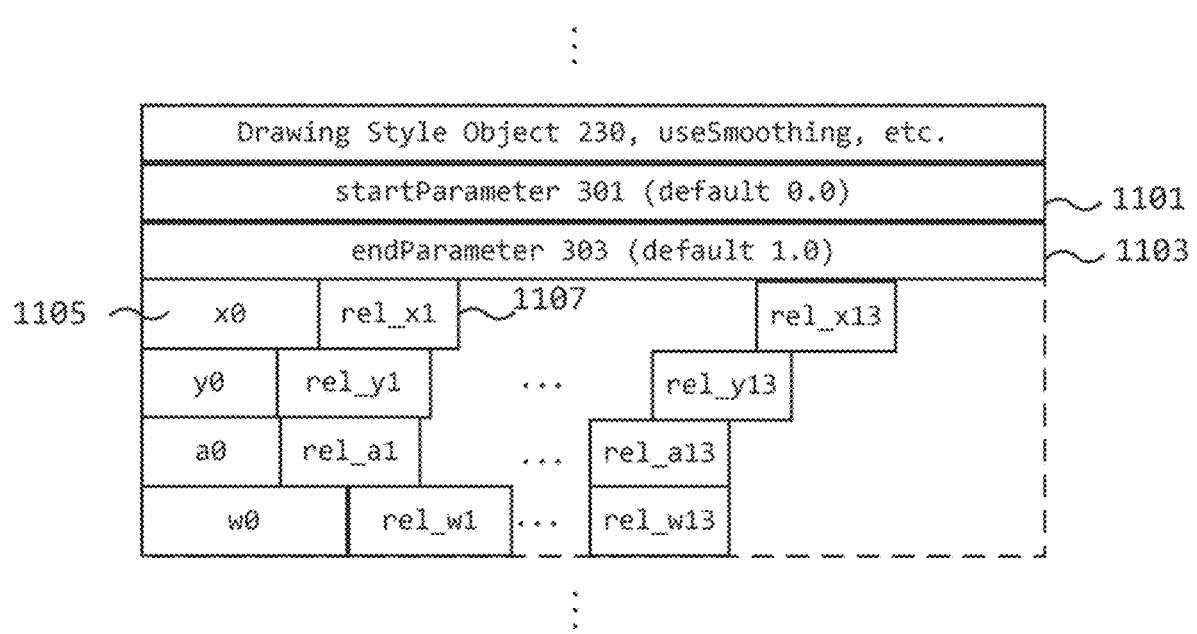
FIG. 11 illustrates a sample stroke object file in the stroke file format (SFF), which may be outputted at point "E" of the ink data processing device of FIG. 5.

FIG. 11 illustrates a sample portion of stroke object 210 in the stroke file format (SFF), which may be outputted to point "E" from the recording format data processing section 142 of the ink data processing device of FIG. 5. The illustrated stroke object 210 in the stroke file format contains drawing style object 230, filter parameters (useSmoothing, filter strength) and the point objects p0~p13 at x coordinates x0'~x13' as illustrated in FIG. 8, row D. The start Parameter field 1101 includes the start Parameter 301, and the end Parameter field 1103 includes the end Parameter 303. The field "x0" (1105) includes the absolute x coordinate value of the initial point object of the stroke object 210. The field "rel_x1" (1107) includes the x coordinate offset (delta) value of the second point object of the stroke object 210 relative to the absolute x coordinate value of the initial point object.

Figure 12:
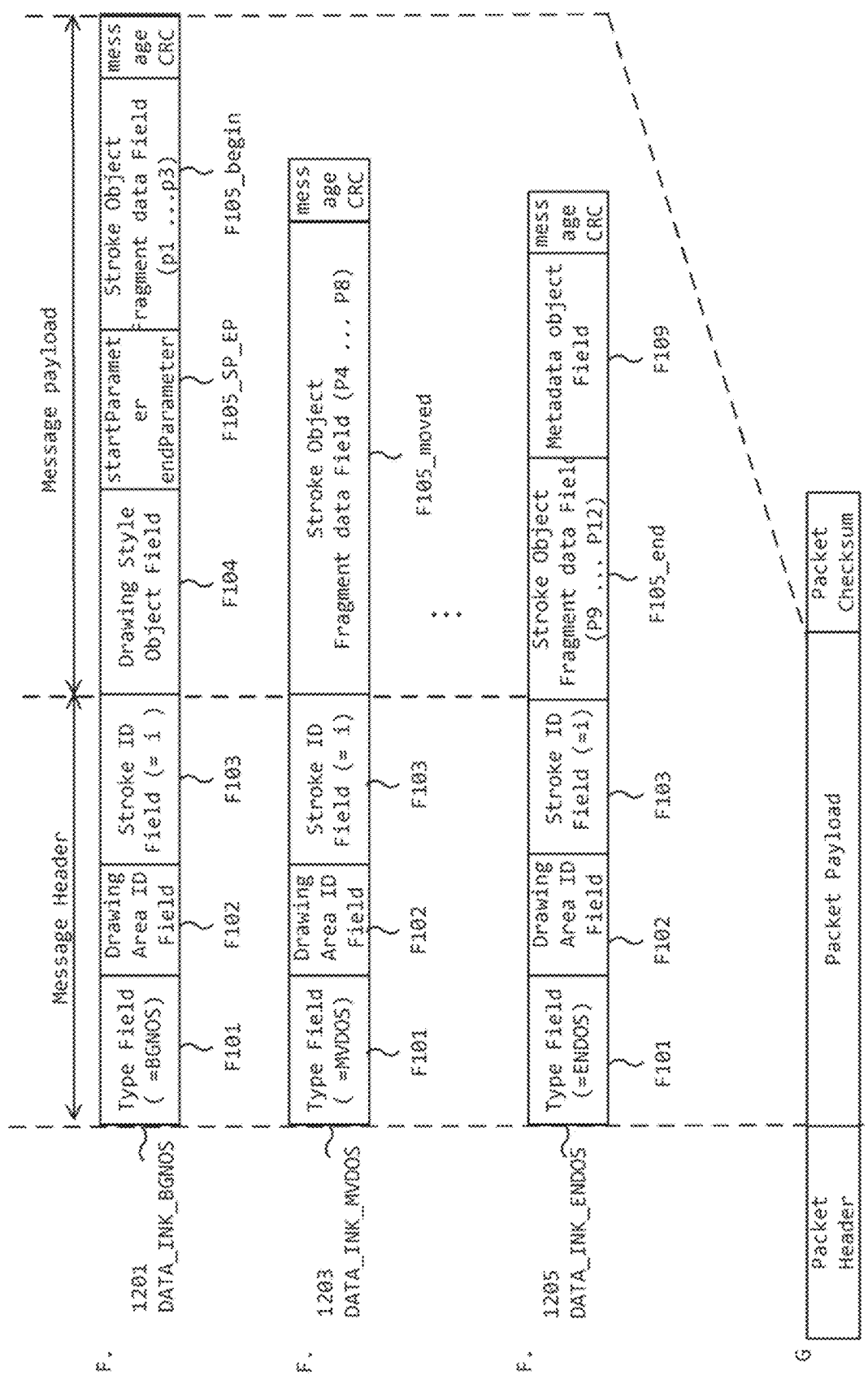
FIG. 12 illustrates three messages in a stroke message format (SMF), which may be outputted at point "F" of the ink data processing device of FIG. 5, and one packet outputted at point "G" of the ink data processing device of FIG. 5.

FIG. 12 illustrates three messages formatted in the stroke message format (SMF), which may be outputted to point "F" from the ink data communication section 144 of the ink data processing device of FIG. 5, and one packet outputted to point "G" from the network communications section 112 of the ink data processing device of FIG. 5.

The DATA_INK_BGNOS 1201 message, outputted in step S972 of FIG. 9, includes information indicating that the message is the first message of the stroke object 210 (e.g., message type BGNOS, F101), the drawing area ID (F102) that indicates a common drawing area shared between the ink data processing device and a remote user's reception device, and stroke ID that is used to identify the stroke object 210 from among multiple stroke objects 210 within the drawing area (F103). F101, F102 and F103 constitute a message header.

The DATA_INK_BGNOS 1201 message further includes the drawing style object 230 (F104), filter parameters related to smoothing filter applied (not shown), and the start Parameter and the end Parameter (F105_SP_EP), and optionally (if room permits) any of the initial fragmented data of the point objects that form part of the stroke object 210 (F105_begin), followed by a CRC error correction value. For example, "F105_begin" field may contain point objects p0~p3 of FIG. 8. F104, F105_SP_EP, F105_begin and CRC fields constitute a message payload.

The reason why F104 is included in DATA_INK_BGNOS 1201 is described below in reference to the second embodiment. Parameters related to smoothing filter are included in the first message, DATAINK_BGNOS 1201, so that a device that receives stroke object 210 can immediately determine whether to apply smoothing filtering processing to the point objects included in the stroke object 210 at the beginning of the reception of the stroke object 210.

The DATA_INK_MVDOS 1203 message, outputted in step S976 of FIG. 9, includes the message header including a message type field ("MVDOS") F101, the drawing area ID field F102, and the stroke ID field F103. The DATA_INK_MVDOS 1203 message also includes the second fragmented data (F105_moved) including point objects subsequent to those included in the DATA_INK_BGNOS 1201 message. For example, "F105_moved" field may contain point objects p4~p8 of FIG. 8. Unlike the first data message, the DATA_INK_MVDOS 1203 message does not include the drawing style object 230 (F104) and is identified as a subsequent (not first) type of data message (MVDOS) in F101. The DATA_INK_MVDOS 1203 message includes the same drawing area ID (F102) and the same stroke ID (F103) as the first data message.

The DATA_INK_ENDOS 1205 message, outputted in step S980 of FIG. 9, is the last data message for the stroke object 210 and includes the last fragmented data of the stroke object 210 (F105_end), which may be for example point objects p9~p13 of FIG. 8. The DATA_INKENDOS 1205 message is identified as a last data message (ENDOS) in F101 and includes the same drawing area ID (F102) and the same stroke ID (F103) as the first data message. The last data message includes a metadata object 250 in F109, which includes non-drawing related information such as author information.

The three types of data messages described above are outputted to point "F" from the ink data communication section 144 of the ink data processing device of FIG. 5. A packet "G" in the last row of FIG. 12 is a packet that includes all of these three types of data messages as a packet payload, which is outputted to point "G" from the network communications section 112 (Tx, Rx) of the ink data processing device of FIG. 5.

Figure 13A:
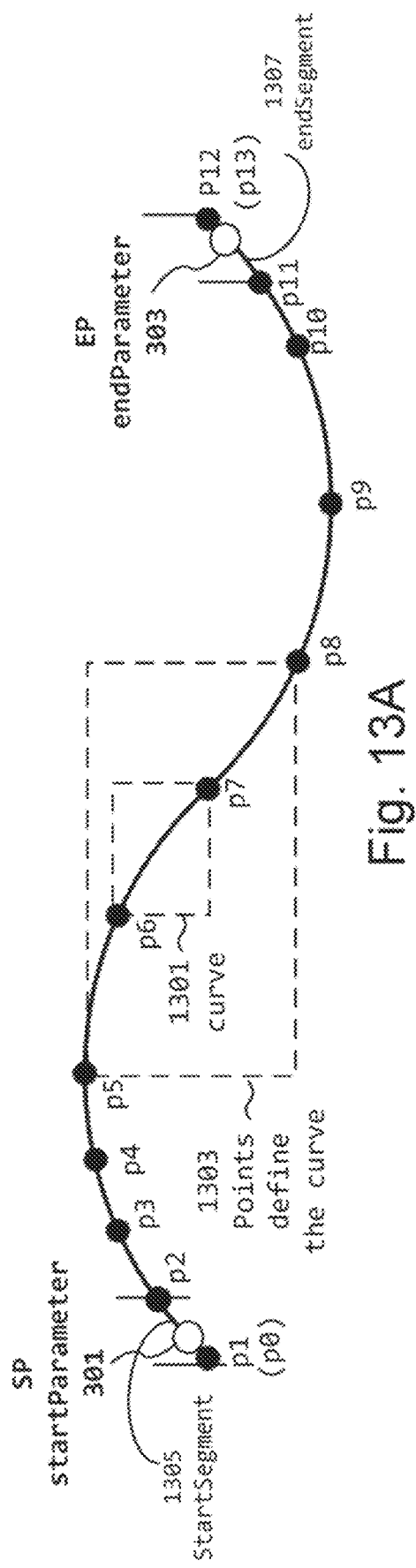
FIG. 13A illustrates a stroke object subjected to the Catmull-Rom Curve interpolation operation, which may be outputted at point "D" of the ink data processing device of FIG. 5 to be inputted to a graphic processing section (300) or to an ink data formatting section (140).
Figure 13B:
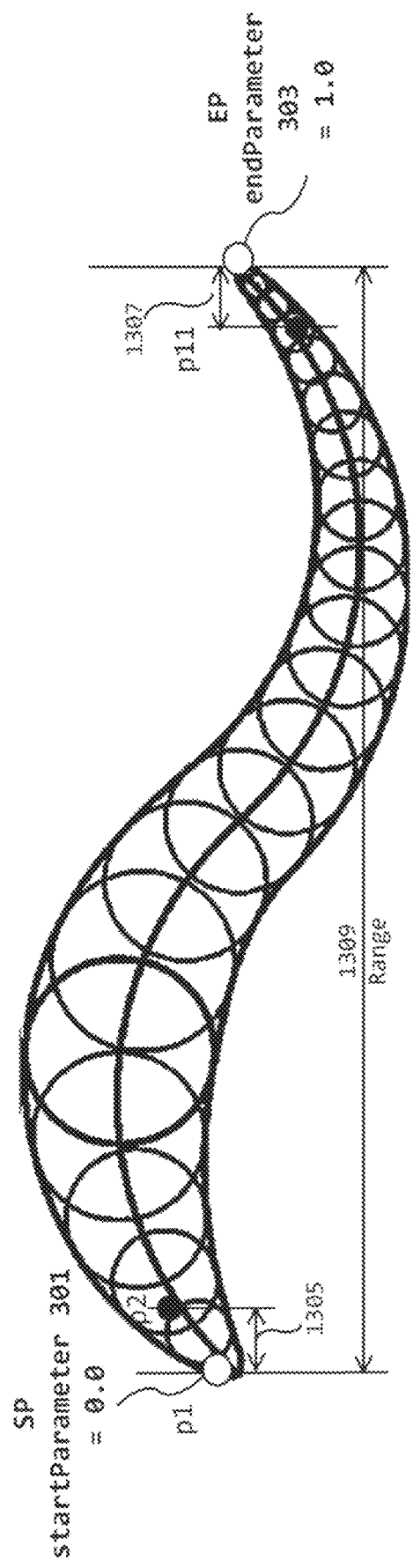
FIG. 13B illustrates a rendering (display) result of the stroke object of FIG. 13A, outputted from the graphic processing section (300) at point "H" of the ink data processing device of FIG. 5.

FIG. 13A illustrates a stroke object 210 subject to the Catmull-Rom Curve interpolation operation, which is inputted via point "D" to the graphic processing section 300 of the ink data processing device of FIG. 5. (The stroke object 210 of FIG. 13A may also be inputted via point "D" to the ink data formatting section 140 as described above.) FIG. 13B illustrates how the stroke object 210 of FIG. 13A is outputted from the graphic processing section 300 to point "H" to be drawn (rendered) on the display 113 of the ink data processing device of FIG. 5.

In FIG. 13A, the stroke object 210 includes point objects p0~p13, which correspond to x0'~x13' illustrated in FIG. 8 above. The stroke object 210 is subject to the Catmull-Rom Curve interpolation operation, thus all of the point object p0~p13 are used as control points for generating interpolated curve segments which together form the curve shown in FIG. 13A. For example, points p0~p3 are used as control points to generate a curve segment between p1 and p2, points p1~p4 are used as control points to generate a curve segment between p2 and p3, and so forth. As illustrated, the resulting curve passes through all of the control points p0~p13.

One characteristic of the Catmull-Rom Curve is that, because each curve segment is fully defined by four control points, the effect of moving one control point is local. For example, FIG. 13A illustrates that a curve segment 1301 between p6 and p7 is defined by four control points, p5, p6, p7 and p8. Moving one control point may impact at most four curve segments and does not affect the rest of the curve segments forming the curve. For example, moving p8 may impact at most four curve segments of p6-p7, p7-p8, p8-p9 and p9-p10. The "local control" characteristic of the Catmull-Rom Curve makes it suitable for supporting a slicing operation on a stroke object 210, where it is desired for the resulting two new stroke objects 210 to retain as much (shape) information of the original stroke object 210 as necessary with a minimum amount of data. In other words, the "local control" characteristic allows each of the resulting slices to retain the original shape with a minimum number of control points (to fully maintain the shape of the curve from one end to the other end). For example, when the stroke object 210 of FIG. 13A is sliced at a curve segment between p6 and p7, the first slice needs to retain only control points p0~p8 and the second slice needs to retain only control points p5~p13. The Poly-Bezier Curve also has the "local control" characteristic and thus is suited for supporting a slicing operation. Unlike the Catmull-Rom Curve, however, the Poly-Bezier Curve needs control points that are not along the curve (i.e., the curve does not pass through all of its control points). Having to calculate and store those control points outside the curve is an extra calculation step requiring storage space that is not required with the Catmull-Rom Curve, in which all control points are provided by the point objects of a stroke object 210. This difference makes the Catmull-Rom Curve, which is computationally less demanding, better suited for supporting real-time applications of ink data generation, manipulation, drawing, and communication.

FIG. 13B illustrates an example of actual rendering (drawing) of the stroke object 210 of FIG. 13A as outputted from the graphic processing section 300 at point "H" in FIG. 5. FIG. 13B illustrates a range 1309 of the actual drawing that spans from the start position indicated by the start parameter SP ("0.0") of the starting curve segment 1305 to the end position indicated by the end parameter EP ("1.0") of the ending curve segment 1307. Note that the first curve segment 1305 to be drawn is between p1 and p2 and not between p0 and p1 because p0 is used merely as a control point for defining the curve segment between p1 and p2. Similarly, the last curve segment 1307 to be drawn is between p11 and p12 and not between p12 and p13 because p13 is merely a control point used to define the curve segment between p11~p12.

<Ink Data Manipulation (Slicing)>

A slicing operation made possible by the systems and methods of the present invention according to various embodiments is now described in reference to FIGS. 14-19.

Figure 14:
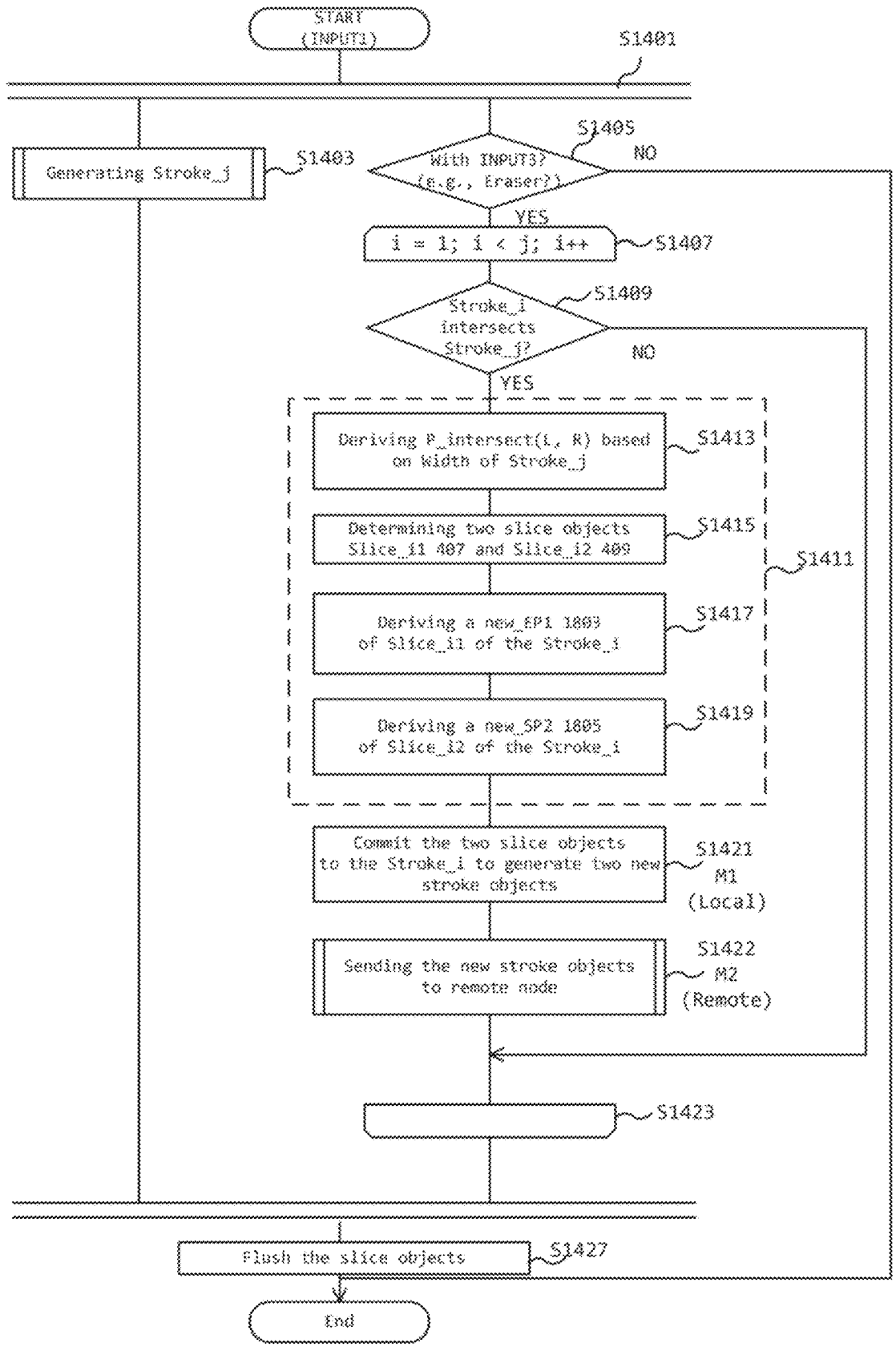
FIG. 14 is a flow chart of a slicing operation applied to a stroke object according to first embodiments of the present invention.

FIG. 14 is a flow chart of a slicing operation applied to a pre-existing stroke object 210. The slicing operation is executed cooperatively by the stroke object handling section 122 and the manipulation object handling section 128. The illustrated example assumes a slicing operation as shown in FIG. 4B, wherein the newly-drawn Stroke_j 403 slices the pre-existing stroke_i 401.

First, the ink data generation section 120 (the stroke object handling section 122) receives new pen event data ("INPUT 1"). In step S1401, two processing threads starting from step S1403 and step S1405, respectively, are executed in parallel.

In the first processing thread, in step S1403, the ink data generation section 120 generates a stroke object (Stroke_j) according to the process described in FIG. 9 above. In parallel in the second processing thread, in step S1405, the ink data generation section 120 (the manipulation object handling section 128) determines whether manipulation information ("INPUT 3") is associated with the pen event data ("INPUT 1") which is used by the first processing thread to generate the new stroke object 210. For example, the manipulation information ("INPUT3") may indicate that the associated stroke object 210 is to carry out a slicing operation.

If there is no such "INPUT 3" (NO to step S1405), the process proceeds to an end and the newly generated stroke object (Stroke_j) is handled as a normal stroke object 210. If there is "INPUT 3" associated with the stroke object 210 (YES to step S1405), the Stroke_j is treated as a manipulation object 270 to implement a slicing operation on one or more pre-existing stroke objects 210.

<Slicing Operation>

A loop starting from step S1407 through step S1423 is repeated for each of the pre-existing stroke objects (stroke_1~Stroke_j−1). In this example, the slicing operation embodied in the newly-generated Stroke_j is applied to each of the pre-existing stroke objects 210. There are various techniques that can be applied to skip strokes isolated, in terms of positioning, from the manipulation object 270. For example, the stroke object handling section 122 can maintain indices with stroke segments within an area. The indices can be used by the manipulation object handling section 128 to skip the unnecessary intersection calculations.

Step S1407 sets up the loop.

Figure 15A:
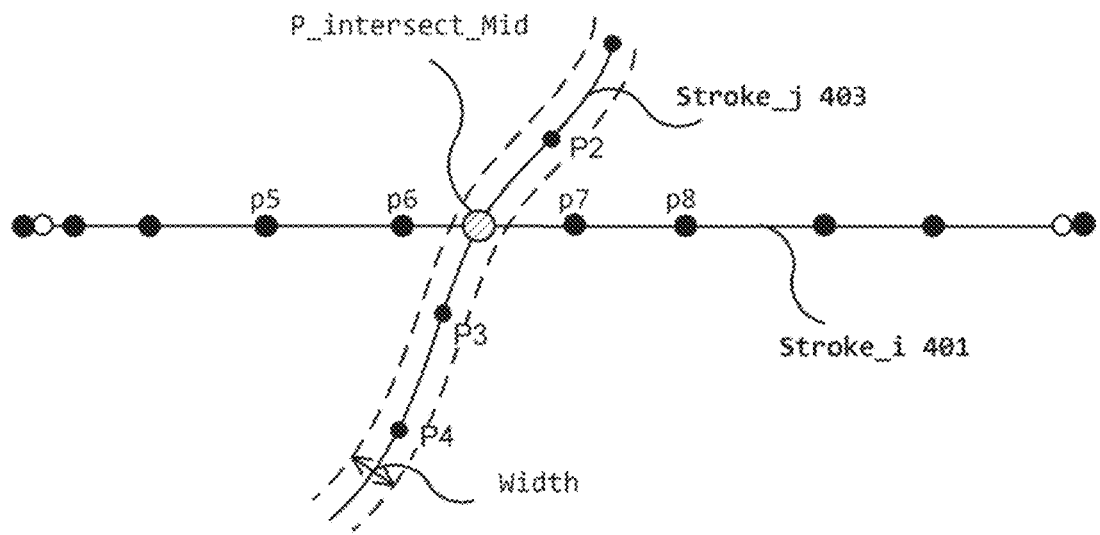
FIG. 15A illustrates a process of determining a single (mid) intersecting point (P_intersect_Mid) between two strokes, performed in step S1409 of FIG. 14.

In step S1409, the manipulation object handling section 128 determines whether the new Stroke_j 403 intersects a pre-existing stroke_i 401 (i<j), as shown in FIG. 15A. FIG. 15 illustrates the new Stroke_j intersecting the pre-existing stroke_i at a cross-point P_intersect_Mid between two control points p6 and p7 of the pre-existing stroke_i. In the illustrated example, since the new Stroke_j has a width, the cross-point is calculated as an intersection between a middle line (shown in solid line passing through points P2, P3, P4) of the new Stroke_j and the pre-existing stroke_i.

Returning to FIG. 14, when it is determined in step S1409 that the new Stroke_j does not intersect the pre-existing stroke_i, it means that the slicing operation is not to be applied to the pre-existing stroke_i. The process increments i by 1 and determines whether the new Stroke_j intersects the next pre-existing stroke_i+1.

When it is determined in step S1409 that the new Stroke_j intersects the pre-existing stroke_i, the slicing operation of step S1411 is applied to the pre-existing stroke_i.

Figure 15B:
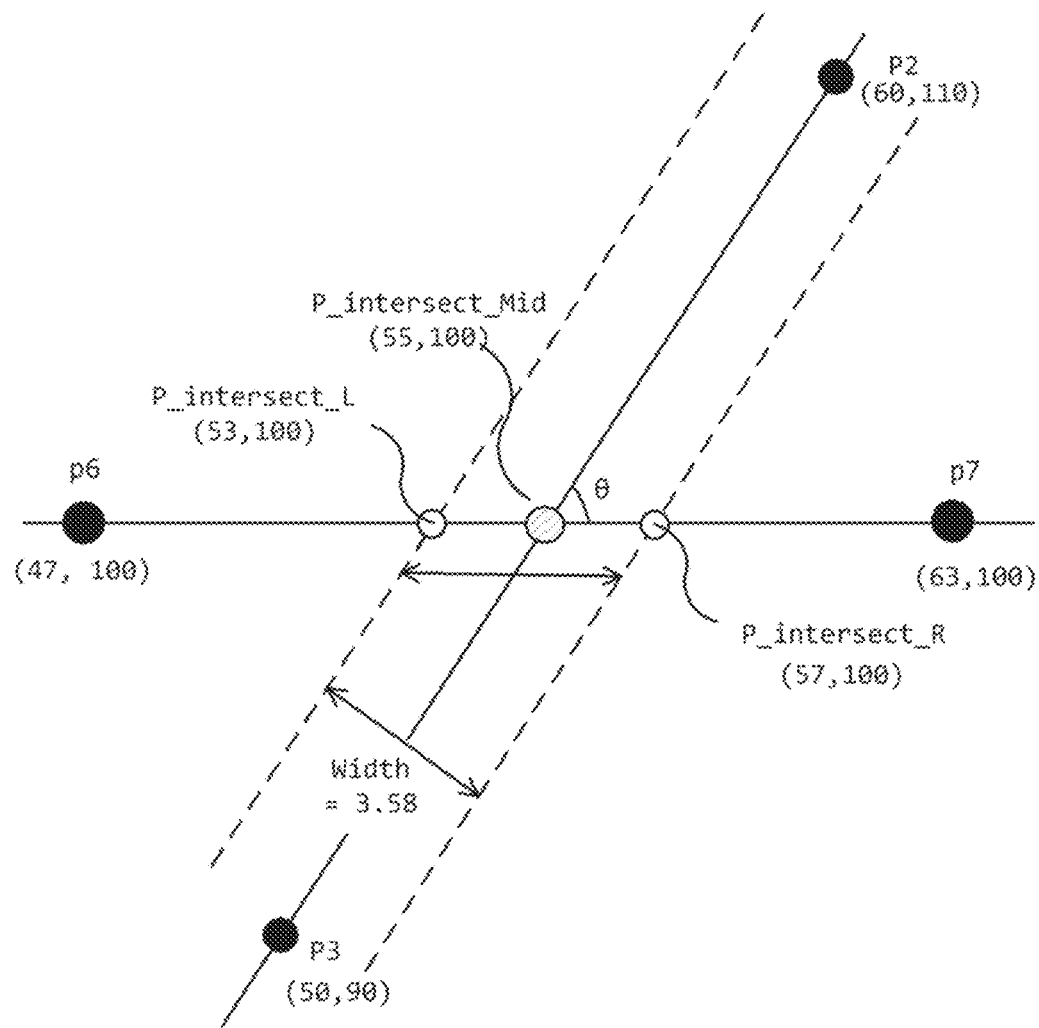
FIG. 15B illustrates a process of deriving two (edge) intersecting points (P_intersect_L and P_intersect_R) between a slicing stroke object having a width and a pre-existing stroke object, performed in step S1413 of FIG. 14.

In step S1413, as shown in FIG. 15B, the manipulation object handling section 128 derives two intersecting points P_intersect_L and P_intersect_R between two edges (in broken lines) of the new Stroke_j and the pre-existing stroke_i, respectively, based on the calculated cross-point P_intersect_Mid (55,100) and "Width" (3.58) of the new Stroke_j. In FIG. 15B, p6 is at (47, 100) and p7 is at (63,100) for the pre-existing stroke_i, while P2 is at (60,110) and P3 is at (50,90) for the new slicing Stroke_j. As described above, the cross-point P_intersect_Mid is calculated as an intersection between line p6_p7 and line P2_P3. The width of the new Stroke_j along the p6_p7 direction can be derived as "Width"/sin θ≈4.0 (the "derived width"), where sin θ=(110−90)÷sqrt ((60−50)^2+(110−90)^2). The derived width of 4.0 is then used to calculate the two intersecting points P_intersect_L and P_intersect_R, by adding or subtracting one half of the derived width to or from the cross-point P_intersect_Mid (55,100). In the illustrated example P_intersect_L is found to be at (53, 100) and P_intersect_R is found to be at (57, 100). There might be additional calculation that will take place in S1413. For example, if stroke_i and Stroke_j are not flat in the intersection area, then additional calculation should take into account the actual curvature in calculation of P_intersect_L and P_intersect_R.

In FIG. 14, in step S1415, the manipulation object handling section 128 generates two instances of the stroke object_i resulting from the slicing operation as shown in FIGS. 16A and 17A, respectively. The two instances are of "slice" type. The first slice of FIG. 16A includes control points p0 through p8 to define curve segments between p2-p7, and the second slice of FIG. 17A includes control points p5-p13 to define curve segments between p6-p12. The first slice of FIG. 16A includes a hole segment 1801 between p6 and p7, at which the stroke_i is sliced, as the ending curve segment. On the other hand, the second slice of FIG. 17A includes the hole segment 1801 as the starting curve segment. The first slice retains the default start parameter of "0.0" for the starting curve segment p1_p2, but now needs a new end parameter for its newly-created ending curve segment p6_p7. Similarly the second slice retains the default end parameter of "1.0" for the ending curve segment p11_p12 but now needs a new start parameter for its newly-created starting curve segment p6_p7.

Figure 18A:
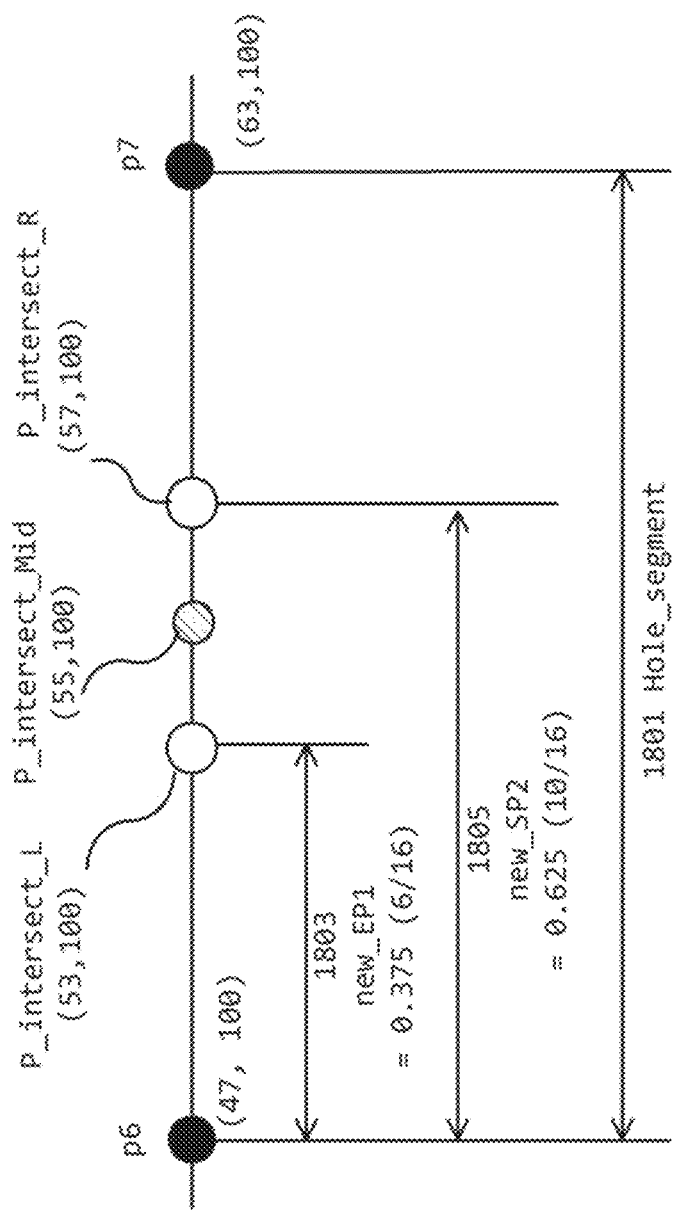
FIG. 18A illustrates a process of deriving a new end point for the first slice of FIG. 16A and a process of deriving a new start point for the second slice of FIG. 17A.

In step S1417, the manipulation object handling section 128 derives a new end parameter (new_EP1) value 303 for the first slice of FIG. 16A, as shown in FIG. 18A. In FIG. 18A, the new end parameter 1803 ("new_EP1") of the first slice is a value that indicates the position of P_intersect_L (53,100) within the ending curve segment p6_p7 of the first slice. The new end parameter 1803 may be an absolute value (e.g., (53,100)), a relative value (e.g., +6 along X direction from p6), or a ratio of a distance between p6 and P_intersect_L relative to a distance between p6 and p7 (e.g., 6/16=0.375). A ratio is useful because it can be used without further processing in interpolation calculations performed by various sections, for example the graphic processing section 300 in FIG. 5.

FIG. 16B illustrates a data structure of parameters that define the first slice. The data structure includes the start parameter of "0.0" (default value, in float type) as well as the end parameter of "0.375" (ratio, in float type) derived in step S1417 above. In FIG. 16B, line 11 indicates that the data structure defines a "slice" object which, once finalized (or committed), becomes a stroke object 210. Line 12 "slice_from Index" is an index value (e.g., integer) that indicates the start point object number of the slice. In the example of FIG. 16, the "slice_from Index" is "0" because the first slice starts at point p0. Line 13 "slice_to Index" is an index value (e.g., integer) that indicates the end point object number of the slice, which is "8" in FIG. 16 because the first slice ends at point p8 (the last point p8 is a control point for the ending curve segment p6_p7).

Returning to FIG. 14, in step S1419, the manipulation object handling section 128 derives a new start parameter (new_SP2) value 301 for the second slice of FIG. 17A, as shown in FIG. 18A. In FIG. 18A, the new start parameter 1805 ("new_SP2") of the second slice is a value that indicates the position of P_intersect_R (57,100) within the starting curve segment p6_07 of the second slice. The new start parameter may be an absolute value (e.g., (57,100), a relative value (e.g., +10 along X direction from p6), or a ratio of a distance between p6 and P_intersect_R relative to the distance between p6 and p7 (e.g., 10/16=0.625).

FIG. 17B illustrates a data structure of parameters that define the second slice. The data structure includes the end parameter of "1.0" (default value, in float type) as well as the start parameter of "0.625" (ratio, in float type) derived in step S1419 above. In FIG. 17B, line 21 indicates that the data structure defines a "slice" object which, once finalized, becomes a stroke object 210. Line 22 "slice_from Index" is "5" because the second slice starts at point p5 (the first point p5 is a control point for the starting curve segment p6_p7). Line 23 "slice_to Index" is "13" because the second slices ends at point p13.

Returning to FIG. 14, in step S1421, the manipulation object handling section 128 finalizes (or commits to) the first slice of FIG. 16B (first slice object 274) and the second slice of FIG. 17B (second slice object 274) to render them into the first newly-created stroke object 210 and the second newly-created stroke object 210, respectively, and stores them in the memory device 770. The finalizing step S1421 is a "M1 (Local)" operation that occurs between the manipulation object handling section 128 and the stroke object handling section 122, as shown in FIG. 6. At this point, the stroke object handling section 122 may discard the first and second "slice" objects and/or the original stroke object_i.

FIG. 16C illustrates a rendered (displayed) path of the finalized first stroke object 210, and FIG. 17C illustrates a rendered (displayed) path of the finalized second stroke object 210. As shown in FIG. 16C, curve segments between p1 and p6 are fully displayed, but as for the ending curve segment between p6 and p7, only a portion up to the end point indicated by the end parameter 303 (0.375) is displayed. The portion from p6 to the end point indicated by the end parameter 303 precisely follows the shape of the original stroke object 210 because the newly-created first stroke object 210 retains the same control points p5-p8 that define the ending curve segment between p6 and p7 as included in the original stroke object 210. Similarly, as shown in FIG. 17C, curve segments between p7 and p12 are fully displayed, but as for the starting curve segment between p6 and p7, only a portion starting at the start point indicated by the start parameter 301 (0.675) is displayed. The portion from the start point indicated by the start parameter 301 to p7 precisely follows the shape of the original stroke object 210 because the newly-created second object retains the same control points p5-p8 that define the starting curve segment between p6 and p7 as included in the original stroke object 210.

In FIG. 14, in step S1422, the manipulation object handling section 128 may transmit the newly created first and second stroke objects 210 to a reception device of a remote user, as will be more fully described below in reference to FIGS. 20 and 21. The transmission step S1422 is a "M2 (Remote)" operation as shown in FIG. 6, which occurs between the manipulation object handling section 128, via the ink data formatting section 140, and a reception device of a remote user coupled to a network outside the ink data processing section 100. Alternatively, in step S1422, the manipulation object handling section 128 may transmit the two slice objects 274 instead of the newly created stroke objects 210. In that case step S1421 will be performed on the reception device. This will be fully described below in reference to FIG. 20.

In step S1423, the loop process repeated for each of the plurality of pre-existing stroke objects 210 is completed.

In step S1427, the manipulation object handling section 128 flushes (discards) all slice objects 274 (if not already), which are created and used in the slicing operation step of S1411 above.

The slicing operation described above in effect replaces the original stroke object 210, which is sliced, with two new stroke objects 210 resulting from the slicing operation. Thus, after the two new stroke objects 210 are created, the original stroke object 210 may be discarded.

In the embodiment described in FIG. 14, the new stroke object_j associated with manipulation information ("INPUT 3") is treated as a manipulation object 270 configured to execute a slicing operation on one or more pre-existing stroke objects 210. In other words, the stroke object_j is used as a manipulation object 270.

In other embodiments, the slice objects 274 created during the slicing operation step of S1411 in FIG. 14 may be used as a manipulation object 270 to execute a slicing operation on one or more pre-existing stroke objects 210 residing in one or more computers (10-1-1, 10-1-2, 10-3, . . . ) with which the pre-existing stroke objects 210 are shared. In this case the slice objects 274 are not discarded. Use of the slice objects 274 as a manipulation object 270 will be more fully described below in reference to FIGS. 20 and 21A.

In still further embodiments, a hole segment object may be created that defines the hole segment 1801 shown in FIGS. 16A, 17A and 18A, and used as a manipulation object 270 that executes a slicing operation on one or more pre-existing stroke objects 210. FIG. 18B illustrates a data structure of parameters that define the hole segment object. Line 01 indicates that the data structure defines a "hole segment" object, which is different from a slice object 274 and a stroke object 210. Line 02 "hole_from Index" is an index value (e.g., integer) that indicates the start point object number of the hole segment, which is "6" in this example because the hole segment is between p6 and p7. Line 03 "hole-end parameter" is "0.375" (ratio, in float type) derived in step S1417 of FIG. 14, which indicates the end point of the ending curve segment of the first slice created by the hole segment 1801. Line 04 "hole_to Index" is an index value (e.g., integer) that indicates the end point object number of the hole segment, which is "7" in this example because the hole segment is between p6 and p7. Line 05 "hole-start parameter" is "0.625" (ratio, in float type) derived in step S1419 of FIG. 14, which indicates the start point of the starting curve segment of the second slice created by the hole segment 1801. Use of the hole segment object as a manipulation object 270 will be more fully described below in reference to FIGS. 20 and 21B.

While in the above-described embodiments, P_intersect_L is used as the new end point of the first slice and P_intersect_R is used as the new start point of the second slice, in other embodiments the same point may be used as both the new end point of the first slice and the new start point of the second slice. For example, for ease of calculation, P_intersect_Mid may be used as both the new end point of the first slice and the new end point of the second slice.

According to the embodiments of the invention described above, display of a sliced curve segment (e.g., the "hole segment" 1801) is controlled by a new end parameter 303, which defines an end point at which display of a first slice ends, and by a new start parameter 301, which defines a start point at which display of the second slice starts. Both of the first and second slices retain data that fully define the structure of the hole segment and merely limit what portion of the hole segment is displayed as part of the first slice or the second slice. Thus, these slices when rendered (displayed) precisely follow the shape of the original stroke object 210. Further, because the slices retain the same data (e.g., control points) that fully define the hole segment as in the original stroke object 210, there is no need to recalculate the positions of control points or calculate new control points. The systems and methods of the present invention are preferably used with a curve interpolation algorithm having the "local control" characteristic as discussed above, such as the Catmull-Rom Curve and the Poly-Bezier Curve. Then, the slices resulting from a slicing operation need to retain a minimum amount of data (e.g., a minimum number of control points) to define the hole segment resulting from the slicing operation.

Figure 19:
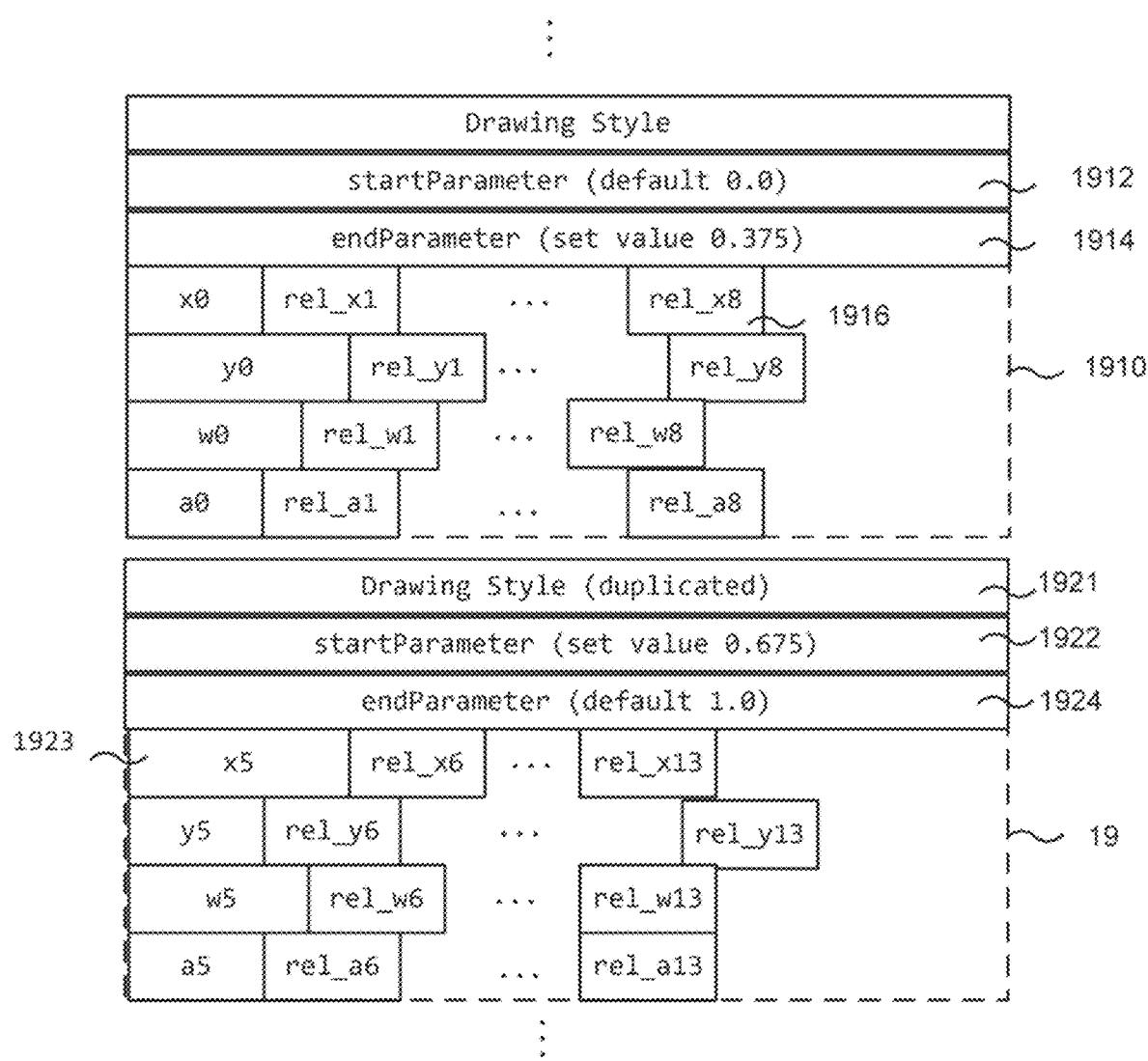
FIG. 19 illustrates a sample file in the stroke file format (SFF) containing two newly-created stroke objects representing two slices resulting from slicing a stroke object.

FIG. 19 illustrates a sample file in the stroke file format (SFF) containing the two newly-created stroke objects 210 as displayed in FIGS. 16C and 17C. FIG. 19 may be compared to FIG. 11 which illustrates a sample original stroke object file.

In FIG. 19, a broken-line box 1910 indicates a file containing the first newly-created stroke object 210 of FIG. 16C. The first stroke object file contains points x0~x8 corresponding to point objects p0~p8 of FIG. 16C. The start parameter field 1912 includes the default value of "0.0" and the end parameter field 1914 includes the value of "0.375" derived in step S1417 of FIG. 14. A broken-line box 1920 indicates a file containing the second newly-created stroke object 210 of FIG. 17C. The second stroke object file contains points x5~x13 corresponding to point objects p5-p13 of FIG. 16C. The start parameter field 1922 includes the value of "0.675" derived in step S1419 of FIG. 14 and the end parameter field 1924 includes the default value of "1.0." The first stroke object file 1910 may be a rewritten/modified instance of the original stroke object file (of FIG. 11), or may be duplicated from the original stroke object file to form an independent copy. As used herein, a "newly-created" file may mean either of these types of files. The second stroke object file 1920 may also be a duplicated copy of the original stroke object file, as shown in field 1921 of FIG. 19.

Figure 20:
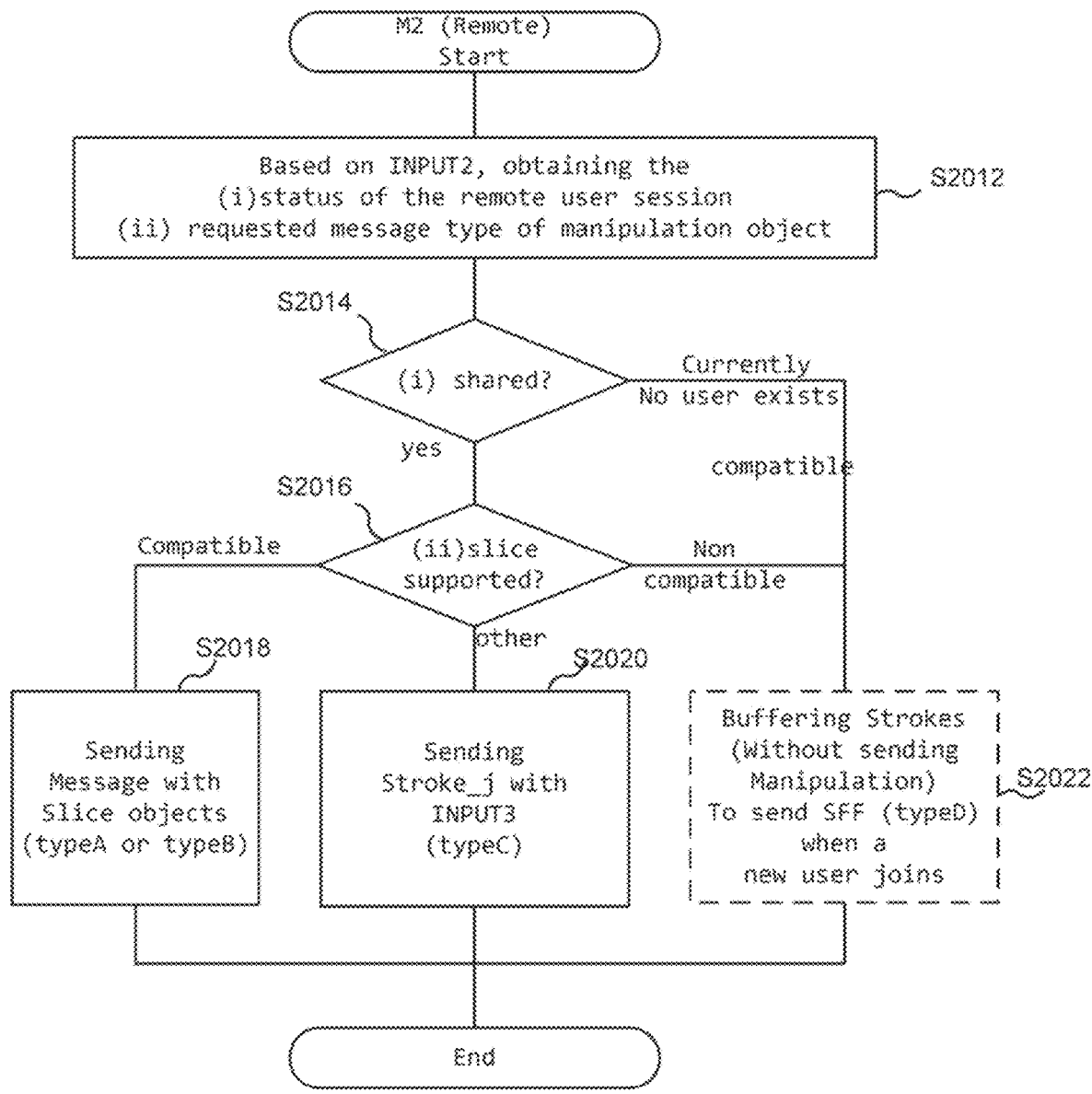
FIG. 20 is a detailed flow chart of the ink data transmission processing performed in step S1422 of FIG. 14.

FIG. 20 is a detailed flow chart of the ink data transmission processing at step S1422 of FIG. 14. In step 2012, the ink data processing section 100 obtains, from the context information ("INPUT 2"), information indicating (i) whether a remote user exists who shares the ink data 200 (a set of stroke objects 210) generated by the ink data processing section 100, and (ii) a message type to use for transmitting the ink data 200 to the remote user.

In step 2014, the ink data formatting section 140 of the ink data processing section 100 determines, based on information (i) above, whether the ink data 200 in the local device shared with another remote computer. If no remote user or computer using the ink data 200 currently exists, optionally in step S2022, the ink data formatting section 140 may buffer two newly-generated stroke objects 210 in Type D message shown in FIG. 21D (which corresponds to the SFF format file of FIG. 19). When a remote user later joins the ink data generation session of the ink data processing section 100, the file formatting section 140 may send Type D message to the remote user. At this time it is not necessary to send the slicing manipulation object_j itself because the remote user, who did not view the slicing operation in real time, need only receive the result of the slicing operation, i.e., the two newly created stroke objects 210.

If it is determined in step S2014 that a remote user exists, in step S2016, the ink data processing section 100 determines, based on information (ii) above, a message type to use to transmit the ink data 200 to the remote user. A suitable message type may be selected depending on the type of manipulation operation supported by the reception device (see FIG. 22) of the remote user, a tolerance for time delay in a particular application, an available amount of transmission resources, etc. For example, when information (ii) indicates that the reception device of the remote user does not support any manipulation (e.g., slicing) operation, proceeding to step S2022, the ink data formatting section 140 buffers and transmits only the result of the slicing operation, i.e., the newly-created stroke objects in Type D message to the remote user.

In step S2016, if information (ii) above indicates that the reception device of the remote user supports executing a stroke object 210 as a manipulation object 270 to slice one or more stroke objects 210 on the reception device, the process proceeds to step S2020. In step S2020, the ink data formatting section 140 may use the ink data communication section 144 to transmit the manipulation (slicing) stroke object_j in a message Type C as shown in FIG. 21C.

Figure 21A:
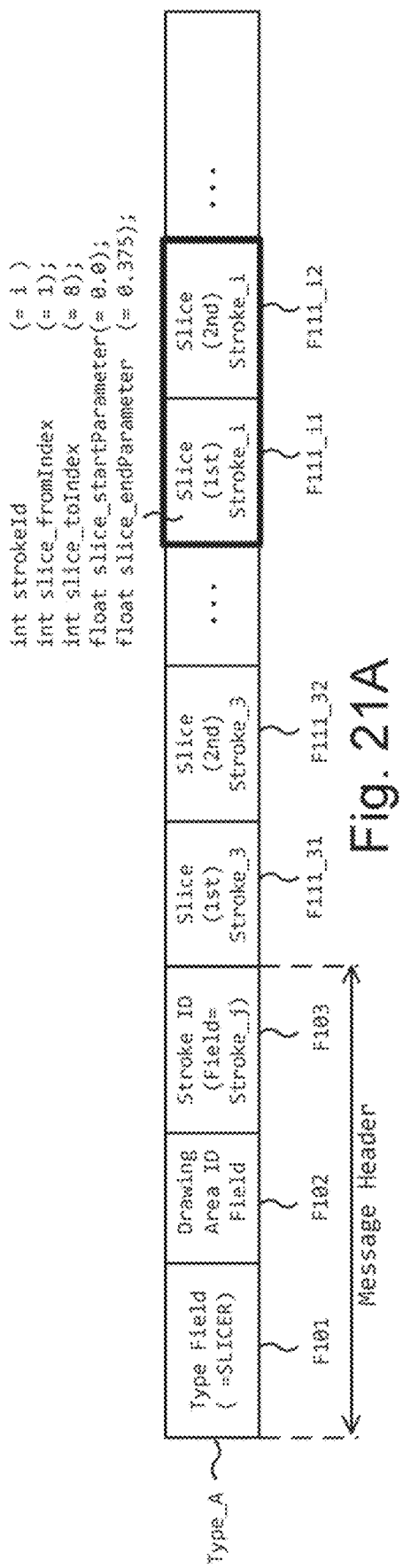
Figure 21B:
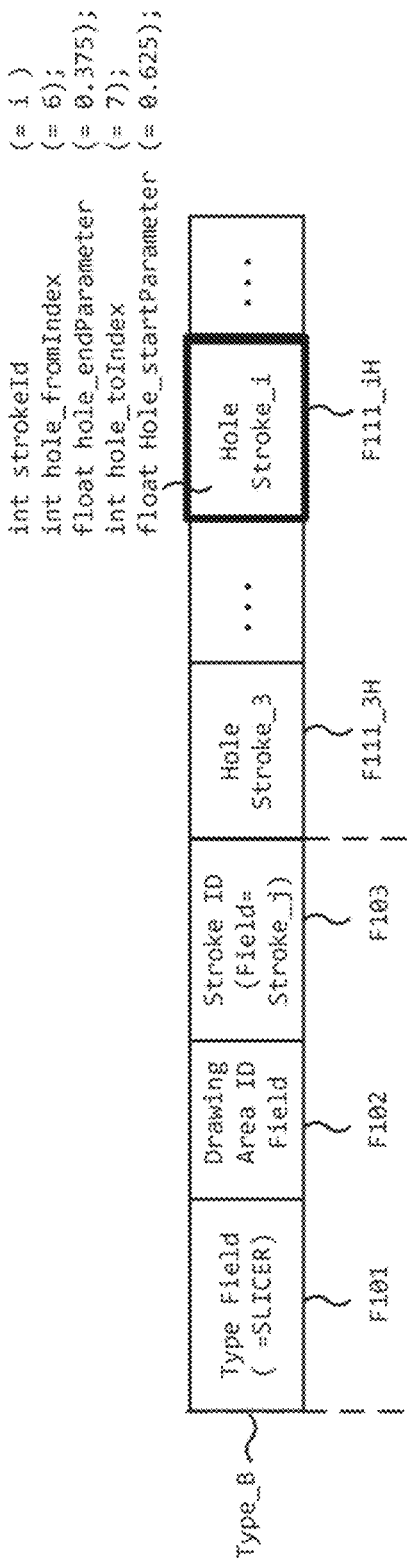
Figure 21C:
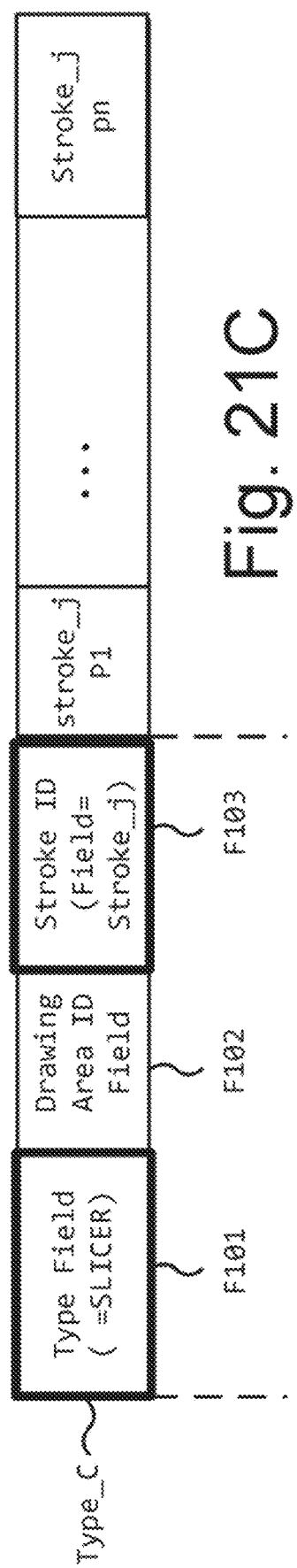

Type C message of FIG. 21C has a header including type field F101, drawing area ID field F102, and stroke ID field F103 that identifies the stroke object_j. The type field F101 indicates that the message is of a "slicer" type which implements (executes) a slicing operation. In this example, the "slicer" type indication in F101 constitutes the manipulation information ("INPUT 3") that indicates that the associated stroke object_j is a manipulation object 270. The payload portion of Type C message includes the manipulation (slicing) stroke object_j containing point objects p1~pn. One advantage of using Type C message to transmit the stroke object_j as a manipulation object 270 is that it allows for the same slicing operation to occur simultaneously, in real time, at both the transmission side and the reception side. This is because the transmission side, upon generating the stroke object_j, can virtually simultaneously transmit the stroke object_j with manipulation information ("INPUT 3") to the reception side so that both sides can then execute the same manipulation stroke object_j simultaneously.

Referring back to step S2016 of FIG. 20, if information (ii) above indicates that the reception device of the remote user supports executing a slice object 274 or a hole segment object as a manipulation object 270 to slice one or more stroke objects 210 on the reception device, the process proceeds to step S2018. In step S2018, the ink data formatting section 140 may use the ink data communication section 144 to transmit the slice objects 274 (FIGS. 16B and 17B) as a manipulation object 270 in a message Type A as shown in FIG. 21A. Alternatively, in step S2018, the ink data formatting section 140 may use the ink data communication section 144 to transmit the hole segment object (FIG. 18B) as a manipulation object 270 in a message Type B as shown in FIG. 21B.

Type A message in FIG. 21A has a header including type field F101, drawing area ID field F102, and stroke ID field F103 that identifies the stroke object_j. The payload portion of Type A message includes one or more pairs of slice objects 274 resulting from slicing one or more pre-existing stroke objects 210 with the stroke object_j. FIG. 21A illustrates two such pairs: slice (1st) and slice (2nd) in fields F111_31 and F111_32, respectively, which resulted from slicing pre-existing Stroke_3 with the stroke object_j; and slice (1st) and slice (2nd) in fields F111_i1 and F111_i2, respectively, which resulted from slicing pre-existing Stroke_i with the stroke object_j (description of other pairs is omitted). The type field F101 of Type A message indicates that the message is of a "slicer" type which implements (executes) a slicing operation. In this example, the "slicer" type indication in F101 constitutes the manipulation information ("INPUT 3") that indicates that the associated pairs of slice objects 274 form a manipulation object 270. A reception device that receives Type A message extracts each pair of slice objects 274 and finalizes the slice objects 274 in reference to the original (pre-existing) stroke object 210 to be sliced, to generate two new stroke objects 210 which can then be drawn on a display. One advantage of using Type A message to transmit slice objects 274 as a manipulation object 270 is that the data size of slice objects 274 is generally smaller than the data size of a slicing stroke object 210 (the stroke object_j) included in Type C message and the data size of newly-created stroke objects 210 included in Type D message.

Type B message in FIG. 21B has a header including type field F101, drawing area ID field F102, and stroke ID field F103 that identifies the stroke object_j. The payload portion of Type B message includes one or more hole segment objects resulting from slicing one or more pre-existing stroke objects with the stroke object_j. FIG. 21B illustrates two hole segment objects: hole segment stroke_3 in field F111_3H, resulted from slicing pre-existing Stroke_3 with the stroke object_j; and hole segment stroke_i in field F111_iH, resulted from slicing pre-existing Stroke_i with the stroke object_j (description of other hole segment objects is omitted). The type field F101 of Type B message indicates that the message is of a "slicer" type which implements (executes) a slicing operation. In this example, the "slicer" type indication in F101 constitutes the manipulation information ("INPUT 3") that indicates that the associated hole segment objects form a manipulation object 270. A reception device that receives Type B message extracts and executes each hole segment object in reference to the original (pre-existing) stroke object 210 to be sliced, to generate two new stroke objects 210 which can then be drawn on a display. Similar to Type A message described above, one advantage of Type B message to transmit hole segment objects as a manipulation object 270 is that the data size of hole segment objects is generally smaller than the data size of a slicing stroke object 210 (the stroke object_j) included in Type C message and the data size of newly-created stroke objects included in Type D message.

Figure 22:
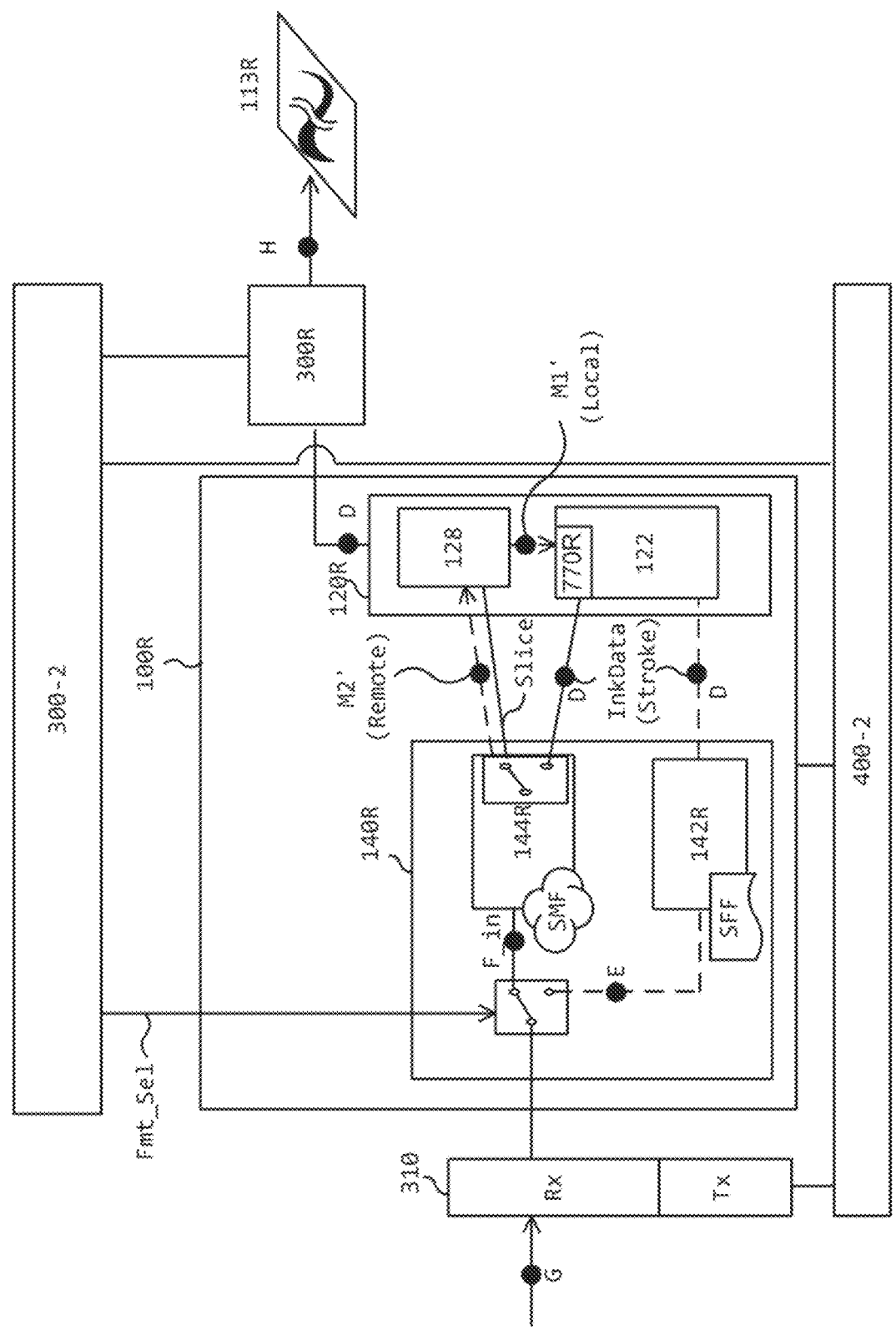
FIG. 22 is a functional block diagram of an ink data reception device configured to remotely receive ink data via a network according to first embodiments of the present invention.

FIG. 22 is a functional block diagram of an ink data reception device configured to remotely receive ink data 200 via a network according to embodiments of the present invention.

The reception device includes a network communications section 310 (Rx, Tx), an ink data processing section 100R, an application section 300-2, a graphic processing section 300R, a display 113R, and an operating system 400-2. In exemplary embodiments, the ink data processing section 100R is embodied in libraries that realize the ink data processing section 100 on the transmission side. Thus, the reception device generally performs counterpart functions corresponding to the functions performed by the ink data processing section 100.

In FIG. 22, points "D," "E," "F_in," "G" and "H" correspond to the respective points in the ink data processing section 100 on the transmission side. In FIG. 22, M2' (Remote) indicates a point at which a manipulation object 270 transmitted from M2 (Remote) on the transmission side is received. M1' (Local) indicates a point that corresponds to M1 (Remote) on the transmission side, where the processing to finalize (commit to) slice objects 274 performed in step S1421 of FIG. 4 is performed, except that in FIG. 22 the slice objects 274 (or a manipulation stroke object 210 that produces the slice objects 274) are not internally generated but are received from the transmission side.

The network communications section 310 (Tx, Rx) receives packets via a WAN or wireless/wired LAN interface and extracts various ink data messages as described in FIG. 12.

The ink data processing section 100R includes an ink data formatting section 140R and an ink data generation section 120R. The ink data formatting section 140R corresponds to the ink data formatting section 140 on the transmission side, and similarly includes a recording format handling section 142R configured to receive ink data 200 in a recording-type stroke file format (SFF) via point "E" and an ink data communication section 144R configured to receive ink data 200 in a communication-type stroke message format (SMF) via point "F_in." The data communication section 144R determines, based on a value contained in a header field F101 of a received message ("INPUT 3"), whether a received message includes a manipulation object 270, i.e., a special type of stroke object 210 (e.g., SLICER type stroke object), a slice object 274, or a hole segment object configured to execute a manipulation (slicing) operation on one or more pre-existing stroke objects.

The ink data generation section 120R corresponds to the ink data generation section 120 on the transmission side. Unlike the ink data processing device on the transmission side, the reception device (which does not include an input sensor 110) does not receive pen event data to generate a stroke object 210. Instead, the ink data generation section 120R receives various objects such as stroke objects 210, manipulation objects 270, drawing style objects 230 and metadata objects 250. The ink data generation section 120R uses a stroke object handling section 122 and a manipulation object handling section 128 to process (e.g., manipulate) the received stroke objects 210, and stores the manipulated (transformed) stroke objects 210 in a memory device 770.

The graphic processing section 300R carries out processing corresponding to that carried out by the graphic processing section 300 on the transmission side. As shown in FIGS. 13A and 13B, the graphic processing section 300R reconstructs a stroke (path) by generating interpolated curves according to a curve interpolation algorithm such as the Catmull-Rom Curve algorithm using point objects contained in a stroke object 210 as control points. The graphic processing section 300R further controls the range (portion) of the stroke object 210 to be displayed in reference to a start parameter and an end parameter defined for the stroke object 210. For example, if the start parameter is 0.5 and the end parameter is 0.5, the graphic processing section 300R starts to draw (display) the stroke object 210 from a midpoint of its starting curve segment and stops displaying the stroke object 210 at a midpoint of its ending curve segment. The graphic processing section 300R also adds width, color, and other graphical properties to the rendered stroke object 210 in reference to a drawing style object 230 received in association with the stroke object 210.

The display 113R corresponds to the display 113 on the transmission side. The application section 300-2 is supported by the operating system 400-2 and is dynamically or statically linked to the libraries that realize the ink data processing section 100R. The application section 300-2 may include applications that are the same as, similar to, or different from the applications supported in the application section 300-1 on the transmission side.

Figure 23:
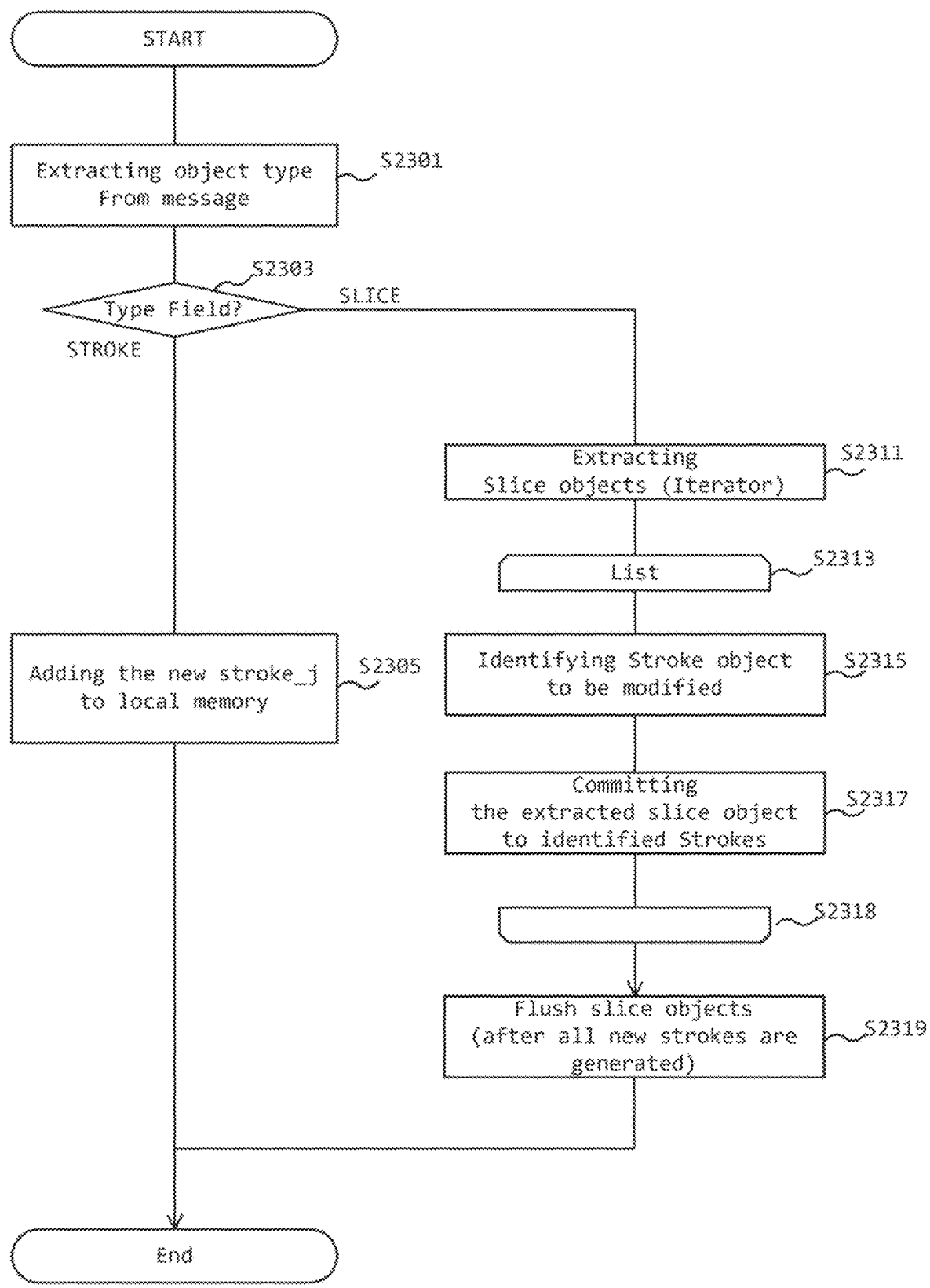
FIG. 23 is a flow chart illustrating a reception processing of a manipulation (slicing) object at the reception side according to first embodiments of the present invention.

FIG. 23 is a flow chart illustrating a reception processing of a manipulation (slicing) object, which may be performed by the reception device of FIG. 22, according to embodiments of the present invention.

In step S2301, the ink data formatting section 140R receives ink data messages received via the network communication section 310 and extracts the type of message included in each message from the type field F101 included in a message header ("INPUT 3").

In step S2303, the ink data formatting section 140R determines whether a message contains a regular stroke object 210 or a manipulation object 270. As described above, a manipulation object 270 may be any of a stroke object 210, a slice object 274, or a hole segment object, associated with manipulation information ("INPUT 3").

A stroke object 210 may be in the stroke message format (SMF) file as in FIG. 12 or in the stroke file format (SFF) file as in FIG. 11. A manipulation object 270 is preferably in the SMF file, as shown in FIGS. 21A-21C.

If it is determined that a regular stroke object 210 is received, in step S2305, the stroke object handling section 122 adds the received stroke object 210 in the memory device 770R.

If it is determined that a manipulation (slicing) object is received, in step S2311, the manipulation object handling section 128 extracts one or more manipulation objects included in the received message and, in step S2313, generates a list of the extracted manipulation objects. For example, if Type A message of FIG. 21A is received, the list identifies the two pairs of slice objects 274 in fields F111_31, F111_32, F111_i1, and F111_i2 as manipulation objects (description of other pairs is omitted). If Type B message of FIG. 21B is received, the list identifies the two hole segment objects in fields F111_3H and F111_iH as manipulation objects (description of other hole segment objects is omitted). If Type C message of FIG. 21C is received, the list identifies the stroke object_j as a manipulation object 270.

The following steps S2315-S2318 will be repeated for each of the manipulation objects included in the list.

In step S2315, the manipulation object handling section 128 determines a target stroke object 210 to which the manipulation object 270 is to be applied. For example, in case of Type A message of FIG. 21A, it is determined that the manipulation object 270 in the form of the pair of slice objects 274 in fields F111_31, F111_32 is applied to pre-existing Stroke 3, and that the manipulation object 270 in the form of the pair of slice objects 274 in fields F111_i1 and F111_i2 is applied to pre-existing Stroke_i.

In step S2317, the manipulation object handling section 128 applies the manipulation object 270 to the target stroke object 210 identified in step S2315 to carry out a manipulation operation, and commits (finalizes) the manipulation operation so as to generate fully-defined stroke objects. The generated stroke objects are then stored in the memory device 770R of the stroke object handling section 122. Operation of step S2317 generally corresponds to operation of step S1421 in FIG. 14. In short, committing or finalizing a manipulation operation reflects the result of the manipulation operation in resulting stroke objects.

In step S2318, the manipulation object handling section 128 determines whether all of the manipulation objects identified in the list of step S2313 have been executed on their respective target stroke objects. If not, the process returns to step S2315 to process the next (remaining) manipulation object 270.

If all of the manipulation objects identified in the list have been executed on their respective target stroke objects and their manipulation operations have been committed (finalized) to generate a new set of stroke objects, in step S2319, the manipulation object handling section 128 flushes the slice objects 274 and hole segment objects (if any) used as the manipulation objects.

While the ink data processing section 100 on the transmission side and the ink data processing section 100R on the reception side are described as a software library operating on the operating system 400-1 or 400-2, the ink data processing sections 100 and 100R may be realized in a different manner, such as in an application-specific integrated circuit (ASIC) or an IC.

Figure 91:
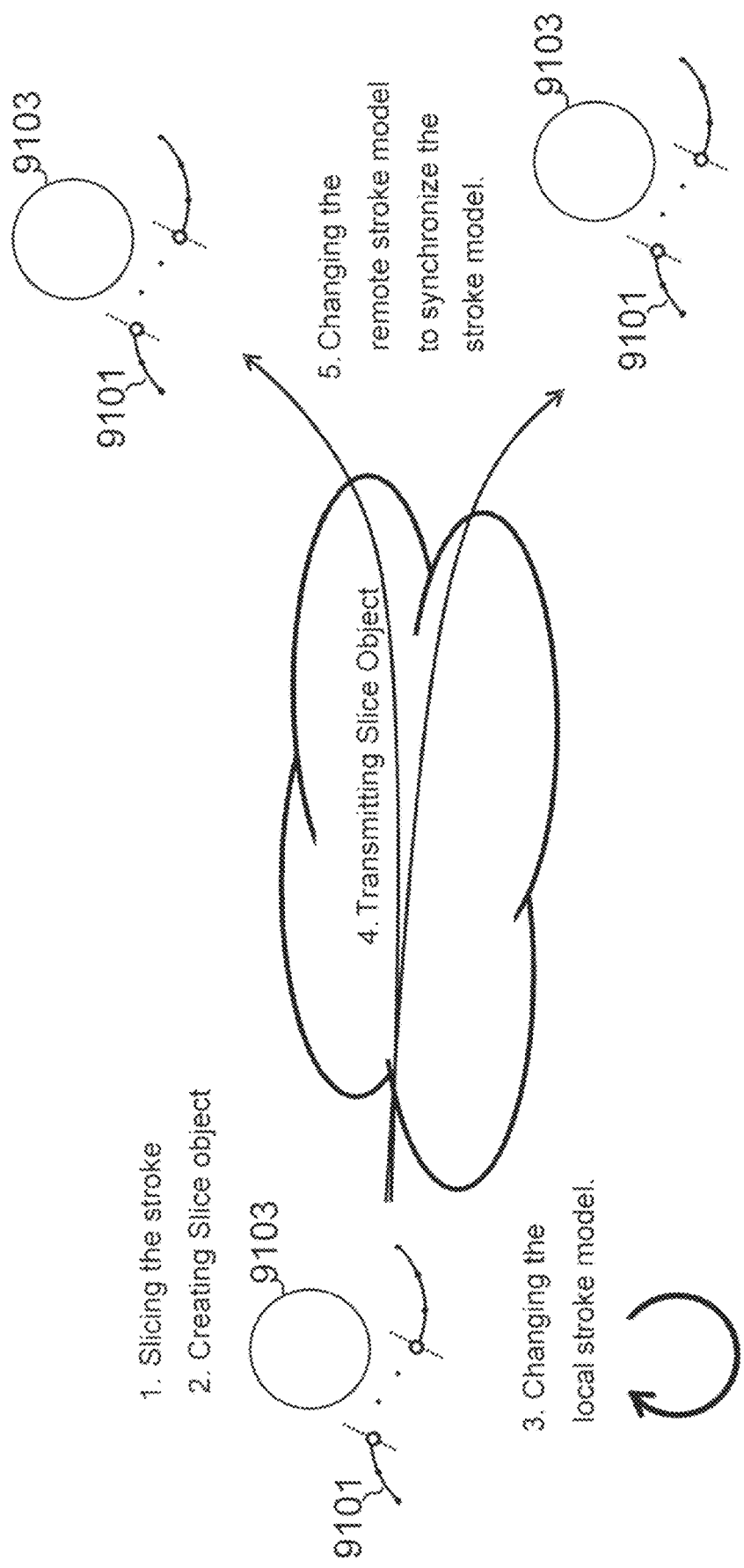
FIG. 91 is a diagram explaining the effect of using an ink data processing device (101) of FIG. 75 to address ASPECT ONE.

Thus, according to the ink data processing method of the first embodiment, it is possible to modify or manipulate (e.g., slice) a portion of a stroke object 210, and transmit the modification/manipulation to one or more other computing devices, as illustrated in FIG. 91.

Second Embodiment

A second embodiment of the present invention is directed to methods and systems for communicating (transmitting, relaying, receiving and processing, and streaming) ink data 200, among multiple devices (transmission devices, relay servers, reception devices) that share a common drawing area. In particular, the methods and systems enable superimposing multiple layers of ink data 200 respectively generated by different devices within the common drawing area real-time, in the right communication order and in a timely manner.

The second embodiments of the invention are particularly suited for realizing real-time collaboration applications, in which multiple users can enter hand-drawn (freehand) input to a common drawing area (or canvas) at the same time in real time.

For use in real-time collaboration applications, the present invention provides methods and systems capable of generating ink data 200 with a full set of attributes (color, trace or stroke width, rendering (drawing) style, etc.), which can be shared without perceivable time delay thanks to novel communications/reproductions schemes in which transmission timings of fragments of ink data 200 are controlled.

According to one aspect, ink data 200 includes stroke objects respectively generated (drawn) using different types of devices and a drawing style object 230 that characterizes the stroke objects (e.g., what type of pen tip is used to draw a stroke object), and the ink data 200 is rendered within a common drawing area. Some applications such as real time collaboration applications have strict (fast) time requirements while other applications do not have such strict time requirements. Apparatuses and methods according to an aspect of the invention are configured to transmit/relay/receive the ink data 200 in a timely manner, in the right order and in the right format, according to requirements of a particular application in use.

According to one aspect, the present invention provides a method implemented by a transmission device to communicate with multiple reception devices that respectively share a drawing area with the transmission device, wherein the transmission device transmits to the multiple reception devices ink data 200 representative of traces of input operation detected by an input sensor of the transmission device. The method includes generally three steps: (a) an ink data generation step, (b) a message formation step, and (c) a transmission step. The ink data generation step includes: (i) continuously inputting pen even data (INPUT 1) generated according to movement of a pointer, and generating fragmented data of a stroke object, wherein the stroke object contains multiple point objects to represent a trace of said movement of the pointer, the fragmented data being generated per defined unit T, and (ii) generating a drawing style object 230 based on context information (INPUT 2) at a pen down time corresponding to generation of the pen event data at a beginning point of said trace, wherein the drawing style object 230 defines a rendition form of said trace of the stroke object. The message formation step includes: (i) generating a first message that includes the drawing style object 230, and (ii) generating one or more second messages subsequent to the first message, the one or more second messages including the fragmented data. Finally the transmission step includes transmitting the first message and the one or more second messages in sequence according to a defined communications protocol.

According to another aspect, a relay method is provided for receiving ink data 200 representative of traces of input operation detected by an input sensor of a transmission device and relaying the received ink data 200 to multiple reception devices that respectively share a drawing area with the transmission device. The method includes generally four steps: (a) a reception step, (b) a control step, (c) a data message relay step, and (d) a transmission step. The reception step includes receiving a control message including information regarding the drawing area and receiving a data message including the ink data 200 to be rendered in the drawing area. The control step includes updating a connection list that lists communications addresses of the multiple reception devices that share the drawing area. The data message relay step includes: (i) determining whether to permit updating of the drawing area based on a stroke object 210 included in the data message, (ii) if the updating is permitted, generating a new data message to be relayed to the reception device listed in said connection list directly or via another relaying device, and (iii) if the updating is not permitted, generating a reject message indicating that a request for updating of the drawing area is rejected. Finally the transmission step includes transmitting the new data message in a communications packet to the reception device.

According to a further aspect, the invention provides a method of receiving ink data 200 including generally four steps. The first step includes receiving a first fragment of a stroke object 210 in a message associated with a first fragment ID. The second step includes receiving a third fragment of the stroke object 210 in a message associated with a third fragment ID, wherein the third fragment ID is not consecutive with the first fragment ID. The third step includes interpolating a missing second fragment of the stroke object 210 based on the received first and third fragments of the stroke object 210 and displaying the interpolated second fragment. The fourth step includes, after receiving an end of the stroke object 210, transmitting a request including a stroke ID of the stroke object 210 to request retransmission of the stroke object 210 as a whole.

According to yet another aspect, a method is provided of streaming ink data 200 including multiple stroke objects using a server in which the ink data 200 is stored. The method includes generally two steps. The first step includes reading the stored stroke objects sequentially. The second step includes transmitting the stroke objects from the server to one or more receiving devices at defined timings that respectively correspond to sequential portions of the stroke objects.

Description of the Second Embodiment

FIG. 1 described above in reference to the first embodiment illustrates an overall system in which ink data 200 may be generated and communicated (transmitted, relayed, received, processed, streamed, etc.) according to the second embodiment of the present invention. For example, Device 10-3 in FIG. 1 may combine (synthesize) the ink data 200 respectively outputted from Device 10-1-1 and Device 10-1-2, in real time, using an application provided by Application Service #2, which may be a real-time collaboration type application. Device 3 may render (draw) on its screen the ink data 200 outputted from Device 10-1-1 and Device 10-1-2 as different layers that are superimposed on one another in real time.

The ink data 200 generated and communicated amongst different devices according to embodiments of the present invention are shared by various types of devices, computers, operating systems, or applications over communications resources.

Figure 25:
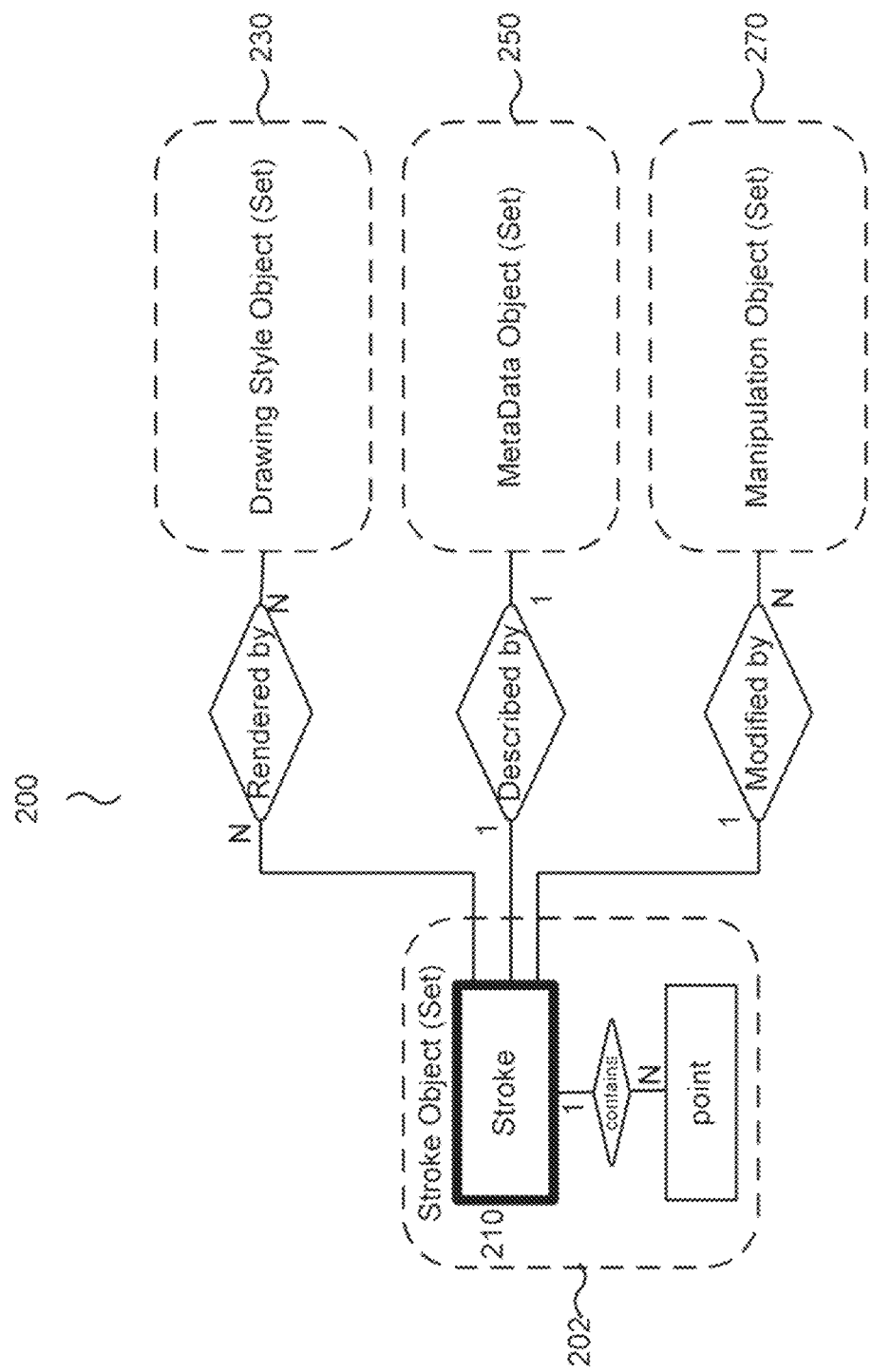
FIG. 25 is an entity relationship diagram of an ink data structure, suitable for use in second embodiments of the present invention.

FIG. 25 is an entity relationship diagram of an information model for the ink data 200. FIG. 25 differs from FIG. 2 in that the stroke object 210 of FIG. 25 need not include startParameter 301 or endParameter 303, but otherwise is the same as FIG. 2. The ink data 200 according to embodiments of the present invention include a stroke object 210 (or stroke object set 202) (see FIG. 3A) and a drawing style object (set) 230 including information needed to control the shape and color of a stroke object 210 when rendered (drawn, visualized, rasterized). FIGS. 3B and 3C, described above in reference to the first embodiments, respectively illustrate two rendering (drawing) results according to two different drawing style objects 230 of the same stroke object 210 of FIG. 3A. The ink data 200 further include a metadata object (set) 250 including non-drawing related information that describes a stroke object 210, such as authorship, pen ID, locally obtained date and time information, location information obtained by GPS, etc. The ink data 200 still further include a manipulation object (set) including information needed to manipulate (e.g., select, rotate, slice) a pre-existing stroke object 210. Such information is organized in the form of manipulation objects, each of which is executable on a pre-existing stroke object 210 to effect desired manipulation of the stroke object 210. Other manipulation objects may include, for example, cropping (deleting), erasing, copying, enlarging and shrinking manipulation objects.

FIG. 3A illustrates a stroke object 210, which contains multiple point objects (Point_1 . . . Point_n). The stroke object 210 includes information that represents a trace of movement of a pointer. The pointer may be a pen-type implement or a finger. Specifically, the stroke object 210 includes coordinates of the multiple point objects (Point_1 . . . Point_n) that form the trace. Each of the point objects may be associated with attributes such as its radius, color, transparency (opacity) value, etc.

The coordinates of the multiple point objects (Point_1 . . . Point_n) are obtained or derived from suitably sampling a pen event data (or pointer operation), which are generated according to movement of a pointer, and interpolating the sampled points as necessary. As described above in reference to the first embodiment, to represent the trace as a smooth curve, suitable curve algorithms such as the Catmull-Rom interpolation algorithm may be employed.

There are generally two methods for generating (x, y) coordinates of multiple point objects. First, the points derived per unit time from pen event data are outputted, while the pen event data are being inputted, as points of "raw value type." Second, after all points forming a stroke are entered, a higher-order function representative of a fitted curve (a Catmull-Rom curve, a Bezier curve, etc.) for the stroke is generated, and a minimum number of point objects needed to express the fitted curve are obtained as points of "optimized point type." According to one embodiment of the present invention, depending on the timing constraints on ink data 200 communications requested by each application, the two methods of generating (x, y) coordinates are selectively switched.

As illustrated in the different rendering results of FIGS. 3B and 3C, each drawing style object 230 includes information regarding the unique form in which the trace is rendered (drawn or expressed) on a screen or display, i.e., how the trace appears on the screen or display. Thus, use of different drawing style objects to render the same stroke object 210 results in different renditions of the stroke object 210 in terms of how they appear. The form of a trace may be defined by one or more of a shape of a point object (e.g., a circle in FIG. 3B and a flake or petal in FIG. 3C), width of the trace (e.g., the radius of each circle in FIG. 3B or the size of each flake in FIG. 3C), any angle or offset associated with each point object (see FIG. 3C), color of the trace (or colors of the point objects), transparency/opacity of the trace (or of the point objects), texture of the trace (or texture of the point objects), etc. The information needed to draw a stroke object 210 is included in a drawing style object 230 associated with the stroke object 210.

Figure 26:
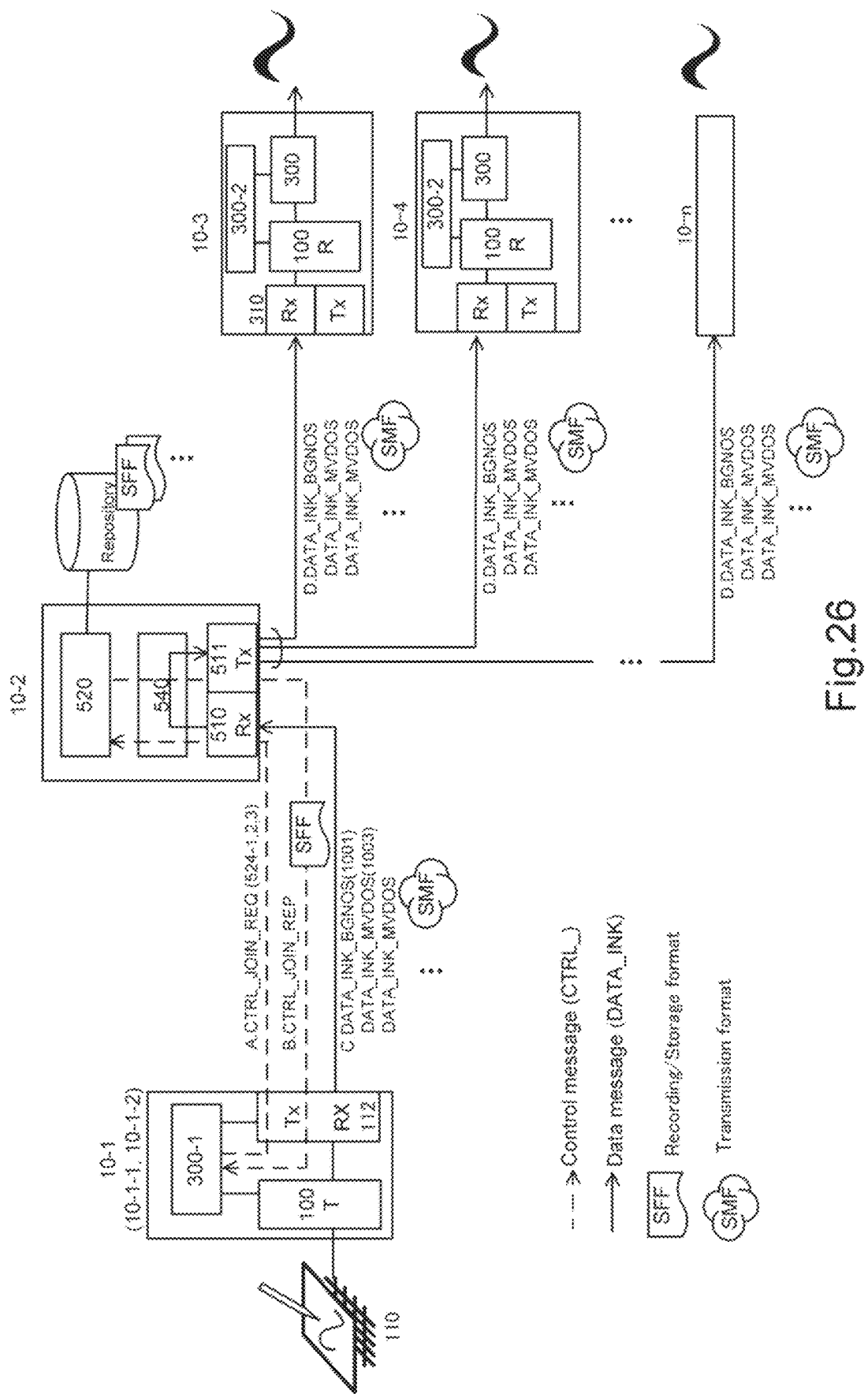
FIG. 26 is an overall communications system diagram suitable for use in second embodiments.

FIG. 26 is an overall communications system diagram according to embodiments of the present invention. The communications system includes a transmission device 10-1, a relay server 10-2, and multiple reception devices 10-3, 10-4 . . . 10-n, which all share and use a group of library resources 10 as shown in FIG. 1. The relay server 10-2 can be also part of globally distributed peer-to-peer network of relaying servers (similar to content delivery network) for increased performance. The system of FIG. 26 is suited for implementing transmission, relay and reception methods of ink data 200 to achieve real-time collaboration according to embodiments of the present invention.

The transmission device 10-1 of FIG. 26 corresponds to Device 10-1-1 or Device 10-1-2 of FIG. 1.

The transmission device 10-1 includes an input sensor 110, input processing section (not shown), ink data processing section 100T, an application section 300-1, and a communications section 112 ("Tx Rx"). Ink data processing section 100T corresponds to 100T in FIG. 5 of the first embodiment. The application section 300-1 includes one or more user applications, which are linked to the ink data processing section 100T and supported by the group of library resources 10 (FIG. 1). In the illustrated embodiment, the application section 300-1 executes a real-time collaboration application #1 that utilizes a real-time communications function.

The relay server 10-2, typically a relaying server, embodies and provides an ink data exchange service. In the illustrated embodiment, the relay server 10-2 serves transmission device 10-1 and reception devices 10-3, 10-4 . . . 10-n, which are remotely located from the relay server 10-2, by exchanging or relaying ink data 200 in real time.

Figure 28:
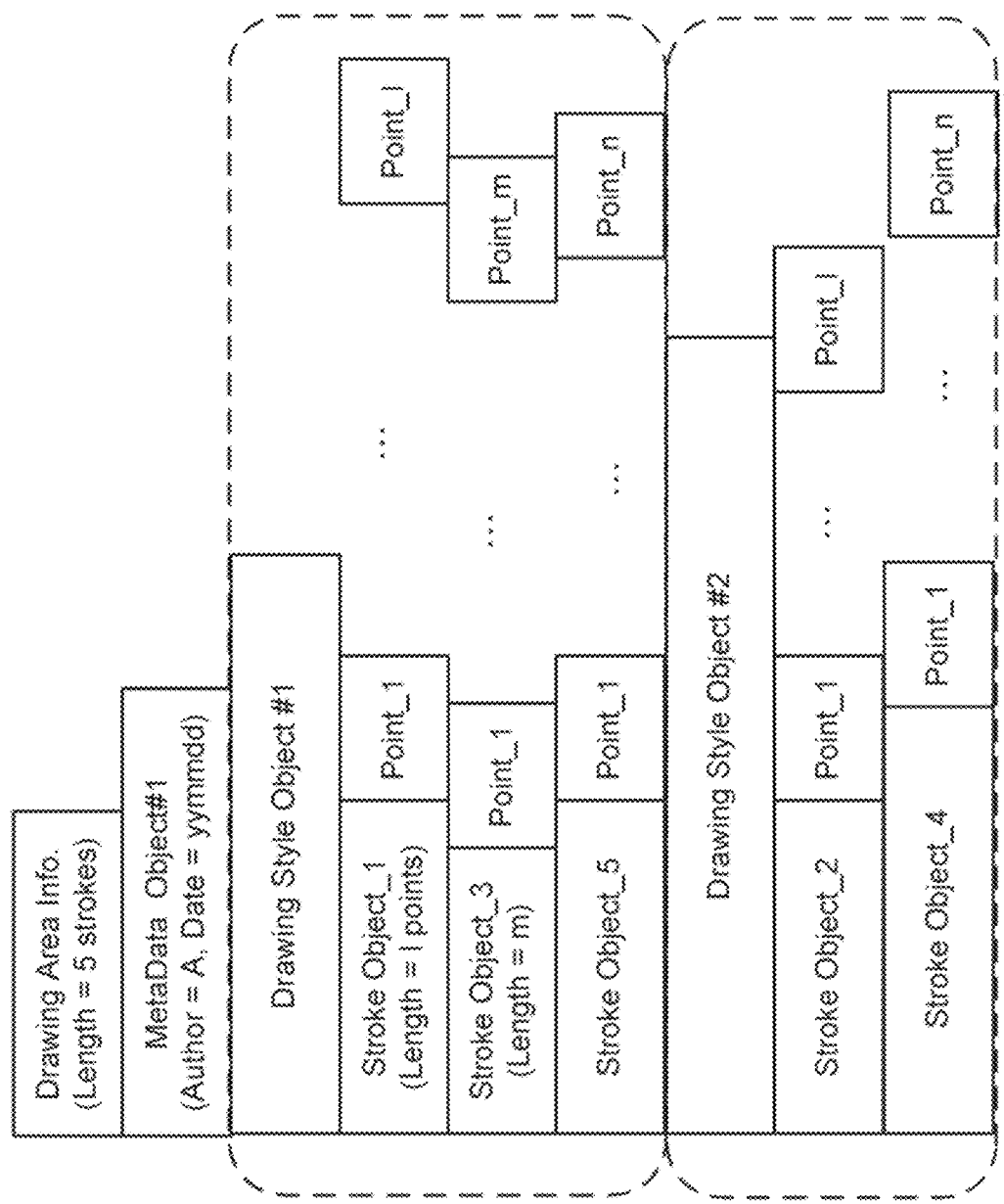
FIG. 28 illustrates a sample recording format, suited for storing an updated state of a common drawing area (canvas), in second embodiments of the present invention.

The relay server 10-2 includes a communications section (510 Rx, 511 Tx), an ink data relay section 540, an application control section 520, and a repository configured to store canvas data (or drawing area data), to be described more fully below. According to an aspect of the invention, the repository stores information regarding the latest state of a drawing area (canvas), which is continuously updated, in the stroke file format (SFF) as illustrated in FIG. 28. Upon request from transmission/reception devices, the relay server 10-2 returns the latest state of the common drawing area to the requesting devices such that they all can share the up-to-date state of the drawing area (i.e., what the "canvas" currently looks like). According to one aspect, the relay server 10-2 absorbs differences in communications protocols used by multiple devices, to permit communication and exchange of ink data 200 amongst those devices.

The reception devices 10-3, 10-4 . . . 10-n each correspond to Device 3 in FIG. 1, and include a communications section (310 "Rx Tx"), an ink data processing section 100R, a graphic processing section 300, and an application section 300-2. The application section 300-2 executes Application #2, which utilizes the definition and communications protocol of the ink data 200 processed in the ink data processing section 100R. Application #2 of the reception device may be the same as Application #1 used by the transmission device 10-1, or may be different as long as both Applications #1 and #2 share the same definition and communications protocol of ink data 200.

The division among the transmission device 10-1, the relay server 10-2, and the reception devices 10-3, 10-4 . . . 10-n, as shown in FIG. 26 is for ease of illustration only, and the various functions of these devices may be partially or fully consolidated, or may be further divided and distributed, according to each application and implementation of an embodiment of the present invention. For example, the reception device 10-3 may be equipped to perform the ink data processing functions ("ink data generation" 120T and "ink data formatting" 140T to be described in FIG. 27) of the transmission device 10-1, or the transmission device 10-1 may be equipped to perform the ink data processing functions ("ink data formatting" 140R and "ink data generation" 120R to be described in FIG. 31) of the reception device 10-3. In some implementations multiple transmission devices exist, while in other implementations no transmission device exists. In the latter case, for example, the relay server 10-2 retains ink data 200 in its repository and streams the ink data 200 to one or more client reception devices 10-3, 10-4 . . . 10-n.

In FIG. 26, arrows in broken lines illustrate flow of ink data control messages, such as control messages that set a common drawing area (or canvas) on which the ink data 200 inputted via multiple devices are superimposed as multiple layers. Names of the ink data control messages start with a prefix "CTRL_".

Arrows in solid lines illustrate flow of ink data messages, including the actual ink data 200 inputted via multiple devices to be superimposed on one another in the common drawing area. Names of the ink data messages start with a prefix "DATA_INK_".

Figure 34:
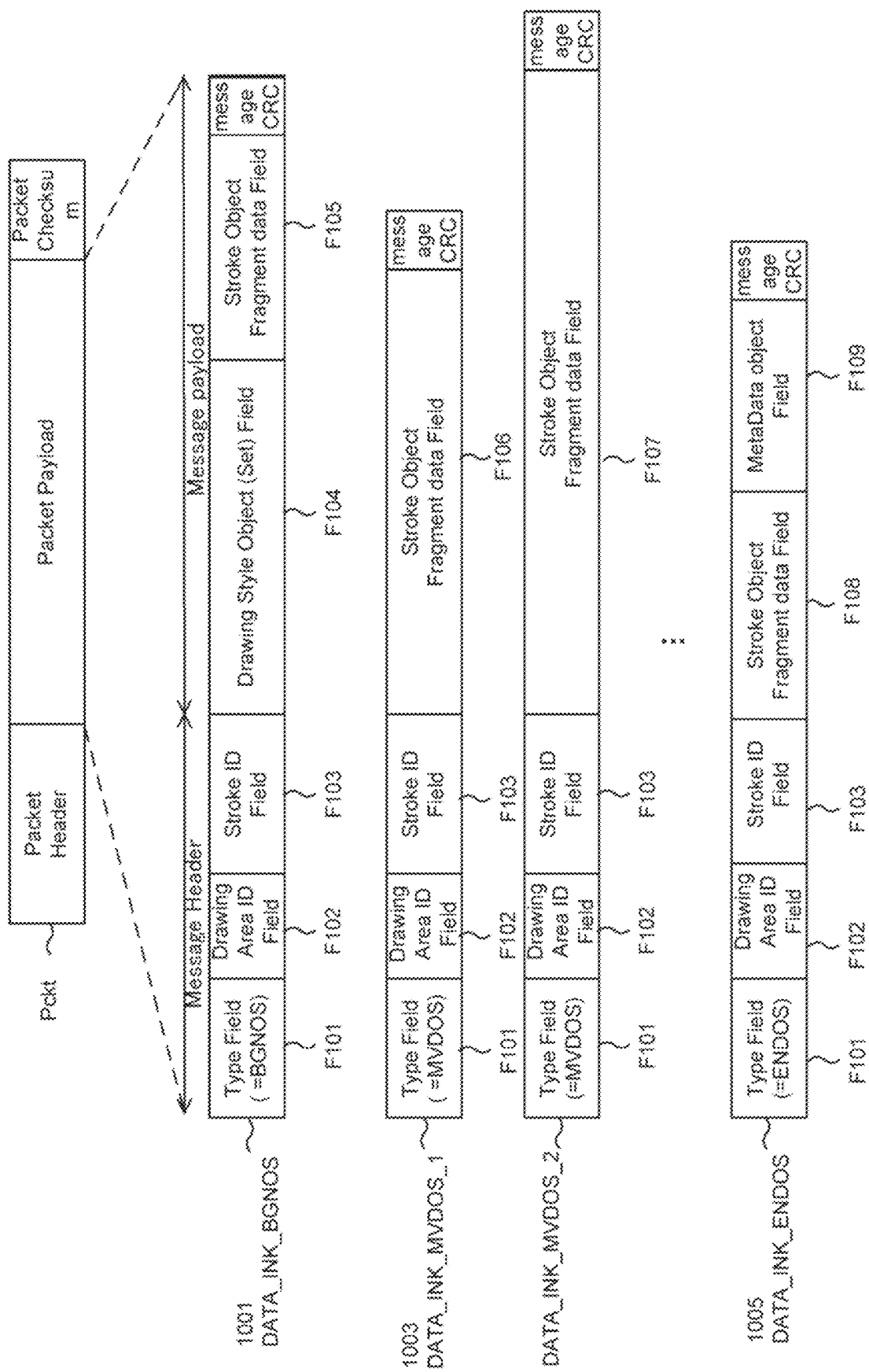
FIG. 34 illustrates a sample transmission format of communications packets and messages, suited for transmitting (communicating) ink data amongst multiple devices, according to second embodiments of the present invention.

"SMF"s (Stroke Message Format) shown in FIG. 26 are messages generated and arranged in packets in a transmission format, as illustrated in FIG. 34 to be described below. Briefly, ink data 200 in a transmission format are suited for real-time communication without perceived delay. For example, point objects of the "raw value type" described above may be used to form a stroke object 210 of the transmission format.

"SFF"s (Stroke File Format) shown in FIG. 26 are messages generated and arranged in a recording format, as illustrated in FIG. 28 to be described below. Briefly, ink data 200 in a recording format are compressed and are suited for storage. For example, point objects of the "optimized point type" described above may be used to form a stroke object 210 of the recording format. As further example, in SMF transmission format color information may be processed in RGB while in SFF recording format color information may be processed in YCC for compression efficiency.

In various embodiments of the invention, the transmission format (e.g., SMF) is used to communicate and exchange ink data 200 amongst multiple devices in real time, while the recording format (e.g., SFF) is used to store the common drawing area (canvas) in a repository (which may be sent to each device upon initial access).

A broken-line arrow "A. CTRL_JOIN_REQ" is a message issued when a transmission device 10-1 first joins an editing session of a common drawing area provided by a collaboration service. The transmission device 10-1 may be the first device to join the common drawing area, or may be a latecomer that joins an editing session already commenced by other transmission devices. The broken-line arrow "A. CTRL_JOIN_REQ" indicates a transmission direction of a message that the transmission device 10-1 sends out, to set a drawing area (or canvas) to be shared with the reception devices 10-3, 10-4 . . . 10-n. The CTRL_JOIN_REQ message may include or be associated with a message containing information regarding the transmission device's environment (e.g., a set of parameters that describe its transmission/reception environment) to be negotiated with, or shared with, the relay server 10-2.

For example, parameters that describe a transmission device's transmission/reception environment include communications parameters such as a stroke transmission/reception unit (size), message retransmission control setting, etc. (FIG. 30A, 524-1), drawing parameters that define a pen tool set, coordinates system, etc. (FIG. 30B, 524-2), and user policy parameters such as priority over resource competition, block user list, etc. (FIG. 30C, 524-3).

A broken-line arrow "B. CTRL_JOIN_REP" indicates a transmission direction of a response message that the relay server 10-2 sends out, in response to the CTRL_JOIN_REQ message. CTRL_JOIN_REP includes environmental data necessary for the transmission device 10-1 to transmit its ink data 200, and in particular, the environmental data may include information regarding the latest state of the drawing area (canvas) of the reception devices 10-3, 10-4 . . . 10-n.

A solid-line arrow "C. DATA_INK_BGNOS," "DATA_INK_MVDOS" "DATA_INK_ENDOS" (see FIG. 34) indicates a transmission direction of the ink data 200 that the transmission device 10-1 sends, as updating messages to update the drawing area (or canvas), to the relay server 102 at the timings and in the transmission format pursuant to a defined communications protocol to be described in detail later.

A solid-line allow "D. DATA_INK_BGNOS" and "DATA_INK_MVDOS" indicates a transmission direction of the ink data 200 processed by and sent out (broadcasted) by the relay server 10-2 to the reception devices 10-3, 10-4 . . . 10-*n*, on respective communications lines.

Figure 27:
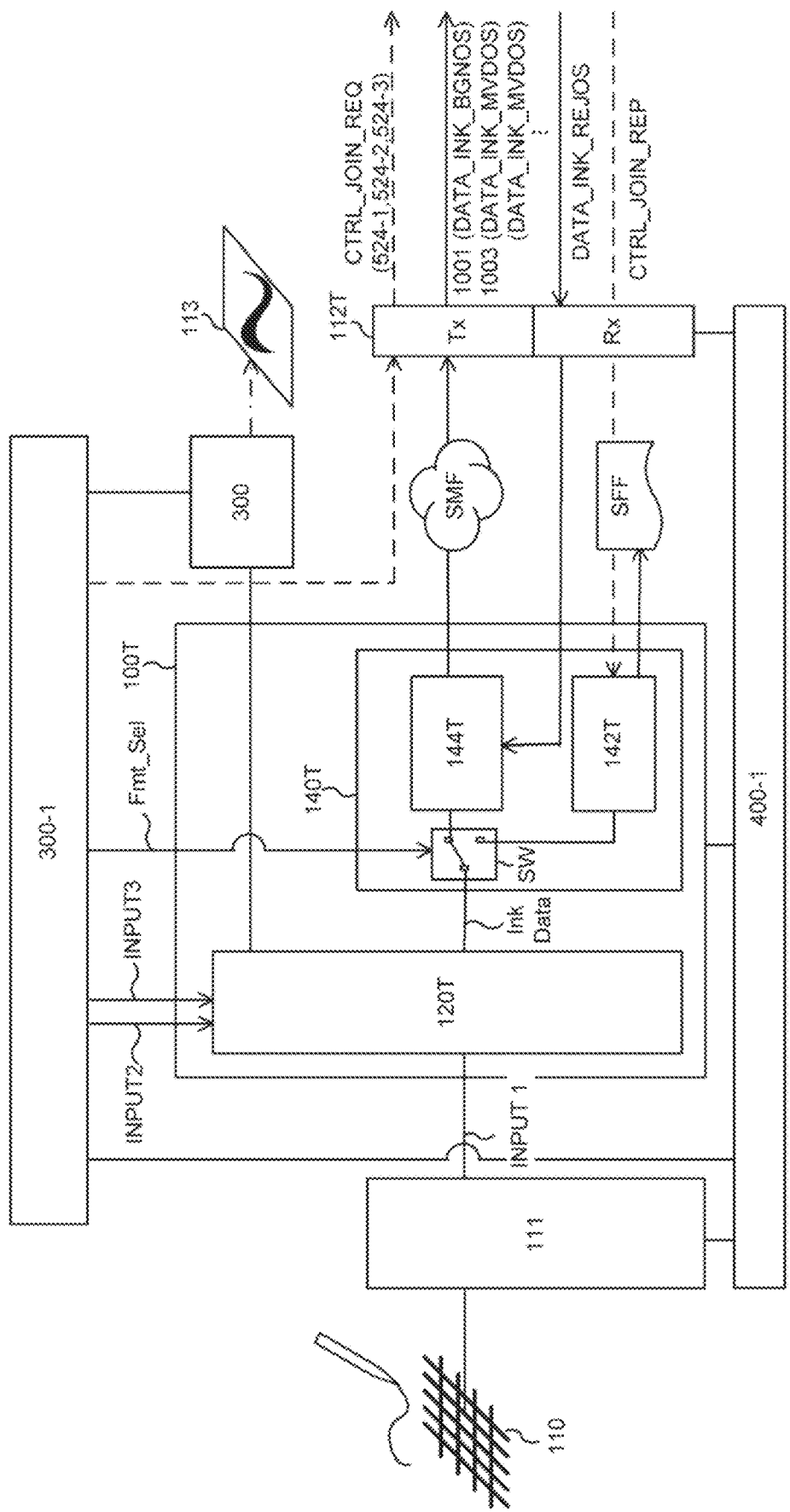
FIG. 27 illustrates a transmission device (10-1) of the communications system of FIG. 26.

FIG. 27 illustrates the transmission device 10-1 of FIG. 26 in a functional block diagram. The transmission device 10-1 includes a (touch/pen) sensor 110, an input processing section 111, the ink data processing section 100T, the application section 300-1, a network communications section (Tx, Rx) 112T, a graphic processing section 300, a display 113, and an operating system 400-1.

The sensor 110 has a function to detect a user's handwriting motion or operation (via a pointer such as a pen and a finger) and generates an input data signal representative of the detected handwriting motion. For example, an electrostatic sensor, a pressure-sensitive sensor, an electromagnetic resonance (EMR) based sensor may be used.

The input processing section 111 receives an input data signal that is typically dependent on a particular sensor device and its driver running on an operating system 400-1, converts it to "pen event data" that include sensed coordinate positions and other information such as pointer pressure information, and outputs the pen event data as "INPUT 1." The pen event data are still dependent on a particular sensor device used to detect the handwriting operation input. The input processing section 111 is typically provided by a driver for the sensor 110 or a library that performs processing corresponding to the sensor driver. For example, when an electrostatic sensor is used, the input processing may include processing to interpret a gesture based on continuously entered input, such as palm-rejection processing. Since the pen event data are sensor/device dependent, the pen event data may or may not include pointer pressure information or pointer tilt (angle) information, depending on whether the sensor 110 has pressure/tilt detection function or not. The configuration of the sensor 110 and the input processing section 111 is not limited to that which is illustrated, and all or part of the sensor 110 and the input processing section 111 may be provided in a digital stationery device such as a pen-shaped device.

The ink data processing section 100T includes an ink data generation section 120T and an ink data formatting section 140T. The ink data processing section 100T corresponds to 100T in FIG. 5 of the first embodiment. The ink data processing section 100T is responsible for converting the pen event data ("INPUT 1"), which may be sensor/device dependent, to ink data 200 that can be used and shared by a variety of applications on a variety of devices.

The ink data generation section 120T retrieves or receives the pen event data, which are sensor/device dependent, and converts it to device-independent ink data 200, which is a digital representation of ink that is applied (e.g., drawn, smudged, deposited, etc.) on paper using a real pen. The ink data generation section 120T corresponds to stroke object handling section 122 in FIG. 7. The ink data generation section 120T retrieves the ink data (point objects p0 to pn−1 stored in a memory 770 in FIG. 7) per defined unit T, such as a defined time unit (e.g., 5 msec) or a defined data size unit, to generate a stroke object 210, or fragments (portions) of the stroke object 210, that represents a trace entered by a handwriting operation.

The ink data generation section 120T receives the pen event data ("INPUT 1") from the sensor 110, and also receives context information ("INPUT 2") from the application section 300-1 (e.g., a real-time collaboration application) or from an operating system (400-1).

The context information ("INPUT 2") is information regarding the context or environment of the pen event data at the time when a first part of a stroke is drawn (i.e., at "pen-down"). The context information is set by the application section 300-1 typically prior to generation of the pen event data by the sensor 110. For example, the context information may include the type of pen tip used (e.g., brush, crayon, pencil), stroke/trace colors (red, green, blue), transparency (or opacity) value (alpha) of a pen stroke, stroke/trace width, etc. The ink data generation section 120T generates a drawing style object 230, which is used to draw (render) a stroke object 210 on a display, based on the context information ("INPUT 2") at the timing of the start of the pen event data (at S605 in FIG. 32, to be described later).

The context information ("INPUT 2") also includes non-drawing related information about pen event data, such as author information, pen ID, date/time information, location information, etc. Based on such non-drawing related context information the ink data generation section 120T generates a metadata object 250.

The ink data generation section 120T additionally receives a manipulation information ("INPUT 3") from the application section 300-1. INPUT 3 specifies that the next input from the sensor 110 is not to define a normal stroke object 210, but is to define a manipulation object 270 that embodies and executes a manipulating operation (e.g., slicing, deleting, copying, enlarging, etc.) on a pre-existing stroke object 210. When INPUT 3 is received, with respect to one or more of pre-existing stroke objects #0-#i, the next stroke object #j is formed as a manipulation object 270 (e.g., a slicing object) and its manipulating operation is applied.

The ink data formatting section 140T includes an ink data communication section 144T and a recording format data processing section 142T. In general the ink data formatting section 140T formats (e.g., places in transmission packets) the fragmented data of a stroke generated per defined unit T by the ink data generation section 120T. The ink data formatting section 140T also formats drawing style objects 230, metadata objects 250 and a manipulation objects 270 generated by the ink data generation section 120T. The ink data formatting section 140T formats various objects and the fragmented data of each stroke object 210 in messages and in communications packets according to format selection information (Fmt_Sel) received from the application section 300-1.

The ink data communication section 144T performs the following functions when the format selection information (Fmt_Sel) received from the application section 300-1 specifies use of a transmission format (e.g., SMF) as an output format:

1) Inputs a stroke object 210 generated by the ink data generation section 120T as fragmented (or complete) data per defined unit T, and generates various types of data messages (i.e., messages that start with prefix "DATA_INK_" as in FIG. 34) according to parameters implicitly defined or explicitly negotiated. (E.g., FIG. 30A, 524_1*c*).

2) Inputs a drawing style object 230 generated by the ink data generation section 120T and adds the drawing style object 230 ("F104" in FIG. 34) to a "first" data message ("DATA_INK_BGNOS" in FIG. 34.)

3) Determines a unique stroke ID of the stroke object 210, and adds the stroke ID ("F103" in FIG. 34) to all data messages which include the fragmented data of the stroke object 210.

4) Adaptively performs retransmission processing (see FIGS. 35A, 35B and 36A) or abort processing (FIG.

37) upon receiving a response message ("DATA_INK_NACK" in FIG. 36A or "DATA_INK_REJOS" in FIG. 37) according to the negotiated parameters (e.g., FIG. 30A, 524_1f, with or without 524_1a).

The recording format data processing section 142T processes the ink data 200 generated according to the application section 300-1 into a recording format (e.g., SFF), which is different from the transmission format. For example, the ink data 200 in the recording format may be uploaded from the transmission device 10-1 to the relay server 10-2 to indicate a current state of a common drawing area (canvas), to be shared (accessed) by multiple users of the reception devices 10-3, 10-4 . . . 10-*n* upon initial access to a real-time collaboration application. Instead of the recording format, on the other hand, the transmission format may be used to communicate ink data 200 in real time between multiple devices.

FIG. 28 illustrates a sample recording format for use in embodiments of the present invention. The recording format differs from the transmission format (of FIG. 34) in terms of the types of data included/omitted, and the order and redundancy of data.

Types of Data Included/Omitted

For example, when a manipulation object 270 is generated to modify preexisting stroke object 210, in the transmission format a manipulation object 270 (e.g., slice object 274 as described above in reference to the first embodiment), to transform the ink data 200 residing in one or more computers is generated and transmitted. On the other hand, in the recording format, it suffices to record only the state after the manipulation (updating) has been completed, and thus it is not necessary to retain the manipulation object 270 itself. Thus, the recording format example of FIG. 28 does not include any manipulation object 270.

Order and redundancy of data A metadata object 250 includes non-drawing-related information about a stroke object 210, such as author information, pen ID, etc., which is often the same for a number of stroke objects 1-5 entered at the same time, for example, when the same author using the same pen generates multiple stroke objects 1 through 5 in this order.

In the recording format, redundancy may be reduced because the entire data content is known at the time of formatting data in the recording format. In the illustrated example, the same value of authorship may be applied to all stroke objects 1-5, and thus the same value need not be repeated 5 times. Drawing-related information to be included in a drawing style object 230 may also include redundancy in some cases where, for example, the same type of pen tip shape (e.g., brush) is used to draw multiple stroke objects. Thus, as another example, the same value of pen tip shape may be applied to stroke objects 1, 3 and 5, where this value need not be repeated 3 times in the recording format. Similarly, when the same value of pen tip shape is applied to stroke objects 2 and 4, the value need not be repeated in the recording format. In this connection, it is not critical to maintain the time sequential order of stroke objects (i.e., the order in which they were entered) in the recording format. Also, because each stroke object is fully completed when being put into a recording format, the total number of point objects that form a stroke object may be included in the stroke object itself.

On the other hand, in the transmission format, it is difficult to rearrange the time sequential order of the stroke objects if real-time communication is of importance. In real-time communication, typically it is necessary to transmit information regarding stroke objects 1-5 in the time sequential order as they are entered and generated. Also, when transmitting fragmented data of a single stroke object, it is not possible to know in advance how many point objects will be included in the stroke object, and thus it may be necessary to indicate the last fragmented data that completes the stroke object as such (and the last fragmented data may include information regarding the total number of point objects included in the stroke object).

According to embodiments of the present invention, the same amount of information may be included in less bytes in the recording format than in the transmission format, because the transmission format may need to have redundancy and a rigid time sequential structure for the purpose of achieving real-time communication without perceivable time delay. Thus, for the purpose of memory space saving, the latest drawing area information stored in the repository of the relay server 10-2 is preferably in the recording format, which can then be accessed and retrieved by various devices connected to the relay server 10-2 using a lesser amount of transmission resources.

Referring back to FIG. 27, the network communications section 112T (Tx, Rx) of the transmission device 10-1 generates communications packets (see FIG. 34), which include the messages generated by the ink data processing section 100T as payload, and outputs the packets via a network interface connected to media (Ethernet, etc.)

Various communications protocols may be used based on implicit or explicit (via negotiation) definition in view of communications environment as necessary. For example, a protocol that includes a built-in retransmission mechanism such as TCP or HTTP(S) over TCP or SSL may be used (FIG. 35A), or a protocol that itself does not offer a retransmission mechanism such as UDP (or RTP/UDP) may be used (FIG. 35B). Further, when UDP is used, either a message retransmission mechanism may be employed (FIG. 36A) or a message retransmission mechanism is omitted for the purpose of complying with time requirements of real-time type applications (FIG. 36B). Also, it is possible to use different communications protocols for control messages and data messages, respectively. For example, it is possible to employ a protocol with a retransmission mechanism to transmit control messages shown in broken-line arrows, while employing a protocol without a retransmission mechanism to transmit data messages shown in solid-line arrows.

The application section 300-1 provides an application that uses the ink data transmission method according to an embodiment of the present invention. The application section 300-1 issues the CTRL_JOIN_REQ, etc., via the network communications section 112T (Tx), to the relay server 10-2 (in particular, 520 in FIG. 29) which manages the latest status of the common drawing area (or canvas). The application section 300-1 determines the drawing area (canvas) on which to perform drawing using an input device 110.

The application processing section 300-1 processes and provides to the ink data processing section 100T of the transmission device 10-1 the following information:

context information such as color information, pen tip shape, authorship information, creation date and time (INPUT 2),
  manipulation information that specifies that the incoming input forms a manipulation object (INPUT 3), and/or
  format selection information (Fmt Sel), which designates which one of a transmission format and a recording format should be selected.

The application processing section 300-1 is capable of receiving the ink data 200 generated by the ink data generation section 120T to output to both the remotely-located reception devices (10-3, 10-4 . . . 10-*n*) and to the transmission device's own local display or screen, if provided.

The graphic processing section 300 generates pixel data based on the ink data 200. The graphic processing section 300 is capable of instantly drawing (rendering) the stroke objects on the local display or screen, which may represent the state of the common drawing area in which ink data 200 entered via multiple devices are superimposed as different layers.

The ink data transmission device 10-1 according to embodiments of the present invention determines the latest (updated) state of a drawing area (canvas) for use, and processes pen event data continuously to generate fragmented (or complete) data of a stroke object 210 per defined unit T (e.g., 5 msec). The ink data transmission device 10-1 further selects respective parts of context information (INPUT 2) to generate an associated drawing style object 230 and a metadata object 250, generates a manipulation object based on INPUT 3, and formats the generated objects in a transmission format (e.g., SMF) for transmission to the relay server 10-2 and to the reception devices 10-3, 10-4 . . . 10-*n*. The defined unit T may be adaptively determined based on a request from a collaboration application.

Figure 29:
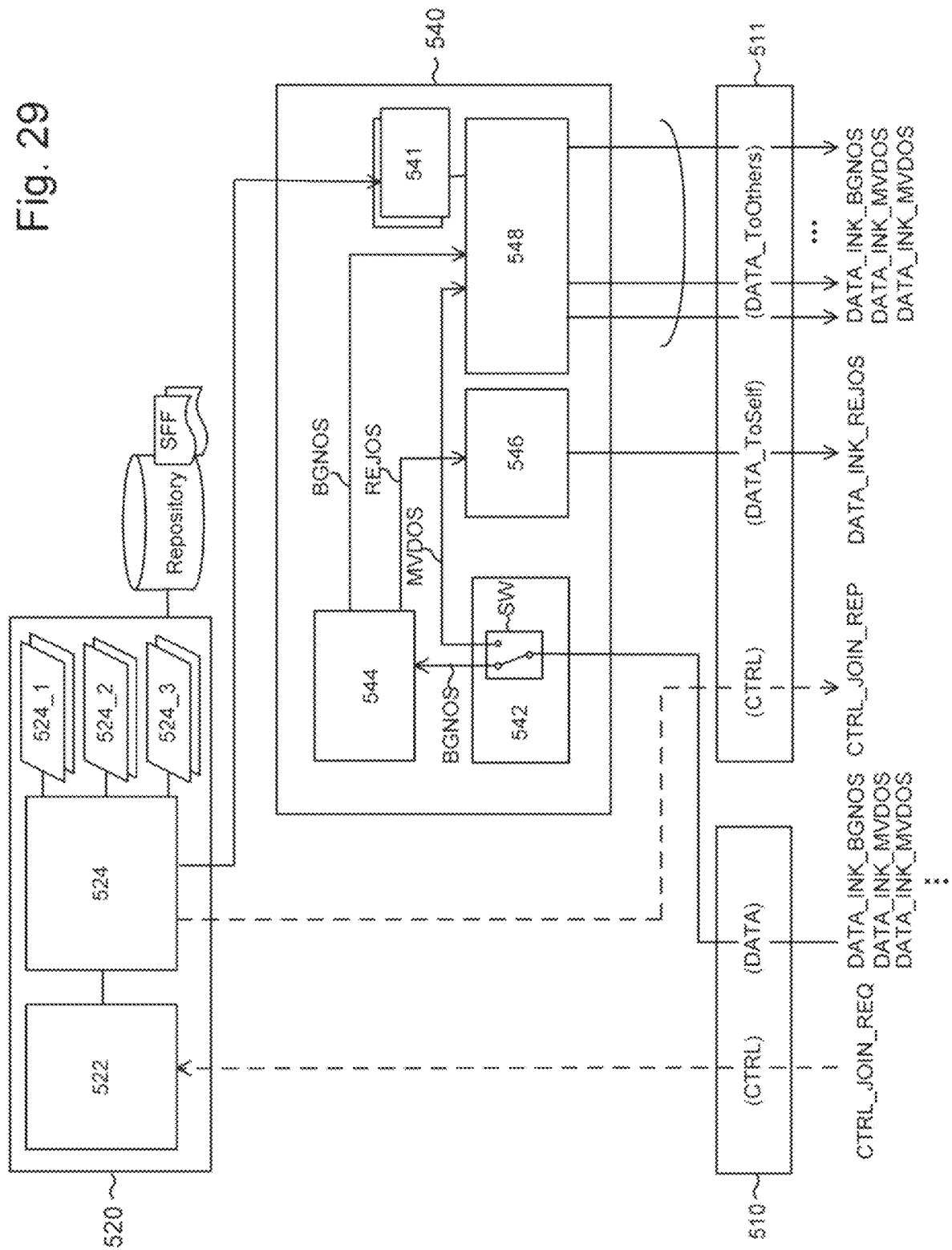
FIG. 29 illustrates a relay server (10-2) of the communications system of FIG. 26.

FIG. 29 is a block diagram of the relay (or streaming) server 10-2. The relay server 10-2 provides a real-time collaboration service by relaying fragmented data received from one or more transmission client devices to one or more reception client devices 10-3, 10-4 . . . 10-*n*. The functions of the relay server 10-2 may be contained in a single device, or may be distributed amongst multiple servers linked by a network.

The relay server 10-2 includes a message reception section 510, a drawing area management section 520, an ink data relay section 540, and a message transmission section 511.

The message reception section 510 receives the control messages and data messages, separately, from the transmission device 10-1. The messages are transmitted between the transmission device 10-1 and the relay server 10-2 in communications packets pursuant to a protocol (RTP/HTTP/HTTPS(SSL)/TCP/UDP/Websocket, etc.) and in a message type (fragmented, retransmission, maximum delay, etc.) which may be predefined or may be defined based on on-demand negotiation between the devices when the devices first join the common drawing area. As illustrated, the message reception section 510 may employ multiple reception ports to distinguish between the control messages and the data messages, though other methods may be used to distinguish between the control messages and the data messages. For example, a separate device (server) for processing the control messages may be provided aside from the relay server 10-2 that processes the data messages, or a message header obtainable from a common reception socket buffer may be used to distinguish between the two types of messages.

The drawing area management section 520 manages the status of the drawing area, in which ink data 200 inputted from multiple devices and exchanged through the relay server 10-2 are superimposed on one another as different layers. The drawing area management section 520 includes a service management section 522 and a drawing area information management section 524.

The service management section 522 manages services that employ the ink data relay method according to embodiments of the present invention. The service management section 522 cooperates with external servers (not shown) to perform, for example, accounting functions, authentication function of new users, functions to provide a subscription-based viewing access to a common drawing area, to authorize or not authorize each user to enter ink data 200 to a common drawing area, etc., i.e., so-called AAA (Accounting, Authenticating, Authorizing) functions.

The drawing area information management section 524 manages drawing area information used to control operations of ink data relay methods. The drawing area information includes generally three types of information (524_1 in FIG. 30A; 524_2 in FIG. 30B; and 524_3 in FIG. 30C). The drawing area information management section 524 manages the three types of information, and based on the three types of information updates, maintains and purges a user connection list 541, which lists one or more users that are connected to each drawing area (canvas).

FIG. 30A shows a set of communications parameters 524_1 related to transmission and reception of ink data 200. The communications parameters are exchanged amongst communicating devices at the time of application startup, for example. The communications parameters 524_1 may include the following:

(524_1*a*) Packet Retransmission parameter defines whether a retransmission mechanism is built in communications packets (or protocol stack) that are used to carry ink data 200. For example, when using TCP (with retransmission support) for transmission while using UDP (without retransmission support) for reception, TRUE is set for transmission while FALSE is set for reception. This achieves robust and reliable transmission of ink data 200 from a transmission device 10-1 to a relay device 10-2, while at the same time providing real-time, no-perceivable-time delay streaming of the ink data 200 from the relay device 10-2 to multiple reception devices 10-3, 10-4 . . . 10-*n*, for example.

(524_1*b*) MTU (Maximum Transmission Unit), MSS (Maximum Segment Size) parameter defines a MTU or MSS depending on the type of media (e.g., Ethernet) to which a transmission device is connected (e.g., 146 bytes).

(524_1*c*) Stroke Data Fragment Enable parameter sets whether to fragment a stroke object 210 into fragments that are each less than the stroke object 210 as a whole.

(524_1*d*) maximum Rx delay parameter sets the maximum allowed reception delay, in milliseconds (msec) for example.

(524_1*e*) Message Encryption scheme parameter defines whether encryption is used and if used what encryption/decryption algorithm is used.

(524_1*f*) Message Retransmission parameter defines, for a protocol such as UDP that does not include a retransmission mechanism in the communications layer, whether to implement retransmission in the message layer. For example, the parameter is used to switch between using retransmission in the message layer (FIG. 36A) and not using retransmission in the message layer (FIG. 36B).

(524_1*g*) Audio Sync ENABLE parameter defines whether audio and stroke data are synchronously reproduced or not, and may be used to determine whether or not to transmit ink data 200 in fragments or in a complete form (per unit of stroke). For example, when audio and stroke data are to be synchronously reproduced, the stroke data may be fragmented with each fragment time-stamped such that each fragment can then be synchronously reproduced with its corresponding audio data.

(524_1*z*) Other Parameter set identifier defines a predetermined set of communications parameters.

FIG. 30B shows a set of drawing parameters 524_2 related to drawing (rendering) of ink data 200, and may include the following:

(524_2a) Drawing area ID parameter sets a common drawing area that a user device may join. In the illustrated example, FIG. 30B shows "#123," which is a common drawing area (or canvas) ID. In some embodiments, the relay server 10-2 may present to a user multiple IDs of multiple canvases, in which collaborative editing is on-going and from which the user device may select one to join. In other embodiments when the user device is starting a new drawing area, a unique drawing area ID may be assigned to the newly started drawing area.

(524_2b) User local canvas offset, rotation, scale parameter(s) define a relationship between the global coordinate system of the common drawing area and the local coordinate system of a user device used to join an editing session in the common drawing area. For example, this allows two different users to edit an upper portion and a lower portion of the ink data drawing from two different angles, respectively.

(524_2d) Pen tool set ID parameter is an ID assigned to a collection of pen parameters (pen tip shape, color, stroke width, ink transparency/opacity, etc.) that together define how a pen stroke appears on a drawing area. Multiple IDs may be predefined for multiple collections, from which a user may select one at the time of joining a collaborative editing session on a common drawing area.

FIG. 30C shows a set of user policy parameters 524_3 related to policies that govern user access to a common drawing area, including stroke data priority, filtering and quality of service (QoS), and may include the following:

(524_3a) User account priority parameter sets priority to stroke data in an ink data transmission service. In the illustrated example, the parameter is set to "High," which means that the resource arbitration (or QoS) control 544 of the relay server 10-2 will process and transmit the "High" priority stroke data preferentially over other stroke data whose priority is set to "Low," for example.

(524_3b) Block user list includes other users that one user wishes to block, i.e., from whom the user does not wish to receive ink data 200. The list may also include those users to whom the user does not wish to transmit ink data 200. Instead of listing those users to DENY reception from or transmission to, it is also possible to list those users to ACCEPT reception from or transmission to.

The ink data relay section 540 relays the data messages received from the transmission device 10-1 to one or more other reception devices in reference to the connection list 541, which lists all the devices currently connected to the drawing area into which the data messages are added (drawn). The connection list 541 also lists what communications, drawing, and user policy protocols should be used to communicate with each of the devices listed in the connection list 541. In various embodiments, the ink data relay section 540 handles (forwards or drops) a stroke object message, not in the unit of a packet or in the unit of a message, but as "one flow."

The ink data relay section 540 includes a new stroke flow detection section 542, a resource arbitration (or QoS) control 544, a feedback transmission section 546 (DATA_ToSelf), and an all-cast transmission section 548 (DATA_ToOthers).

The new stroke flow detection section 542 checks the header of a received message (Type field, F101 in FIG. 34) to determine if the message includes a new stroke ("DATA_INK_BGNOS"), or the message includes the fragmented data of the same (current) stroke object 210 for which the relay processing has already started.

The resource arbitration (or QoS) control 544 controls transmission resources in reference to the beginning end of each stroke object 210 and if necessary in reference also to the ending end of the stroke object 210. When processing the beginning end of a new stroke (BGNOS), the resource arbitration (or QoS) control 544 determines whether to accept the new stroke into the drawing area (canvas) based on various criteria. For example, if a stroke ID of a stroke object 210 newly received from a transmission device 10-1 is identical to one of the stroke IDs already used in the drawing area, the resource arbitration (or QoS) control 544 may reject the newly received stroke object 210 having the same stroke ID. As another example, if network resources are found insufficient to forward or handle a new stroke object 210 at a particular time, it rejects entry of newly received stroke objects until the network resource condition improves. This will prevent a situation in which a user starts to enter a new stroke object 210 only to have to abort the entry process before finishing the stroke object 210 due to lack of sufficient networking or computing resources. As a further example, if a particular device (user) is temporarily denied an updating right, the resource arbitration (or QoS) control 544 rejects any stroke objects generated by that particular device. For example, resources may be preemptively allocated to processing stroke data transmitted from a user with "High" priority (524_3a in FIG. 30C) over stroke data transmitted from a user with "Low" priority. The resource arbitration (or QoS) control 544, when determining to reject a new stroke received from any of the devices, sends "REJECT" from the feedback transmission section 546. The resource arbitration (or QoS) control 544, when determining to accept a new stroke received from a device, sends (forwards) the new stroke to all of the other devices (except for the device that itself has sent the new stroke) via the all-cast transmission section 548.

According to various embodiments of the present invention, because each stroke object 210 is fragmented into fragmented data and sent and relayed sequentially, remotely located devices can share the stroke object 210 as it is entered in real time without perceivable time delay. At the same time, the resource arbitration (or QoS) control 544 performs a traffic control function to resolve any conflicts amongst multiple users and to ensure that sufficient resources are provided for every user that is granted a right to enter a new stroke object 210 (while temporarily preventing other users to make any entry while the first user is making an entry, for example).

The feedback transmission section 546 (DATA_ToSelf) sends back a response only to the transmission device 10-1 that has sent a message to the relay server 10-2. For example, when the resource arbitration (or QoS) control 544 decides not to allow entry of a new stroke object 210 by the transmission device 10-1, the feedback transmission section 546 sends a reject message (see FIG. 37) only to the transmission device 10-1.

The all-cast transmission section 548 (DATA_ToOthers) sends a message to all of the devices currently connected to the drawing area (as included in the connection list 541), except the transmission device 10-1 that has sent a message to the relay server 10-2. In the illustrated example, when a message is received from the transmission device 10-1 and is determined to be relay-able, the all-cast transmission section 548 sends the message to all of the reception devices 10-3, 10-4 . . . 10-n.

The relay server 10-2 thus receives ink data 200 from one transmission device and selectively relays it to one or more reception devices while optimally controlling efficient use of the network resources as a whole.

Figure 31:
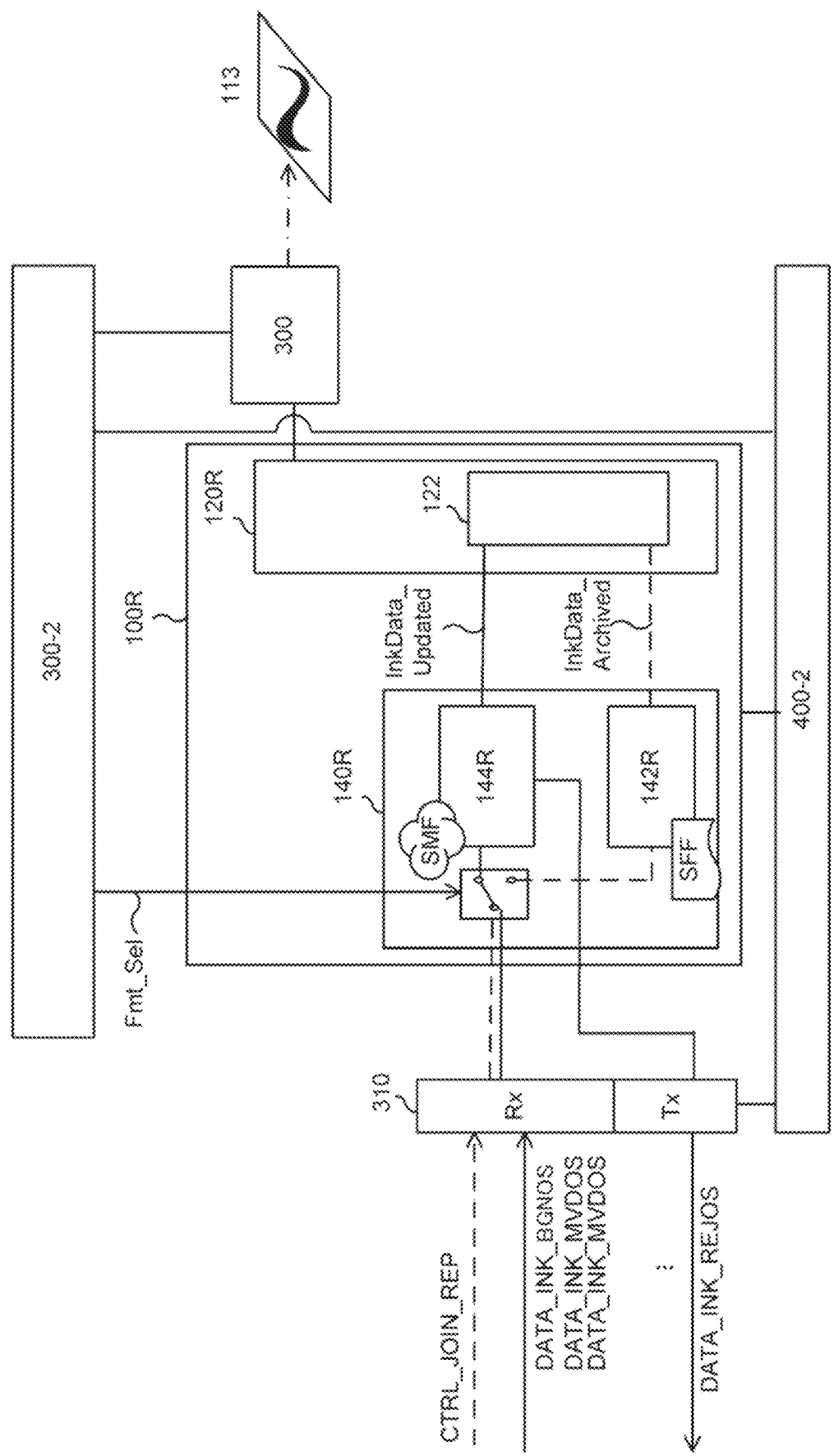
FIG. 31 illustrates a reception device (10-3) of the communications system of FIG. 26.

FIG. 31 is a block diagram of the ink data reception device 10-3 of the ink data communications system of FIG. 26. The reception device 10-3 includes a network communications section 310 (Rx, Tx), the ink data processing section 100R, the application section 300-2, the graphic processing section 300, and operating system 400-2.

The application section 300-2 running on the operating system 400-2 includes an application that utilizes an ink data reception method according to various embodiments of the present invention. The application or type of operating system may be the same as the application (or type of operating system) of the application section 300-1 of the transmission device 10-1, or may be different as long as both applications allow entry, transmission and reception of ink data 200 with each other through a common drawing area. This is because the ink data 200, which is commonly defined (standardized) can be transmitted and received independently of a particular platform amongst different applications and operating systems. At the initiation timing of the communication when the reception device 10-3 joins an editing session of the common drawing area, the application section 300-2 downloads the latest status of the drawing area (canvas), in which other users have perhaps superimposed their respective ink data 200 as different layers.

The application 300-2 may upload the ink data 200 that it has generated to the drawing area at the relay server 10-2. The ink data 200 generated locally by the reception device 10-3, perhaps prior to a collaborative editing session, may be in the recording format, while the ink data 200 generated in real time during a collaborative editing session may be in the transmission format. Either the ink data 200 of the recording format or the transmission format may be uploaded to the relay server 10-2. In this connection, the application section 300-2 directs the graphic processing section 300 to output the ink data 200 generated by the ink data generation section 120R to be superimposed in the drawing area.

The network communications section 310 (Tx, Rx) corresponds to the network communications section 112T (Tx, Rx) of the transmission device 10-1. The network communications section 310 receives communications packets (Pckt) via a network interface and extracts message(s) from the payload portion of the packets. The reception protocol used by the reception device 10-2 may be different from the communications protocol used by the transmission device 10-1. For example, the transmission device 10-1 may employ a protocol including retransmission mechanism, such as TCP and HTTP over TCP, HTTPS over SSL, to send messages to the relay server 10-2, while the relay server 10-2 may employ a not-so-reliable but suitable for streaming protocol such as UDP and RTP over UDP protocols to send messages to the reception device 10-2. Which communications protocol to use may be determined through negotiation at the commencement of communication amongst the communicating devices.

The ink data processing section 100R includes the ink data formatting section 140R and the ink data generation section 120R, and extracts ink data 200 from the ink data formatted in either the transmission format or in the recording format. The ink data processing section 100R corresponds to the ink data processing section 100T of the transmission device 10-1.

The ink data formatting section 140R includes an ink data communication section 144R and a recording format handling section 142R. The ink data communication section 144R processes the ink data 200 as updated in the transmission format. Specifically, the ink data communication section 144R extracts information (e.g., stroke ID) in each data message and outputs the fragmented data, which are fragments of a stroke object 210 divided per unit T defined by the transmission side. The ink data communication section 144R also extracts the drawing style object 230 included in the first of the messages for the stroke object 210, i.e., "DATA_INK_BGNOS" message. The drawing style object 230 contains information necessary to render (draw) its associated stroke object(s).

The recording format handling section 142R receives and processes the drawing area information in the recording format, as stored (archived) in the repository of the relay server 10-2, to reconstruct the latest drawing area.

The application 300-2 controls the ink data generation section 120R to selectively receive ink data 200 from the ink data communication section 144R or from the recording format handling section 142R according to the format of the ink data output/input.

For example, when the application first joins a collaborative editing session at a common drawing area, a "CTRL_JOIN_REQ" request is issued to retrieve the latest drawing area information in a file in the recording format (SFF). The retrieved ink data 200 of the latest drawing area is in the recording format and, as such, may be processed at the recording format handling section 142R. Subsequently retrieved ink data 200 may be in the transmission format (SMF), as in the form of "DATA_INK_BGNOS" and other messages (DATA INK*) as shown in FIG. 34 and, as such, may be processed at the ink data communication section 144R, one message (or messages representing one stroke) at a time.

To achieve real-time processing of ink data 200, the ink data communication section 144R outputs the fragmented data of a stroke object 210, as they are received, to the graphic processing section 300, instead of waiting to receive all point objects (or the fragmented data) that form the stroke object 210.

The ink data generation section 120R of the reception device 10-3 performs reception processing corresponding to the transmission processing of the ink data generation section 120T of the transmission device 10-1.

The ink data 200 consisting of the stroke objects, each consisting of multiple point objects, and the drawing style object 230, metadata object 250, and manipulation object associated with the stroke objects are all already generated on the transmission side. Thus, they need not be newly generated on the reception side. Rather, on the reception side, the ink data generation section 120R stores and updates the ink data 200 in the form usable by its application #2. For example, the ink data generation section 120R transforms the received ink data 200 in a first data type (e.g., integer type) into the ink data 200 of a second data type usable by application #2 (e.g., float type, double type) and provides the transformed data to the application section 300-2 or to the graphic processing section 300 used by the application section 300-2.

The graphic processing section 300 of the reception device 10-3 is similar to the graphic processing section 300 of the transmission section 10-1. The graphic processing section 300 performs processing to generate pixel data based on received ink data 200, to display the stroke objects on a display screen 113 of the reception device 10-3.

Figure 32:
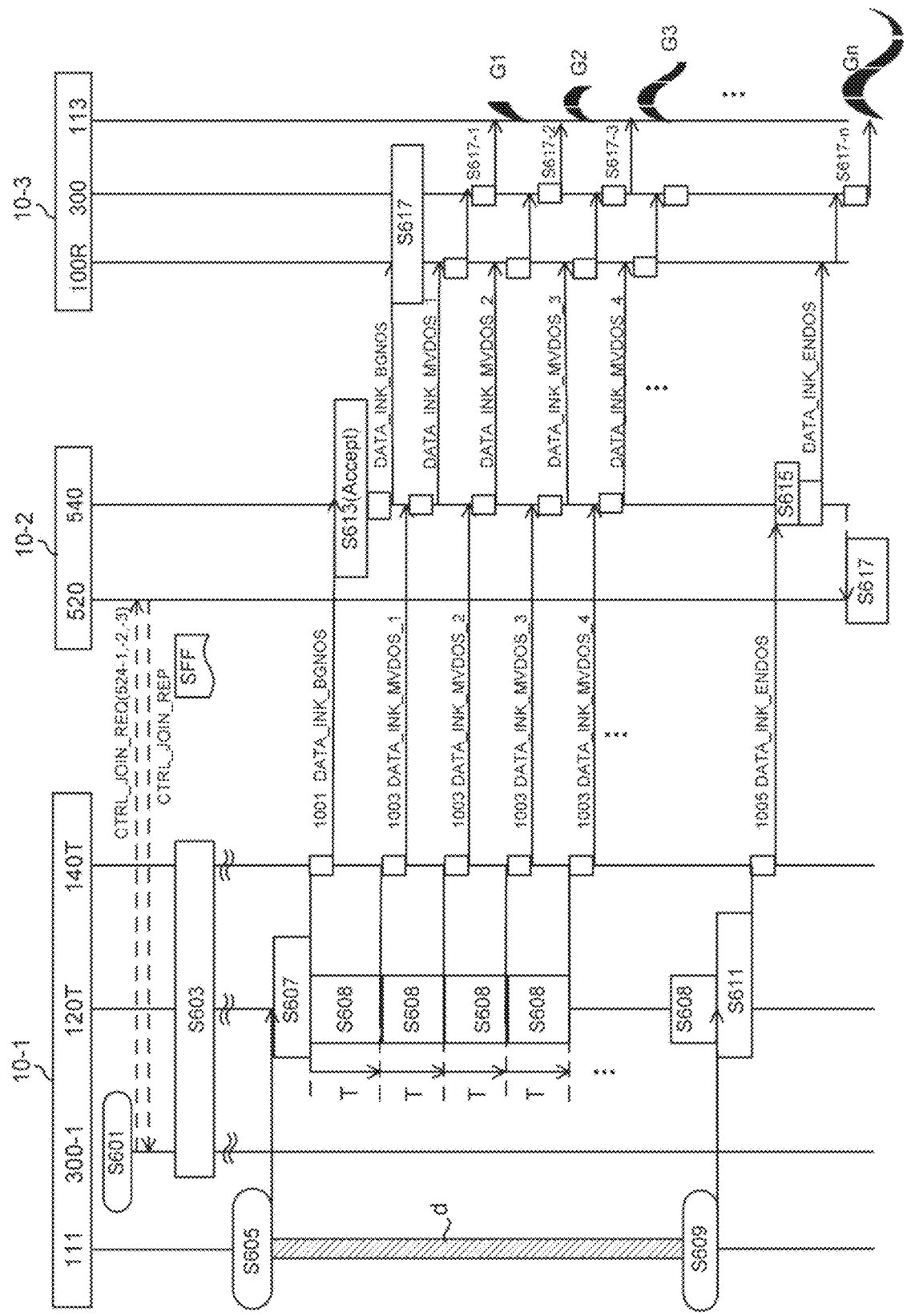
FIG. 32 is a sequence diagram illustrating ink data communications between the transmission device (10-1), relay server (10-2), and reception device (10-3), according to second embodiments of the invention.

FIG. 32 is a sequence diagram illustrating ink data communications between the transmission device 10-1, the relay server 10-2, and the reception device 10-3, according to embodiments of the invention.

In FIG. 32, the functions/sections of the transmission device 10-1, the relay server 10-2, and the reception device 10-3 are identified with the same reference numbers as used in FIGS. 27, 29 and 31 above. The sequence illustrates a case in which the transmission device 10-1 joins a real-time collaboration session that has already started, in which ink data 200 inputted by multiple users may be superimposed on one another.

<Starting the Application Section 300-1>

In step S601, the transmission device 10-1 activates the application section 300-1 that utilizes an ink data communications method according to embodiments of the present invention. Activation of the application section 300-1 triggers activation of the ink data generation section 120T and the ink data formatting section 140T in the ink data processing section 100.

First, the application section 300-1 of the transmission section 10-1 issues a control message (CTRL_JOIN_REQ, with or without parameters 524_1, 524_2, 524_3) that specifies one of multiple drawing areas retained in the drawing area management section 520 of the relay server 10-2 as a target drawing area (524_2a). The drawing area management section 520 of the relay server 10-2 returns the latest state of the specified drawing area in a recording format (SFF), which may be highly compressed, back to the transmission device 10-1 (CTRL_JOIN_REP). Then, the application section 300-1 invokes the recording format handling section 142T to reconstruct the latest state of the drawing area based on the ink data 200 in the recording format. The transmission device 10-1 thereby locally reconstructs (or initially constructs) the up-to-date state of the drawing area (or ink data current state), in which other devices such as the reception devices 10-3 and 10-4 may have already started drawing (entering) ink data 200 superimposed on one another. At this point, the transmission device 10-1 enters into input-waiting state.

<Ink Data Transmission Processing>

The transmission device 10-1 executes ink data transmission processing by using detection of a "pen event data input start" as a trigger. In step S605, the input processing section 111 of the transmission device 10-1 detects input of a stroke beginning point. In FIG. 32, during the hatched duration "d", the pen event data are continuously inputted to the ink data processing section 100T from step S605 to step S609, during which one stroke is drawn starting at a stroke beginning point and ending at a stroke ending point (hereinafter referred to as "stroke unit"). During this time (duration d) the input processing section 111 continuously outputs the pen event data per unit T (every S608), for example every 5 msec, to the ink data generation section 120T.

The ink data processing section 100T uses the start of the pen event data input as a trigger to start the processing to generate a drawing style object 230 based on context information (INPUT 2) received from the application section 300-1. Specifically, based on the context information (INPUT2) regarding the pen event data received from the application section 300-1, the ink data processing section 100 generates a drawing style object 230, which includes information used to draw (render) a stroke object 210 on a common drawing area (canvas). The ink data processing section 100 generates a drawing style object 230 by selectively extracting a portion of the context data that is needed for the reception side to render drawing. The drawing style object 230 includes information such as color (red, green blue) of a stroke (trace), pen tip type (brush, crayon, pencil), transparency or opacity value (alpha), whether transparency or opacity is allowed to vary within a stroke object 210, stroke (trace) width (e.g., 0.2-6.0 points), whether a stroke (trace) width is allowed to vary within a stroke object 210, rasterization method, type of stroke texture, etc.

Generation of the drawing style object 230 is triggered by detection of input of a beginning point of a stroke object 210 based on input of pen event data, i.e., at S605 in FIG. 32. Thus, even when a user repeatedly changes the colors of a pen prior to starting drawing operation, old (outdated) color information will not be included in the drawing style object 230 and thus will not be transmitted to the relay server 10-2 to clutter transmission resources, for example.

The ink data formatting section 140T (more specifically the ink data communication section 144T) of the ink data processing section 100T adds the generated drawing style object 230 into the first data message (DATA_INK_BGNOS 1001) for the stroke object 210 being generated. (See FIG. 34).

The DATA_INK_BGNOS 1001 message includes information indicating that the message is the first message for the stroke object 210 (e.g., message type BGNOS, F101), the drawing area ID (F102), stroke ID that is used to uniquely identify the stroke object 210 within the drawing area (F103), the drawing style object 230 (F104), and optionally (if room permits) any of the fragmented data that form part of the stroke object 210 (F105), followed by a CRC error correction value.

After generating and including the drawing style object 230 into the first data message (DATA_INK_BGNOS 1001), instead of waiting for receipt of "ACCEPT" message from the relay server 10-2, the transmission device 10-1 continuously generates, per defined unit T that is smaller than the stroke unit, fragmented data, where multiple pieces of fragmented data together form one stroke object 210 (S608). Specifically, the ink data generation section 120T processes the pen event data forming one stroke (or trace) per the defined unit T to produce ink data 200, and the ink data formatting section 140T formats the fragmented data in communications messages ("DATA_INK_MVDOS 1, 2 . . . n" in FIG. 34) corresponding to the defined unit T and assigns the stroke ID to each of the fragmented data in each message, until an end of the pen event data input operation is detected.

The defined unit T as used herein may be a unit of time, which is the same as or greater than the sampling time unit of the pen event data input, for example 5 msec. Thus, unit T may be 5 msec, 50 msec, 200 msec, etc. Alternatively or additionally, the defined unit T may be a unit of data size, such as a fixed length of 256 bytes and 512 bytes. Data (byte) size based unit T may be set smaller than the data (byte) size of a message transfer unit (MTU) according to a given communications protocol, as shown in FIG. 34. Further alternatively, unit T may be dynamically changed and switched between a time unit T and a data size unit T, for example.

The unit T may be adaptively or selectively set by the application section 300-1 depending on each application or timing requirements. For example, for the purpose of allowing a stroke object 210 to continuously and growingly appear on the reception device 10-3 as if it is being "drawn" in real time, the application section 300-1 may set the unit T to correspond to a minimum unit that allows necessary interpolation processing to occur between generated point objects. As another example, for the purpose of reducing communications overhead (amount of traffic) associated with having to send the same message header information (e.g., the stroke ID associated with every message for one stroke object 210), the application section 300-1 may set the unit T as large as possible, up to the unit of a stroke object itself (the stroke unit). As another example, for the purpose of reducing overall message in case there is a big difference between pen event data input rate and display rate (e.g., pen event input comes between 3-4 msec., but the display refreshes every 15 msec.) then the application section 300-1 may set the unit T to match the display rate. In this case each stroke fragmented message will contain data for more than one point object.

Figure 33:
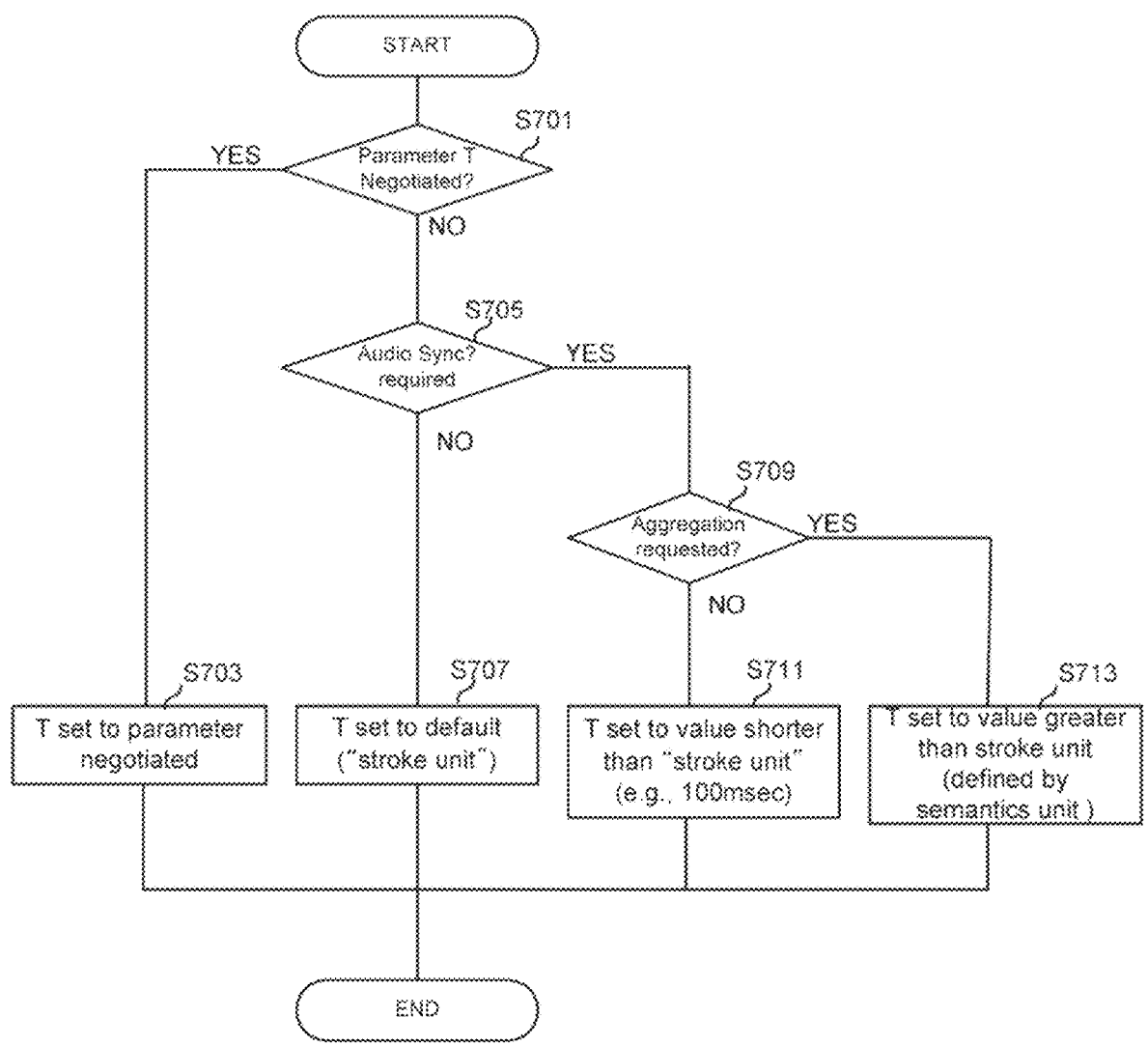
FIG. 33 is a flow chart of a sample process of finding a defined unit T for transmitting ink data.

FIG. 33 is a flow chart illustrating a method of determining unit T, which may be implemented in the transmission device 10-1 and/or the relay server 10-2. In step S701, it is determined whether parameter T is explicitly negotiated between the transmission and reception devices or between the transmission/reception devices and the relay server 10-2. If "YES," the explicitly negotiated value is set as the unit T. (Step S703). For example, the unit T may be negotiated and defined according to parameters that set a stroke data to be fragmented (S524_1*c* "TRUE") and set the maximum reception delay to be 100 msec (524_1*d* "100" msec). If, on the other hand, the decision result of S701 is "NO," other time-related requirements of the applications 300-1 and 300-2 are used to set unit T. For example, in step S705, it is determined whether ink data 200 and other data (audio, video, etc.) are to be synchronously reproduced. If "YES," in step S709, it is determined if "aggregation is requested," which will be described fully in reference to FIGS. 43 and 44 below. If "NO," then in step S711, unit T that is smaller than a unit corresponding to one stroke is set as the unit T. Also, each (fragmented) data per the defined unit T is time stamped for the purpose of synchronous reproduction with other type(s) of data. If, on the other hand, the decision result of S705 is "NO," it is assumed that there are no particular timing constraints, and unit T is set to its default value, such as the unit of a stroke as a whole, for example.

Referring back to FIG. 32, when the input processing section 111 of the transmission device 10-1 detects an end of the pen event data input (S609), i.e., when it detects an end of input operation of one stroke object 210, the ink data processing section 100T generates a metadata object 250 in step S611. The metadata object 250 includes information regarding the generated stroke object 210 other than the information used to draw (render) the stroke object 210 on a display (which is included in the drawing style object 230). For example, a metadata object 250 includes author information, pen ID, etc.

<Ink Data Relay Processing>

The relay server 10-2 transfers the fragmented data for one stroke object 210, as received in the data messages from the transmission device 10-1, without modification to the reception device 10-3.

The relay server 10-2 first receives the first message (DATA_INK_BGNOS) of the stroke object 210 from the transmission device 10-1. Then, in step S613 (ACCEPT) of FIG. 32, the resource arbitration (or QoS) control 544 determines whether or not to allow new entry (updating) of the stroke object 210 starting with its first message DATA_INK_BGNOS as received. The sequence of FIG. 32 illustrates a case in which the resource arbitration (or QoS) control 544 determines to allow entry of the stroke object 210 generated by the transmission device 10-1. Then, the relay server 10-2 stores the stroke ID so that it can identify and forward all subsequent data messages associated with the same stroke ID by merely checking the message headers, and forwards the first message DATA_INK_BGNOS to the reception device 10-3.

The relay server 10-2 continues to forward subsequent data messages (DATA_INK_MVDOS) for the same stroke object 210, while checking the stroke ID included in their headers, without having the resource arbitration (or QoS) control 544 make independent determinations as to each of the subsequent data messages. Thus, the resource arbitration decision needs to be performed only once per each stroke.

In step S615, when the last one of the data messages for the stroke object 210 (DATA_INK_ENDOS) is received, the relay server 10-2 forwards the last message to the reception device 10-3 and the resource arbitration (or QoS) control 544 releases the processing resources of the relay server 10-2 to forward the stroke object 210, which is fully completed at this point.

As a post-processing operation following the completion of transfer of one stroke object 210, in step S617, the stroke object 210 is added to the drawing area as stored in the drawing area repository of the relay server 10-2.

Because the relay (forwarding) process is performed per each stroke object 210, the ink data 200 forwarded in the transmission format in real time can be readily converted into the recording format at the completion of the relay process, to be stored in the repository in a compressed recording format. This allows for the relay server 10-2 to efficiently update the state of the common drawing area (or canvas) shared by multiple devices, each time it completes relaying a stroke object 210 generated by one of the multiple devices to other device(s).

<Ink Data Reception Processing>

The reception device 10-3 first receives from the relay server 10-2 the first data message (DATA_INK_BGNOS) of the newly generated stroke object 210, which includes the drawing style object 230. Using the information included in the drawing style object 230, such as the color, pen tip type, transparency/opacity, rendering method, etc., the reception device 10-3 commences drawing (rendering) operation to draw the received fragmented data of the stroke object 210 on its display.

The ink data processing section 100R continues to process the fragmented data of the same stroke object 210 included in subsequently received data messages, using the same information included in the drawing style object 230, to generate ink data 200 and output the ink data 200 to the graphic processing section 300.

The graphic processing section 300 starts and continues drawing (rendering) process of the fragmented ink data 200 as they are received. Steps S617-1 to S617-*n* in FIG. 32 respectively represent the rendered forms of the stroke object 210 on the display at different times. FIG. 32 shows that the stroke object 210 is continuously drawn as its fragmented data are increasingly received and processed, from state G1, G2, G3 where the stroke object 210 is only partially, but growingly, drawn until state G4 where the stroke object 210 is completely drawn, similarly to how a user may see an actual pen stroke being drawn on paper by another user.

FIG. 34 illustrates a sample transmission format of data messages, arranged in communications packets suitable for real-time communications amongst multiple devices according to one embodiment of the invention. The illustrated example uses a defined unit T that is smaller than a message transfer unit (MTU) of a communications protocol defined by a media interface (e.g., Ethernet) to which the transmission device 10-1 is connected.

The communication packet at the top of FIG. 34 shows a communication packet outputted from the network communication section 112 of the transmission device 10-1.

"DATA_INK_BGNOS" in FIG. 34 shows the first data message of multiple data messages for a new stroke object 210.

F101 field specifies the type of data message. F101 field of the first data message, "DATA_INK_BGNOS," indicates "BGNOS", meaning that it is the first one of data messages for a new stroke object 210.

F102 field includes a drawing area ID of a drawing area, in which the new stroke object 210 is to be added or superimposed.

F103 field includes a stroke ID of the stroke object 210. The stroke ID is uniquely assigned to each stroke object 210 as used in the common drawing area. Various methods are possible to assign a unique stroke ID to each stroke object 210 per drawing area. For example, the (highest) stroke ID value currently used in the drawing area may be incremented to obtain a new unique ID to be assigned to a new stroke object 210, or a pen ID value of a pen used to enter a new stroke object 210 may be incremented to obtain a unique stroke ID for the stroke object 210. Thus, the transmission device 10-1 may independently assign a unique stroke ID to a new stroke object 210 that it generates. Also, as discussed above, the resource arbitration (or QoS) control 544 of the relay server 10-2 prevents use of overlapping stroke IDs if the transmission device 10-1 fails to assign a unique stroke ID. Because the transmission device 10-1 may independently assign a unique stroke ID to a new stroke object 210, there is no need for communications sequencing that is otherwise required to centrally assign unique stroke IDs to stroke objects generated by different devices. Thus, it becomes possible for the transmission device 10-1 to start transmitting ink data 200 at a pen-down time, i.e., immediately after a user starts to draw a stroke.

F104 field includes a drawing style object 230, or a set of drawing parameters included in the drawing style object 230 which are all related to how to draw (or render) a stroke object 210. The parameters may include, for example, a shape parameter (a circle in FIG. 3B or a flake/particle in FIG. 3C), a shape radius or size, the minimum and maximum values of a shape radius or size, pen pressure or pen tilt information (which impacts how a stroke drawn with that pen pressure or pen tilt will appear on a display), etc.

In some embodiments, the entire set of drawing parameters is included in F104 field. In other embodiments, one or more sets of drawing parameters (or one or more "drawing style objects") may be shared between the transmission device 10-1 and the relay server 10-2 (and the reception device 10-3) in advance, and only a parameter-set ID (or a drawing style object ID) may be included in F104 field to specify which set of drawing parameters is to be used to render the stroke object 210. For example, frequently used parameter settings, such as a limited number of combinations of commonly-used pen tip types (pencil, brush, pen) and commonly-used colors may be pre-defined, with each setting given a unique ID, and these setting IDs may be included in F104 field to communicate how the stroke object 210 is to be rendered (drawn) on a display. The parameter settings may be explicitly negotiated between devices at the time of initial negotiation, or may be implicitly defined as part of a system protocol.

F105 field includes the first fragmented data out of a plurality of fragmented data that together form one stroke object 210. F105 field of the first data message includes the beginning coordinate position of the stroke object 210, for example. While FIG. 34 shows the first fragmented data (in F105) as included in the first data message (DATA_INK_BGNOS), the first fragmented data (F105) may be included in the second data message if there is no sufficient room in the first data message (which must include the drawing style object).

"DATA_INK_MVDOS" 1, 2 . . . data messages of FIG. 34 are all related to the same stroke object 210 and respectively include the second fragmented data (F106), the third fragmented data (F107), and so forth. Unlike the first data message, these subsequent data messages do not include the drawing style object (F104) and are identified as a "subsequent" (not first) type of data message (MVDOS) in F101. The subsequent data messages all include the same drawing area ID (F102) and the same stroke ID (F103) as the first data message.

"DATA_INK_ENDOS" data message is the last data message for the stroke object 210 and may include the last fragmented data of the stroke object 210 (F108). Also, the last data message includes a metadata object 250 in F109, which includes non-drawing related information such as author information.

Figure 35A:
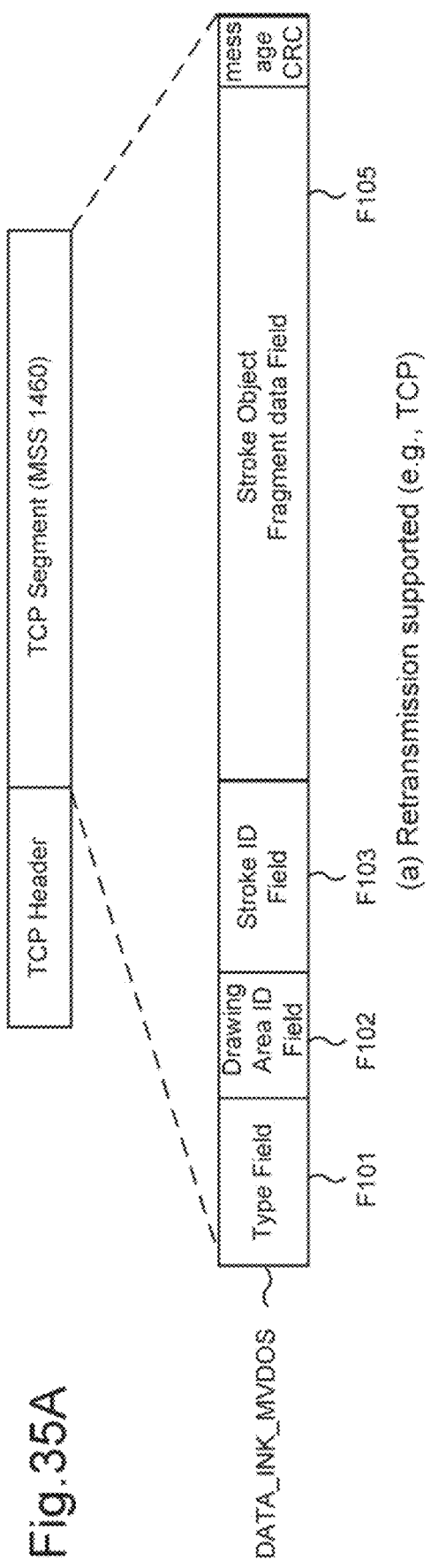
FIG. 35A illustrates a communications packet used in a communications protocol that includes a data retransmission scheme.
Figure 35B:
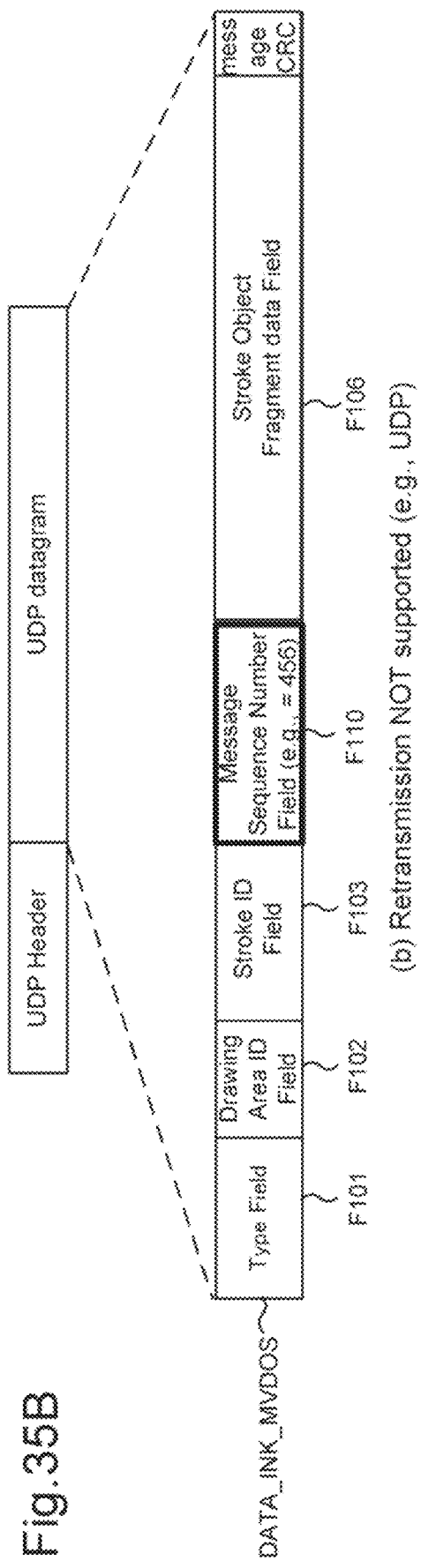
FIG. 35B illustrates a communications packet used in a communications protocol that does not include a data retransmission mechanism.

FIG. 35A illustrates a transmission format, specifically, a communications packet including a data message "DATA_INK_MVDOS," which may be used in a communications protocol that includes a built-in data retransmission mechanism, such as TCP. On the other hand, FIG. 35B illustrates a communications packet that may be used in a communications protocol that does not include a built-in data retransmission mechanism, such as UDP. Unlike the data message format of FIG. 35A, the data message format of FIG. 35B for use in a protocol without a retransmission mechanism may include an additional field F110 which includes a sequence ID uniquely assigned to each data message. The sequence ID may be used to detect a message loss to trigger/request retransmission.

Figure 36A:
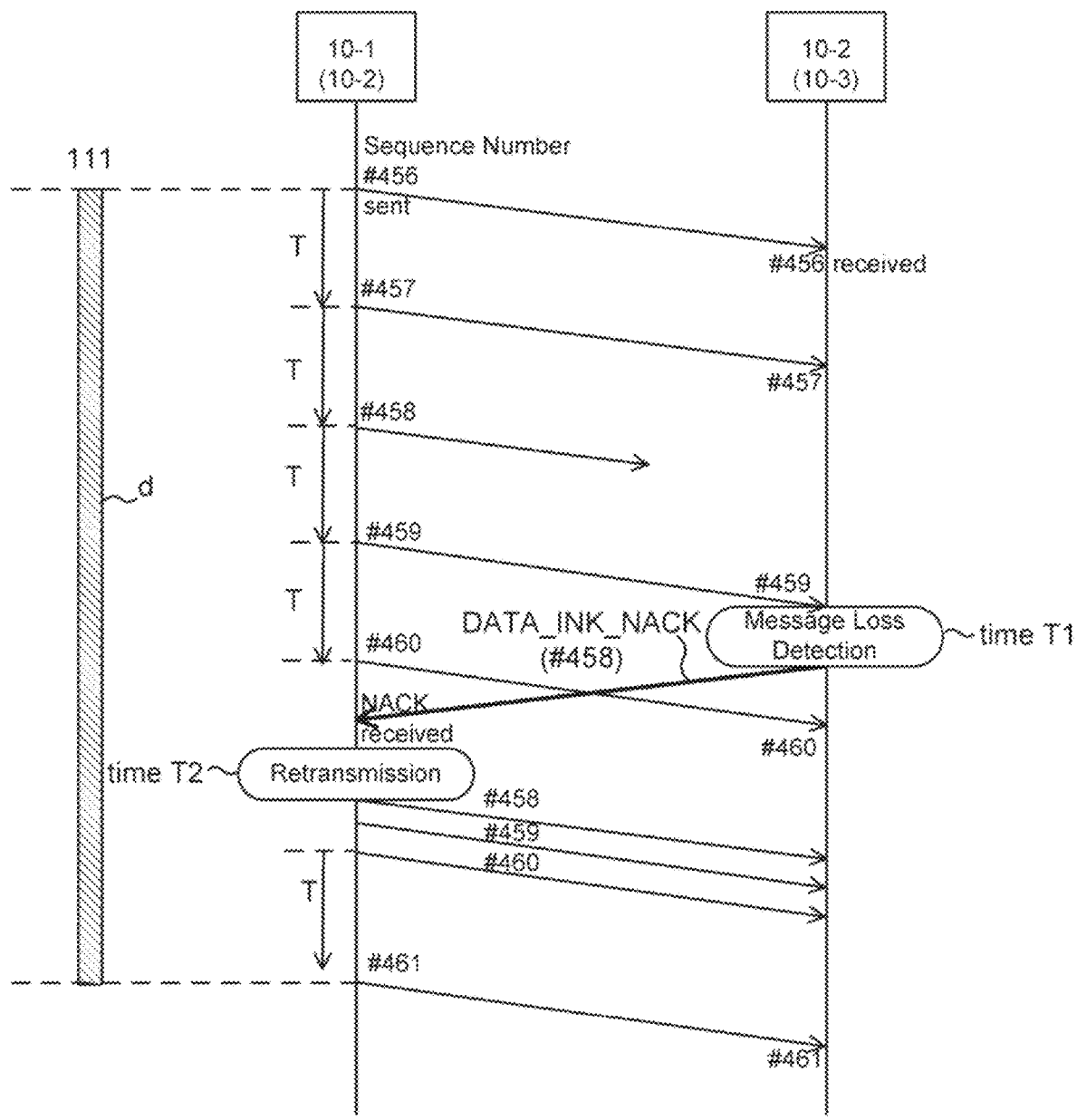
FIG. 36A is a sequence diagram of a sample data retransmission process which uses sequence ID, suitable for use in a communications protocol that does not include a data retransmission mechanism.
Figure 36B:
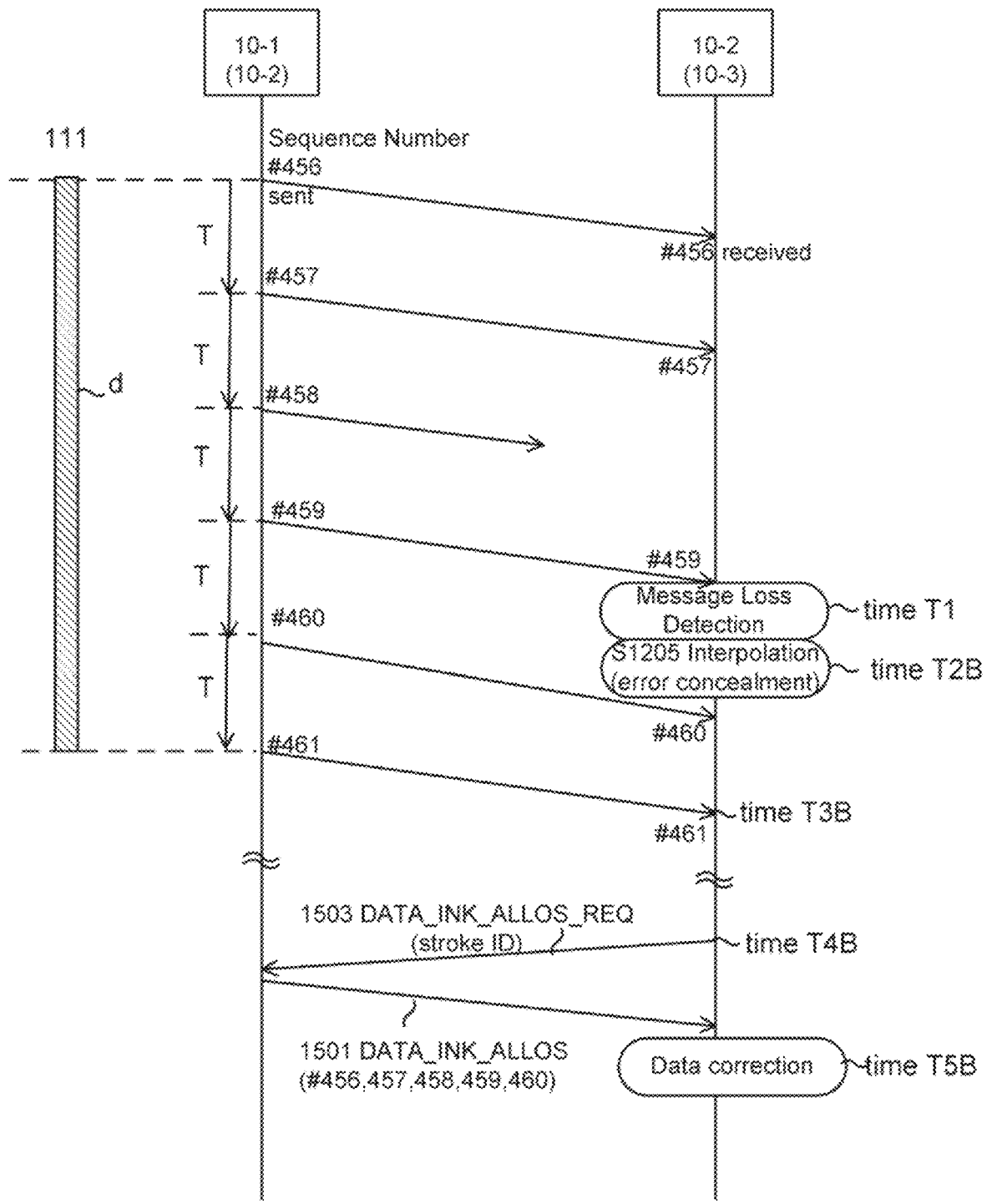
FIG. 36B is a sequence diagram of a data transmission process, suitable for use in a communications protocol that does not include a data retransmission mechanism, in which data retransmission is not performed.

Specifically, FIG. 36A is a sequence diagram of a sample data retransmission process which uses sequence ID, and which is suitable for implementation in a communications protocol, such as UDP, which does not include a data retransmission mechanism. For example, FIG. 36A applies when the transmission side's packet retransmission parameter (524_1a) is set to "FALSE" and the message retransmission parameter (524_1f) is set to "ENABLE." The hatched duration "d" corresponds to duration d in FIG. 32.

FIG. 36A shows that the first, second, and fourth data messages respectively associated with sequence ID #456, #457, and #459, transmitted from the transmission device 10-1, are successfully received at the relay server 10-2. FIG. 36A also shows that the third data message associated with sequence ID #458 has been lost somewhere in the network between the transmission device 10-1 and the relay server 10-2 and not received by the relay server 10-2.

The relay server 10-2, at time T1 when the third data message associated with sequence ID #458 is expected but not received and instead the fourth data message associated sequence ID #459 is received, detects that the third data message associated with sequence ID #458 is lost. The relay server 10-2 then issues a Negative Acknowledgement (NACK; DATA_INK_NACK) message including sequence ID #458 to indicate that the third message associated with sequence ID #458 was not received.

The transmission device 10-1, at time T2 when the NACK message is received, detects that the third data message associated with sequence ID #458 was lost and starts the retransmission processing to retransmit the third data message associated with sequence ID #458 and subsequent data messages that follow sequence ID #458 (i.e., #459, #460 . . . ). One reason for retransmitting all subsequent data messages, not just the lost data message, is to continue transmission of fragmented data of a stroke object 210 in a time sequential manner to avoid any perceivable time delay.

Another reason is that when a data message is lost it is likely that data messages subsequent to that lost data message are also lost.

According to the retransmission processing method described above, even when a protocol that does not include a retransmission mechanism is used, it becomes possible to ensure that all data messages (or data packets) necessary to form one stroke object 210 are successfully received. While the retransmission processing method is described above as occurring between the transmission device 10-1 and the relay server 10-2, the method may be similarly implemented between the relay server 10-2 and the reception device 10-3.

FIG. 36B shows another example of message retransmission. Similar to FIG. 36A, the hatched duration "d" corresponds to duration d in FIG. 32. FIG. 36B applies when the transmission side's packet retransmission parameter (524_1a) is set to "FALSE" and the message retransmission parameter (524_1f) is set to "DISABLED." The message retransmission parameter may be set to "DISABLED" when there is little tolerance for message transmission delay (i.e., when there is a strict requirement not to have any perceivable transmission delay), regardless of whether message retransmission is possible or not.

As in FIG. 36A, in FIG. 36B also, the first, second, and fourth data messages respectively associated with sequence ID #456, #457, and #459, transmitted from the transmission device 10-1 (or the relay device 10-2 on the transmission side) are successfully received at the relay server 10-2 (or the reception device 10-3). The relay server 10-2 at the reception side, at time T1 when the third data message associated with sequence ID #458 is expected but not received and instead the fourth data message associated with sequence ID #459 is received, detects that the third data message associated with sequence ID #458 is lost. Thereafter, at time T2B, without issuing a retransmission request, the reception side performs interpolation processing (or error concealment processing) (S1205) to supplement or interpolate a missing portion of the data corresponding to the lost data message associated with sequence ID #458 based on the successfully received messages associated with sequence ID #456, #457, and #459, to thereby achieve continuous, uninterrupted display processing. At time T3B, processing of the last data message associated with sequence ID #461 is completed. Thereafter, at time T4B, the reception side issues a DATA_INK_ALLOS_REQ message 1503 (see FIG. 39B) using the received stroke ID. The transmission side 10-1 (or 10-2) then transmits a DATA_INK_ALLOS message 1501 (see FIG. 39A), which is a message that includes the identified stroke as a whole. The reception side 10-2 (or 10-3), at time TSB, uses the received DATA_INK_ALLOS message 1501 to perform data correction of the supplemented or interpolated missing portion of the data, as necessary.

Figure 36C:
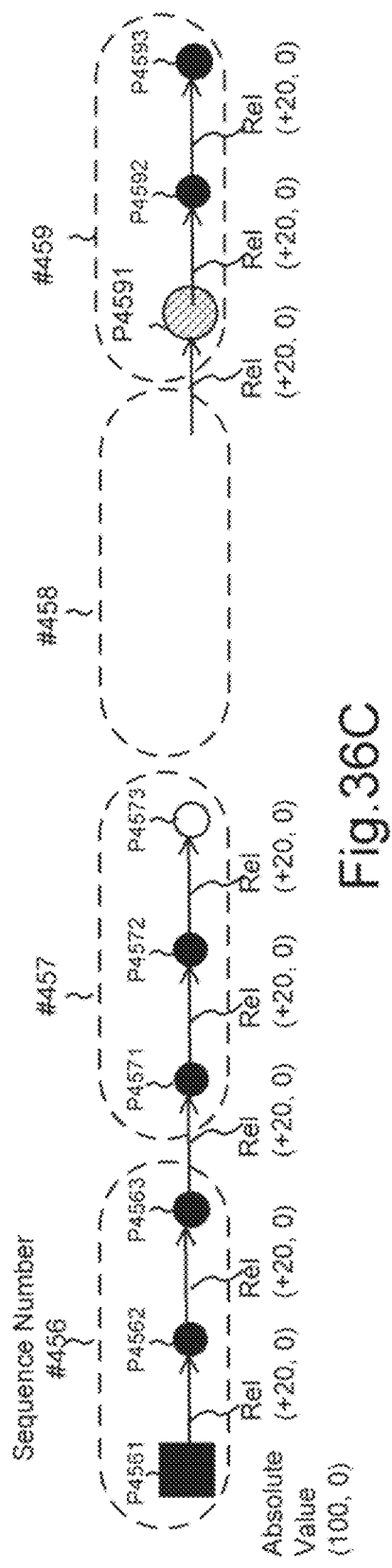
FIGS. 36C-36E illustrate methods for calculating a control position of a message.

FIG. 36C illustrates a problem to be addressed in the interpolation processing (error concealment processing) at step S1205 of FIG. 36B. It is assumed that the messages #457, #458 and #459 form one complete stroke data. In FIG. 36C, the message #456 includes control positions P4571, P4562 and P4563. The black-square position P4561 is a stroke beginning position and includes the position's absolute coordinate, which is (100, 0) in the illustrated example. In the figures, black square positions are associated with absolute coordinates (to be referenced). On the other hand, the black-circle position P4562 is associated with a difference (offset) relative to an absolute coordinate or a coordinate of an immediately preceding position to be referenced. In the illustrated example, the position P4562 is at Rel (+20, 0), meaning that it is located +20 horizontally and +0 vertically relative to the absolute coordinate (100, 0) of P4561. The black-circle position P4563 is at Rel (+20, 0) relative to the immediately preceding black-circle position P4562. The message #457 includes three positions P4571, P4572 and P4573, each at Rel (+20, 0) relative to its immediately preceding position. As in FIG. 36B, assume that the message #458 is not received at the reception side. Then, the cross-hatched beginning position P4591 of the last message #459 cannot be determined because the position P4591 only includes relative offset information, which is not useful unless there is a reference position.

The cross-hatched beginning position P4591 may be determined by various methods according to embodiments of the present invention. A first method according to an embodiment of the invention involves linear prediction performed at the reception side, to be described still in reference to FIG. 36C. For example, when messages are transmitted per 50 msec, the presumed trajectory of portions in a missing message can be predicted based on the speed and acceleration of the position coordinates that are already obtained. In FIG. 36C, the stroke has advanced a total of Rel (+60, 0) from P4563 (the last control position of the message #456) to P4573 (the last control position of the message #457), and thus, it can be predicted that the last control position of the missing (lost) message #458 has also advanced Rel (+60, 0) relative to P4573.

Figure 36D:
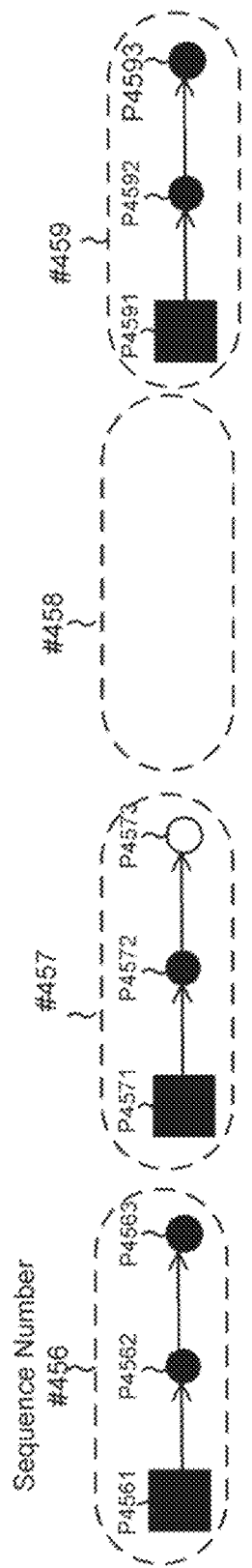

FIG. 36D illustrates a second method to obtain the cross-hatched beginning position P4591 according to an embodiment of the invention. In this method, the transmission side may switch to include an absolute coordinate in the beginning control position of each one of the fragmented messages, as indicated by the black-square positions P4561, P4571 and P4591. In one embodiment, the transmission device 10-1 may select to implement this method if a) output in a format different from the recording forma is requested, and b) one or more of the following conditions is met: (i) stroke fragmentation is used ("StrokeData fragment Enable" is "TRUE" in 524_1); (ii) message retransmission is not implemented in the message layer ("Packet Retransmission" is "TRUE" in 524_1a and "Message Retransmission" is "DISABLED" in 524_1f); and (iii) there is an explicit indication to include an absolute coordinate in each fragmented message. Though FIG. 36D shows that an absolute coordinate is included in every fragmented message, the frequency with which to include absolute coordinates may be varied. For example, communications protocol reporting such as IETF RFC3550 and RTP reporting may be used to vary the inclusion frequency of absolute coordinates at the transmission side based on the reception quality detected at the reception side.

Figure 36E:
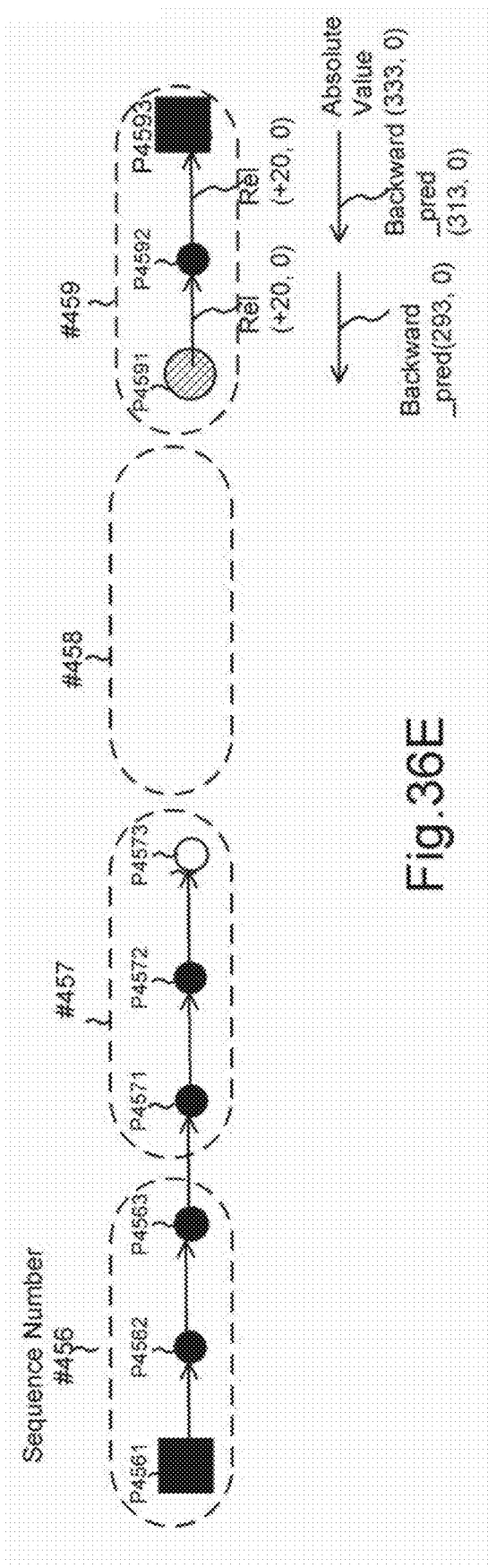

A third method to obtain the cross-hatched position P4591 is backward confirmation that may be used together with the linear (forward) prediction of FIG. 36C. In FIG. 36E, unlike the case of FIG. 36C, the last control position P4593 of the last message #459 is square shaped and contains its absolute coordinate, (333, 0) in the illustrated example. When loss of a message (#458) is detected, the reception side performs backward confirmation of the cross-hatched circle position P4591 based on the last control position P4593 of the last message #459 including an absolute coordinate. In the illustrated example, the cross-hatched position P4591 is calculated backward from the last control position P4593 (333,0), via P4592 by Rel (−20, 0) and to P4591 by another Rel (−20, 0), to be (293, 0).

Figure 36F:
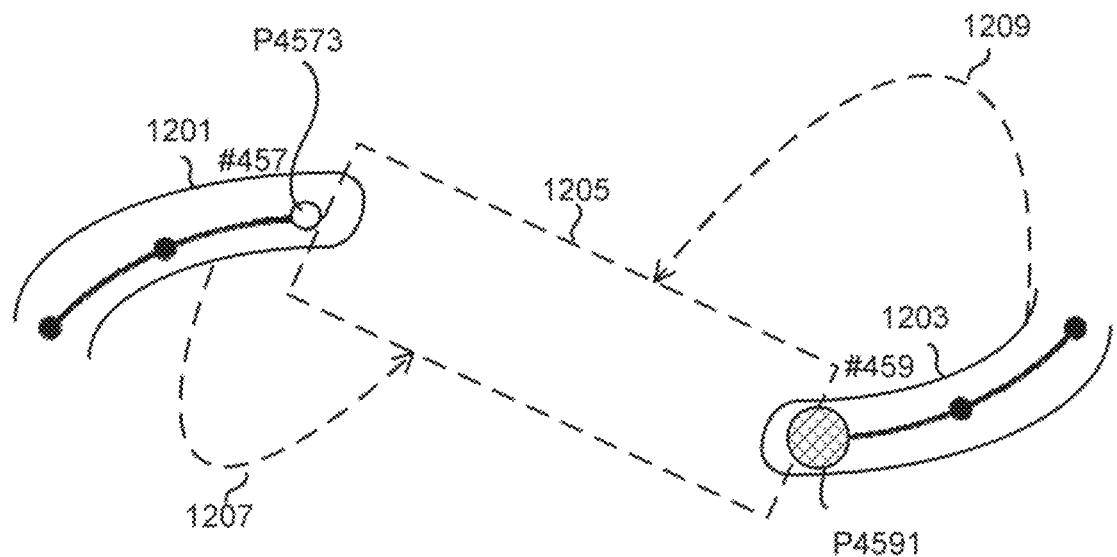
FIGS. 36F and 36G illustrate an interpolation (error concealment) processing, which uses the control position calculated in FIGS. 36C-36E, for use in the sequence of FIG. 36B.

FIG. 36F illustrates the supplementing or interpolation processing (error concealment processing) performed at step S1205 of FIG. 36B that uses the cross-hatched control position P4591 obtained according to any of the methods described above. A solid line 1201 indicates a partial stroke data generated based on the message #457, and a white circle P4573 indicates the last (ending) control position of the fragmented stroke object 210 included in the message #457. A solid line 1203 indicates another partial stroke data generated based on the message #459, and the cross-hatched P4591 indicates the first (beginning) control position of the fragmented stroke object 210 included in the message #459. The missing data (corresponding to the lost message #458) between the partial stroke 1201 and the partial stroke 1203 may be derived based on bi-directional prediction using interpolation (or error concealment) both in a forward direction from the partial stroke 1201 as shown in a broken arrow 1207, and in a backward direction from the partial stroke 1203 as shown in another broken arrow 1209.

Figure 36G:
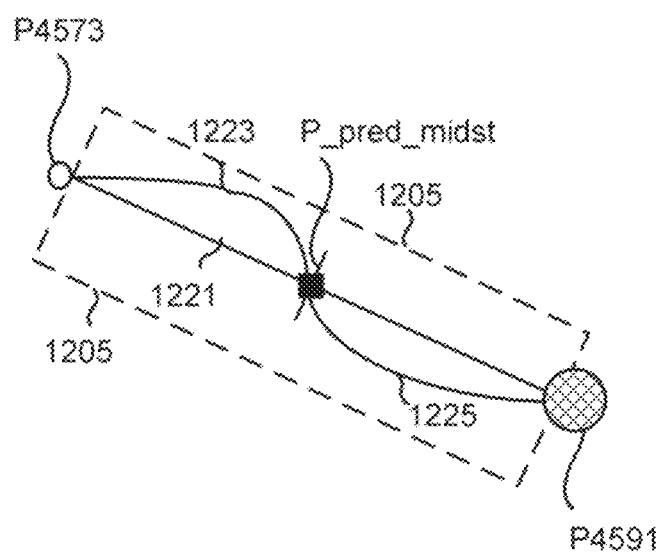

FIG. 36G illustrates one example of bi-directional prediction processing. In this example, a line (or a fitted curve) 1221 connecting P4573 and P4591 is formed, and a midpoint P_pred_midst is found that divides the line 1221 into two equal line (or curve) segments 1223 and 1225 that may be respectively expressed as approximate curve functions.

As described above, when a communications protocol does not include a retransmission mechanism in the communication layer (e.g., UDP), the system may adaptively select between implementing message transmission in the message layer as in FIG. 36A, or not implementing message retransmission even in the message layer as in FIG. 36B. Thus, when an application has strict timing requirements such as when ink data 200 are to be synchronously reproduced with audio data, for example, retransmission is disabled both in the communication layer and the message layer so as to avoid any perceivable transmission time delay and to achieve continuous, real time reception and display of ink data 200.

Figure 37:
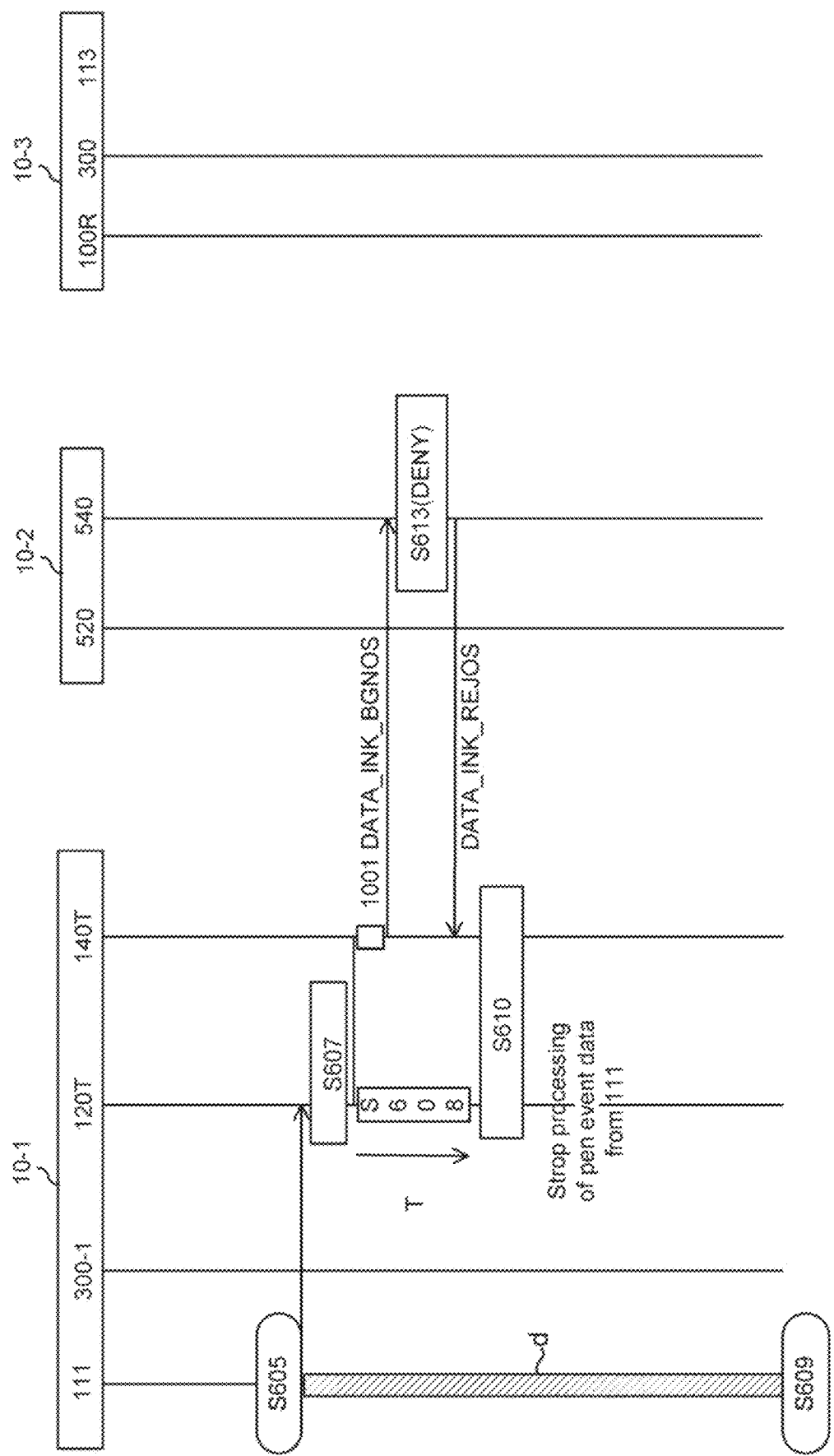
FIG. 37 is a sequence diagram illustrating ink data communications, in which a request to update a common drawing area issued by a transmission device is rejected by a relay server.

FIG. 37 is a sequence diagram illustrating ink data communications, in which a request to update a common drawing area issued by a transmission device is rejected by a relay server. For example, the transmission device 10-1 requests to add a new stroke object 210 to the common drawing area, and the request is rejected by the relay server 10-2. The portion up to a point when the transmission device 10-1 sends the first data message (DATA_INK_BGNOS) including the drawing style object 230 is the same as that included in the sequence diagram of FIG. 32.

When the relay server 10-2 receives the first data message, the ink data relay section 540 determines, in step S613 (DENY), to reject acceptance of the first data message based on defined criteria, such as any limit on processing resources, any limit on network resources, user access policy, etc.

The relay server 10-2 then sends a rejection message (DATA_INK_REJOS) from the feedback transmission section 546 to the transmission device 10-1.

When the transmission device 10-1 receives the rejection message in response to the first data message for a stroke object 210, in step S610, the transmission device 10-1 aborts the transmission processing and discontinues transmission of subsequent data messages for the stroke object 210. In other words, unless a rejection message is returned, the transmission device 10-1 continues the transmission processing to transmit all fragmented data for one stroke object 210 in successive data messages, without waiting for return of an explicit ACCEPT message.

According to the ink data transmission methods of various embodiments of the present invention, even when a long stroke (trace) (which may take a few seconds to complete, for example) is drawn by one device, a different device can start to display the stroke as it is being drawn in a common drawing area without having to wait for the completion of the stroke. Various retransmission methods, which may be built-in in a given protocol system or which may be additionally used in a protocol system without a retransmission mechanism, may be used to ensure that a complete stroke object 210 is successfully received at the reception side even when the stroke object 210 is divided and sent in multiple pieces of fragmented data. Also, when any of the data messages for a stroke object 210 sent by the transmission device 10-1 is refused/rejected by the relay server 10-2, the transmission device 10-1 aborts the transmission process to thereby avoid wasting precious processing resources and network (transmission) resources.

Figure 38:
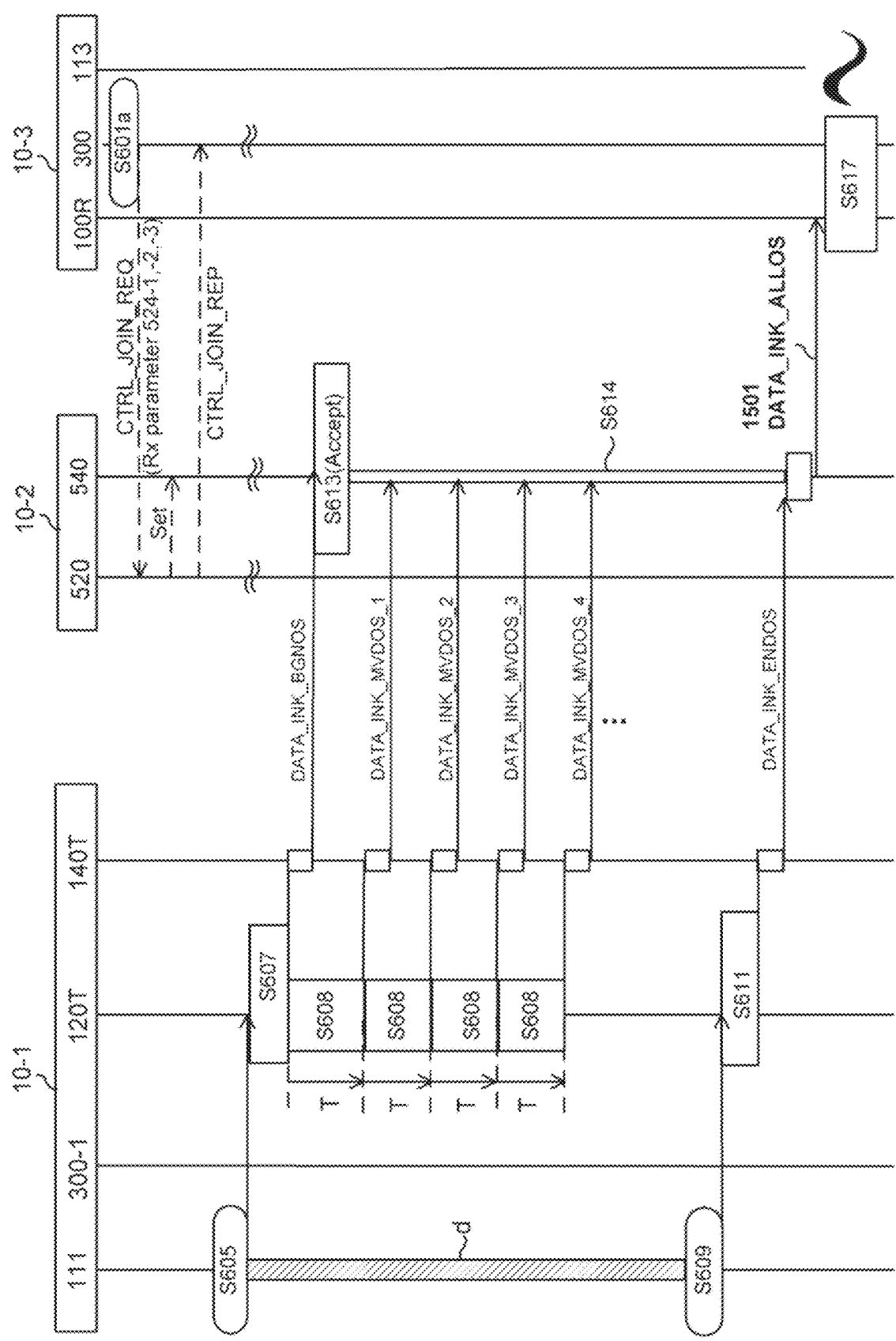
FIG. 38 is a first modification example of the sequence diagram of FIG. 32, in which a relay server receives fragmented data of a stroke object from a transmission device and combines all of the fragmented data per stroke object to be relayed to a reception device.

FIG. 38 is a first modification example of the sequence diagram of FIG. 32, in which the relay server 10-2 receives fragmented data of a stroke object 210 from the transmission device 10-1 and combines all of the fragmented data for the stroke object 210 to be relayed to the reception device 10-3. The transmission of fragmented data per defined unit T from the transmission device 10-1 to the relay server 10-2 is the same as shown in FIG. 32.

In this embodiment, the reception device 10-3 may negotiate with the relay server 10-2 in advance to set reception parameters that define how the reception device 10-3 receives ink data 200 relayed from the relay server 10-2. For example, the reception device 10-3 sends a control message (CTRL_JOIN_REQ 524_1) to the relay server 10-2, which includes communications setting information such as information indicating that the reception device 10-3 is to receive ink data 200 per stroke unit, as opposed to per defined unit T (524_1c "StrokeData fragment Enable" value "FALSE.") The relay server 10-2 stores the communications setting information received from the reception device 10-3 in the drawing area information management section 524, such that the relay server 10-2 will relay ink data 200 to the reception device 10-3 per stroke unit (while it may relay ink data 200 to other reception devices per defined unit T).

Then, as in FIG. 32, the transmission device 10-1 starts to transmit fragmented data of a stroke object 210. The relay server 10-2, in step S614 (buffering), continues to store the fragmented data for the stroke object 210 until the last data message (DATA_INK_ENDOS) is received. When the last data message is received, the relay server 10-2 prepares and sends a data message containing the entire stroke object 210 as well as its associated drawing style object 230, metadata object 250, etc., and sends it as "DATA_INK_ALLOS" to the reception device 10-3, for rendering at S617.

In this example, because the relay server 10-2 sends ink data 200 concerning an entire stroke object 210 at once, the number of point objects included in the stroke object 210 is known. Thus, the ink data 200 may be transmitted in a recording format, instead of in a transmission format, where the recording format has less redundancy and thus may be more compressed than the transmission format.

Figure 39A:
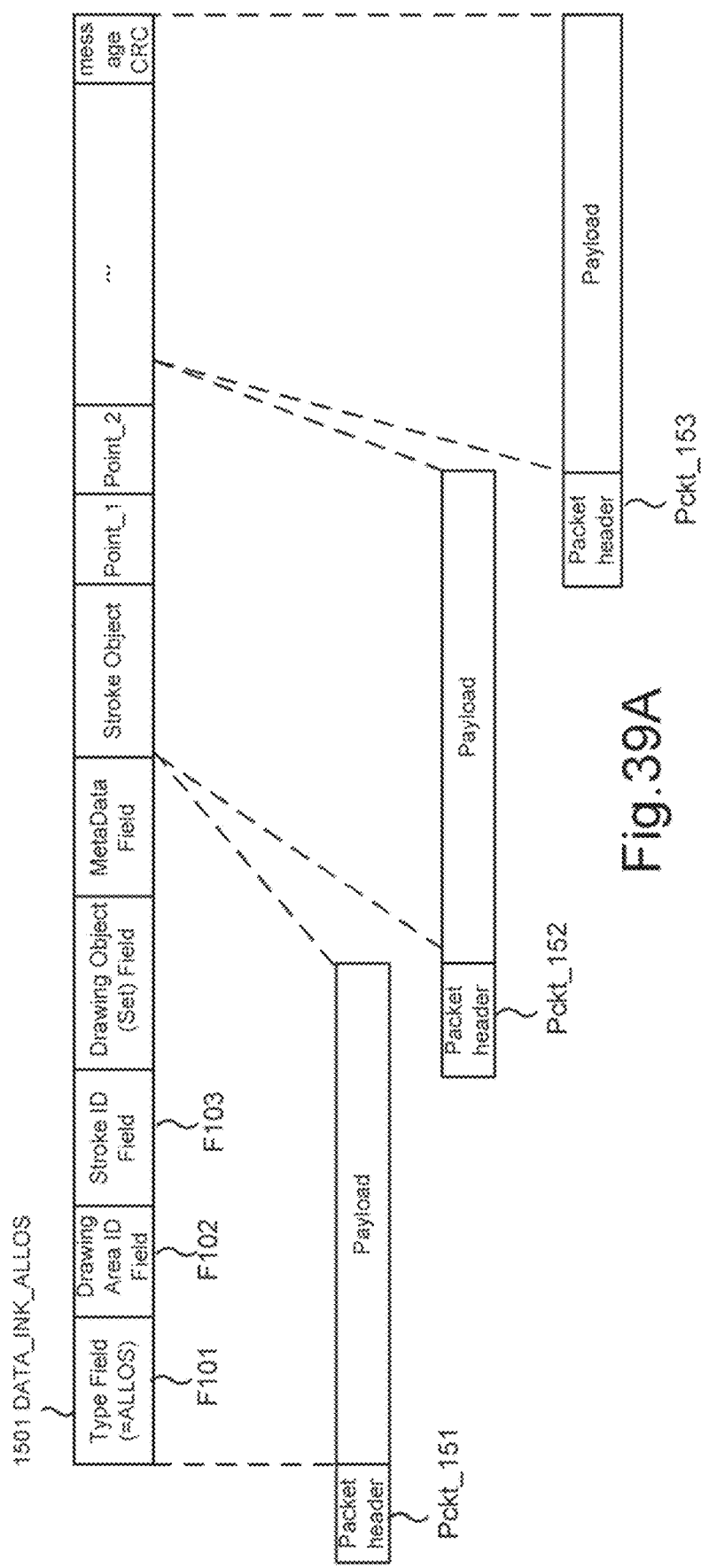
FIG. 39A is a data transmission format for use in the first modification example of FIG. 38, in which all of the ink data for one stroke object are combined and included.

FIG. 39A is a sample data message format of "DATA_INK_ALLOS," in a recording format, which includes all of the ink data 200 for one stroke object 210 as well as an associated drawing style object 230, metadata object 250, the number of point objects included in the stroke object 210, etc. As shown, the message includes a message CRC, and if the message size exceeds a given communications packet MTU, the message is divided into two or more communications packets (Pckt_1, Pckt_2, Pckt_3, etc.) in the communications layer, which is below the ink data message layer.

When transmitting ink data 200 per stroke unit, it may be possible to use a communications protocol different from that used for streaming fragmented data, in real time, per defined unit T. For example, TCP or HTTP (which basically relies on TCP), which includes a retransmission mechanism, may be used to transmit ink data 200 per stroke unit, while a protocol without a retransmission mechanism, such as UDP, may be used to stream fragmented data per defined unit T.

The reception device 10-3 receives the ink data 200 per stroke unit and, in step S617, applies graphic processing to draw (render) the stroke object 210 in one rendition.

The modified sequence example of FIG. 38 may be suited for use by a reception device 10-3 that may be in a network environment in which traffic speed is slow and thus real-time streaming wherein each stroke can be continuously received may be difficult to achieve. In such cases, the reception device 10-3 may opt to employ a more robust reception method to receive stroke objects, one stroke object at a time, without data loss.

FIG. 39B illustrates a sample data message format of "DATA_INK_ALLOS_REQ" 1503, which is a message that requests the stroke object 210 data of an entire stoke when the stroke ID is known. The message may be used to request retransmission of the entire stroke object data using the stroke ID.

Figure 40:
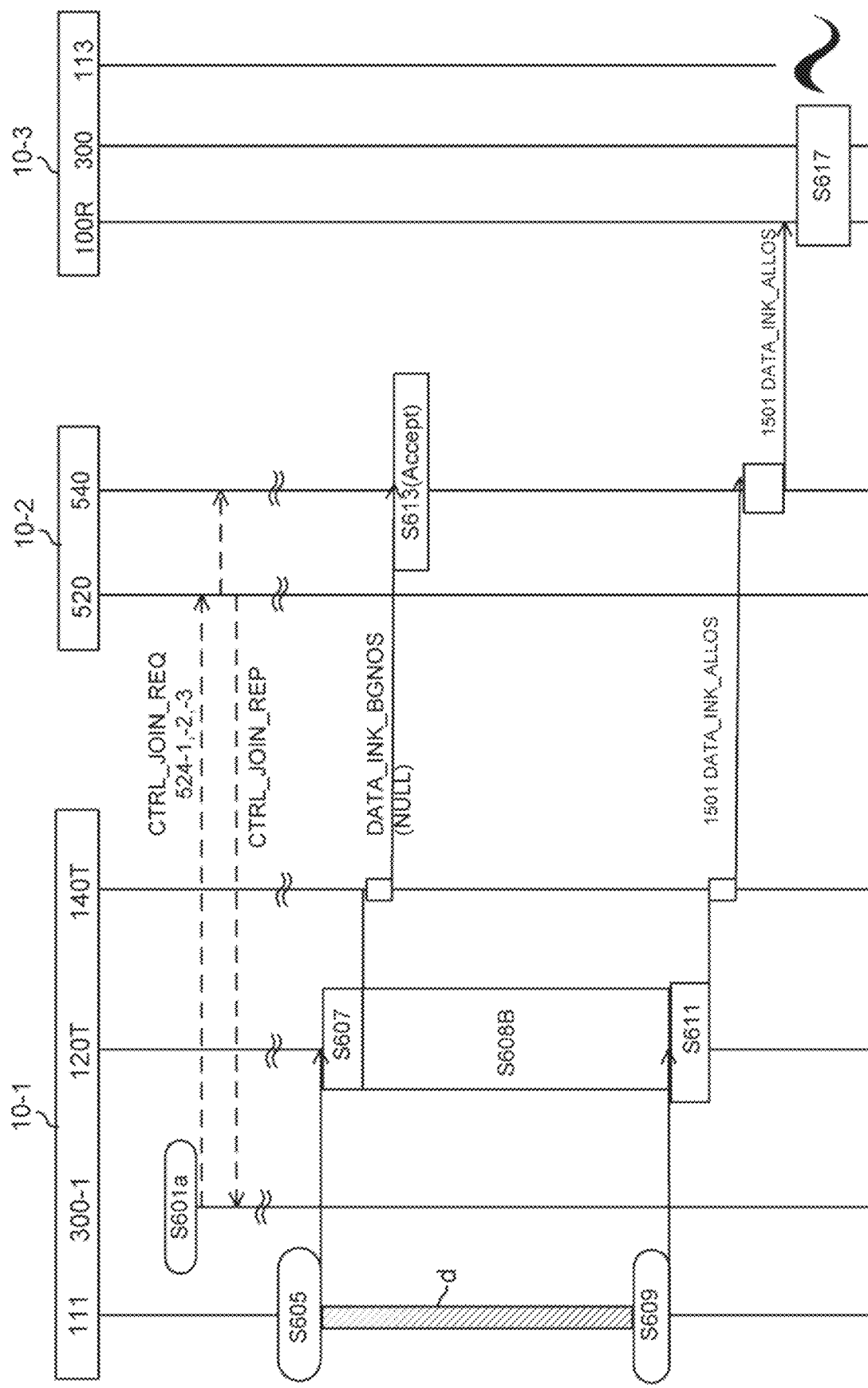
FIG. 40 is a second modification example of the sequence diagram of FIG. 32, in which a stroke object is transmitted "as is" (i.e., non-fragmented) from a transmission device via a relay server to a reception device.

FIG. 40 is a second modification example of the sequence diagram of FIG. 32, in which a stroke object 210 is transmitted "as is" (i.e., non-fragmented) from the transmission device 10-1 via the relay server 10-2 to the reception device 10-3.

In this embodiment, the transmission device 10-1 may negotiate with the relay server 10-2 in advance to set transmission parameters that define how the transmission device 10-1 transmits ink data 200 to the relay server 10-2. For example, the transmission device 10-1 sends a control message (CONTROL_JOIN_REQ), which includes communications setting information such as information indicating that the transmission device 10-1 is to transmit ink data 200 per stroke unit, as opposed to per defined unit T (524_1c "StrokeData fragment Enable" value "FALSE"). The relay server 10-2 stores the communications setting information received from the transmission device 10-1 in the drawing area information management section 526, so that the relay server 10-2 is controlled to receive ink data 200 from the transmission device 10-1 per stroke unit (while it may receive ink data 200 from other transmission devices per defined unit T).

As in FIG. 32, in FIG. 40, the transmission device 10-1 executes ink data transmission processing by using detection of a "pen event data input start" (e.g., "PenDown" event) as a trigger. Specifically, in step S605, the input processing section 111 of the transmission device 10-1 detects input of a stroke beginning point. In FIG. 40, the pen event data are continuously inputted to the ink data processing section 100T from step S605 to step S609 at the input processing section 111 (and correspondingly from S607 to S611, collectively S608B, at the ink data generation section 120T), during which one stroke is drawn starting at a stroke beginning point and ending at a stroke ending point.

The ink data processing section 100T of the transmission device 10-1 generates a drawing style object 230 based on context information (INPUT 2) using the "pen event data input start" (e.g., "PenDown" event) (S605) as a trigger. The ink data formatting section 140T of the transmission device 10-1 may then format the first data message (DATA_INK_BGNOS) to be transmitted to the relay server 10-2, which the relay server 10-2 may determine to accept (S613 (ACCEPT)) or reject. The first data message in this case is sent to confirm whether the relay server 10-2 is capable of accepting the ink data 200 from the transmission device 10-2 and, as such, need not include the coordinate of the beginning point of a stroke object 210, for example.

As long as a rejection message (NACK) is not received from the relay server 10-2, the transmission device 10-1 formats the ink data 200 for an entire stroke object 210 in a message "DATA_INK_ALLOS," which includes the entire stroke object 210 as well as its associated drawing style object 230, metadata object 250, etc., and sends it to the relay server 10-2.

When transmitting ink data 200 per stroke unit, it may be possible to use a data format different from that used to transmit ink data 200 per defined unit T. For example, the ink data 200 per stroke unit may be transmitted in a recording format, while the ink data 200 that are fragmented per defined unit T (smaller than stroke unit) may be transmitted in a transmission format. Also, when transmitting ink data 200 per stroke unit, a communications protocol that provides a retransmission mechanism may be used to achieve more robust (reliable) transmission of ink data 200.

The relay server 10-2 receives a data message (DATA_INK_ALLOS) including the entire stroke object 210 as well as its associated drawing style object 230, metadata object 250, etc., and relays the same "as is" (DATA_INK_ALLOS) to the reception device 10-3. To this end, the reception device 10-3 may negotiate with the relay server 10-2 in advance to set reception parameters that define that the reception device 10-3 is to receive ink data 200 relayed from the relay server 10-2 per stroke unit, as opposed to per defined unit T.

The reception device 10-3 receives the ink data 200 per stroke unit and, in step S617, applies graphic processing to draw (render) the stroke object 210 in one rendition.

The modified sequence example of FIG. 40 may be suited for use by a transmission device 10-1 and a reception device 10-3, both of which may be in a network environment in which traffic speed is slow and thus real-time streaming wherein each stroke can be continuously transmitted and received may be difficult to achieve. In such cases, the transmission device 10-1 and the reception device 10-3 may opt to employ a more robust transmission/reception method to transmit/receive stroke objects, one stroke object 210 at a time, without data loss.

Figure 41:
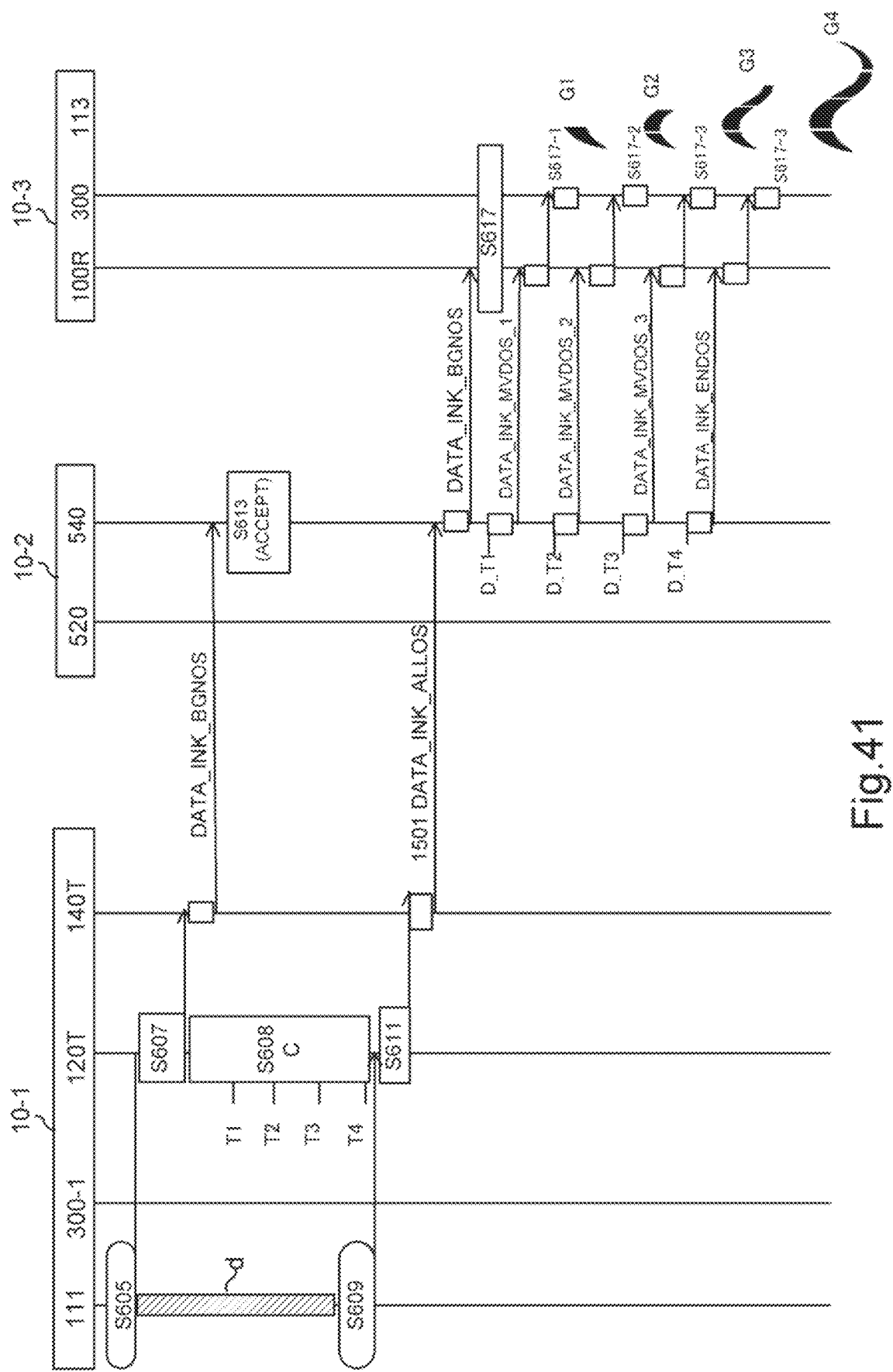
FIG. 41 is a third modification example of the sequence diagram of FIG. 32, in which a relay server receives a stroke object from a transmission device and fragments the received stroke object into multiple pieces of fragmented data to be relayed to a reception device.

FIG. 41 is a third modification example of the sequence diagram of FIG. 32, in which the relay server 10-2 receives a stroke object 210 from the transmission device 10-1 and divides the received stroke object 210 into multiple pieces of fragmented data to be relayed or sent to the reception device 10-3.

As in the previous sequence of FIG. 40, the transmission device 10-1 generates and transmits a data message that contains the ink data 200 for an entire stroke object 210, as well as any associated drawing style object 230, metadata object 250, etc., (DATA_INK_ALLOS) to the relay server 10-2. (See steps S607 through S611, collectively S608C, at the ink data generation section 120T.)

During duration "d," the ink data generation section 120T of the transmission device 10-1 embeds in the ink data 200 respective times corresponding to the point objects derived from pen event data to form the stroke object 210. For example, when the application 300-1 is used in connection with audio (e.g., 524_1g "Audio Sync ENABLE" parameter "ENABLE"), the transmission device 10-1 inserts time-stamping information to the ink data 200, per fragment, for the purpose of synchronization with the reproduction timings of audio or other data. The times are embedded as "reproduction times," which the relay server 10-2 may use in relaying the ink data 200 and the reception device 10-3 may use in reproducing (rendering) the ink data 200. For example, a first portion (first point object) of the ink data 200 generated by time T1 is to be relayed by the relay server 10-2 at a corresponding time D_T1, a second portion (second point object) of the ink data 200 generated by time T2 (between T1 and T2) is to be relayed by the relay server 10-2 at a corresponding time D_T2, and so forth. Similarly, the first through fourth portions (point objects) of the ink data 200 generated by times T1 through T4, respectively, are reproduced (drawn) by the reception device 10-3 at corresponding timings based on times T1 through T4, respectively, starting at a "Graphic Processing Start" step of S617.

The relay server 10-2 receives the data message DATA_INK_ALLOS from the transmission device, which includes the ink data 200 for an entire stroke object 210 as well as any associated drawing style object 230, metadata object 250, etc., and divides the ink data 200 into multiple pieces of fragmented data per defined unit T, similarly to how the transmission device 10-1 generates the fragmented data in the sequence example of FIG. 32. The defined unit T is smaller than the stroke unit in this example. The relay server 10-2 outputs the generated fragmented data at the timings of D_T1, D_T2, D_T3, and D_T4, respectively, to the reception device 3.

The reception device 10-3 receives and processes multiple data messages including fragmented data, which together form one stroke object 210, similarly to the reception device 10-3 in the sequence example of FIG. 32. Specifically, the reception device 10-3 receives the first data message DATA_INK_BGNOS, which signals that it is the first data message of a series of data messages forming one stroke object 210. The reception device 10-3 extracts the drawing style object 230 contained in the first data message and uses the information in the drawing style object 230 to start rendering (drawing) the fragmented data of the stroke object 210. The ink data processing section 100R continues to process subsequent fragmented data received in subsequent data messages, and the drawing section 300 continues rendering (drawing) the rest of the stroke object 210 in a growing (increasing) manner. FIG. 41 shows that the stroke object 210 is continuously drawn as its fragmented data are increasingly received and processed, from state G1, G2, G3 where the stroke object 210 is only partially, but growingly, drawn until state G4 where the stroke object 210 is fully drawn. While in the above example the relay server 10-2 controls the relay transmission timings of the stroke data, it is possible to have the relay server 10-2 transmit the stroke data per unit of stroke and then have the reception device 10-3 control the reproduction timings of respective fragments of the received stroke data. It is further possible to have the relay server 10-2 retain the stroke data and start streaming the stroke data to one or more reception devices at a scheduled time. For example, the scheduled time can be set to 0:00 on Jan. 1, 2020, and the reception devices may start to receive a set of strokes depicting a message "Happy New Year" to be drawn on their respective displays starting at the scheduled time.

The various embodiments and modifications described above can be combined to provide further embodiments. Aspects of the embodiments can be modified to provide yet further embodiments.

For example, in some embodiments, the reception device 10-3 may be configured to determine whether to accept or reject a data message relayed from the relay server 10-2, similarly to how the relay server 10-2 is configured to determine whether to accept or reject a data message transmitted from the transmission device 10-1. When the relay server 10-1 receives a rejection message (DATA_INK_REJOS), it updates the connection list 541 (FIG. 29) to indicate that data messages from the transmission device 10-1 are not to be relayed to the reception device 10-3 (while the same data messages may be relayed to other reception devices).

Figure 42:
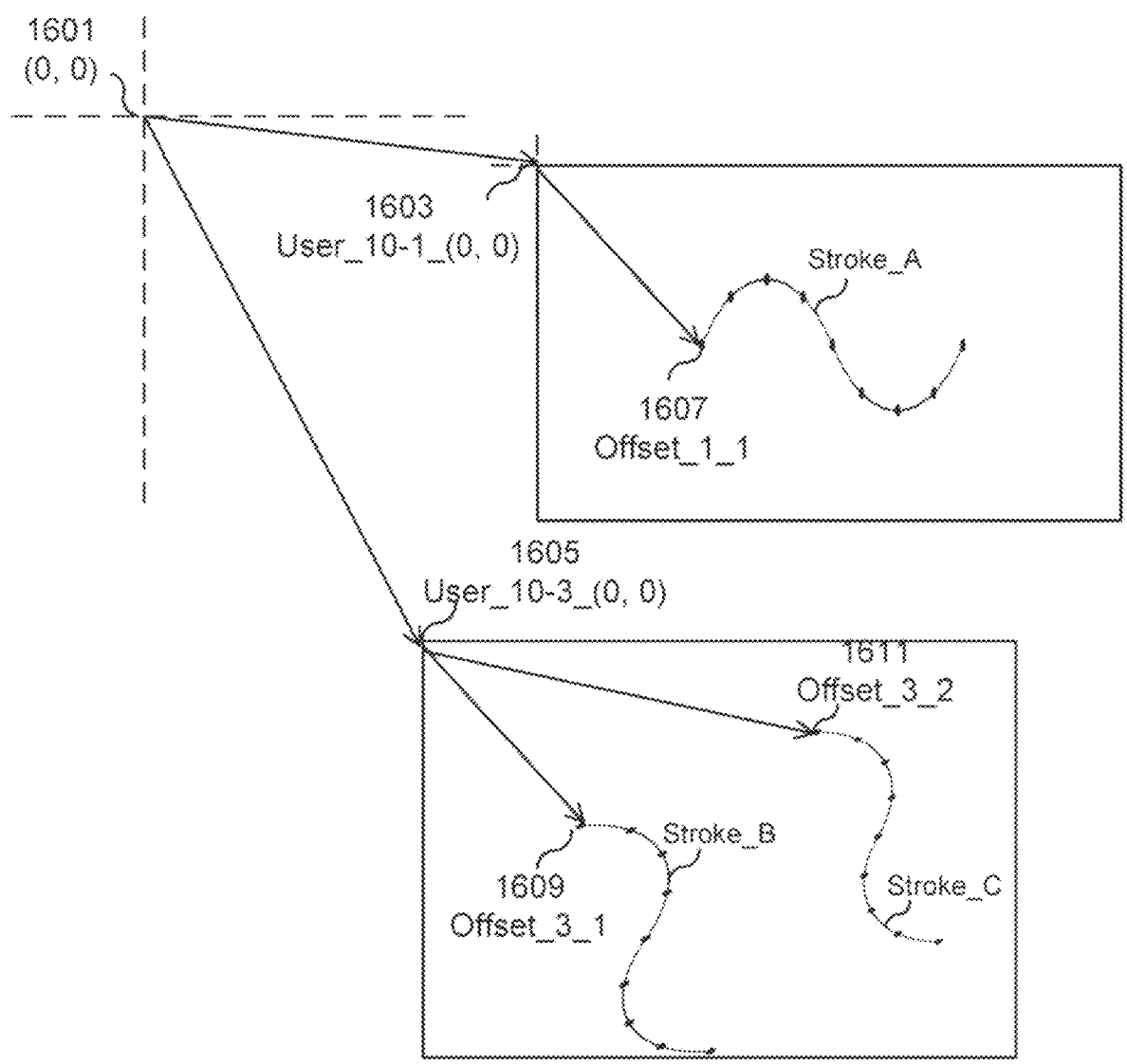
FIG. 42 is a diagram illustrating the concept of a user-specific stroke starting point relative to an origin of a common drawing area.

In some embodiments, an origin of a common drawing area coincides with an origin of a user-specific drawing area (i.e., an origin of the display 113 of a transmission/reception device). In other embodiments, an origin or the dimensions of a user-specific drawing area need not be the same as an origin or the dimensions of a common drawing area. FIG. 42 is a diagram illustrating the concept of a user-specific stroke starting point, within a user-specific drawing area, relative to an origin of a common drawing area.

In FIG. 42, point 1601 (0,0) indicates an origin of a common drawing area, while point 1603 User 10-1 (0,0) indicates an origin of a user-specific drawing area for User 10-1 and point 1605 User 10-3 (0,0) indicates an origin of another user-specific drawing area for another User 10-3. The vector from (0,0) to User 10-1 (0,0) is illustrated to be (200, 30), and the vector from (0,0) to User_10-3 (0,0) is illustrated to be (130, 260). At the initiation of communication, the transmission device 10-1 and the reception device 10-3 share their respective origin vectors from the origin of the common drawing area ((200, 30) and (130, 260) in the illustrated example) with the relay server 10-2. Thus, when the transmission device 10-1 sends Stroke_A starting at Offset_1_1 (1607) to the relay server 10-2, the transmission device 10-1 needs to send only vector Offset_1_1, which is the vector from User 10-1 (0,0) to the starting point Offset_1_1. The relay server 10-2 can then combine the received vector Offset_1_1 with vector (200, 30) to determine the position of the starting point Offset_1_1 relative to the origin of the common drawing area.

The relay server 10-2 may then send the combined vector from point 1601 (0,0), via point 1603 User 10-1 (0,0), to Offset_1_1 (1607), which combined vector defining the position of the starting point Offset_1_1 relative to the origin of the common drawing area, to the reception device 10-3. The reception device 10-3 may then determine the position of the starting point Offset_1_1 relative to its own user-specific drawing area having the origin of User 10-3 (0,0) (1605) by subtracting its origin vector (130,260) from the received combined vector. Alternatively, the relay server 10-2 may perform the subtracting operation to calculate the position of the starting point Offset_1_1 relative to the origin of User 10-3 (0,0) (1605) of the user-specific drawing area of the reception device 10-3. When the relay server 10-2 sends the calculated position of the starting point Offset_1_1 relative to the origin of User 10-3 (0,0) to the reception device 10-3, the reception device 10-3 can immediately process the received position within its own user-specific drawing area.

Similar process can be used when the reception device 10-3 enters and sends Stroke_B starting at Offset_3-1 and Stroke_C starting at Offset_3-2, drawn in the user-specific drawing area having the origin of User 10-3 (0,0), to the relay server 10-2, to be forwarded onto the transmission device 10-1.

In these embodiments, since the relay server 10-2 performs coordinate conversion relative to the origin of the common drawing area, the transmission and reception devices 10-1 and 10-3 need not perform the conversion themselves and transmit and receive coordinates data (vector data) as coordinates data relative to its own origin. That is, once the transmission and reception devices 10-1 and 10-3 share their origins relative to the origin of the common drawing area with the relay server 10-2, the coordinates conversion processing can be fully transparent to the transmission and reception devices 10-1 and 10-3.

While the defined transmission unit T to send ink data 200 has been described as equal to or smaller than a stroke unit, it is further possible to transmit ink data 200 in a unit larger than the stroke unit. That is, it is possible to "aggregate" the ink data 200 per a unit of semantics, which is larger than the stroke unit. For example, in the process of defining unit T as shown in FIG. 33, in step S709, it is determined whether aggregation is requested. If "YES," then in step S713, the unit T is set to a value greater than a stroke unit, which is a unit of semantics.

Figure 43:
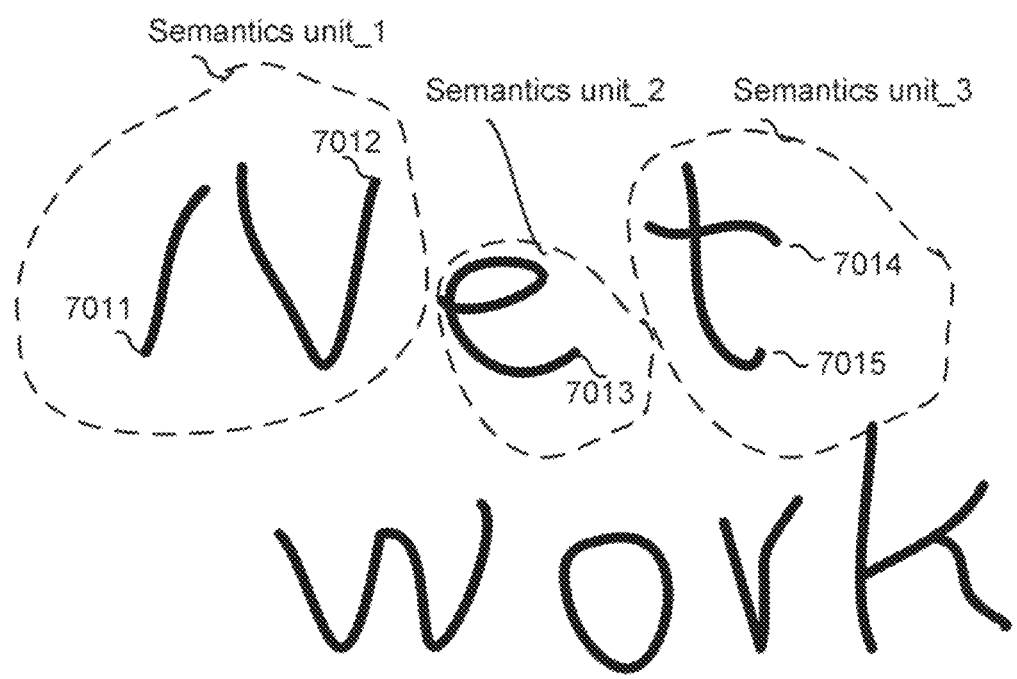
FIGS. 43 and 44 illustrate a second embodiment of ink data transmission in a unit of semantics, which is greater than a unit of stroke.
Figure 44:
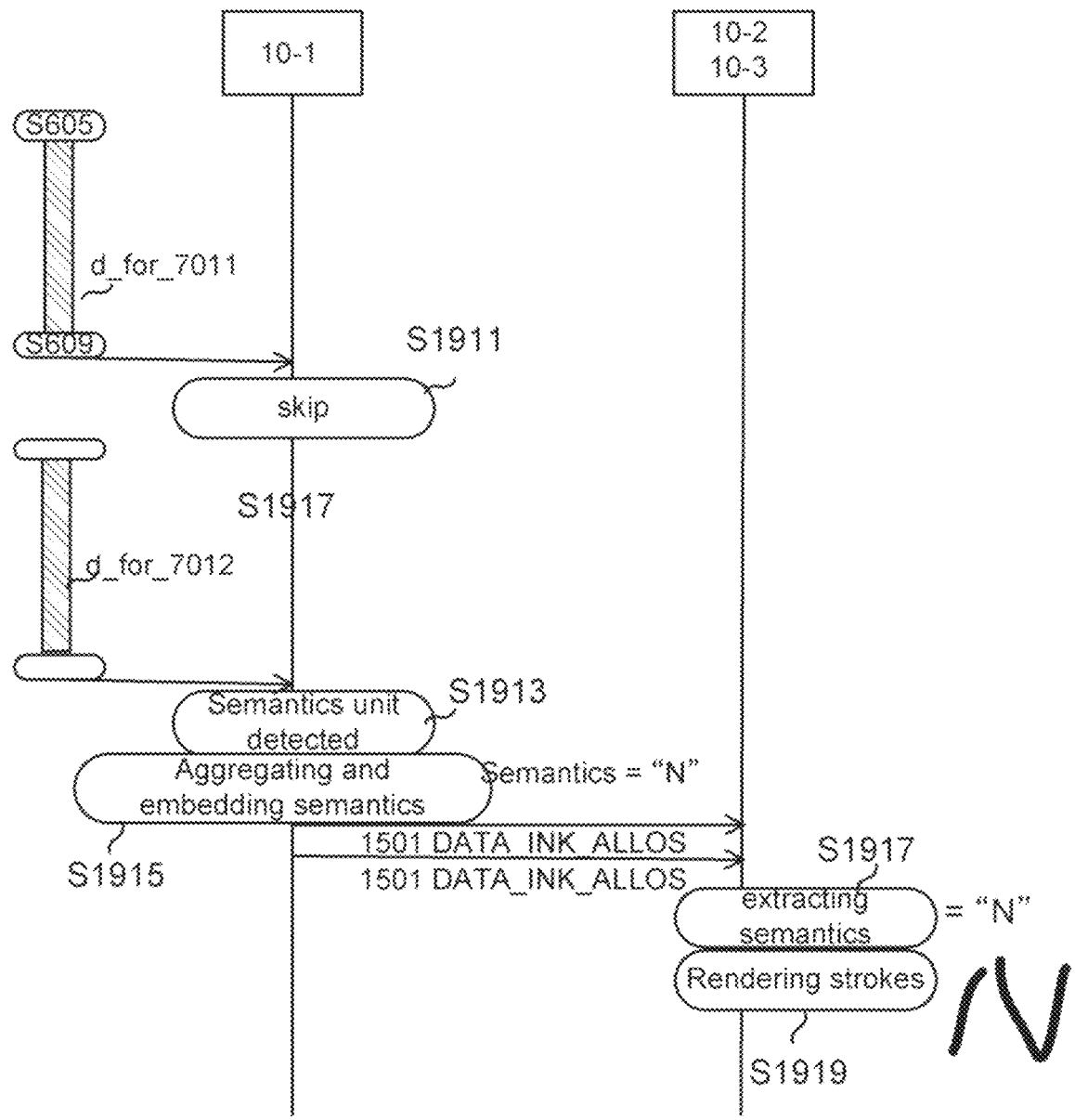

FIG. 43 illustrates the concept of a unit of semantics, while FIG. 44 illustrates a sample flow of transmitting ink data 200 in a unit of semantics.

FIG. 43 illustrates a word "Network" consisting of seven (7) handwritten letters. 7011 refers to the first stroke, 7012 refers to the second stroke (together forming the first letter "N"), 7013 refers to the third stroke, and 7014 and 7015 respectively refer to the fourth and fifth strokes that together form the third letter "t." Here, the first and second strokes 7011 and 7012 are deemed to form one semantics unit because they together form one letter, and similarly the fourth and fifth strokes 7014 and 7015 are deemed to form one semantics unit because they together form one letter.

FIG. 44 illustrates a sample flow of "aggregating" multiple strokes that form one semantics unit and transmitting the stroke data per the unit of semantics. In this example, the application 300-1 is linked to a character recognition engine. In FIG. 44, the hatched duration "d_for_7011" is a period during which the first stroke 7011 is detected. The ink data generation section 120T detects, based on the analysis result of the character recognition engine used by the application 300-1, that the first stroke 7011 does not form a complete unit of semantics. Since the unit of semantics is not yet completed, in step S1911, the process skips an ink data transmission step. Then, during the hatched duration "d_for_7012" the second stroke 7012 is detected. In step S1913, the ink data generation section 120T detects that the first and second strokes 7011 and 7012 form one unit of semantics. In step S1915, the ink data generation section 120T aggregates the first and second strokes 7011 and 7012, and also generates metadata information indicating that the first and second strokes 7011 and 7012 together form one unit of semantics and together mean "N." The transmission device 10-1 transmits the stroke (ink) data (1501 DATA_INK_ALLOS) together with the metadata information to the reception side (the relay server 10-2 or the reception device 10-3). In step S1917, the reception side extracts the metadata information to determine that the first and second strokes 7011 and 7012 together form one unit of semantics and together mean "N." Thereafter, in step S1919, the reception side renders (draws) the first and second strokes 7011 and 7012 on its display.

Third Embodiment

Figure 92:
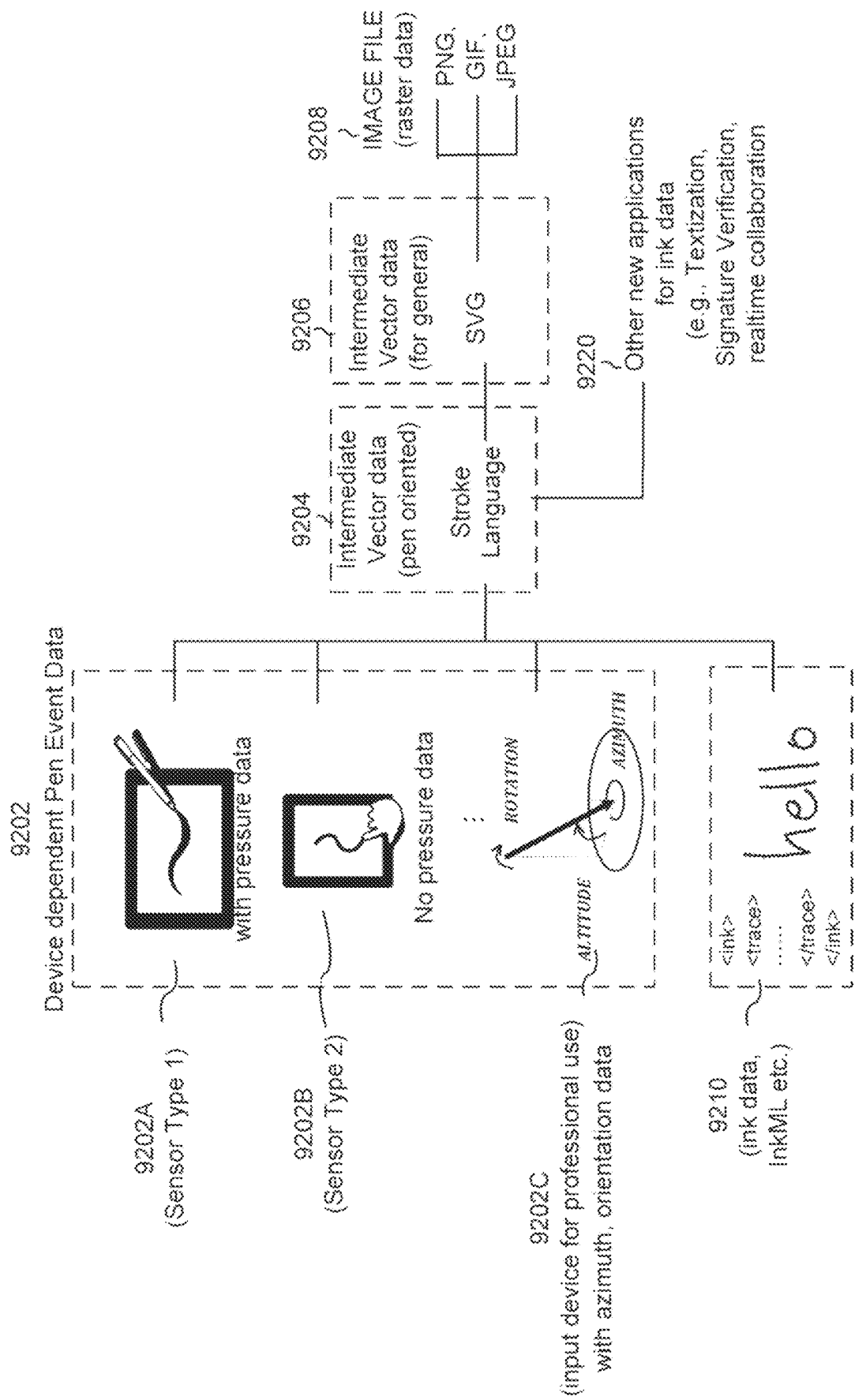
FIG. 92 is a diagram explaining the effect of using an ink data processing device (101) of FIG. 75 to address ASPECT TWO.

A third embodiment is directed to methods for generating and reproducing ink data configured to represent handdrawn data, and to methods of outputting (rendering) drawings using the reproduced ink data. Specifically, processing of FIG. 92 is described that abstracts (generalizes) pen event data 9202 dependent on a specific input device sensor to generate ink data 200. For example, processing is described that abstracts (generalizes) pen event data having pen pressure data (Type 1) and pen event data not having pen pressure data (Type 2) so as to generate device-independent common attributes values.

Background of the Third Embodiment

Document (D5) above describes an ink data standard, and states the purpose of the standard as follows: "Jot [standard] enables ink to be used across a very broad range of applications and devices. With a standard interchange format, a number of scenarios are possible. Here are a few examples of ink sharing. Of course, many more applications will arise as Jot is implemented on diverse platforms."

The standard utilizes a flag called "inkForceDataPresent" that indicates that pen pressure data, which is one attribute of ink data, is present.

Each of the points (dots) that form a stroke is defined in the data structure of Table 1 below:

TABLE 1

| Data structure of Document (D5) | | |
|---|---|---|
| typedef struct tag__INK__POINT { | | |
| XY32 | position; | // required x/y point data |
| S16 | force; | // optional force data |
| S16 | height; | // optional z height data |
| S16 | rho; | // optional rotational data |
| ANGLE16 | angle; | // optional theta and phi data |
| INK__BUTTONS | buttons; | // optional proximity, contact, button data |
| } INK__POINT, FAR *P__INK__POINT; | | |

In the above, "force" is a value that corresponds to pen pressure. Therefore, to an electronic device capable of obtaining "pen pressure" information (e.g., most EMR-type tablets), the inkForceDataPresent flag value is set to a Boolean value indicative of the presence of pen pressure data, and the value of pen pressure ("force") is entered as input information.

Document (D1) describes another ink data standard, and states the purpose of the standard as follows: "Hardware and software vendors have typically stored and represented digital ink using proprietary or restrictive formats. The lack of a public and comprehensive digital ink format has severely limited the capture, transmission, processing, and presentation of digital ink across heterogeneous devices developed by multiple vendors. In response to this need, the Ink Markup Language (InkML) provides a simple and platform-neutral data format to promote the interchange of digital ink between software applications."

In this standard, a stroke is called a "trace," and its data structure can be defined by attributes that are freely selected from among a predefined set of attributes.

In a default setting, a trace is represented as a list of decimal number combinations (X, Y), according to the data structure of Table 2-1 below:

TABLE 2-1

Data structure (Default) of Document (D1)

<traceFormat xml:id="DefaultTraceFormat">
  <channel name="X" type="decimal"/>
  <channel name="Y" type="decimal"/>
</traceFormat>

To the default data structure, further attributes may be added by defining additional channel names, such as F (force). For example, an attribute (channel name) indicative of pen pressure is defined as follows:

| channel name | Dimension | default unit | interpretation |
|---|---|---|---|
| F | Force | % | pen tip force |

By setting the name of a <channel name> tag of <traceFormat> as "F (Force)," for example, one can custom-define a "traceFormat" including a force attribute.

A trace is then represented as a list of decimal number combinations (X, Y) and according to any custom-defined "traceFormat." Thus, ink data (e.g., coordinates, pen pressure, etc.) represented in a custom-defined traceFormat is provided as a list of continuous values.

Document (D2) describes yet another attempt to standardize ink data in the industry, and describes its purpose as follows: "Ink Serialized Format or ISF is a Microsoft format to store written ink data. The format is mainly used for mobile devices like Personal digital assistants, tablet PCs and Ultra-Mobile PCs to store data entered with a stylus." D3 further describes that "[a]n ink object is simply a sequence of strokes, where each stroke is a sequence of points, and the points are X, and Y coordinates. Many of the new mobile devices can also provide information such as pressure, and angle. In addition [they] can be used to store custom information along with the ink data."

When pen pressure information is to be included, the following attribute can be included in the data format:
TAG_NORMAL_PRESSURE Indicates pressure is the first thing after x, y
Information including the TAG_NORMAL_PRESSURE information can then be serialized and outputted.

Summary of the Third Embodiment

The ink data structures proposed in Documents (D1), (D2) and (D5) above are intended to output device-specific information obtained by a pen-type input device without abstracting or generalizing the information. For example, when pen pressure data is obtained as an attribute by a pen-type input device, the pen pressure data can be outputted to an electronic device having capability to receive and process pressure data but cannot be outputted to an electronic device which is not expected to have such capability, such as most electrostatic capacitive type tablets. Similarly, when a pen-type input device is incapable of obtaining pen pressure data, no pen pressure data can be outputted to an electronic device even when the electronic device does have capability to receive and process pen pressure data. Still further, some "finger" type input devices capable of receiving hand-drawn input by a finger, such as electrostatic capacitive type sensors, are incapable of generating finger pressure data when a finger is pressed against the sensor surfaces. Thus, since not all pen-type input devices or finger type input devices are capable of obtaining pen pressure data and since not all electronic devices (e.g., tablets and PCs) are capable of obtaining, receiving and processing pen pressure data, utilization of pen pressure data in the currently available ink data is rather limited. This renders the currently available ink data unsuited for the purpose of more realistically simulating or representing hand-drawn data, because in reality pen pressure applied by a user significantly impacts how a pen stroke (or pen trace) appears on paper by affecting the width or darkness of a pen stroke or creating a blotch or smudge of varying size.

Techniques proposed in Documents (D1), (D2) and (D5) are aimed at recording and reproducing movement of a pen (i.e., "pen event") including information such as how much pen pressure is applied or how much the pen is tilted during the pen event. However, information that ultimately needs to be recorded and reproduced is the resulting "appearance" of a series of pen events, such as how multiple strokes or traces appear on a screen. The resulting appearance of a series of pen events is typically used as graphics data. Document (D3) proposes a vector data standard, but Document (D3) is indifferent to the use of a pen as an input device and, as a result, its data are not suited for representing or expressing strokes resulting from use of a pen. For example, the technique of Document (D3) does not permit variable stroke width or variable opacity of a stroke in version 1.1.

A need exists for methods of generating and reproducing ink data based on an ink data model (semantics or language) and an ink data format based on the ink data model, which do not require pen pressure data so as to be usable by devices that do not support pen pressure data. In some embodiments, the method of generating ink data is capable of generating substitute parameter(s) for the pressure data based on information readily available in most, if not all, of a variety of devices. Use of the substitute parameters in the ink data model of the present invention to represent pressure information achieves providing rendered (drawn) pen strokes with various nuanced expressions and realistic appearances that simulate actual pen strokes.

Description of the Third Embodiment

The description of various exemplary embodiments of the present invention below is generally organized in the following six sections:
[1] Overall System Architecture, in reference to FIGS. 1 and 45-47B
[2] Stroke Language (SL) and Stroke File Format (SFF)
  [2-1] Ink data Model ("Stroke Language"), in reference to FIGS. 48A-48I
  [2-2] Stroke File Format (SFF), in reference to FIGS. 48J-48L

[3] Ink data processing section 100 (Generator 100T), in reference to FIGS. 49-63

Figure 64:
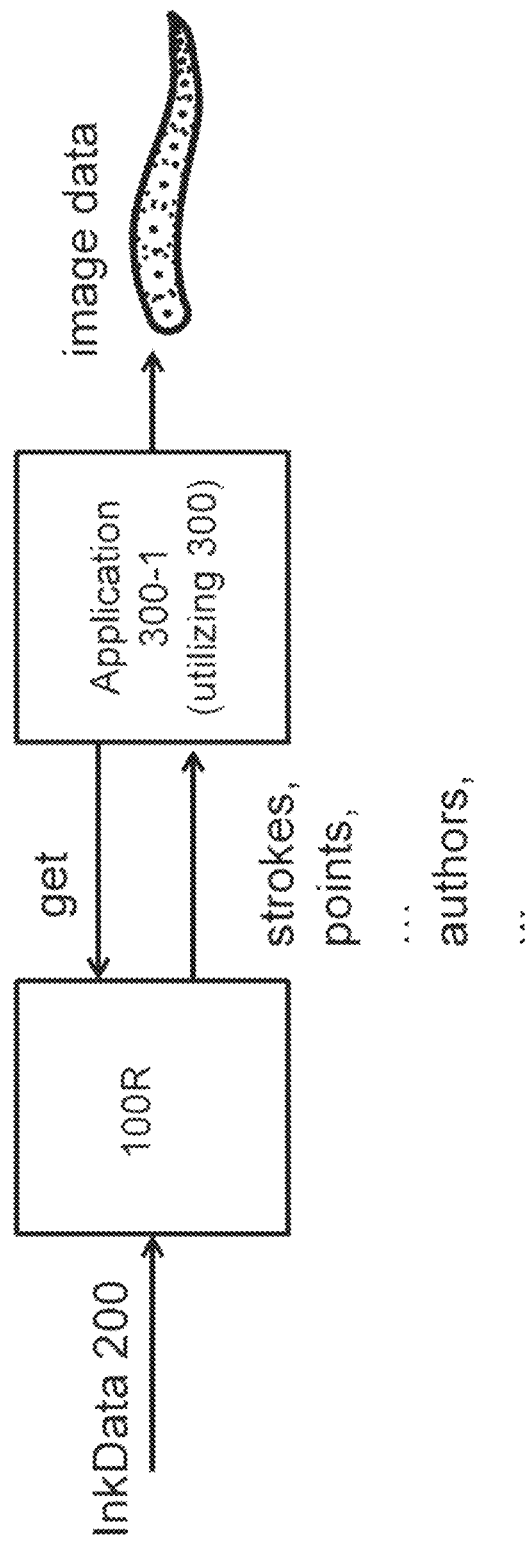
FIG. 64 is a diagram illustrating a relationship between an ink data processing section and various applications, according to third embodiments of the present invention.
Figure 65:
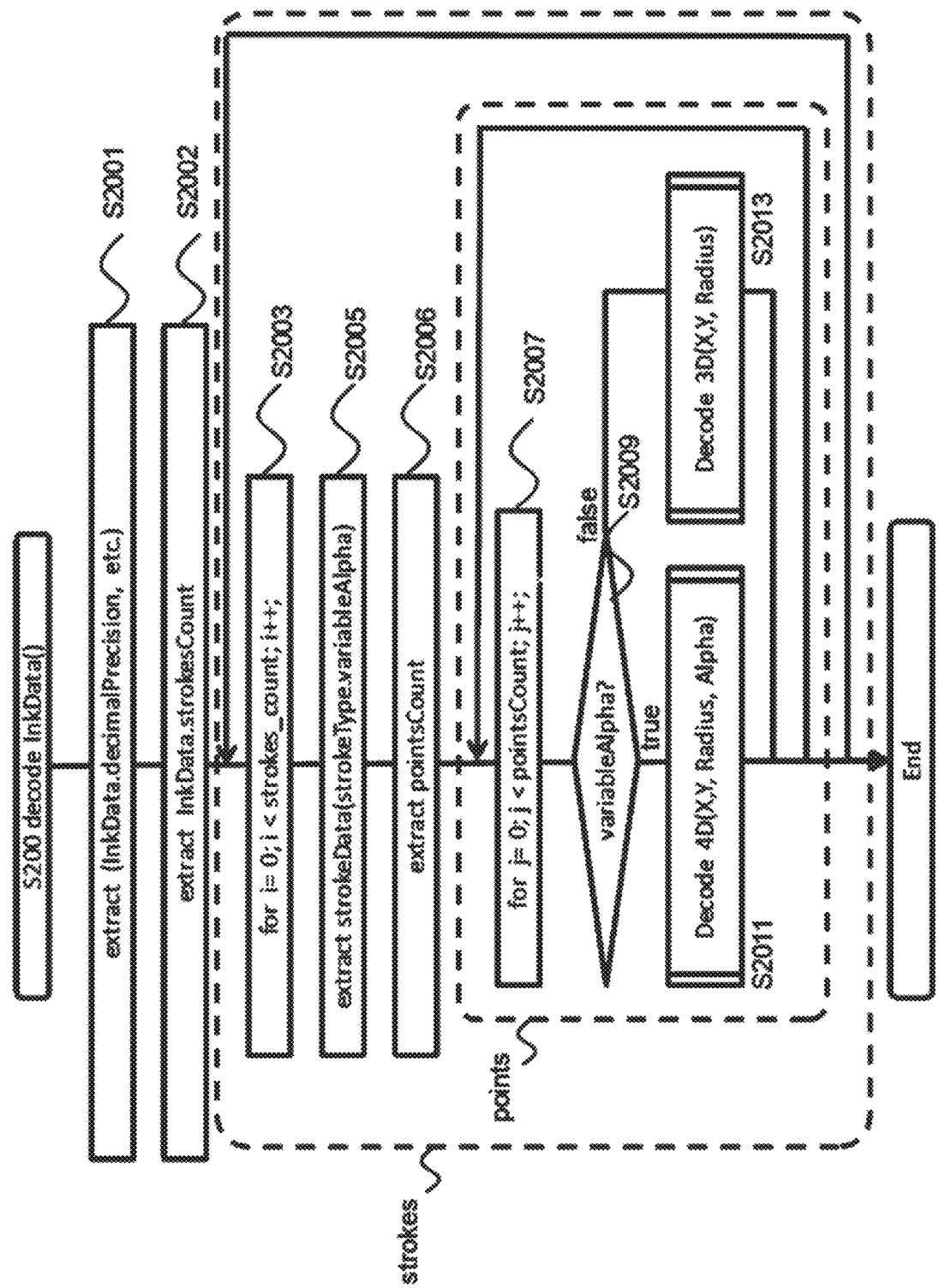
FIG. 65 is a flow diagram illustrating an ink data reproducing process to extract (reproduce) radius and alpha information, as well as X and Y coordinate data, in ink data and outputting the extracted information and data in response to a request from a drawing application, according to third embodiments of the present invention.

[4] Ink data processing section 100R (Reproducer 100R), in reference to FIGS. 64-66

Figure 67:
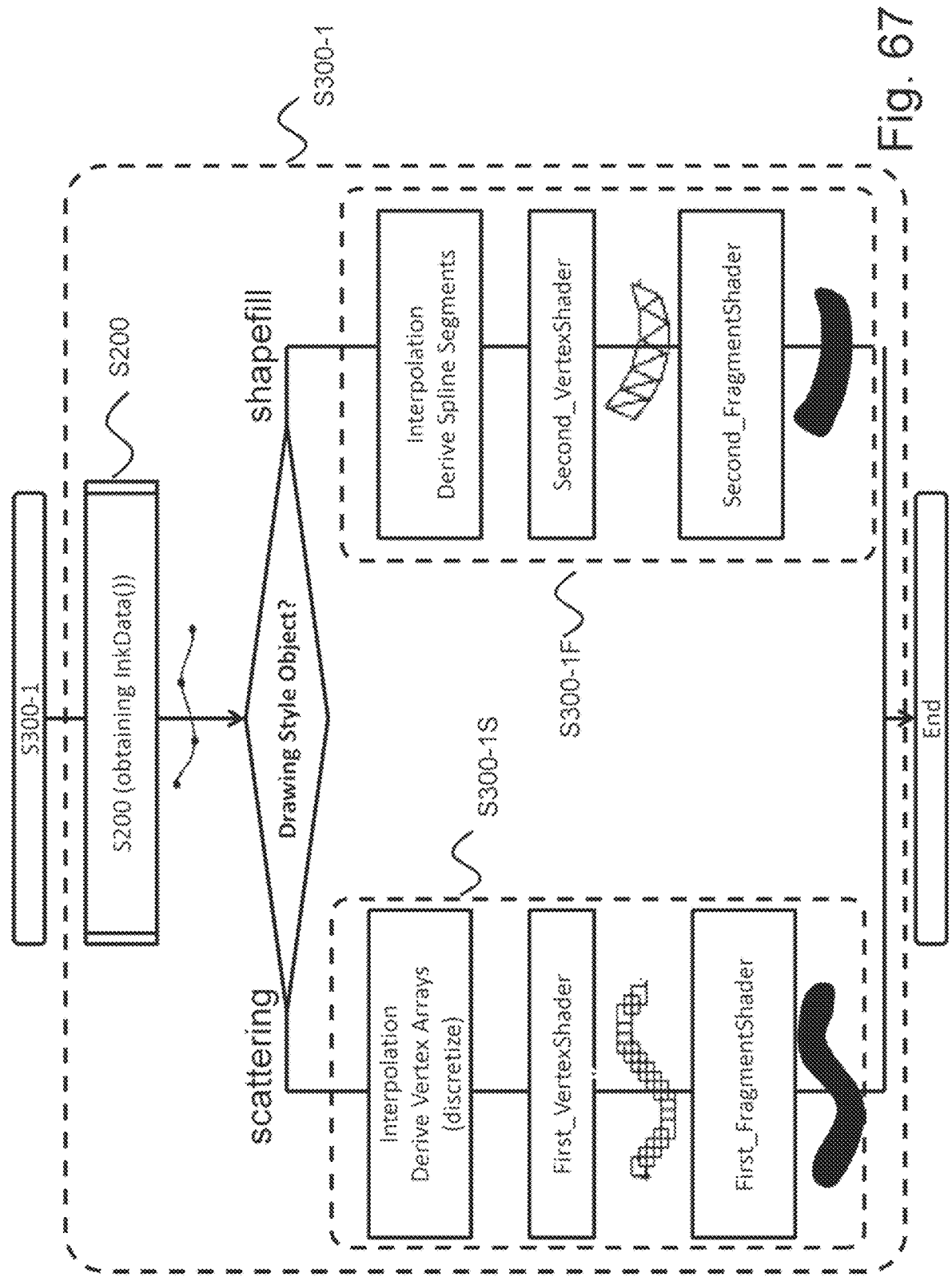
FIG. 67 is a flow diagram illustrating a drawing process that applies a selected drawing style object to a stroke object to be drawn, according to third embodiments of the present invention.

[5] Ink data rendering process, in reference to FIG. 67

[6] Effects: Ink Data Drawing Examples, in reference to FIGS. 68-72

[1] Overall System Architecture (FIGS. 1 and 45-47B)

FIG. 1 described above in reference to the first embodiment illustrates an overall system in which the ink data 200 of the present invention may be generated, reproduced, and rendered (drawn) on a screen according to the third embodiment of the present invention. In particular, the Ink Data exchange infrastructure 10 outlined in solid lines in FIG. 1 represents an infrastructure, realized by libraries that use ink data 200 based on the common language model, for exchanging the ink data 200, wherein the ink data 200 are generalized so as to be commonly usable by a variety of application services and devices, some supporting pressure data and others not supporting pressure data.

In FIG. 1, Device 10-1-1 includes, as an input sensor, a pen-type input device capable of sensing pen pressure data. Device 10-1 generates the ink data 200 using an application provided by Application Service #1. The generated ink data 200 may then be output in a suitable output form (e.g., in packets) corresponding to the destination media (e.g., a network).

Device 10-1-2 is a tablet-type input device capable of receiving hand-drawn input made by a user's finger. The sensor of Device 10-1-2 is not capable of outputting pen pressure data, but may still generate the ink data 200 using an application provided for Application Service #2 which does not require pressure data. The ink data 200 may then be outputted in a suitable form corresponding to the destination media.

Device 10-3 is a desktop-type PC that subscribes to Application Service #2. Device 3 may process (e.g., render on its display screen or redistribute) the ink data 200 outputted from Device 10-1-1 or Device 10-1-2, using an application provided by Application Service #2.

Application Service #1 and Application Service #2 running on Devices 10-1-1, 10-1-2 and 10-3 all utilize the common information model ("Stroke Language") representative of the ink data 200.

The ink data 200 according to embodiments of the present invention are usable by various types of devices on a variety of service applications, not limited to those devices and service applications capable of obtaining or processing pen pressure data per se.

Figure 45:
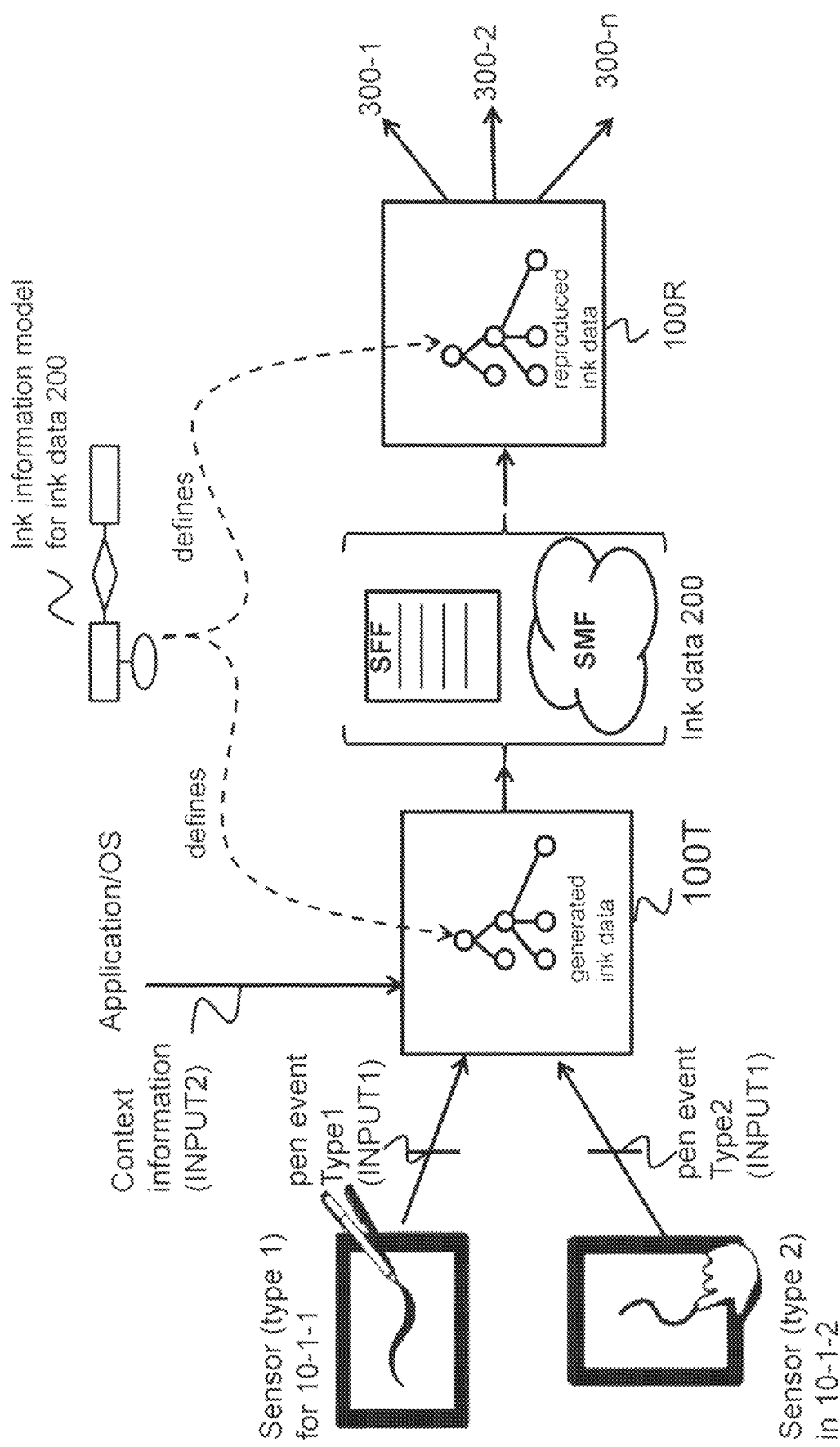
FIG. 45 illustrates data input/output at an ink data processing section and in a generating method on one hand, and at an ink data processing section and in a reproducing method on the other hand, according to third embodiments of the present invention.

FIG. 45 illustrates data input/output at an ink data 200 processing section 100 (generator 100T) and an ink data generating method on the left hand side, and at an ink data processing section (reproducer 100R) and an ink data reproducing method on the right hand side, according to embodiments of the present invention. Ink data processing section 100T corresponds to 100T in FIG. 5 of the first embodiment.

The ink data processing section 100T according to embodiments of the present invention receives pen event data from a sensor of Device 10-1-1 and a sensor of Device 10-1-2, wherein the pen event data represents a pen (or finger) movement that created a pen (or finger) stroke and includes coordinates data (e.g., (X, Y) positions) of the stroke. The pen event data may also include device-dependent data such as pen pressure data and pen tilt data. In FIG. 45, pen event Type 1 data from the sensor of Device 10-1-1 includes pen pressure data, wherein the sensor of Device 10-1-1 is a device capable of outputting pressure data such as a pen-tablet device driver or APIs for an EMR type pen tablet used with a pressure sensitive stylus. On the other hand, pen event Type 2 data from Device 2 does not include any pressure data, wherein Device 10-1-2 is a device incapable of outputting pressure data such as an iPad™ tablet or other capacitive-type touch sensor tablets. The ink data processing section 100 receives device-dependent pen event data (Type 1 and Type 2) and generates and outputs device-independent ink data 200 according to embodiments of the present invention, which can be shared by various devices regardless of their capability to process pressure data.

To generate the ink data 200 based on the pen event data, the ink data processing section 100 also receives context information (INPUT 2) about the pen event data from the application or operating system used to input the pen event data, as shown in FIG. 45. The generated ink data 200 is a collection of various objects (stroke objects 210, metadata objects 250, drawing style objects 230, manipulation objects 270, etc., see FIG. 48B), which are arranged in a tree structure in FIG. 45. The context information (INPUT 2) includes, for example, pen (tip) type (e.g., pencil, crayon, brush, etc.) and/or pen color information received from a drawing application, pen tablet resolution information and sampling rate, pen event entry time and location information, a pen ID, a user ID provided by an OS, and any other information regarding a stroke provided by the (software) application used to generate (draw) the stroke.

The ink data model defines semantics of data used in the application area (domain) that processes the ink data 200. When the common ink data model is shared amongst various applications and services, information can be freely shared, reliably, in a system structure in the domain that processes the ink data 200.

In FIG. 45, broken arrows indicate that the ink information model defines each class object of the ink data 200, and a collection of ink data objects forms the ink data 200.

The ink data processing section 100 outputs the generated ink data 200 as a collection of data objects in a media format (e.g., in a file, packets, etc.) requested by the application that needs the ink data 200. There are generally two types of media formats:

(1) Stroke file format (SFF) that stores the ink data 200 in a persistent (semi-permanent) form; and (2) Stroke messaging format (SMF) that is suited for transmitting the ink data 200 in a message or in real-time communication.

The ink data processing section 100R receives the ink data 200 in SFF or SMF files, interprets and extracts the ink data 200 recorded in a specific media as a byte or a binary sequence, and provides the extracted ink data 200 to various types of applications 300 that utilize the ink data 200. In response to a request from one of the applications 300-1 . . . 301-n, the ink data processing section 100R extracts ink data objects and reproduces information defined by the ink data model, and provides the extracted (reproduced) ink data 200 to the requesting application 300-1, 300-2. The ink data processing section 100R is typically embodied as a library dynamically or statically linked to the requesting application 300 and executed on a processor in a personal computer. In another embodiment the ink data processing section 100R may be a cloud server configured to reproduce the ink data 200 by interpreting the ink data model.

Each of the applications 300-1 . . . 300-n retrieves a necessary amount/portion of the ink data 200 extracted and reproduced by the ink data processing section 100R and utilizes the retrieved ink data 200 in executing various operations. For example, the application 300-1 is a drawing application in the illustrated embodiment. A drawing application retrieves a full set of the reproduced ink data 200 and applies, for example, scaling, rasterizing, and rendering operation on the retrieved ink data 200 and may also output an image file.

Figure 46B:
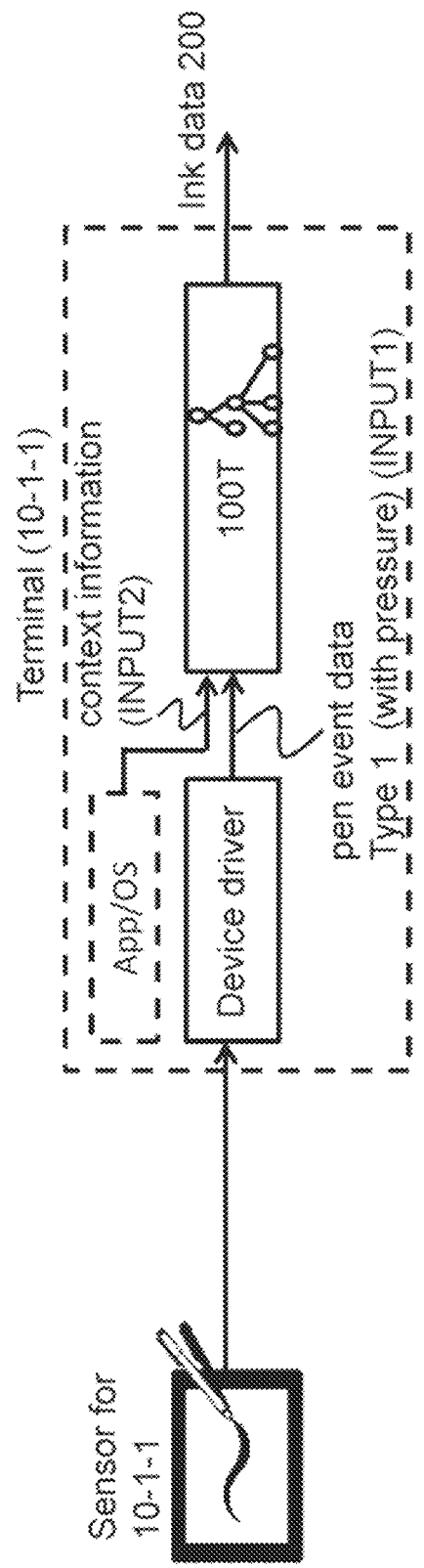
Figure 46C:
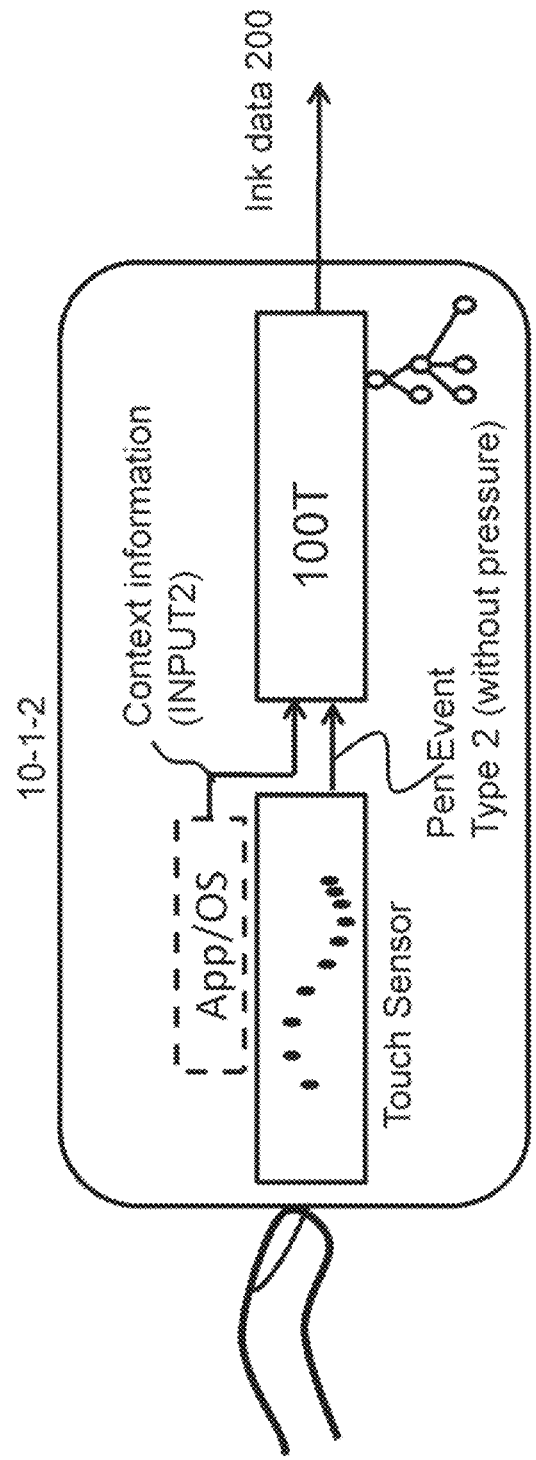

In various embodiments, the ink data processing section 100 and the ink data processing section 100R, as well as the applications 300 that utilize the libraries realizing the generator/reproducer functions, may be embodied in one or more computing devices each including memory and a CPU (central processing unit) or a GPU (graphics processing unit). For example, the ink data processing section 100, the ink data processing section 100R and the drawing application 300-1 may be embodied in one computing device. In this case the ink data processing section 100 and the ink data processing section 100R can use the device memory to share common ink data objects. FIGS. 46A-46C respectively illustrate three configuration examples of an ink data generating apparatus or method according to embodiments of the present invention.

FIG. 46A illustrates an apparatus or method, in which the ink data processing section 100T resides in a server that is different from a stroke-inputting terminal that may be coupled to Device 10-1-2. Device 10-1-2 obtains device-dependent pen event data that may or may not include pen pressure data. In the illustrated embodiment, Sensor of Device 10-1-2 obtains device-dependent pen event data of Type 2 that does not include pen pressure data. Device 10-1-2 then transmits the obtained device-dependent pen event data via a network, such as the Internet, to the server that embodies the ink data processing section 100T. The ink data processing section 100T implemented in the server receives the device-dependent pen event data from Device 10-1-2 and generates the ink data 200 as defined by the ink data model. Context information (INPUT 2) regarding the pen event may also be provided by Device 10-1-2 to the ink data processing section 100T, or may be omitted in case context information (INPUT 2) is not necessary when, for example, the application provided by the server utilizes a common pen type.

FIG. 46B illustrates another apparatus or method, in which the ink data processing section 100T resides in a Device 10-1, wherein the Device 10-1-1 also includes a device driver to control Device 10-1-1. Device 10-1-1 obtains device-dependent raw data that may or may not include pen pressure data. In the illustrated embodiment, the sensor of Device 10-1-1 obtains raw data that includes pen pressure data. The sensor of Device 10-1 sends the raw data including pen pressure data to an I/O of the terminal via a suitable interface protocol such as the USB. The device driver in the terminal processes the received raw data to produce device-dependent pen event data of Type 1 that includes pen pressure data. The ink data processing section 100 of the device 10-1-1 receives the device-dependent pen event data of Type 1 from the device driver and generates the device-independent ink data 200 defined by the ink data model. At this time, as illustrated, the ink data processing section 100 may also receive context information (INPUT 2) regarding the pen event data from the application and/or OS operating on the terminal. The generated ink data 200 may be serialized in the form of a byte sequence or a bit or byte sequence and recorded onto suitable media (network, storage device, etc.).

FIG. 46C illustrates yet another apparatus or method, in which the ink data processing section 100T resides in a terminal that also includes an input sensor (e.g., touch sensor). For example, Device 10-1-2 of FIG. 46C is an electrostatic capacitive-type touch sensor that may function as a terminal, and Device 10-1-2 includes the ink data processing section 100 in addition to the touch sensor. The touch sensor includes a control IC capable of obtaining device-dependent positional data (e.g., positions touched by fingers) but may or may not be able to obtain pen (or finger) pressure data or other pen-specific data (angle, tilt, etc.). In the illustrated embodiment, the touch sensor obtains and sends pen event data of Type 2 that does not include pen pressure data. The ink data processing section 100T receives the device-dependent pen event data of Type 2 from the sensor's control IC and generates the device-independent ink data 200 defined by the ink data model. At this time the ink data processing section 100 may also receive context information (INPUT 2) regarding the pen event data (INPUT 1), if any, from the application and/or OS operating on Device 10-1-2. The ink data 200 may then be outputted in the form of a byte sequence or a bit sequence recorded onto suitable media (network, storage device, etc.) in a persistent form (SFF) or in a messaging packet form (SMF), etc.

FIGS. 47A and 47B illustrate operation of an ink data reproducing method, according to embodiments of the present invention.

FIG. 47A illustrates a reproducing method, in which a server includes the ink data processing section 100R (receiving and reproducing side), an application 300-1, the ink data processing section 100R, and memory (RAM) in which the ink data 200 in a certain format (e.g., SFF) generated by the ink data processing section 100T running with the server, may be stored. The Ink data processing section 100R corresponds to 100R in FIG. 22 of the first embodiment. The application 300-1 invokes static/dynamic libraries of the ink data processing section 100R to get data necessary for the application 300-1. In the illustrated embodiment, the application 300-1 is a drawing display program. The ink data processing section 100R may selectively extract and reproduce the necessary data from among the ink data stored in the RAM and provide the reproduced necessary data to the application 300-1. For example, the reproduced necessary data may include position data and RGB color data, but may or may not include variable stroke width data. The application 300-1 receives the reproduced necessary data from the ink data processing section 100R and performs necessary drawing operations, such as interpolation, geometry generation and rasterization, to thereby output (render) image data on a display screen.

FIG. 47B illustrates another reproducing method, in which a device 10-3 includes the ink data processing section 100R and an application 300-2. In this case, the ink data 200 generated by the ink data processing section 100 (not shown) are prepared into messages or packetized pursuant to a streaming protocol (e.g., in SMF), and outputted to a network, for example. The application 300-2 requests the ink data processing section 100R to obtain data necessary for the application 300-2. In the illustrated embodiment, the application 300-2 is a character image textization application that converts hand-drawn text into machine-readable text pursuant to any text encoding scheme. As such, the application 300-2 requires position data (X-Y data), but does not necessarily require RGB color data. Also, the application 300-2 may require information about an author of the ink data 200 (so as to distinguish a particular author's distinctive handwriting, for example).

The ink data processing section 100R may selectively extract and reproduce the data necessary for the application 300-2 from among the ink data 200 in the messages or packets (in SMF) received from the network, and provide the reproduced necessary data to the application 300-2. The application 300-2 receives the reproduced necessary data from the ink data processing section 100R and performs necessary textization operations to output the textization result, perhaps together with an author ID.

As described above, functions and operations of the ink data processing section 100 and the ink data processing section 100R may be distributed or consolidated amongst various devices (input devices, terminals, servers, etc.) on the Internet infrastructure depending on each application and the type of media used in each embodiment.

[2] Stroke Language (SL) and Stroke File Format (SFF)
[2-1] Ink data Model ("Stroke Language") (FIGS. 48A-48I)

Figure 48A:
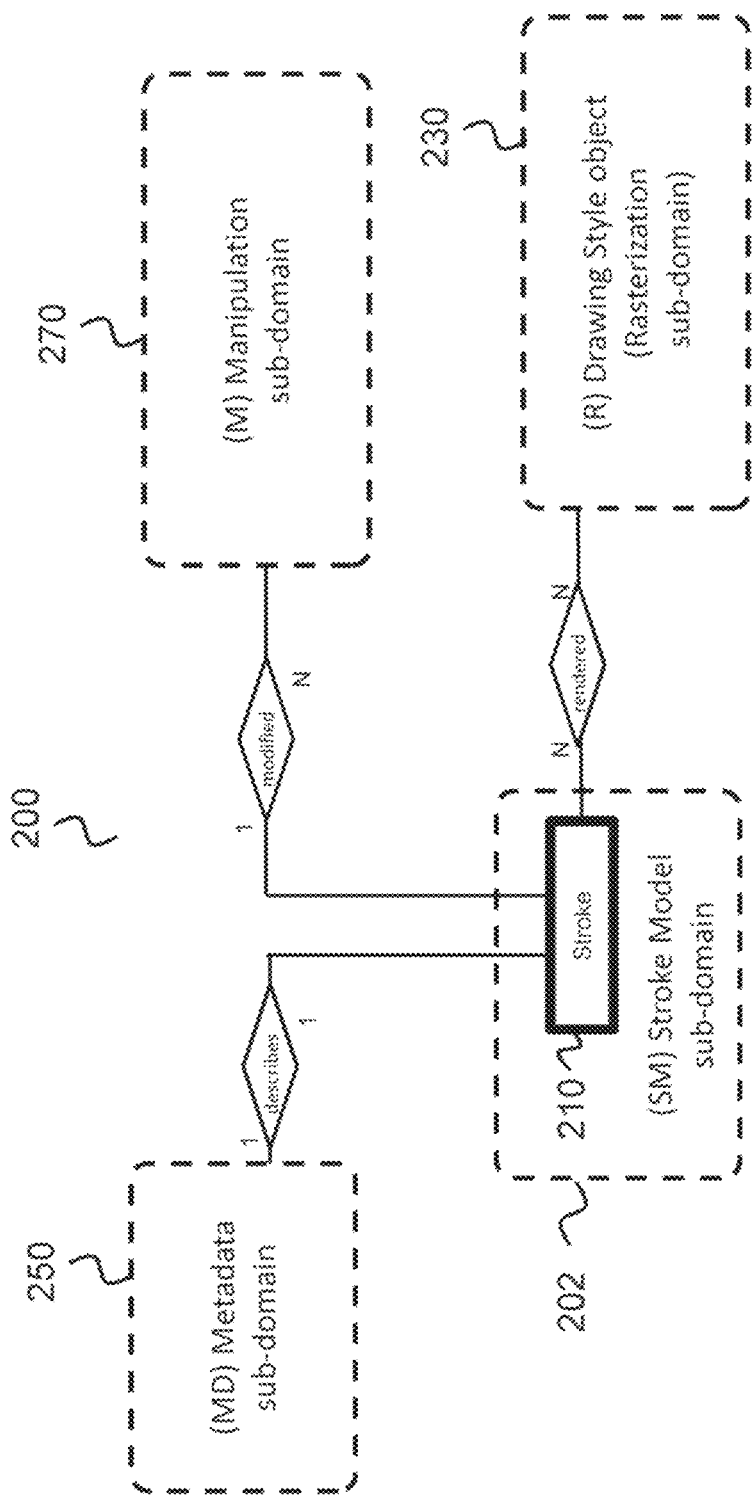
FIG. 48A is an entity relationship diagram of an ink data structure, pursuant to an ink data model (Stroke Language (SL)) according to third embodiments of the present invention.
Figure 48B:
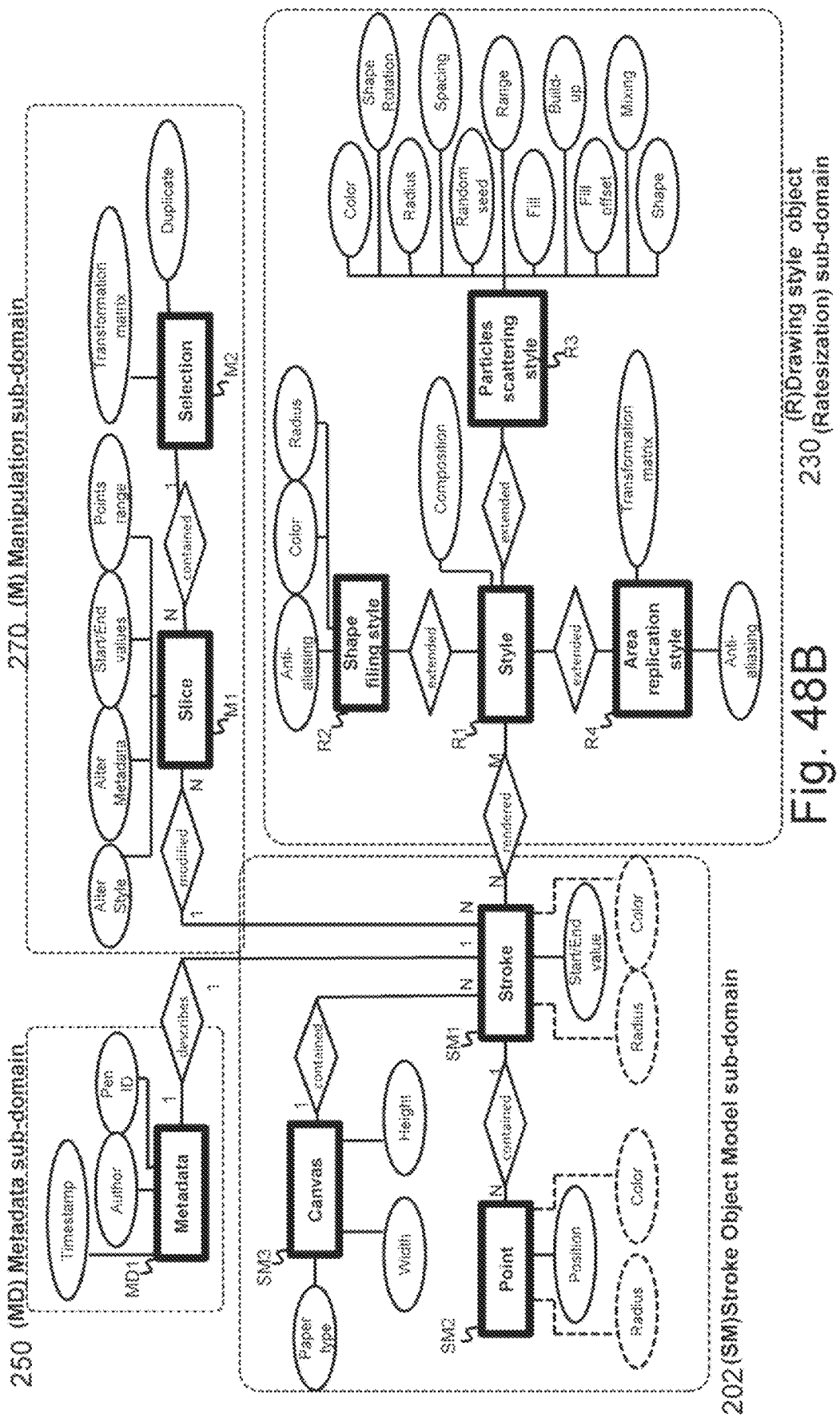
FIG. 48B is a detailed entity relationship diagram of the ink data structure of FIG. 48A.

FIGS. 48A and 48B are Entity-Relationship diagrams illustrating an information model for ink data 200 (Stroke Language) according to embodiments of the present invention.

In the figures, a box indicates an object or class used in the information model. For example, objects "stroke," "point," and "metadata" are used. The objects include class objects defined by object-oriented language as well as data structures such as a structure expressed as a collection of attribute data.

An oval in FIG. 48B indicates an attribute of an object included in a box. For example, attributes "position," "color" and "radius" are used for the data object "Point." Of attributes, those shown in solid ovals are necessary attributes for the corresponding data object. For example, attribute "position" is a necessary attribute for the data object "point." Those ovals shown in broken lines are extendable attributes which can be added. For example, attribute "color" is merely addable and not necessary for the data object "point." A diamond in the figures indicates a relationship between the data objects connected by the diamond. For example, a diamond labeled "contained" means that one of the data objects connected by the diamond is contained in the other data object.

In general, an "information model" describes and defines data semantics in an object area (domain), and represents concepts, relationships, constraints, rules and processing used in the domain. An information model provides a systematic structure that allows information requests in the context within the domain to be shared, reliably, amongst various applications and services. The ink data model outputted by the ink data processing section 100T and/or reproduced by the ink data processing section 100R is configured to be able to express a trace of a stroke inputted by a pen moved by a user, and attributes of the pen used to input a trace such as a pen type (pencil, brush, etc.) and a pen color.

FIG. 48A illustrates four sub-domains in the information model for the ink data 200. The information model for ink data 200 can be conceptually categorized into the following four sub-domains based on the functions and purposes of various data objects:

(SM) Stroke Model sub-domain, which includes a stroke object 210 and a point object, both defining the position (geometry) and the layout of the ink data 200.

(MD) Metadata sub-domain, which mainly defines metadata for the stroke object 210;

(R) drawing style object 230 (Rasterization sub-domain, which mainly defines information necessary to convert the stroke data (stroke objects) to image data; and (M) Manipulation sub-domain, which includes a group of data objects for dynamically manipulating the stroke objects or the instances of the stroke objects, such as deleting, dividing, moving and copying the stroke objects.

Each of the sub-domains will be described below in additional reference to FIG. 48B.

<(SM) Stroke Model Sub-Domain>

The Stroke Model sub-domain includes stroke object 210, point objects, and canvas objects.

Figure 48C:
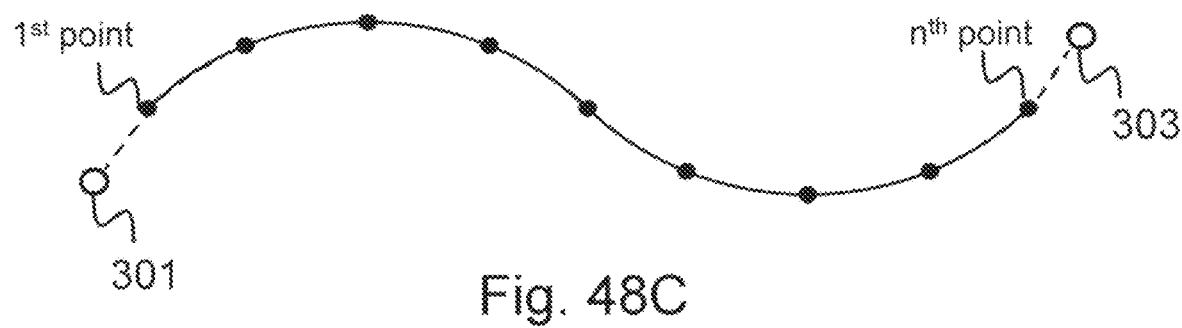
FIG. 48C is a graphical representation of a stroke object.

(SM1) A stroke object 210 is an essential component of the ink data model and forms the core of the ink data 200. FIG. 48C illustrates the structure of a stroke object 210. A stroke object 210 includes point objects of the "1st point" through the "n-th point" which collectively define the geometry of a stroke. The stroke object 210 corresponds to data tagged with "trace" in InkML (D1), "Path" in SVG 1.1 (D3), and "Canvas Path" in HTML 5 (D4) specifications.

A stroke object 210 may include startParameter 301 and endParameter 303 values as object attributes, as described above in reference to the first embodiment. In a stroke object 210 including the startParameter 301 and endParameter 303 as attributes, the startParameter 301 and endParameter 303 are defined separately from the point objects. The stroke object 210 may include, as extendable attributes per stroke, "color" and "radius" (may be substituted with "width" for convenience) attributes. These attributes will be described in detail below.

(SM2) A point object is an object such that N number of point objects are contained in one stroke object 210. A point object includes as a necessary attribute a "position," which indicates a position in a given (e.g., 2D) coordinate system. The point object may include, as extendable attributes, "color," "radius," etc. The "color" may be set per point, or may be set per stroke.

When the same attribute (e.g., color) is defined for multiple data objects in a conceptual tree structure, the attribute given to a lower-level object (e.g., objects closer to the point objects) is given priority. For example, if the color of a stroke (R, G, B and transparency alpha ($\alpha$)) is expressed in a 4D vector (R1, G1, B1, $\alpha$1), and if the color of the 3rd point in the stroke is defined as (R2, G2, B2, $\alpha$2), the color of the 3rd point is determined to be (R2, G2, B2, $\alpha$2). As another example, if the color attributes vary between a shape-filling rasterization (drawing style) object to be applied to a stroke object 210 and the stroke object 210 itself, the color attribute of the stroke object 210 itself takes priority.

The stroke object 210 or the point object may be considered as possessing the "addition" command itself. Each time a new stroke object 210 or a new point object is generated, it commands that the new stroke object 210 or the new point object be added to the data structure.

(SM3) A canvas object indicates the size of a drawing area ("canvas") used when one or more strokes are inputted, and includes as attributes width "W" and height "H," for example. It may also indicate the amount of ink absorption per type of paper, such as Japanese paper, carbon paper, regular paper, copy paper, photographic paper, etc. Paper type information can be combined with rasterization (drawing style) objects to determine the actual image representation of the ink data 200.

Figure 48D:
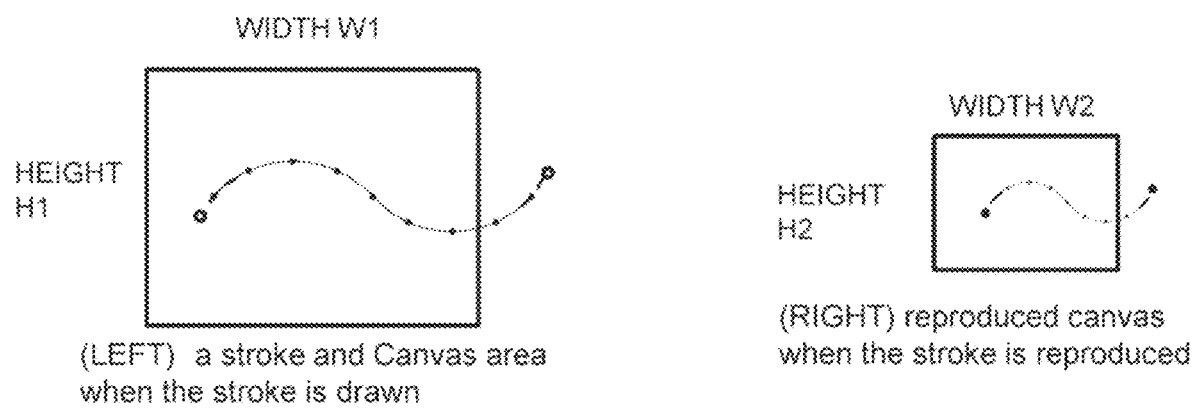
FIG. 48D is a diagram that explains a Canvas object.

FIG. 48D illustrates a canvas object. The drawing on the left indicates the size of a drawing area when a stroke is inputted. It illustrates that the stroke is inputted to the drawing area defined by width "W1" and height "H1." The drawing on the right illustrates how the canvas size (W1, H1) obtained from the ink data 200 may be used to reproduce the stroke. In the illustrated example, it is assumed that the stroke is reproduced on a device, such as a mobile terminal, including a smaller drawing area having width "W2" and height "H2" than the area (W1, H1) used when the stroke is originally drawn. In such a case, the original drawing area (W1, H1) and the relative size/position of the stroke to the original drawing area may be used in enlarging, reducing (shrinking), cropping or offsetting the stroke to fit the given canvas area of the rendering device (W2, H2).

<(MD) Metadata Sub-Domain>

The Metadata sub-domain includes metadata objects 250 that each defines metadata for a stroke object 210, wherein the metadata includes context information (INPUT 2) regarding the pen event data used to generate the stroke object 210.

(MD1) A metadata object 250 has a one-to-one relationship to a stroke object 210 to "describe" the stroke object 210.

Figure 48E:
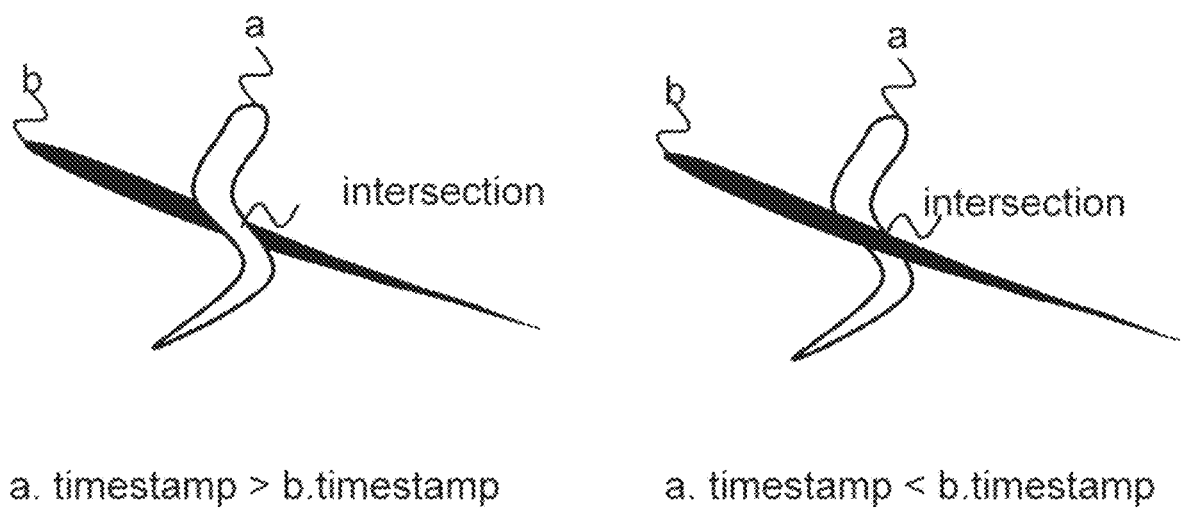
FIG. 48E is a diagram that explains a Metadata object.

1) A timestamp attribute contains time information at which the stroke was recorded and represents, for example, a value of UNIX time in a defined format (32-bit unsigned integer). FIG. 48E illustrates the effect of using a timestamp attribute per stroke. Assume that two strokes a and b were recorded by two separated users substantially simultaneously. The drawing on the left shows that stroke a was drawn after stroke b, i.e., the timestamp value for stroke a is greater than the timestamp value for stroke b. The drawing on the right shows that stroke a was drawn before stroke b, i.e., the timestamp value for stroke a is less than the timestamp value for stroke b. Based on different timestamp values respectively associated with different strokes, it is possible to accurately render strokes entered by multiple users by determining which stroke should be placed above other stroke(s) at each cross-section, for example.

2) An author attribute contains information specifying the author who has recorded a stroke.

3) A pen ID attribute is information that specifies a pen used to record a stroke. Ideally, an ID is globally unique to each pen. When ID information is not available or when pen ID needs to be robustly established, pen ID may be used in connection with a sensor-side ID of a sensor used to detect input made by the pen.

Using the attributes described above, stroke metadata may describe, as non-limiting examples, when and by whom a stroke was drawn using which particular pen.

<(R) Drawing Style Object (Rasterization) Sub-Domain>

The Drawing style object (Rasterization) sub-domain includes a group of drawing style objects 230 that each retains what qualifying or modifying process(es) were associated with a stroke object 210 when the stroke was inputted. A drawing style object 230 is built from context information (INPUT 2) regarding the pen even data based on which the stroke object 210 is generated. For example, drawing style objects record various qualifying or modifying processes associated with (applied to) strokes such as different drawing tool attributes (brush, pencil, crayon, etc.) and different pen tip width. The following objects (collectively called "drawing style objects") may be part of the Rasterization sub-domain.

Figure 48F:
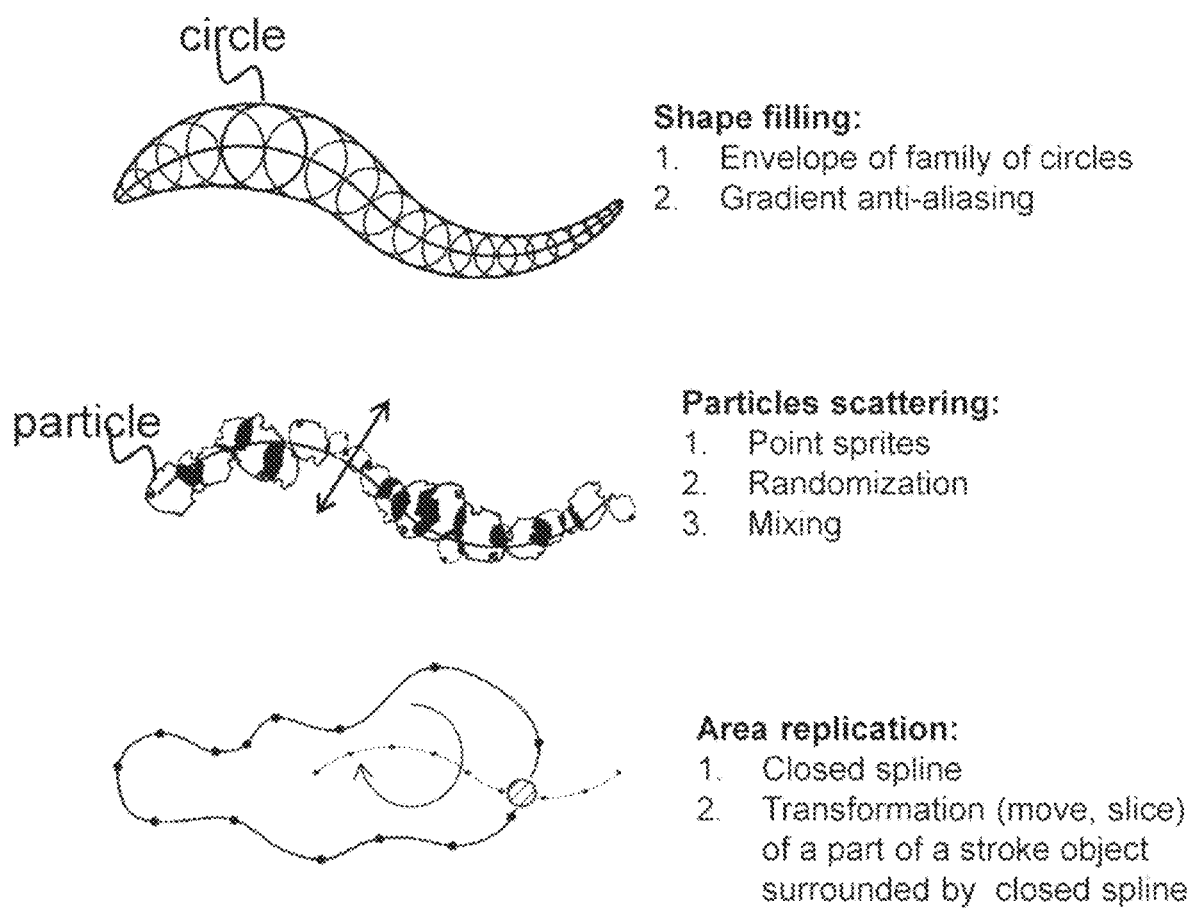
FIG. 48F is a diagram illustrating rendition results of three different drawing style objects as seen on a screen.

(R1) A rasterization style object is a "rendering" object that has an M:N ratio relationship to a stroke object 210. For example, M (e.g., 5) number of style objects (including their extendable objects) may be applied to render N (e.g., 20) number of stroke objects. The style object is a so-called super-class object, whose attributes may be inherited by other object classes such as a shape filling style object in an extended relationship. The style object includes "composition" as an attribute. "Composition" indicates what type of function (e.g., normal, multiply, min, max of the current and previous strokes, erase, etc.) is to be used when blending a stroke with previously-created strokes or with background. FIG. 48F includes conceptual illustration of three representative objects that extend the style object to qualify or modify a stroke object 210: a shape filling style object, a particles scattering style object, and an area replication style object.

(R2) A shape filling style object, as illustrated at the top in FIG. 48F, is applied to a stroke object 210 to define the stroke outline and color when the stroke object 210 is rendered (drawn) on a screen. The shape filling style object defines multiple circles to be respectively positioned relative to multiple point objects that form the stroke object 210, wherein each circle may be associated with radius and color attributes when each point object is not associated with radius and color attributes. Use of the radius and color attributes to define a point object or a stroke object 210, which consists of multiple point objects, is one of the characteristics of the present invention and will be described in detail below. A shape filling style object may also include an anti-aliasing attribute that defines what algorithm should be used to visually eliminate edges of the stroke outline which is defined by an envelope of a series of overlapping circles.

(R3) A particles scattering style object, as illustrated in the middle of FIG. 48F, uses a "particle" instead of a circle used in the shape filling style object described above. A particles scattering style object includes "radius" and "color" attributes, similarly to the shape filling style object described above.

The particles scattering style object also includes an attribute "Random Seed" (see FIG. 48B), which is an integer value and used to generate pseudo-random numbers in order to simulate "roughness" or "splashes" for tools like a pencil or a watercolor brush. The "random seed" attribute is stored in a file format in order to be able to exactly render the same drawing every time when the user opens the file or remote user receives the ink data.

Attribute "Shape Rotation" indicates whether each particle is to be rotated at a random rotation angle or to be rotated along a certain trajectory.

Attribute "Spacing" indicates the distance between two consecutive particles.

Attribute "Range" indicates each particle's offset value in a direction perpendicular to the trajectory direction, as indicate by an arrow in FIG. 48F. Within the width defined by the arrow, the location of a particle may be randomly offset (changed) based on a random number generated based on the random seed.

Attribute "Fill" defines texture to be applied to the shape, such as hatching.

Attribute "Fill Offset" indicates a cut-out position of texture applied to the shape such as hatching, and is used to define and change the cut-out position to avoid the same texture being consecutively applied.

Attribute "Build up" indicates whether the number of generated particles is to increase according to passage of time when a pen is situated at a fixed point for a continuous period of time.

Attribute "Mixing" defines what type of function (e.g., normal, multiply, none, etc.) is to be used to calculate the color of a position where two consecutive particles overlap with each other. For example it may define that the color should be the same as one of the particles' color or a darker color (e.g., mixture of the two colors).

(R4) An area replication style object, as illustrated at the bottom of FIG. 48F, is used to extend a style object. An area replication style object sets an area defined by closed curves interpolated between points. Attribute "transformation matrix" retains an affine transformation matrix to be applied to the content within the area enclosed by the closed curves. Based on the transformation matrix, the area content may be rendered to a different coordinate. Transformation based on the matrix only impacts the rendering style of a stroke object 210, and does not manipulate or modify the stroke object 210 itself.

<(M) Manipulation Sub-Domain>

The Manipulation sub-domain defines a transform (or a manipulation object) to manipulate (divide, delete, copy and paste, modify, etc.) a whole or a part of a pre-existing stroke object 210 generated according to the ink data model.

Figure 48G:
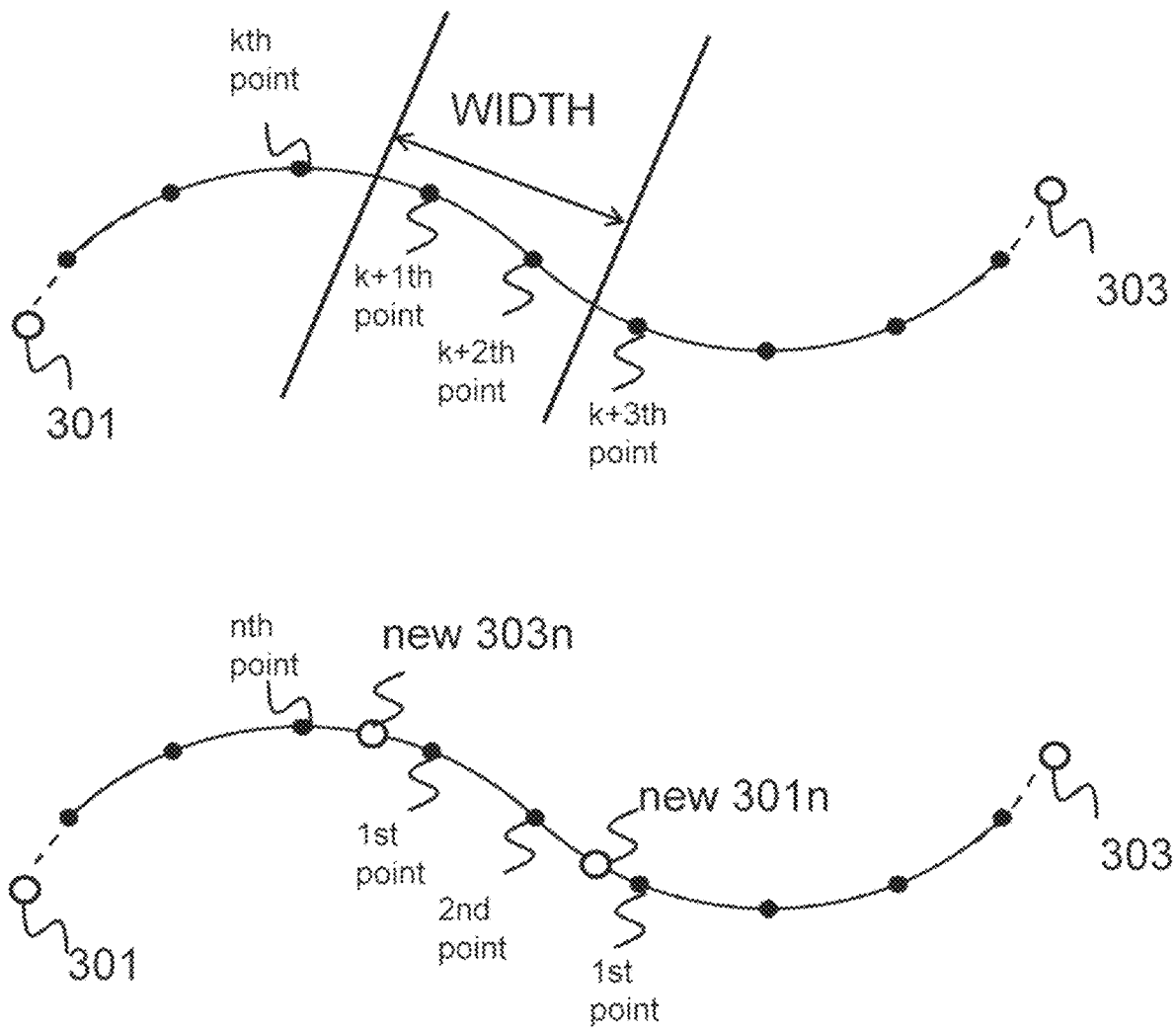
FIG. 48G is a diagram that explains operation of a manipulation (slice) object.

(M1) A slice object 274 is a manipulation object 270 to be applied to extract one or two portions of a stroke object 210. FIG. 48G illustrates the operation of a slice object 274. The drawing at the top in FIG. 48G illustrates a stroke object 210 before the slice object 274 is applied. The slice object 274 is represented by another stroke having "WIDTH" which crosses (intersects) the stroke object 210. The slice object 274 having "WIDTH" is typically associated with a "delete" function. The positions on the stroke object 210 at which the slice object 274 having "WIDTH" intersects are located, respectively, between the k-th point and the (k+1)-th point, and between the (k+2)-th point and the (k+3)-th point. The original stroke curve is generated by interpolating each point with a Catmull-Rom curve, and in order to cut the stroke into two strokes without modifying the shape of the original stroke, when the stroke is sliced, no new end point objects are generated for the newly created end points. Instead, a value for the new endParameter 303*n* is set as an attribute for the first stroke, and a value of the new startParameter 301*n* is set as an attribute for the second stroke object 210, as shown in the bottom drawing of FIG. 48G. The new endParameter 303*n* and startParameter 301*n* are expressed as one or several "float" point numbers indicative of an internal division point between two points defining the first displayed segment or the last displayed segment. For example, the new endParameter 303*n* for the first stroke may be defined as an internal division point between the original k-th point and the original (k+1)-th point. Thus, the shape of the original stroke can be used to represent the shapes of two newly created stokes. In some embodiments, a sliced (removed) stroke portion extending along "WIDTH" in FIG. 48G may be represented as the "third" stroke divided from the original stroke.

According to the method described above, an internal division point between two points in the original stroke is retained as an attribute (new endParameter 303*n* and new startParameter 301*n*) for the newly created (sliced) stroke. As such, no new point objects are created as a result of the slice operation and the original collection of "input points" is not modified. Accordingly, when a curve is to be derived from a collection of interpolated Catmull-Rom curves, the curve outline does not change between before and after the slicing operation.

Attributes "Alter Style" and "Alter metadata" indicate whether the attributes of plural strokes divided from the original stroke by the slice operation are altered (newly-defined) for the divided strokes (e.g., "Author" attribute), or unaltered and the same as the attributes associated with the original stroke (e.g., pen color attribute).

The start and end parameters 301 and 303 are attributes indicative of the start and end positions of two strokes, respectively, which are divided from the original stroke.

Attribute "Point Range" defines the range of points over which the crossing stroke (the slicing manipulation object) defined by "WIDTH" in FIG. 48G intersects the stroke object 210 to be manipulated. In FIG. 48G, the point range includes the (k+1)-th point and the (k+2)-th point.

FIG. 48H illustrates the "erase" function realized by applying the slicing manipulation object When such "erasing" manipulation object is applied to a pre-existing stroke object 210, the stroke object 210 is divided into two strokes—the first stroke (stroke 1) having a new endParameter 303*n* and the second stroke (stroke 2) having a new endParameter 301*n* point, with an exact portion (e.g., between P_intersect_L and P_intersect_R in Hole_segment 1801 in FIG. 18) in the middle being "erased." In this case two new strokes (stroke 1 and stroke 2) are to be generated and middle part are to be erased when this manipulation is finalized (committed) to modify the original single stroke object 210.

Figure 48I:
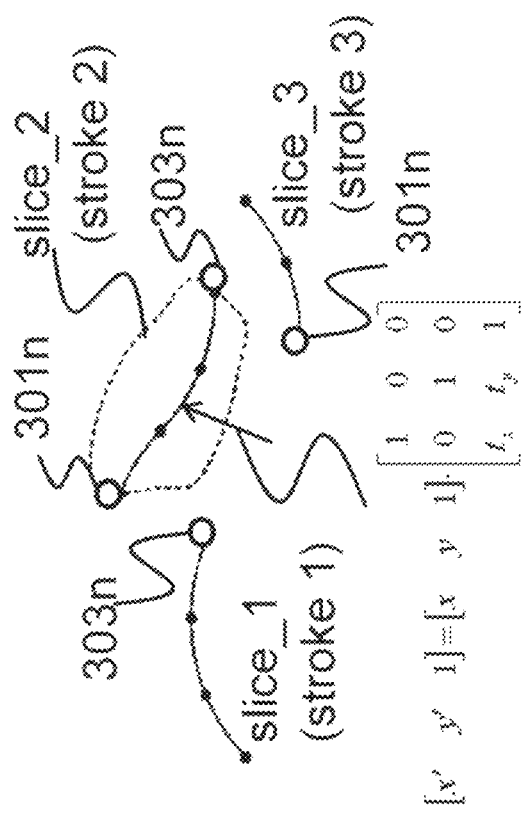
FIG. 48I is a diagram that explains operation of a manipulation (select and transform) object as applied to a pre-existing stroke object.

(M2) A selection object, as illustrated in FIG. 48I, is a manipulation object that "contains" a plural (N) number of slice objects 274 (or slicing manipulation objects). The selection object "selects" an area (slice_2) enclosed by the plural (N) number of slice objects 274 (slice_1, slice3, and slice_3), such that any portion of pre-existing stroke object 210 inside the selected area can then be manipulated (moved, copied, enlarged, shrunk, etc.) by applying a transformation matrix for the portion In FIG. 48I, the selected area shown in a lasso shaped dotted closed curve includes a partially sliced stroke object 210, which can then be manipulated, for example, moved (translated) as illustrated in FIG. 48I.

Attribute "transformation matrix" is an affine transformation matrix. The illustrated example shows the values within the area being translated by tx and ty. When a matrix object is used to define certain manipulation, it is possible to express points within an area (slice_2) as if they have virtually moved to different locations. In this case three new strokes (stroke1, stroke2, and stroke3) are to be generated when this manipulation object is finalized (committed) to modify the original single stroke object 210.

Attribute "Duplicate" indicates whether to retain an object at the original position (before transformation) even after application of an affine transformation matrix to virtually move the object to a different position. For example, by retaining the original position/area in addition to the virtually-moved new position/area, it is possible achieve copying wherein the original position/area is copied onto the new position/area.

Figure 48J:
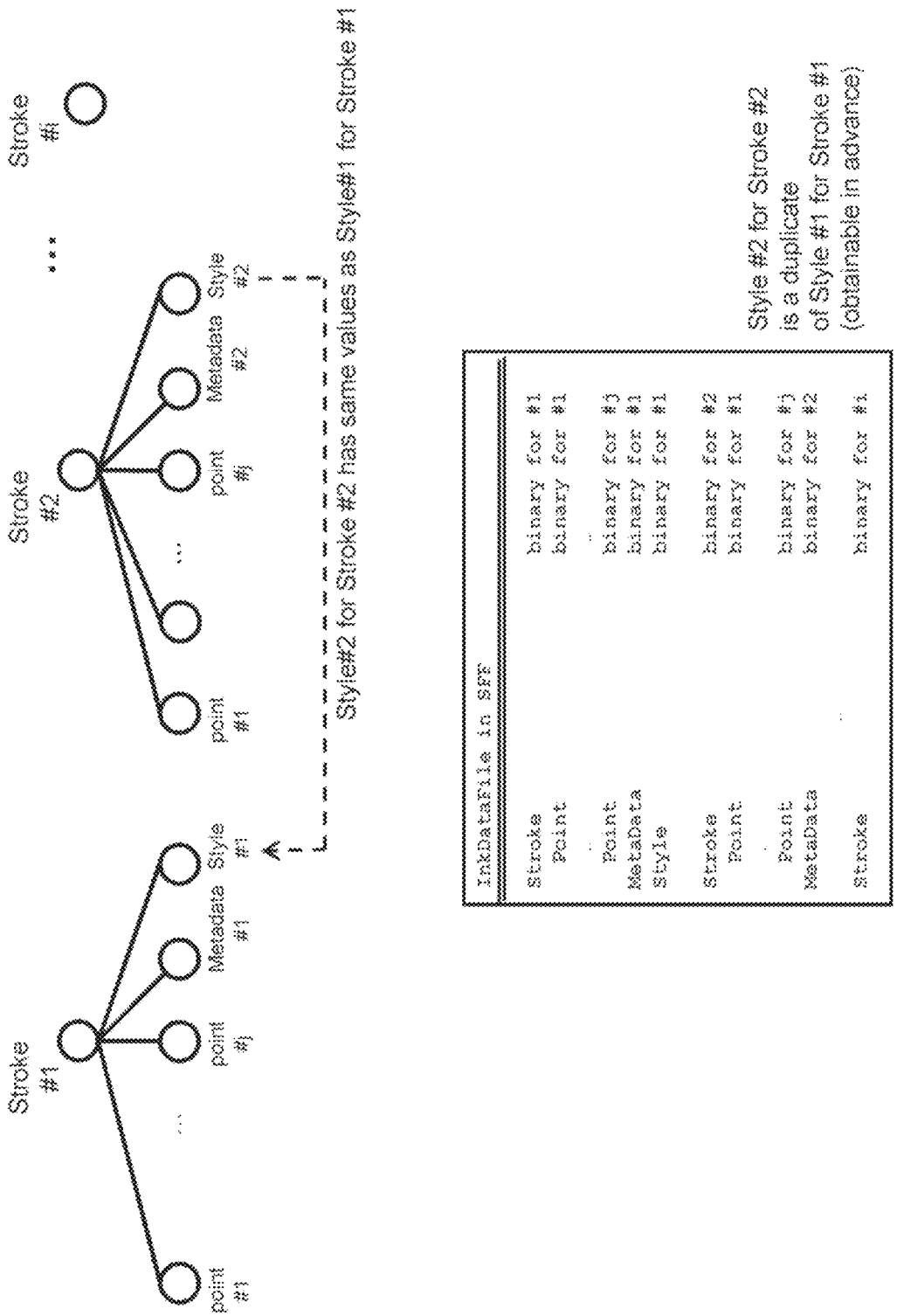
FIGS. 48J-48L illustrate syntax of an ink data structure arranged in a stroke file format (SFF) according to third embodiments of the present invention.
Figure 48K:
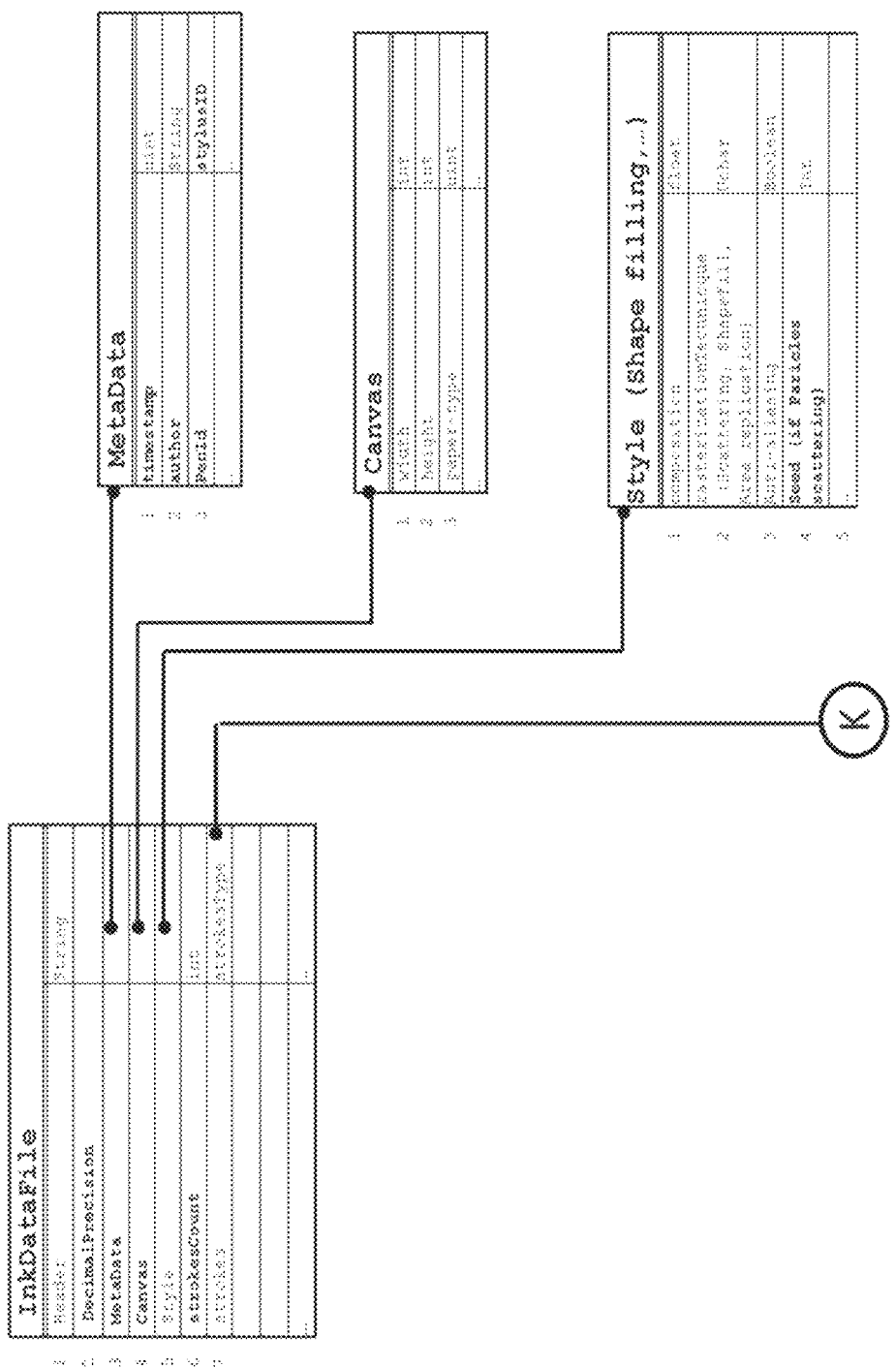
Figure 48L:
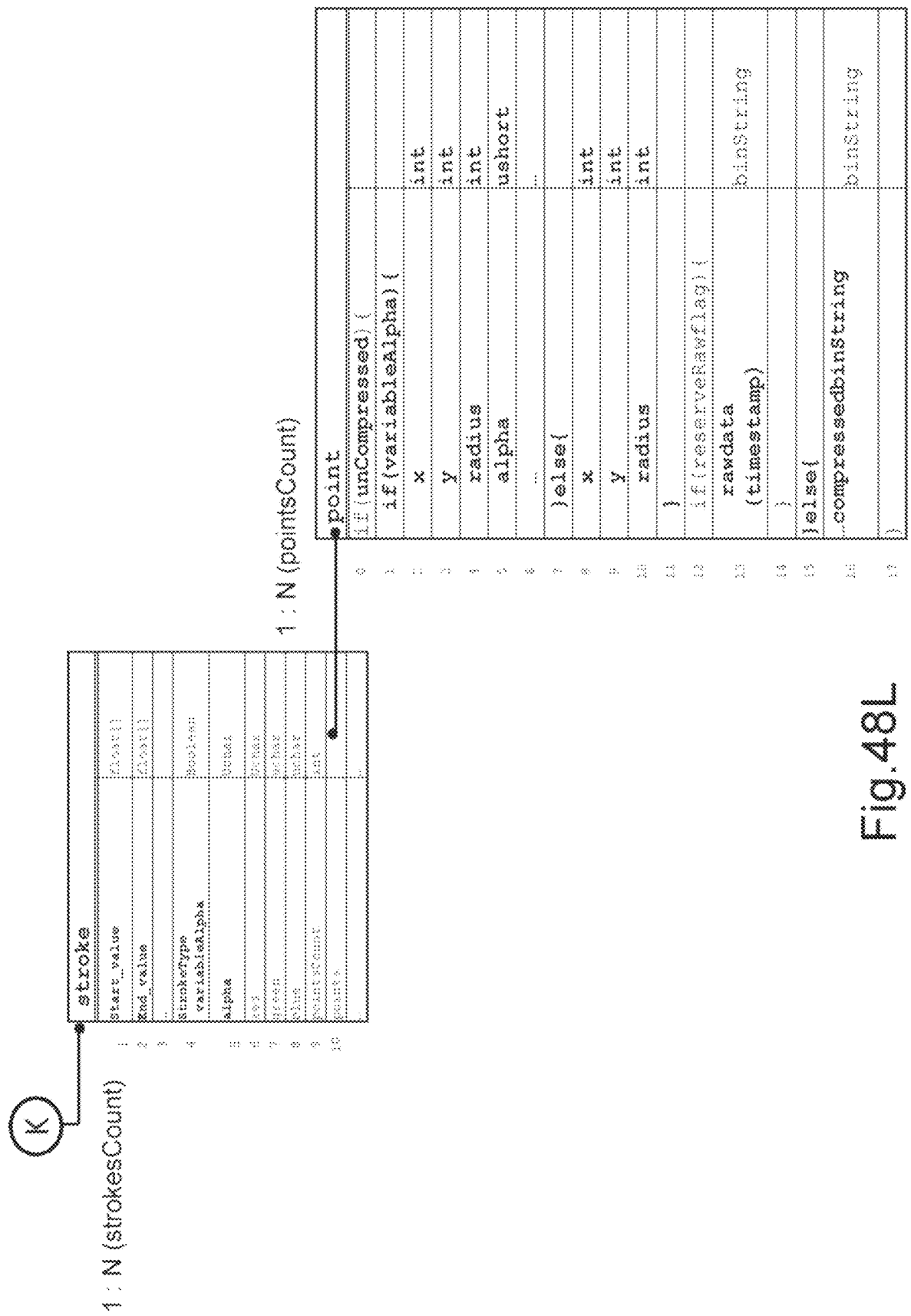

[2-2] Sample Stroke File Format (FIGS. 48J-48L)

FIG. 48J illustrates the ink data structure (object tree) generated or handled by the ink data processing section 100 (100T or 100R), according to the definition of the ink data model as shown in FIG. 48B, as well as a stroke file format (SFF) file in which the ink data structure is serialized and persisted, according to embodiments of the present invention.

The upper portion of FIG. 48J illustrates an ink data structure generated by the ink data processing section 100 in its internal processing resource, such as in memory space. For example, the stroke object 210 is instanced in #1 through #i instances. In each of i number of stroke objects, one or more point objects are instanced (point #1 through #j), and one metadata object 250 and one drawing style object 230 are defined in association with each other (in the form of an instance tree). The data structure is according to the definition of the ink data model as shown in the entity-relationship (ER) diagram of FIG. 48B. In FIG. 48J, stroke #1 and stroke #2 include differently-named style objects (style #1 and style #2), though the substantive data in each of the style objects is the same. This occurs, for example, when stroke #1 and stroke #2 are drawn using the same drawing tool (having the same pen tip type and pen color) in the same drawing application.

The bottom portion of FIG. 48J illustrates an example of a Stroke File Format (SFF) file in which the data structure shown in the upper portion of FIG. 48J is arranged. That is, for each stroke object #1 through #i, point objects #1 through #j that form the stroke object 210, the metadata object 250 that describes the stroke object 210, and the drawing style object 230 that defines how the stroke object 210 is rendered (drawn) on a screen are defined in the SFF file. As shown, one file named "InkDataFile" contains information about a plurality of strokes #1 through #i.

<Information about Stroke #1>
(1) First, information regarding stroke #1 itself is described. The information may include byte sequence(s) (or binary sequence(s), herein interchangeably used) in which attributes of stroke #1 such as a startParameter 301 and an endParameter 303 of stroke #1 are encoded. The information also includes byte sequence(s) in which a group of point objects #1 through #j that form stroke #1 are encoded.
(2) Second, byte sequence(s) are included, in which a metadata object 250 that "describes" stroke #1 is encoded.
(3) Third, byte sequence(s) are included, in which a drawing style object 230 that "renders" stroke #1 is encoded.

<Information about Stroke #2>
The same formatting process is performed for stroke #2, as in the case for stroke #1 above. In the example of FIG. 48J, the values of drawing style object #1 are the same as the values of drawing style object #2. In this case, it may be preferable not to repeat the same values in a persisted file format (SFF) to save file space and to avoid redundancy. Thus, the same values are not repeated as drawing style object #2 and, as shown, no drawing style object is included after the metadata object #2. On the reproduction side, the ink data processing section 100R will continue using the same drawing style object #1 to render each stroke object 210 until a new (different) drawing style object 230 is found. That is, the file generation side and the reproduction side may agree in advance that, in case a style object is omitted for a stroke object 210, the same style object used for the previous stroke object 210 is to be used.

FIG. 48K illustrates a data type of each class when each class of data object (a metadata object 250, a canvas object, a drawing style object 230) is serialized and stored in an SFF file. In FIG. 48K, the "InkDataFile" is an object located at a data structure root.

In FIG. 48K, the first line of each block indicates the name of an object defined according to the ink data model of the present invention. The second and subsequent lines in each block indicate attributes of the named object in the left column and their data types (integer, unsigned Char, etc.) in the right column. The attributes may be encoded using a suitable method, such as ASN.1, BER and DER encoding methods, or encoding methods shown in a schema file of FIG. 10 of the first embodiment such as "sint32-type" and "float."

The semantics of attributes explained in FIG. 48K are the same as the attributes described above in reference to FIG. 48B, except for a portion of the information that is needed for the purpose of persisting the ink data 200, such as "strokeCount" which indicates how many stroke objects are included in a given SFF file.

Data object InkDataFile at the root of the structure includes binary sequence(s) that are persisted in a file according to embodiments of the present invention.

In the first line, "Header" is a data needed for the purpose of persistently storing InkDataFile, and includes information regarding the version of the ink data model definition, etc., for use in processing subsequent binary sequence(s). The header may further include information such as whether data is compressed or not, a binary encoding method used, and other information needed for the application 300 or the reproducer 100R to reproduce the ink data 200 as intended by the ink data generation side.

In the second line, "DecimalPrecision" indicates the accuracy level of values, such as positional coordinate values, which are expressed as decimal numbers in the recording format. "DecimalPrecision" corresponds to the parameter in line 4 of FIG. 10 of the first embodiment described above. The "DecimalPrecision" is not defined in the ink data model, but is a piece of data needed for the purpose of persisting InkDataFile. Use of the "decimalPrecision" is one of characteristics of the present invention and will be described in detail below. The decimalPrecision numbers (or accuracy values) correspond to reciprocal numbers of resolution. For example, when positional coordinate values are obtainable at resolution of 0.01 units (0.01 pixels, for example), the accuracy value expressed as decimalPrecision may be set as 100 (reciprocal of 0.01). For the purpose of more optimal storage, decimalPrecision value may be expressed in an exponential form. For example, value 100 can be expressed as the exponent 2 of a base 10 (in some cases the base might be omitted). Use of the accuracy value in the ink data generating and reproducing methods according to embodiments of the present invention will be more fully described below in reference to FIGS. 58 and 66.

In the third line, "MetaData" corresponds to the metadata object 250 explained above in reference to FIGS. 48B and 48E.

In the fourth line, "Canvas" corresponds to the canvas object explained above in reference to FIGS. 48B and 48D.

In the fifth line, "Style" corresponds to the (drawing) style object explained above in reference to FIGS. 48B and 48F.

In the sixth line, "strokesCount" is a piece of information necessary for the purpose of persisting InkDataFile, and is a code or an integer value that indicates the number of strokes included in the particular InkDataFile. As such, this attribute is not included in the ink data model itself. Typically, the strokesCount is added to the ink data code sequence(s) when they are not to be dynamically modified but instead outputted to static, storage-type media (a file, disk, etc.). Alternatively the strokesCount is not set or includes no value (NULL), for example, when the ink data 200 is to be continuously outputted for real-time communication with a remotely-located ink data reproducing device.

In the seventh line, "strokes" relate to a group of object instances "strokes" (or stroke objects) that are included in the ink data model, wherein each "stroke" (each stroke object 210) contains one or more point objects and various attributes, as will be described in FIG. 48L.

FIG. 48L illustrates information included in each of strokes 1 through N (strokesCount) number of stroke objects. In the first and second lines, "Start_value" and "End_value" correspond to the startParameter 301 and endParameter 303 described above in reference to FIG. 48C. As described above in reference to the first embodiment, these two parameters are stored as attributes of stroke object 210 separately from the point objects included in the stroke object 210.

In the fourth line, "StrokeType variableAlpha" indicates whether the transparency (alpha) associated with the stroke is variable along the length of the stroke. "VariableAlpha" is a flag that indicates whether the transparency of a stroke object 210 is allowed to vary along its length or not (i.e., fixed), and is typically expressed as a Boolean value (TRUE or FALSE). In some embodiments, the attribute "StrokeType variableAlpha" does not exist in the ink data model itself as shown in FIG. 48B, and is used when the stroke objects are persisted in an SFF file (InkDataFile). Use of "variableAlpha" in various embodiments of the invention will be described in detail below.

The fifth through eighth values—"alpha," "red," "green" and "blue"—together constitute the "color" attribute of the stroke object 210.

In the fifth line, "alpha" indicates a fixed transparency value (or opacity/ink darkness value) to be used in case "alpha" of the stroke is not variable, as indicated by "variableAlpha=false" for example. When "alpha" is fixed, the fixed "alpha" is applied along the length of the stroke object 210, i.e., to each of the point objects that form the stroke object 210.

In the sixth through eighth lines, "red," "green" and "blue" are information for determining color data of the stroke object 210 when an RGB color space is used.

In the ninth line, "pointsCount" indicates the number of points included in the stroke object 210. Similarly to "strokesCount" described above, "pointsCount" is used for the purpose of persistenting InkDataFile in an SFF file and may be determined at a timing when the ink data 200 is to be outputted to static, storage-type media (as opposed to more transitory, real-time communication type media). Alternatively, "pointsCount" may not exist in the data structure or may include no value (NULL), for example, when the ink data 200 is to be outputted instead to real-time-type media.

In the tenth line, "points" indicate information regarding each of the point objects that form the stroke object 210.

A point object ("point" in FIG. 48L) is a data object that includes information regarding each of 1 through N (pointsCount) number of points included in the stroke that is being processed. As shown in FIG. 48B, in one stroke object 210, N (pointsCount) number of point objects are included.

In the first line of the box defining "point," "if" phrase means that syntax changes for each "point" data object depending on the variableAlpha value (TRUE or FALSE) indicating whether the stroke includes a length-wise variable alpha or not.

(i) The second through sixth lines indicate data included in "point" data object in case variableAlpha value is TRUE (i.e., the stroke includes a length-wise variable alpha value).

In the second line, "x" indicates a first coordinate value of the point that is being processed.

In the third line, "y" indicates a second coordinate value of the point being processed.

Thus, "x" and "y" together define 2D coordinates of the point.

In the fourth line, "radius" indicates the size of a radius of a circle that includes the point as a center. "Radius" is an attribute associated with a point object, and is not necessarily associated with a pen pressure value or pen tip force. Rather, "radius" is a generalized higher concept having semantics that encompass lower concepts such as the concept of pressure and force, as will be more fully described below.

In the fifth line, "alpha" indicates an alpha value associated with the point object.

It should be noted that the data type of the data included in the second through fifth lines of the point object is either an integer (int) or a ushort (or uchar), as opposed to a floating point (float) data type typically used in drawing processing applications, as will be more fully described in reference to FIG. 58 below.

(ii) The seventh through eleventh lines indicate data included in "point" data object in case variableAlpha value is FALSE (i.e., the stroke does not include variable alpha, i.e., the alpha (transparency) value is fixed for the length of the stroke).

In the seventh line, "x" indicates a first coordinate value of the point. (The same as the second line described above.)

In the eighth line, "y" indicates a second coordinate value of the point. (The same as the third line described above.)

Thus, "x" and "y" together define 2D coordinates of the point.

In the ninth line, "radius" indicates the size of a radius of a circle that includes the point as a center. (The same as the fourth line described above.)

Because in this case the stroke object 210 has a fixed alpha value to be applied to each of the point objects forming the stroke object 210, no alpha value is defined for the point object.

As described above, syntax of data object "point" changes depending on the variableAlpha value (TRUE or FALSE) indicating whether a stroke object 210 includes a variable alpha value or a fixed alpha value along the length, as will be more fully described below in reference to FIG. 57.

The twelfth and subsequent lines indicate that syntax changes for each "point" data object depending on the reserveRawflag value, to selectively include additional attributes. For example, it is possible to extend (expand) the data object to include "timestamp" information for each point, without losing the original information, when the reserveRawflag is set TRUE.

The ink data model as well as the data object InkDataFile in the stroke file format (SFF) defined by the syntax and semantics of the ink data model according to embodiments of the present invention have been described above in reference to FIGS. 48A-48L. Next, the ink data processing section 100 (100T) is described, which is operable to generate and output the ink data 200 having such data structure according to embodiments of the present invention.

[3] Ink Data Processing Section (FIGS. 49-63)

Figure 49:
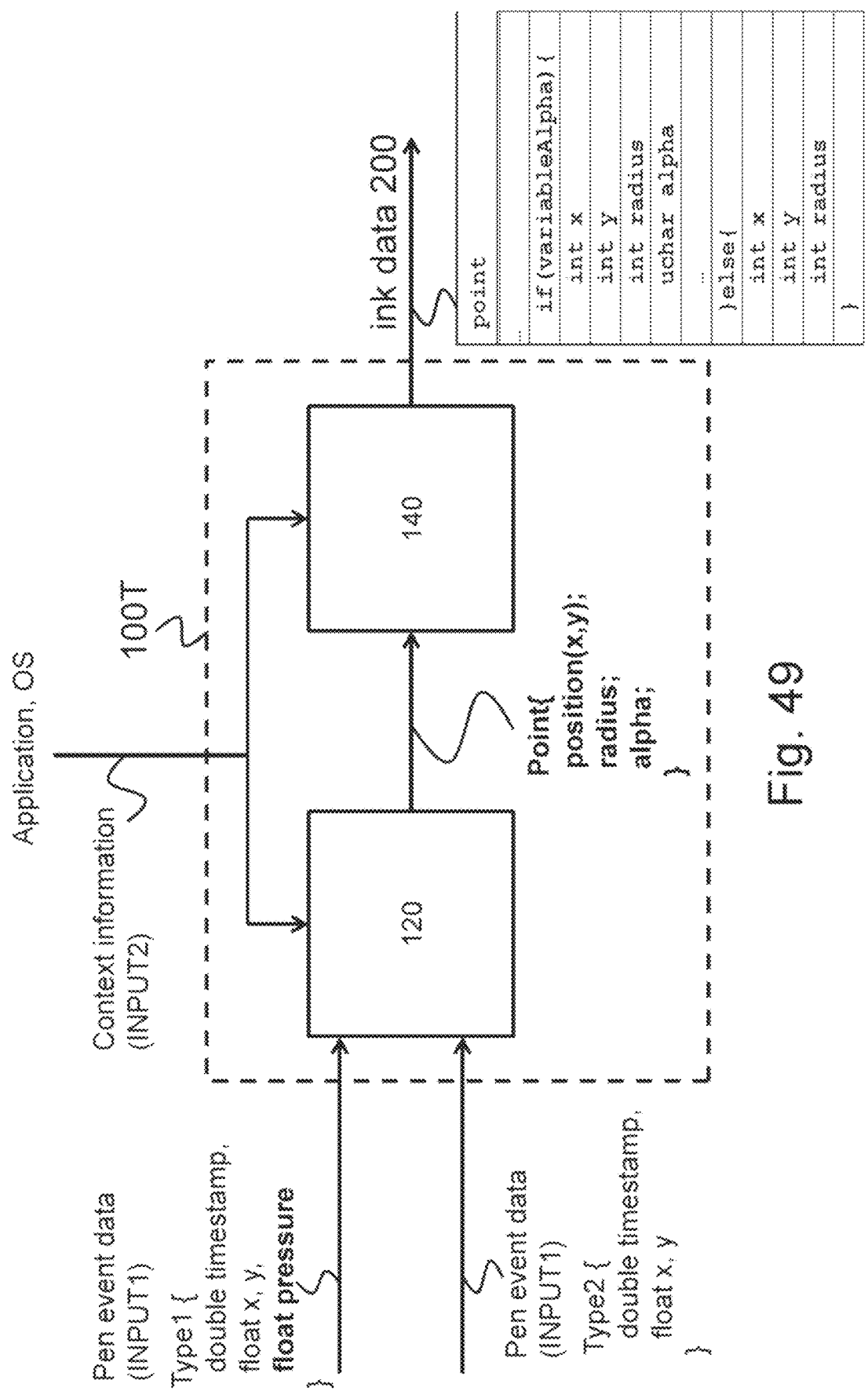
FIG. 49 is a functional block diagram of an ink data processing section according to third embodiments of the present invention.

FIG. 49 is a functional block diagram of an ink data processing section 100T according to embodiments of the present invention. Ink data processing section 100T corresponds to 100T in FIG. 5. The ink data processing section 100T generates ink data according to the definition of the ink data model as described in FIGS. 48A-48L above based on the pen event and pen event context information (INPUT 2) provided by an input device. The ink data processing section 100T outputs the generated ink data 200, for example, in an SFF file ("InkDataFile") described in FIGS. 48J-48L above, in binary sequences, byte sequences, in packets, etc.

The ink data processing section 100T includes an ink data generation section 120 and an ink data formatting section 140. The ink data generation section 120 corresponds to stroke data object handling section 122 in FIG. 7. The ink data generation section 120 receives various types of device-dependent input data ("INPUT1"), such as pen event data of Type 1 that includes pen pressure data and pen event data of Type 2 that does not include pen pressure data. In FIG. 49, pen event data of Type 1 includes timestamp information (e.g., "double timestamp"), plural sets of XY coordinates (e.g., "float x, y") and pen pressure data (e.g., "float pressure"), and pen event data of Type 2 includes timestamp information (e.g., "double timestamp") and plural sets of XY coordinates (e.g., "float x, y"). Instead of receiving the timestamp information, the ink data generation section 120 may use the time at which it receives the pen event data, for example, as the timestamp information.

The ink data generation section 120 also receives context information ("INPUT2") about the pen event data from the application or operating system used to input the pen event data. For example, in case of a stroke drawn using a drawing application, the context information (INPUT 2) may include various parameter values that are set by the drawing application to draw the stroke. That is, the context information (INPUT 2) may include configuration information defined for the purpose of generating (drawing) strokes. The context information (INPUT 2) may be provided for the pen event data of Type 1 and the pen event data of Type 2, respectively, from two different applications if the pen event data of Type 1 and Type 2 are respectively generated by the two applications. Alternatively, the context information (INPUT 2) for the pen event data of Type 1 and Type 2 may be provided by the same application or operating system commonly used to generate the pen event data of Type 1 and Type 2.

As described above in reference to the stroke object handling section 122 in FIG. 7 in the first embodiment, the ink data generation section 120, based on the received pen event data of Type 1 of Type 2 and the received context information (INPUT 2), outputs a series of point objects each including XY coordinates (position) data and radius and alpha data regarding a point. As described above in reference to data object "point" in FIG. 48L, radius is an attribute associated with a point and is not necessarily associated with pressure or pen tip force, but rather is a generalized device-independent higher concept having semantics that encompass lower level concepts such as pressure and pen tip force, according to the definition of the ink data model of embodiments of the present invention.

The ink data formatting section 140 receives the data for each point including XY coordinates and radius and alpha data of the point, formats the inputted data into a data structure corresponding to the data structure of the point object, for example as described in FIG. 48L above, and outputs the formatted data. The data in the formatted point object are of data types of "int" (integer) "ushort," "uchar," etc., as opposed to being of floating point data type ("float") typically used in drawing processing applications.

FIG. 50A is a flow diagram illustrating a process executed by the ink data generation section 120 of FIG. 49, to output radius and alpha information as attributes of a point object according to embodiments of the present invention. Description of outputting XY coordinates data (Position (X, Y)) is omitted because typically the ink data generation section 120 merely passes the XY coordinates data that it receives onto the ink data formatting section 140.

In step S1201, the ink data generation section 120 obtains necessary context information (INPUT 2) for each stroke that includes the point to be processed. Sample context information (INPUT 2) will be described below in reference to FIG. 50B.

In step S1202, it is decided whether the inputted data includes pen pressure data or not.

In step S1203, after it is decided in step S1202 that the inputted data includes pen pressure data ("TRUE"), the pen pressure data of the point may be used to derive a parameter (vn—velocity) at that point. It can be observed that when a greater pen pressure is applied at a point, the velocity at that point becomes slower. Thus, vn can be correlated generally in inverse proportion to the pressure data.

In step S1204, after it is decided in step S1202 that the inputted data does not include pen pressure data ("FALSE"), time information of the point is obtained. The time information may be received as input information for each point that forms a stroke, or may be set as the time at which the ink data generation section 120 (or the ink data processing section 100T) receives the point information.

In step S1205, velocity of the point is derived based on the time information of the point and adjacent point(s), as will be more fully described below in reference to FIG. 51.

In step S1207, radius information of the point is obtained based on vn (velocity), phase information, and pen type information, as will be more fully described below in reference to FIG. 52.

In step S1209, alpha (transparency or opacity) information of the point is obtained based on vn (velocity), phase information, and pen type information, as will be more fully described below in reference to FIG. 55.

Figure 50B:
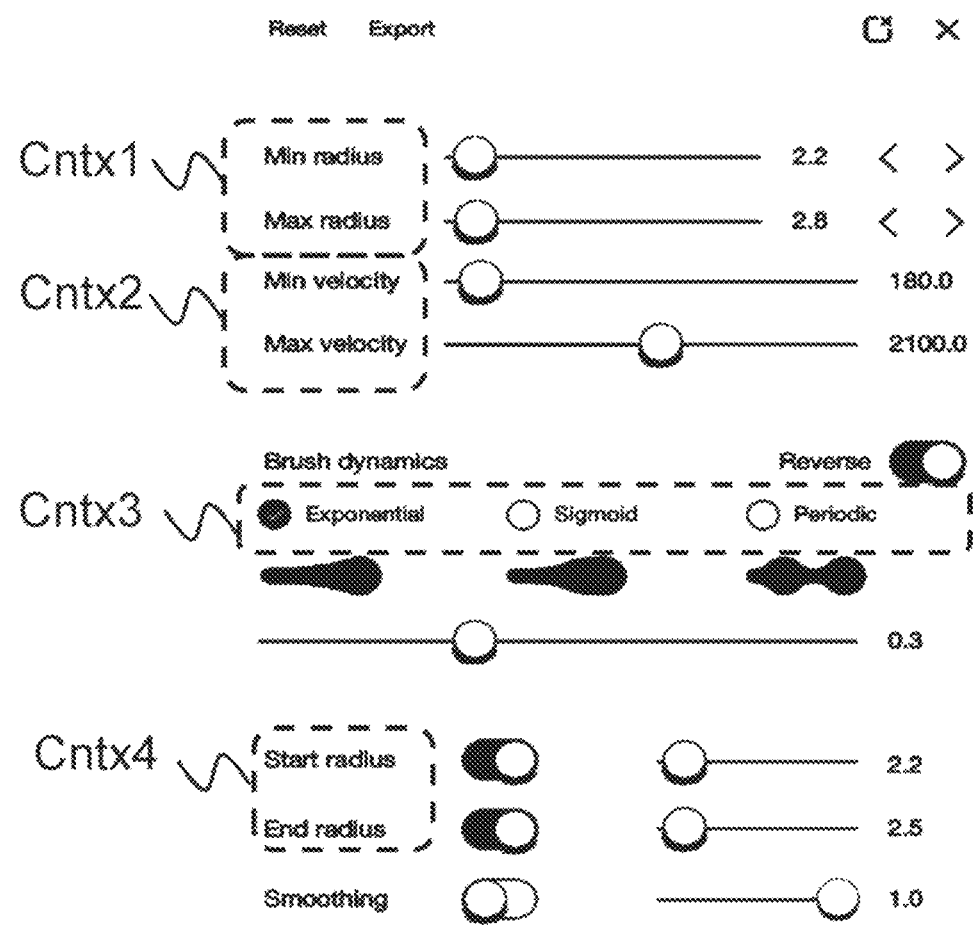
FIG. 50B illustrates sample GUI of an application or an operating system that may be used to define context information regarding pen event data.

FIG. 50B illustrates a sample GUI of an application or an operating system that may be used to set some of the context information (INPUT 2) related to the ink data generation section 120. The context information (INPUT 2) provided to the ink data generation section 120 may include, for example, the maximum and minimum radius values ("Cntx1"), the maximum and minimum velocity values associated with the maximum and minimum radius values, as will be described in reference to FIG. 51 below ("Cntx2"), functions used to derive the radius or alpha values ("Cntx3"), exceptional values that may be set for the BEGIN and END phase points of a stroke (see FIG. 53) ("Cntx4"), and pen type information (not shown). The context information (INPUT 2) may be defined in advance for the ink data generation section 120 or, as shown in FIG. 50B, may be explicitly defined by a user via the setting GUI.

Figure 51:
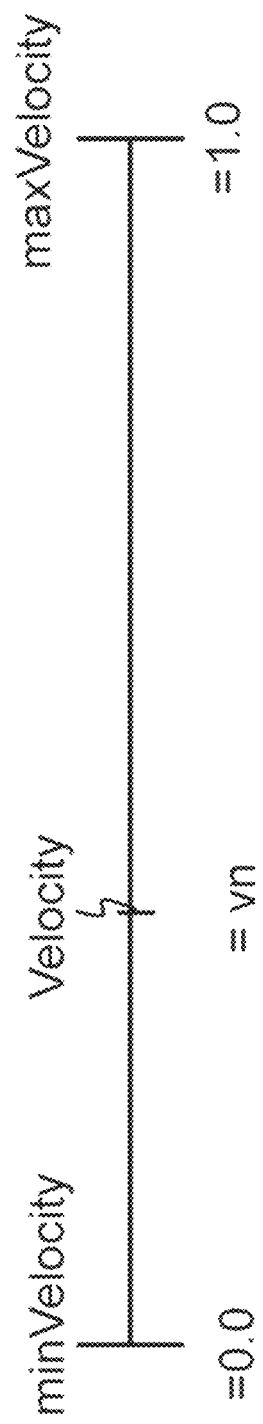
FIG. 51 is a diagram illustrating the process of deriving velocity in step S1205 of FIG. 50, according to third embodiments of the present invention.

FIG. 51 is a diagram illustrating the process of deriving velocity based on the time information in step S1205 of FIG. 50A, according to embodiments of the present invention.

Velocity is derived by dividing distance by time. The denominator of the division may be a difference between the time at which the current point coordinate is obtained and the time at which the previous point coordinate is obtained. The numerator of the division may be a difference (distance) between the current point coordinate and the previous point coordinate. When a sampling rate is fixed (when the denominator is fixed), displacement between the current point coordinate relative to the previous point coordinate may be used to indicate velocity.

In embodiments of the present invention, velocity is outputted as a parameter value (vn) with the minimum value of 0.0 and the maximum value of 1.0, i.e., as a min-max normalized velocity value, which may be set in "Cntx2" of FIG. 50B.

Figure 52:
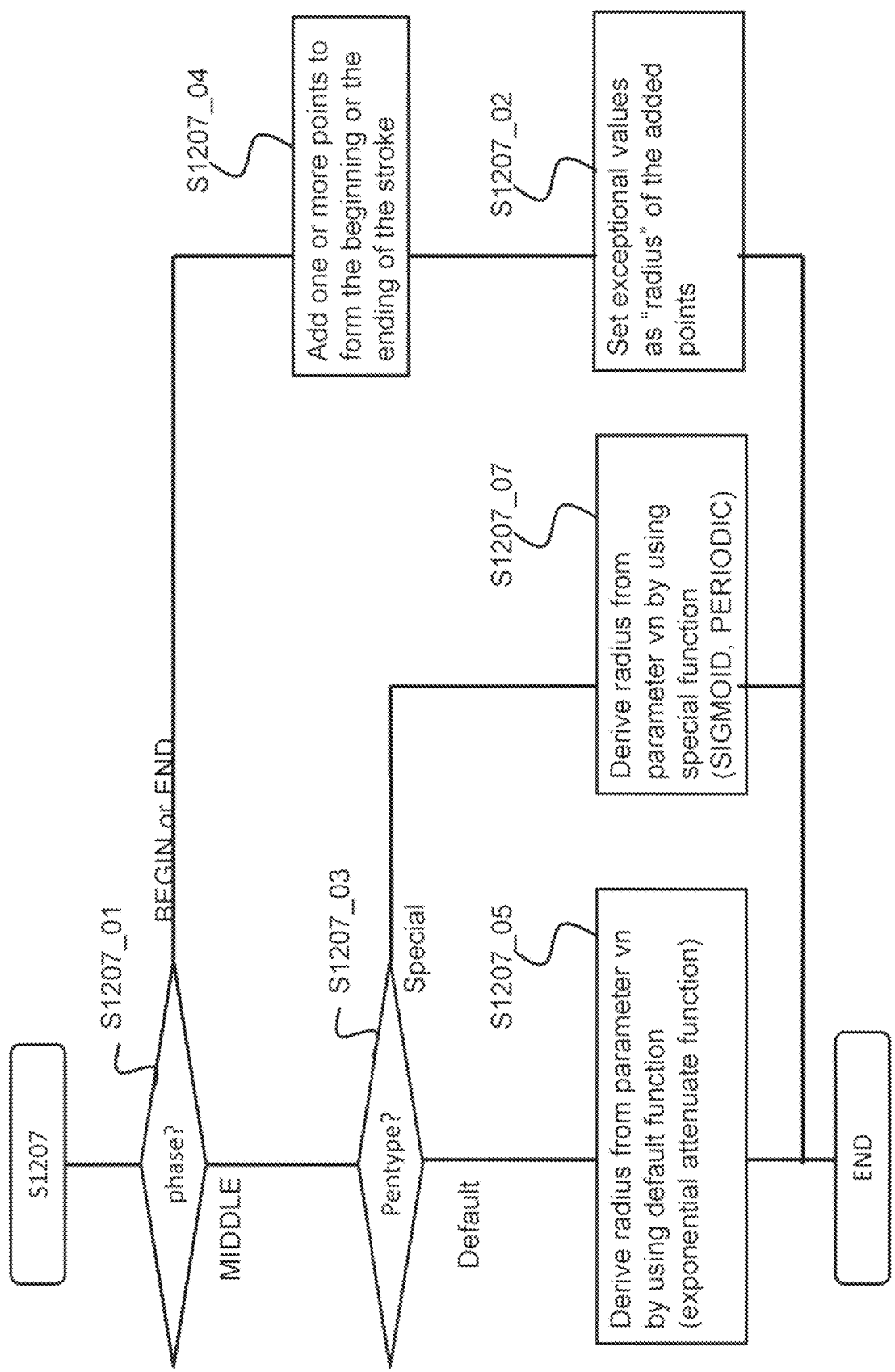
FIG. 52 is a flow diagram illustrating the process of deriving a radius in step S1207 of FIG. 50, according to third embodiments of the present invention.

FIG. 52 is a flow diagram illustrating the process of deriving a radius, which is an attribute of a point object, in step S1207 of FIG. 50A. In general a radius is derived from parameter vn, which may be a normalized velocity value calculated in step S1205 above, or may be derived from the pen pressure data in step S1203, according to embodiments of the present invention.

Figure 53:
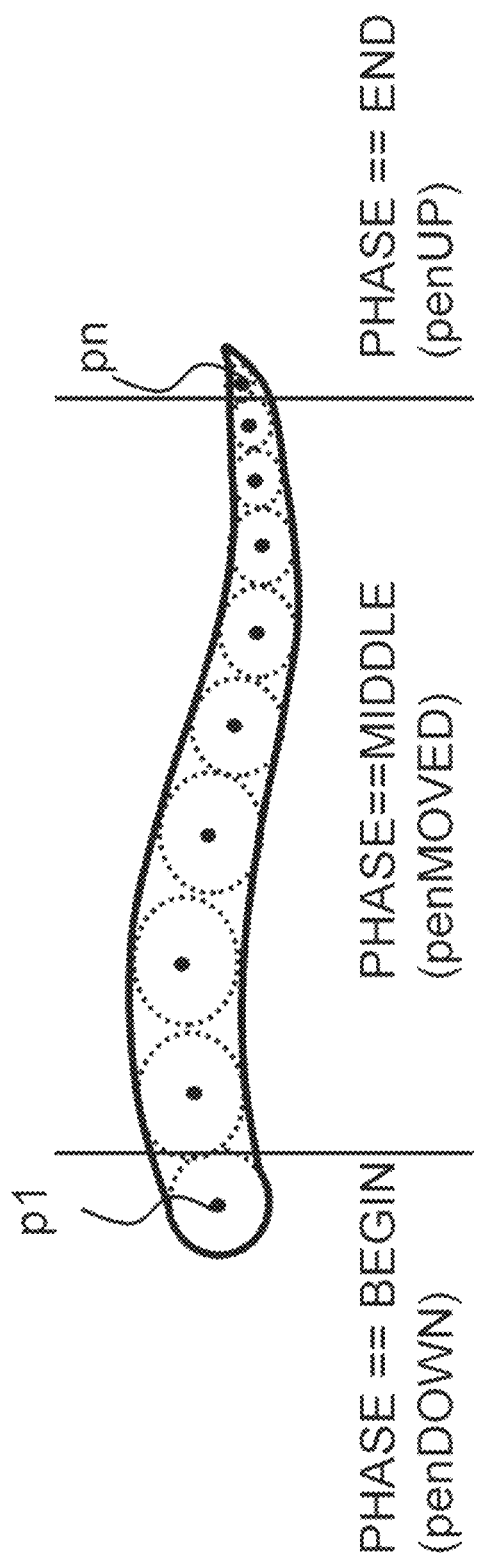
FIG. 53 is a diagram illustrating the definition of "phase" of a stroke as used in step S1207_01 of FIG. 52, according to third embodiments of the present invention.

In step S1207_01, the "phase" of a current point is determined. Referring additionally to FIG. 53, which illustrates the definition of "phase" of a point in a stroke according to embodiments of the present invention, phase is a concept that indicates where (at which position) within a stroke the current point is located. For example, the first point of a stroke is of phase BEGIN, and the last point of a stroke is of phase END. The points between the first point and the last point are of phase MIDDLE. Phase of each point can be determined for each pen event type, such as Pen Down, Pen Move and Pen Up types. A Pen Down event is an event in which a user starts to draw a stroke using a pointer (pen, finger, etc.), a Pen Up event is an event in which the user finishes drawing the stroke using the pointer, and a Pen Move event is an event that occurs between the Pen Down event and the Pen Up event.

In step S1207_04, after it is determined in step S1207_01 that the point to be processed is of phase BEGIN or END, i.e., the point is the first point or the last point of the stroke, one or more points may be added to the beginning of the stroke (ahead of the first point) and to the ending of the stroke (after the last point).

In step S1207_02, for each of the points added to the beginning or the ending of the stroke, an exceptional radius value set in "Ctnx4" of FIG. 50B is set as a radius for the point, such as a radius of 0 or a radius that is larger than (e.g., twice) the normal radius, as will be more fully described below in reference to FIG. 72.

In step S1207_03, after it is determined in step S1207_01 that the point to be processed is of phase MIDDLE, i.e., the point is neither the first point nor the last point of the stroke, the pen type of a pen being used to enter the pen event data is determined.

Figure 54:
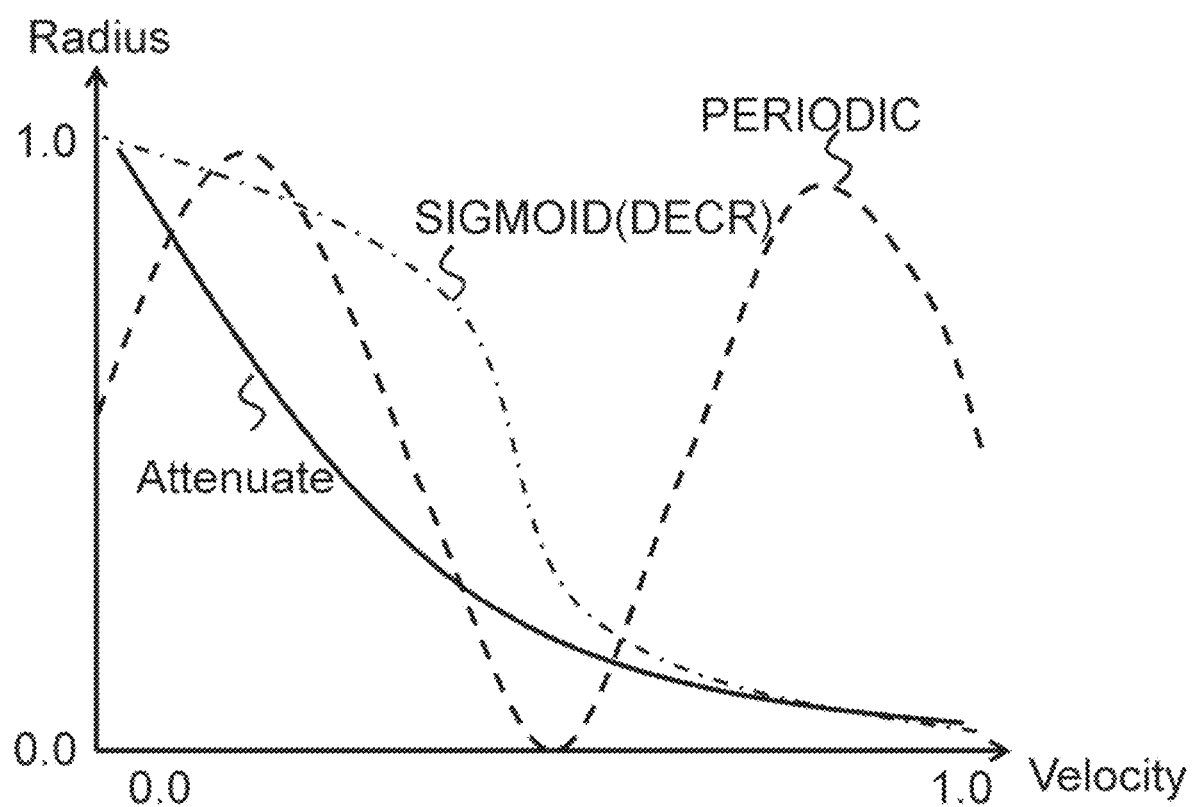
FIG. 54 is a graph that illustrates three functions for deriving a radius from a parameter (velocity), as used in steps S1207_05 and S1207_07 of FIG. 52, according to third embodiments of the present invention.

In step S1207_05, after it is determined in step S1207_03 that the pen type is normal (default), a radius is derived from parameter vn using a normal (default) function, such as the exponential attenuation (or damping) function of FIG. 54 (see "Attenuate" in FIG. 54).

In step S1207_07, after it is determined in step S1207_03 that the pen type is special, such as a pen having a particularly soft pen tip, a radius is derived from parameter vn by using a special function such as "Sigmoid" and "Periodic" functions in FIG. 54. Any of the normal or special functions may be explicitly defined or modified as part of the context information "Cntx3" of FIG. 50B via the setting GUI.

FIG. 54 is a graph that illustrates three functions for deriving a radius from parameter vn (velocity), as used in steps S1207_05 and S1207_07 of FIG. 52, according to embodiments of the present invention.

The horizontal axis indicates parameter vn (velocity) and the vertical axis indicates radius.

The solid line referred to as "Attenuate" indicates a normal attenuation (or damping) function used in step S1207_05 in FIG. 52. The function defines a relationship in which, when vn increases, radius is exponentially attenuated. The normal function is used for normal (default) types of pens. Use of this function to effect such vn-to-radius conversion is based on the following observation.

[Observation A] Line width that increases due to pen pressure corresponds to the area into which ink seeps out in paper.

[Observation B] The faster a pen moves the shorter time period the pen has, to have ink seep out at each point.

Based on Observations A and B above, it is theorized that line width increases when a pen moves slower, while line width decreases when a pen moves faster. The theory is based on that, as a pen moves faster, the pen has a shorter period of time at each point in contact to have ink seep out in paper to form a line (stroke). Line width is considered a series of points each having radius. Accordingly, for normal pens, the attenuation (damping) function is used to convert parameter vn to radius, such that when velocity increases radius is exponentially attenuated, according to embodiments of the present invention.

It should be noted that, even with respect to a device incapable of obtaining pen pressure data, the ink data processing section 100T of the present invention can calculate or obtain velocity information using timestamp information. For example, the ink data processing section 100T may use the local timing at which it receives pen stroke information from such devices to thereby calculate or obtain timestamp information, based on which velocity vn can be determined for each point. Therefore, the ink data processing section 100T can reliably determine and output radius of each point based on velocity vn, with respect to various types of devices including devices capable of obtaining pressure data and devices incapable of obtaining pressure data.

In FIG. 54, the broken line referred to as "SIGMOID" indicates a special function in which attenuation occurs in steps, as opposed to exponentially, and the broken line referred to as "PERIODIC" indicates another special function which is periodic. Both of these special functions may be applied to derive a radius from velocity for special types of pens in step S1207_07 of FIG. 52, as will be more fully described below in reference to FIG. 71.

It should be noted that application of any of these functions described above to convert velocity to point radius may be in real time. Alternatively, the conversion of parameter vn to radius may be performed in advance and the resulting data may be stored in a look-up table, which may be accessible by the ink data processing section 100T.

Figure 55:
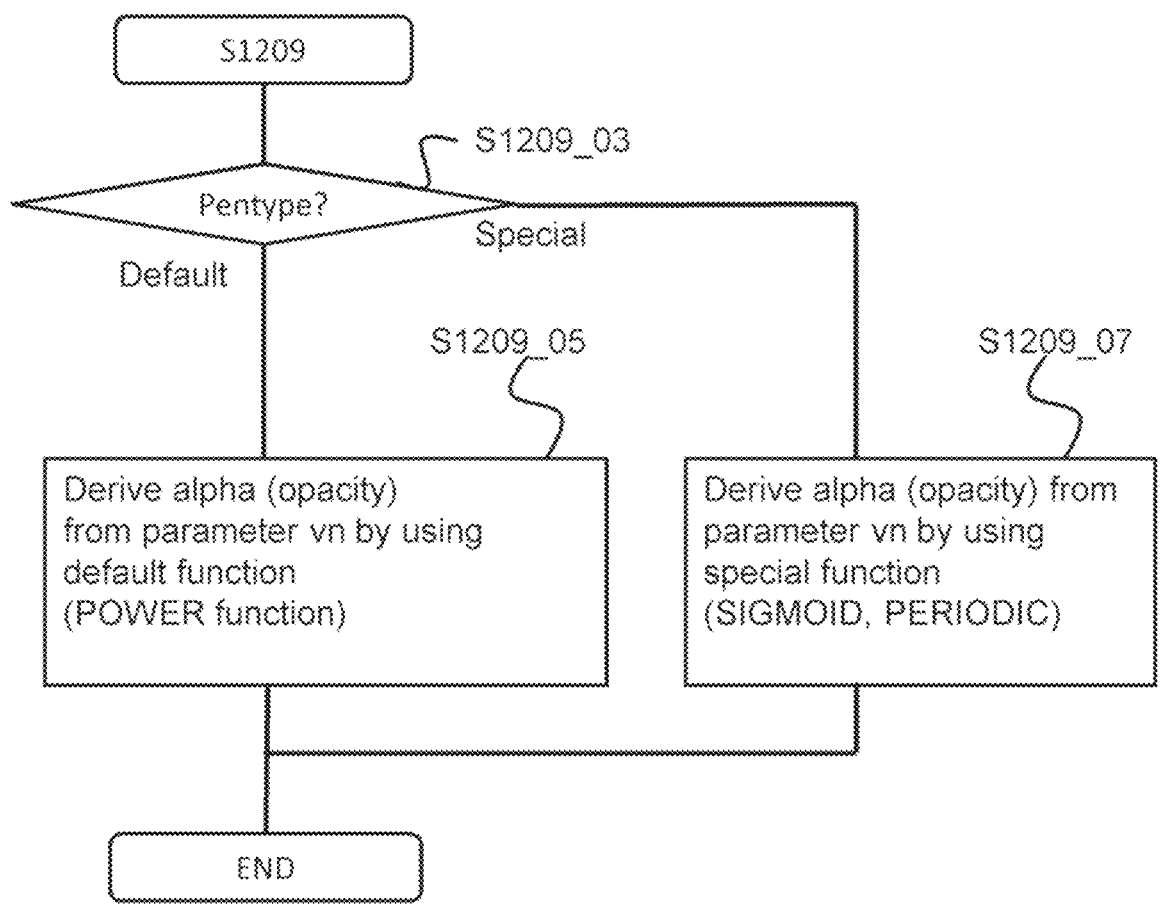
FIG. 55 is a flow diagram illustrating the process of deriving alpha indicative of transparency (or opacity) in step S1209 of FIG. 50, according to third embodiments of the present invention.

FIG. 55 is a flow diagram illustrating the process of deriving an alpha value indicative of transparency (or opacity) of each point in step S1209 of FIG. 50A, according to embodiments of the present invention.

In step S1209_03, the pen type of a pen being use to enter the pen event data is determined from the context information (INPUT 2).

Figure 56:
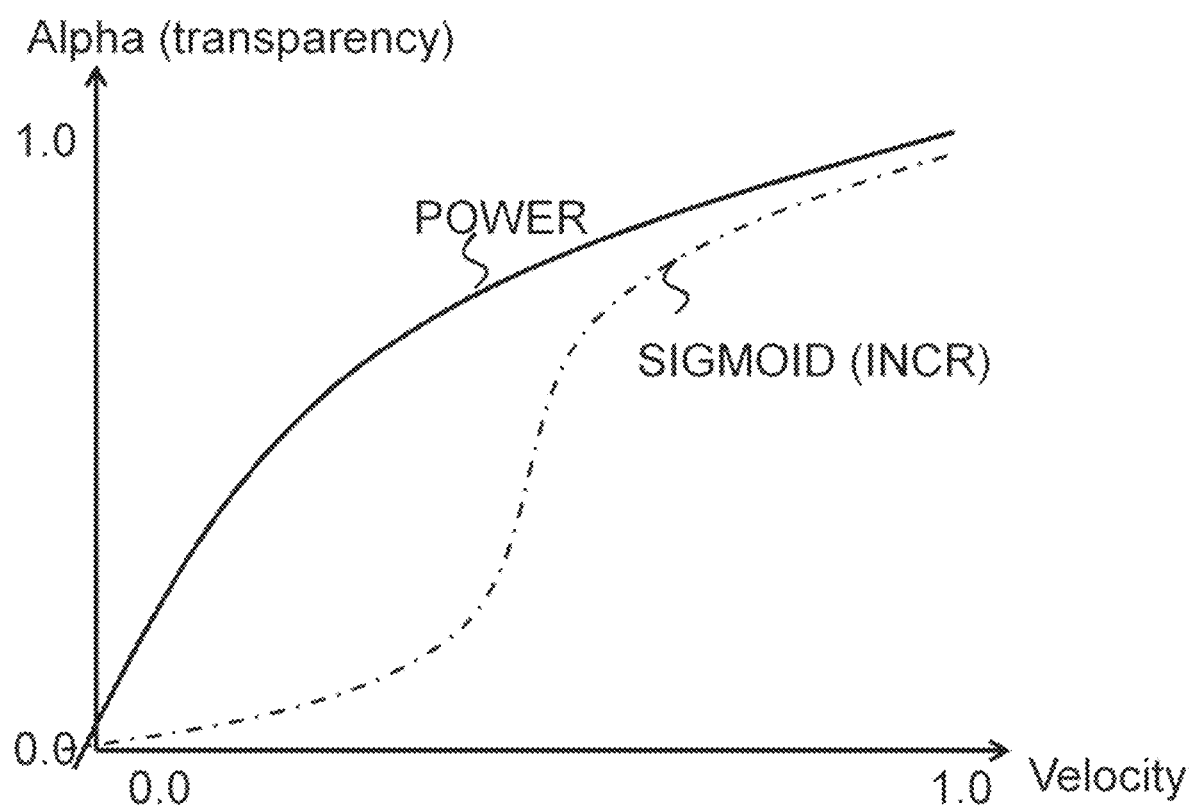
FIG. 56 is a graph that illustrates two functions for deriving alpha (transparency/opacity) from a parameter (velocity), as used in steps S1209_05 and 1209_07 of FIG. 55, according to third embodiments of the present invention.

In step S1209_05, after it is determined in step S1209_03 that the pen type is normal (default), an alpha is derived from parameter vn using a normal (power) function, such as the "POWER" function shown in FIG. 56

In step S1209_07, after it is determined in step S1209_03 that the pen type provided by the context information (INPUT 2) is special, such as a pen having a particularly soft pen tip, an alpha is derived from parameter vn by using a special function such as "SIGMOID" function shown in FIG. 56.

FIG. 56 is a graph that illustrates two functions for deriving an alpha (transparency/opacity) from parameter vn (velocity), as used in steps S1209_05 and 1209_07 of FIG. 55, according to embodiments of the present invention.

The horizontal axis indicates parameter vn and the vertical axis indicates alpha indicating transparency. For example, alpha 0.0 may mean full transparency and alpha 1.0 may mean full non-transparency, i.e., full opacity.

The solid line referred to as "POWER" indicates a normal power function used in step S1209_05 in FIG. 55. The function defines a relationship in which, when velocity vn increases, alpha exponentially increases. The normal (power) function is used for normal (default) types of pens. Use of the normal function to effect such conversion from vn to alpha is based on the following observation.

[Observation C] Ink darkness that increases due to pen pressure corresponds to the area into which ink seeps out in paper.

[Observation D] The faster a pen moves the smaller amount of ink seeps out from the pen at each point (because the pen is in contact at each point for a shorter time period).

Based on Observations C and D above, it is theorized that ink darkness increases (opacity increases) when a pen moves slower, while ink darkness decreases (transparency increases) when a pen moves faster. The theory is based on that, as a pen moves slower, more ink seeps out from the pen into paper at each point in contact to form a darker line (stroke) and, as the pen moves faster, less ink seeps out from the pen at each point in contact to form a lighter line (stroke). Accordingly, for normal pens, the power function is used to convert parameter vn to alpha, such that when velocity increases alpha (transparency) exponentially increases, according to embodiments of the present invention.

It should be noted that, even with respect to a device incapable of obtaining pen pressure data, the ink data processing section 100T of the present invention can reliably calculate or obtain velocity information using timestamp information. For example, the ink data processing section 100T may use the timing at which it receives pen stroke information from such devices to thereby calculate or obtain timestamp information, based on which velocity vn can be determined. Therefore, the ink data processing section 100T can reliably determine and output alpha based on velocity vn, with respect to various types of devices including devices capable of obtaining pressure data and devices incapable of obtaining pressure data.

In FIG. 56, the broken line referred to as "SIGMOID" indicates a special function, which is an example of an increasing function that may be used to derive alpha from velocity for special types of pens in step S1209_07 of FIG. 55.

It should be noted that application of any of these functions described above in reference to FIG. 56 may be in real time. Alternatively, the conversion of parameter vn to alpha may be performed in advance and the resulting data may be stored in a look-up table, which may be accessible by the ink data processing section 100T.

As described above, the ink data generation section 120 of the ink data processing section 100T determines radius and alpha values of each point object based on inputted pen event data, which may or may not include pen pressure data. As shown in FIG. 49, the point data driving section 120 outputs the radius and alpha information in "float" data type in its own internal memory. Then, the ink data formatting section 140 receives the radius and alpha information (float) as attributes of the point object, and outputs them in a stroke file format (SFF, see FIG. 48L) or in a stroke message format (SMF).

Figure 57:
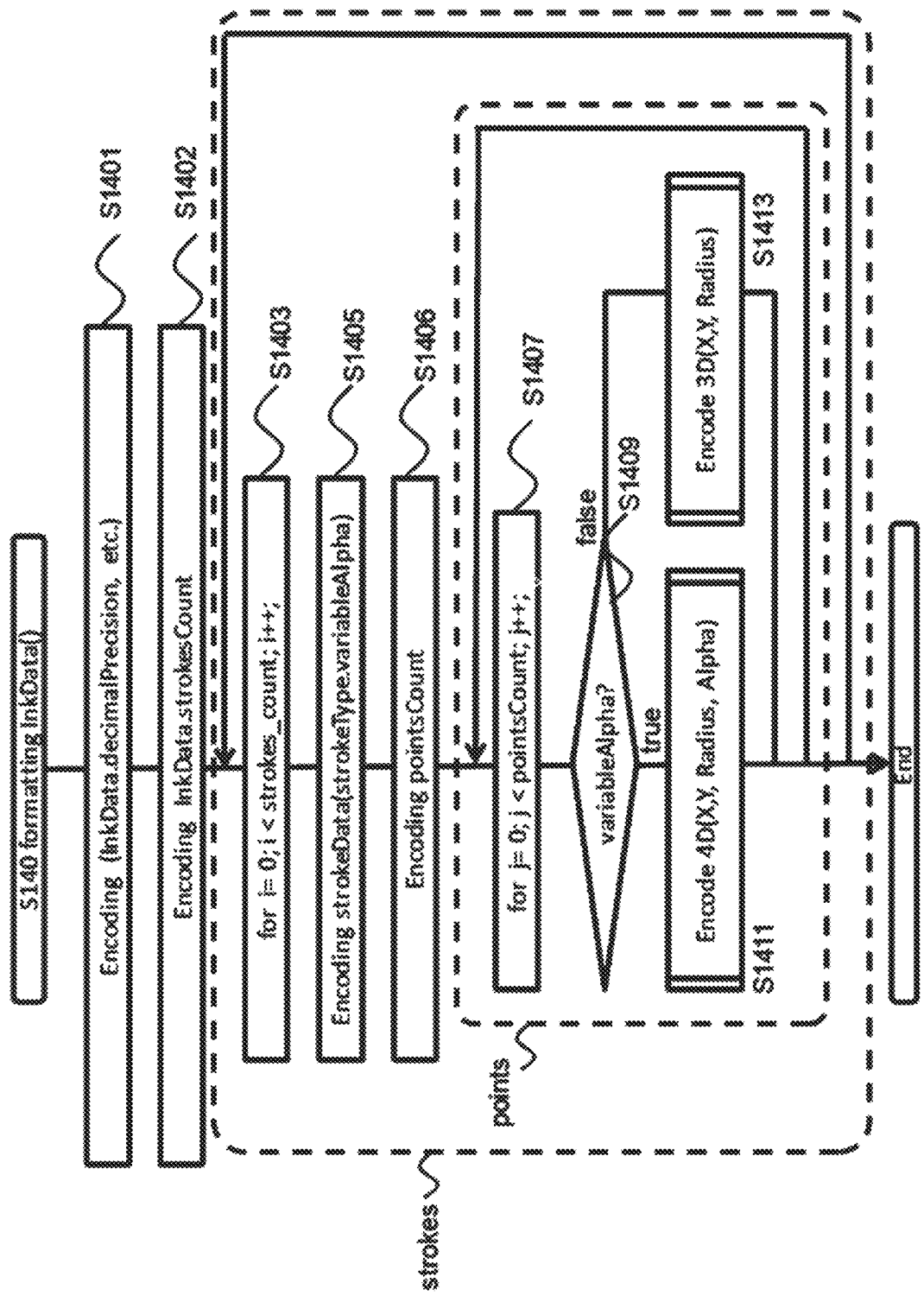
FIG. 57 is a flow diagram illustrating a process of formatting radius and alpha values, as well as X and Y coordinate data, into an ink data format (data structure), according to third embodiments of the present invention.

FIG. 57 is a flow diagram illustrating an ink data formatting process of formatting inputted radius and alpha information, as well as the inputted X and Y coordinate data, into a stroke file format (SFF) or into a stroke message format (SMF). Generally, the formatting process S140 is performed by the ink data formatting section 140 of the ink data processing section 100T as part of a process to generate the ink data 200.

<Serialization of Data Object InkDataFile>

In step S1401, when serializing InkDataFile in the SFF, ink data and information necessary for the purpose of persisting the InkDataFile in an SFF file is serialized. As an example of such necessary information, a decimalPrecision value is serialized and encoded. In the illustrated example, value 100 is used as the decimalPrecision value of "unsigned int" data type, and value 100 is encoded using ASN.1, BER encoding method, or encoding methods shown in a schema file of FIG. 10 of the first embodiment such as "sint32-type" and "float." On the other hand, when serializing InkDataFile in the SMF suited for real-time transmission or messaging, the information necessary for the purpose of persisting the ink data in the SFF may not be needed and thus step S1401 may be omitted when formatting the ink data in the SMF. In step S1402, a strokesCount value for the InkDataFile is encoded in the SFF (see FIG. 48L). On the other hand, when formatting to the SMF, a strokesCount value is not included and, thus, step S1402 may be omitted and the process may instead encode data indicating the last of all the strokes being processed.

<Serializing of a Data Object "Stroke">

The following steps starting with steps S1403 included in a larger rectangle in dotted lines in FIG. 57 are performed for each of the N (strokesCount) number of strokes included in the InkDataFile. As a result, N number of stroke objects are formatted using a defined encoding method and are outputted.

In step S1405, a variableAlpha value is encoded in the stroke object 210 being processed. As described above, the variableAlpha value (TRUE/FALSE) indicates whether the alpha value of the stroke is variable along the length of the stroke.

In step S1406, a pointsCountvalue, which indicates the number of point objects included in the stroke object 210, is encoded. If the pointsCountvalue is not available, for example, in case of real-time type applications (i.e., when formatting to the SMF), step S1406 may be omitted and the process may instead encode data indicating the end of a stroke being processed.

<Serialization of Data Object "Point">

The following steps starting with step S1407 included in a smaller rectangle in dotted lines in FIG. 57 are performed for each of the pointsCount number of points included in the stroke being formatted. As a result, the pointsCount number of point objects are formatted and are outputted.

In step S1409, it is determined whether the alpha value of the stroke, which includes the point being processed, is variable or not, i.e., it is determined whether the variableAlpha value is TRUE or FALSE.

In step S1411, after it is determined in step S1409 that alpha is variable for the stroke along its length ("TRUE") and thus alpha may vary from a point to another point, XY coordinate values as well as the radius and alpha values are encoded for the point, as will be more fully described below in reference to the upper portion of FIG. 58.

In step S1413, after it is determined in step S1409 that alpha is not variable for the stroke ("FALSE"), only the XY coordinate values and the radius value are encoded for the point, and alpha is not encoded, as will be more fully described below in reference to the lower portion of FIG. 58.

At this point, the ink data 200 arranged in the defined data structure according to embodiments of the invention may be outputted to various types of media in a suitable file format (e.g., SFF) or in a message format (e.g., SMF).

FIG. 58 illustrates an implementation example of steps S1411 and S1413 of FIG. 57 described above, according to embodiments of the present invention.

Lines 01-07 in the upper portion of FIG. 58 are pseudo-code corresponding to step S1411 of FIG. 57, when the XY coordinate values as well as both the radius and alpha values are encoded for the point, in case the alpha value is variable along the length of the stroke.

Lines 08-13 in the lower portion of FIG. 58 are pseudo-code corresponding to step S1413 of FIG. 57, when the XY coordinate values and the radius value are encoded but the alpha value is not encoded for the point, in case the alpha value is not variable for the stroke.

In FIG. 58, the sections indicated by "A" and "B" show how the decimalPrecision value, described above, is utilized in implementations of embodiments of the present invention.

Preferably, the XY coordinate values and the radius value of a point are kept in float data type or double data type until immediately before the output timing so as to maintain the highest accuracy possible for the values in the processor. On the other hand, it may be desirable to use the smallest number of bits to represent each value for the purposes of making the ink data 200 widely (commonly) understandable by different data interpretation methods and for the purpose of efficiently compressing the resulting ink data 200.

Therefore, in step S1411, input X, Y and radius values are first multiplied by the decimalPrecision value indicative of the resolution (magnification) to standardize their units, as shown in "A" in FIG. 58, and thereafter are converted (cast) to int (integer) data type, as shown in "B", as shown in the upper portion of FIG. 58.

In step S1413 as shown in the lower portion of FIG. 58 also, similarly to step S1411, input X, Y and radius values are first multiplied by the decimalPrecision value and thereafter are cast to int (integer) data type.

Figure 59:
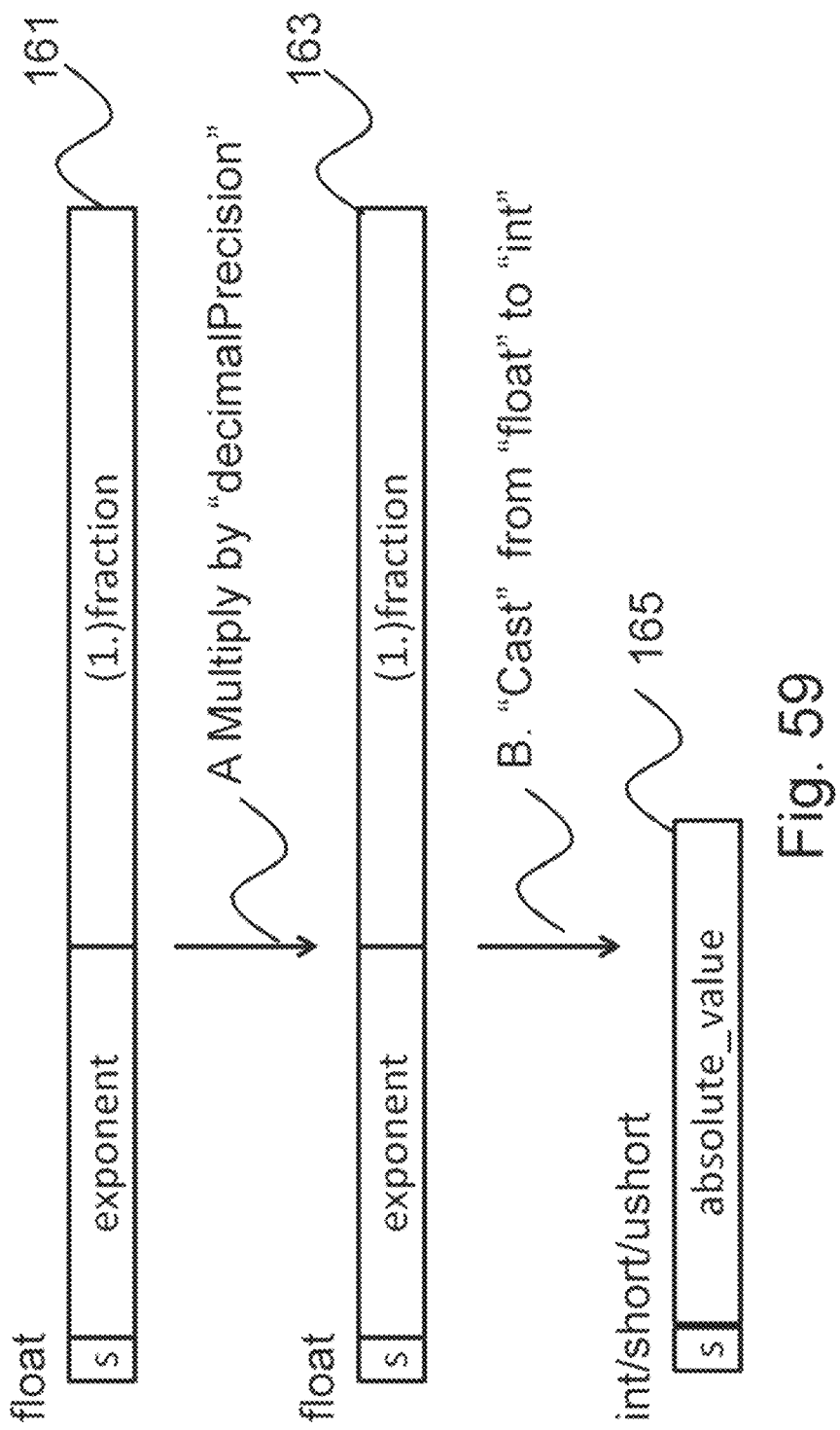
FIG. 59 illustrates conversion of floating data type to integer data type used in steps S1411 and S1413 of FIG. 57, according to third embodiments of the present invention.

In this connection, FIG. 59 illustrates conversion of floating data type to integer data type used in steps S1411 and S1413 of FIG. 57, according to embodiments of the present invention.

In FIG. 59, input data 161 stored as of float data type is an example according to the IEEE 754 standard. In the input data 161, "s" is an encoding bit, "exponent" is an exponent of a floating-point number, and "fraction" is a mantissa of a floating-point number.

The input data 161 is multiplied by the decimalPrecision value, as indicated by "A" in FIG. 58 and described above, to produce multiplied input data 163 of FIG. 59. The multiplied input data 163 is also a floating-point number including an exponent and a fraction (mantissa).

The multiplied input data 163 is converted (cast) from "float" to "int" (or "short" or "ushort") as indicated by "B" in FIG. 58 and described above, to thereby produce an absolute value 165. The absolute value 165 is no longer a floating-point number. In the illustrated embodiment, XY coordinate values as well as the radius value are all cast (converted) to int (integer) values, though they may be cast to any non-floating-point data type.

Figure 60:
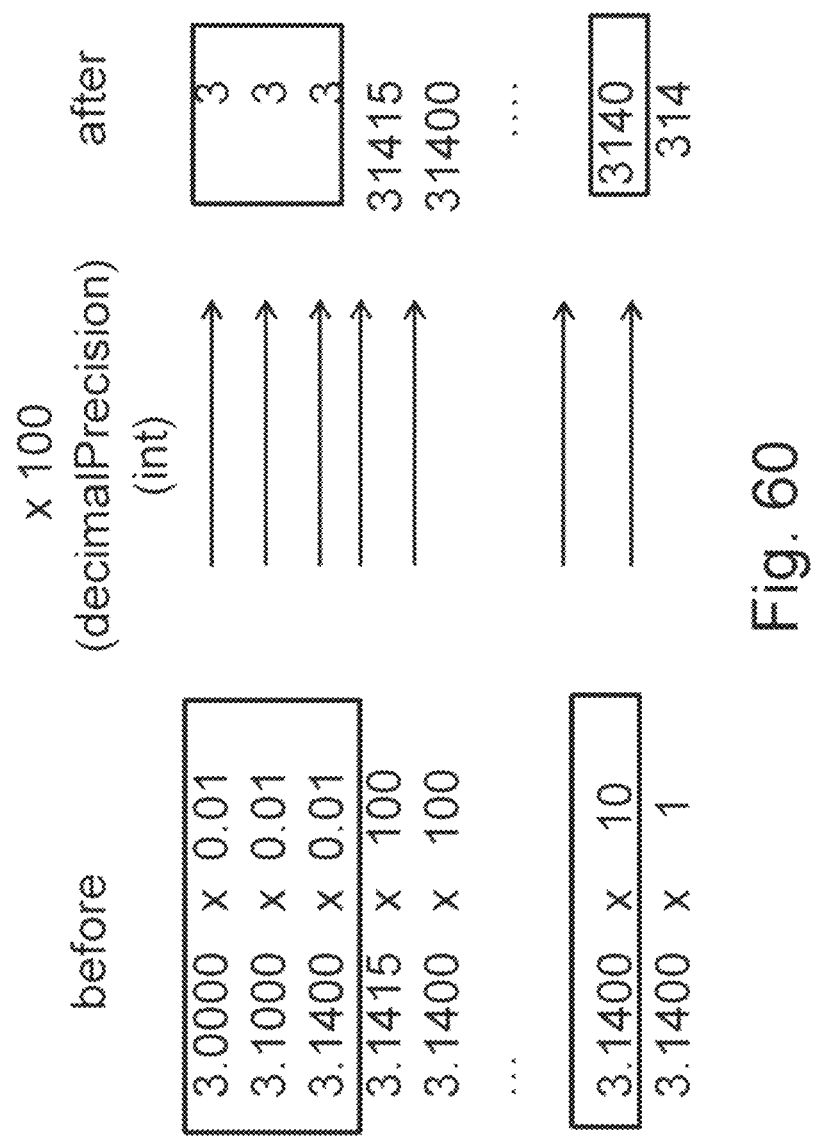
FIG. 60 illustrates the increased efficiency of compression resulting from the data type conversion of FIG. 59, according to third embodiments of the present invention.

FIG. 60 illustrates the increased compression efficiency resulting from the data format conversion (casting) from "float" to "int" described above, according to embodiments of the present invention.

In FIG. 60, decimal numbers are used for ease of explanation and understanding. In the illustrated example, the circular constant pi ($\pi$) is multiplied by different indices of 10 (to the power of 0, +1, +2).

The left-hand side of FIG. 60 indicates values obtained prior to the processing of steps S1411 and S1413 of FIG. 58.

The right-hand side of FIG. 60 indicates values obtained after the processing of steps S1411 and S1413 of FIG. 58

The top three values and the last value included in rectangles on the left-hand side are different floating-point numbers (3.0, 3.1 and 3.14) before the processing, but they all are converted to 3 after the processing as shown on the right-hand side. While the accuracy of each number is somewhat compromised by the conversion, the frequency of use of the same value (e.g., 3 in this example) increases to facilitate efficient processing of the values in a processor, such as efficient compression of the values. For example, data expressed in data type integer may be encoded using ASN.1, BER or DER encoding methods into a file or message protocol to be outputted.

Figure 61:
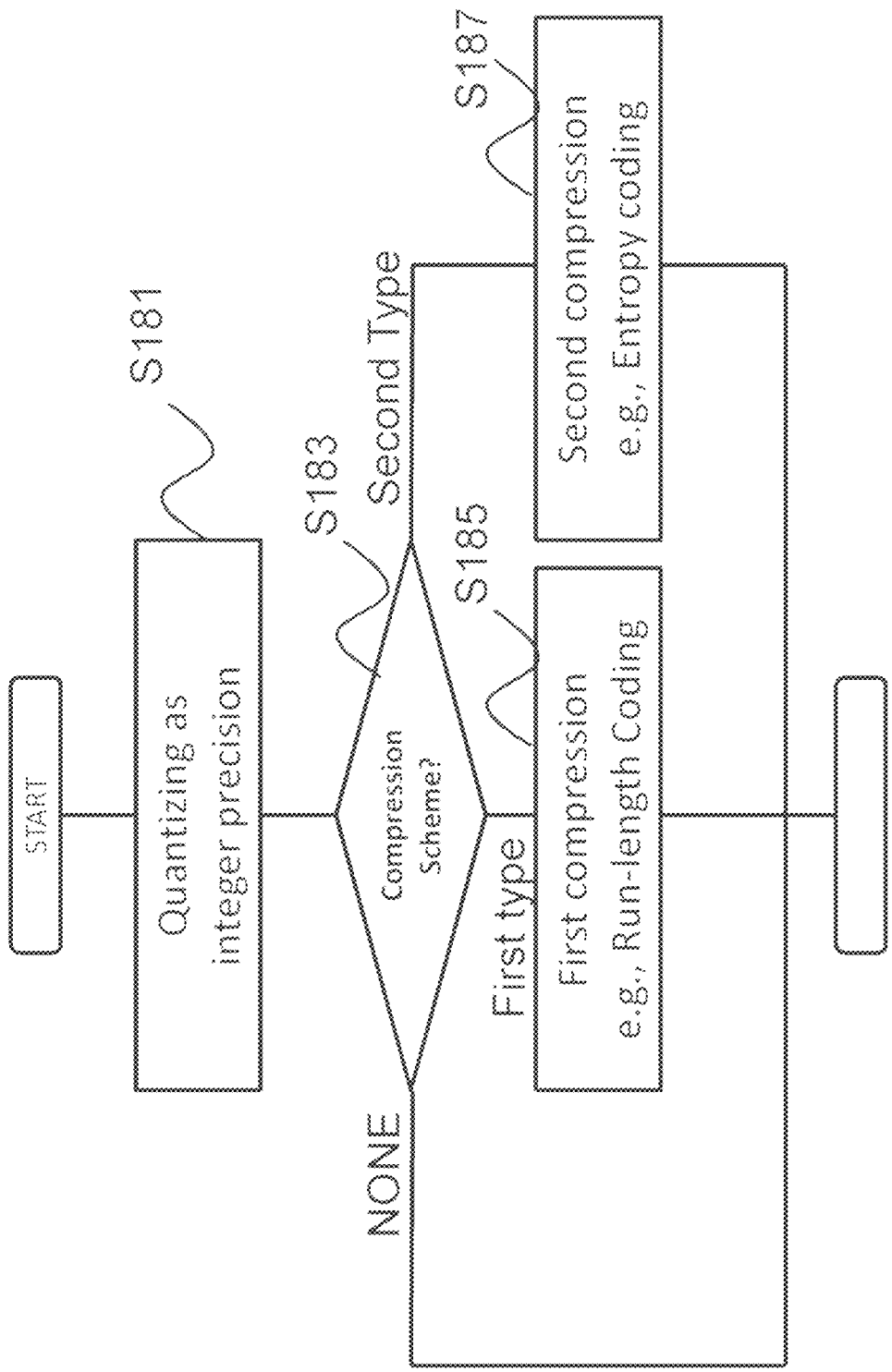
FIG. 61 is a flow diagram illustrating a process, which may be executed in an "ink data formatting section" of FIG. 49 to compress the generated ink data, according to third embodiments of the present invention.

FIG. 61 is a flow diagram illustrating a process, which may be executed in the "ink data formatting section" 140 of FIG. 49 to compress attributes of defined ink data objects, according to embodiments of the present invention.

In step S181, as a preliminary step, the generated ink data 200 to be compressed should be quantized as integer precision values, as performed in steps S1411 and S1413 of FIG. 57.

In step S183, the ink data formatting section 140 determines the type of data compression. For example, the determination may depend on the output format type. Also, the determination may be based on whether the compression is for applications that require real-time data or for applications that utilize data in storage-type media. If no compression is to be performed ("NONE"), the process outputs the ink data values in integer data type "as is." Using the top three values described in FIG. 60 for example, value "+3" represented in 32 bits may be outputted three times.

In step S185, after it is determined in step S183 that the first type of compression method is selected, the process categorizes data sequences such as X coordinate values, Y coordinate values, radius values, etc., into streams according to their attributes, and applies the first type of compression method to the generated ink data 200. For example, the first type of compression method is a run-length coding method. Using the top three values described in FIG. 60 for example, a code is used that indicates that value "+3" is repeated 3 times. The efficiency of the suggested coding technique can be improved by using several coding methods, such as by performing delta encoding (data difference) on the values, before applying run-length coding. This will increase the number of repeated values when the change between values is relatively constant.

In step S187, after it is determined in step S183 that the second type of compression method is selected, the process applies the second type of compression method to the generated ink data 200. For example, the second type of compression method is an entropy coding method using exponential-Golomb code. It is a variable length coding method, which applies a shorter bit length to a value with a smaller absolute value, such as +3, as compared to values with larger absolute values.

<Modifications to the Ink Data Processing Section 100T and Ink Data Generating Method>

As described above, the ink data processing section 100T according to embodiments of the present invention is capable of processing data received from various types of devices, some including pen pressure data and others not including pen pressure data, to derive radius and/or alpha (transparency/opacity) information as attributes of points forming each stroke, to thereby generate the device-independent ink data 200. The ink data processing section 100T outputs the generated ink data 200 in various formats such as in a file format (e.g., SFF) or a message format (e.g., SMF).

In the example of FIG. 50A, in case the input data includes pen pressure data (when a result of step S1202 is TRUE), radius and transparency information is derived from the pen pressure data, without using timing information, though the present invention is not limited to such implementation.

A function may be used, which receives timing information and pen pressure data as input and outputs radius. In this case, it becomes possible to change the stroke width and/or stroke transparency based not only on pen pressure data but also on the pen velocity.

While velocity was derived in various embodiments described above, when a pen includes an acceleration sensor for example or when only values corresponding to acceleration are obtainable, acceleration may be used. For example, by integrating acceleration to derive velocity, processing similar to that described above may be utilized.

Figure 62:
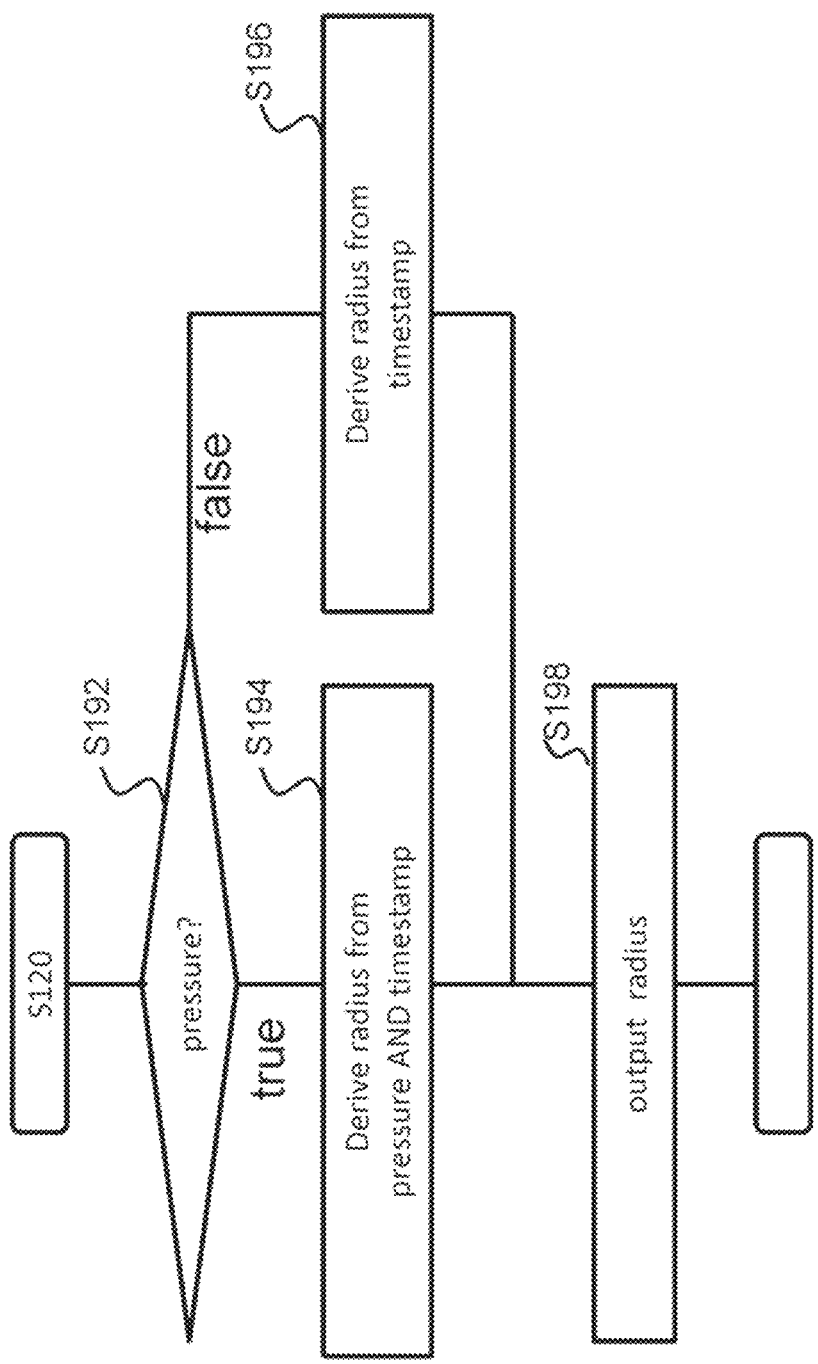
FIG. 62 is a flow diagram illustrating a process executed in an "ink data generation section" of FIG. 49 to output radius information as an ink data attribute (alternatively to FIG. 52), according to third embodiments of the present invention.

FIG. 62 is a flow diagram illustrating another example of a process executed in the ink data generation section 120 of FIG. 49 to output radius information as an ink data attribute, alternatively to the method described above in reference to FIG. 52.

In step S192, similarly to step S1202 of FIG. 50A, it is determined whether the inputted data includes pen pressure data or not.

In step S196, after it is determined in step S192 that the inputted data does not include pen pressure data ("FALSE"), radius is calculated using the relationship between velocity derived from timestamp information and radius, as explained in reference to FIG. 54 above. That is, the relationship is used in which, when velocity increases, radius is attenuated.

In step S194, after it is determined in step S192 that the inputted data includes pen pressure data ("TRUE"), both the inputted pressure data and timestamp information are used to derive radius. Step S192 uses a partial differential function including two variables, wherein (i) when velocity increases radius decreases, in case the pen pressure is fixed, and (ii) when the pen pressure increases radius increases, in case the velocity is fixed. Thus, it is possible to encode radius of each point for the ink data 200 based on both velocity and pen pressure of the point.

In step 198, the radius derived in step S196 or in step S194 is outputted.

Figure 63:
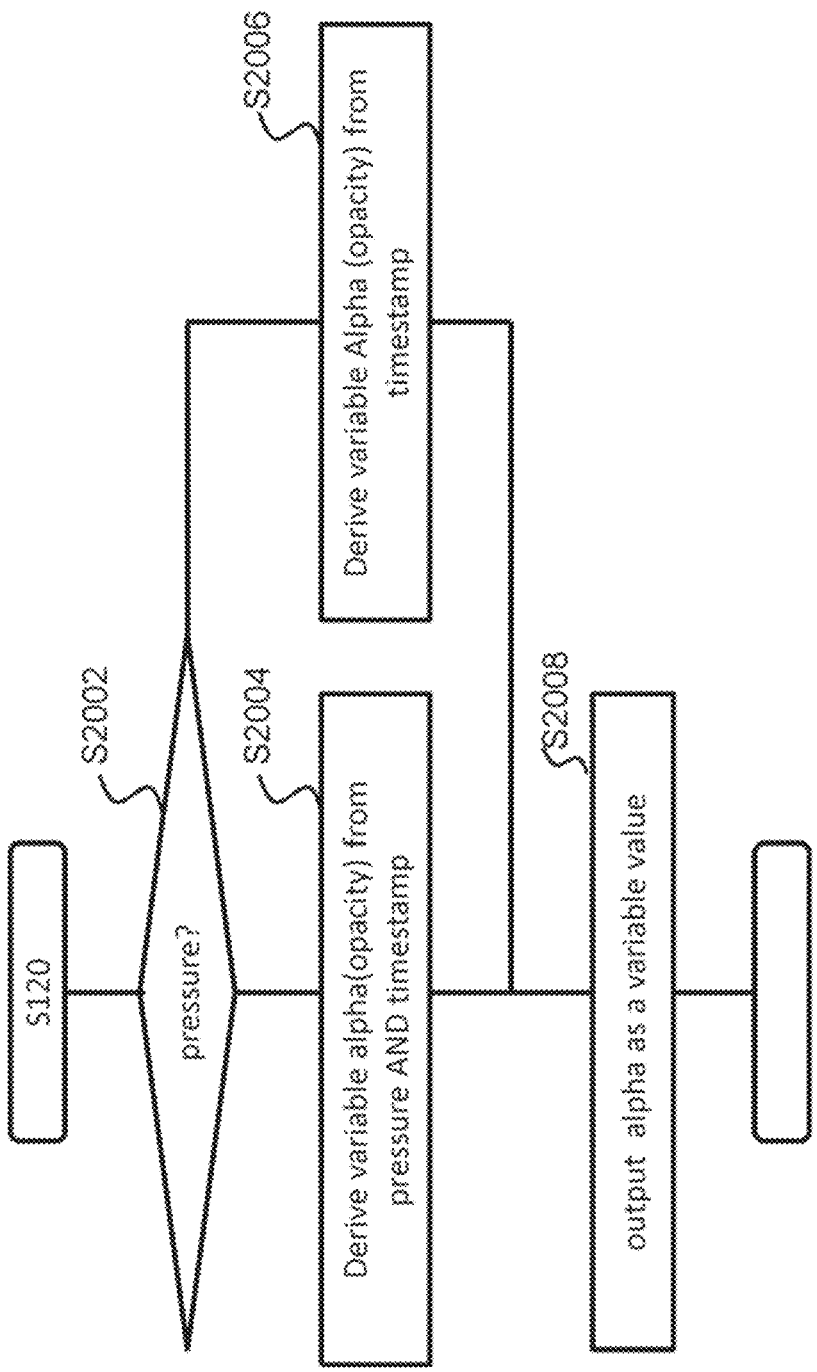
FIG. 63 is a flow diagram illustrating a process executed in a "ink data generation section" of FIG. 49 to output alpha information as an ink data attribute (alternatively to FIG. 55), according to third embodiments of the present invention.

FIG. 63 is a flow diagram illustrating another example of a process executed in the ink data generation section 120 of FIG. 49 to output variable alpha information as an ink data attribute, alternatively to the method described above in reference to FIG. 55.

In step S2002, similarly to step S1202 of FIG. 50A, it is determined whether the inputted data includes pen pressure data or not.

In step S2006, after it is determined in step S2002 that the inputted data does not include pen pressure data ("FALSE"), alpha (transparency/opacity) is calculated using the relationship between velocity derived from timestamp information and alpha, as explained in reference to FIG. 56 above. That is, the relationship is used in which, when velocity increases, alpha also increases (becomes more transparent).

In step S2004, after it is determined in step S2002 that the inputted data includes pen pressure data ("TRUE"), both the inputted pressure data and timestamp information are used to derive a variable alpha value. Step 2004 uses a partial differential function including two variables, wherein (i) when velocity increases alpha increases (becomes more transparent), in case the pen pressure is fixed, and (ii) when the pen pressure increases alpha decreases (becomes more opaque), in case the velocity is fixed. Thus, it is possible to encode alpha (transparency) of each point for the stroke object 210 of the ink data 200 based on both velocity and pen pressure of the point.

In step S2008, the alpha derived in step S2006 or in step S2004 is outputted.

The processes of FIGS. 62 and 63 may be used together such that both radius and alpha values may be derived from the inputted pressure data and timestamp information. Alternatively, only the radius value or only the alpha value may be derived from the inputted pressure data and timestamp information.

Sample functions that transform velocity (vn) to radius and alpha are described above in reference to FIGS. 54 and 56. In general, what functions should be used to transform velocity (vn) to radius and/or alpha depends on the type of pen (or pen tip type) and the type of "paper" that the sensor surface is supposed to simulate (e.g., Japanese paper, carbon paper, regular paper, copy paper, photographic paper, ink absorbing paper, etc.) Thus, any of the functions selected to transform velocity to radius and/or alpha may be adjusted depending on the type of pen and/or the type of paper. In other words, radius and/or alpha derived from velocity may change depending on the type of pen and/or the type of paper.

In accordance with a further aspect of the present invention, pen pressure data utilized in various embodiments of the present invention as described above may be replaced with other attribute values that may be received from various types of input devices, such as pen angle (or pen tilt) data, pen rotation (pen roll) data, etc. These attribute values, such as the pen angle/tilt data, may be used to derive radius and/or transparency (alpha) information according to various embodiments of the present invention, in place of the pen pressure data used in the above-described examples. For example, some pen-type input devices are capable of generating pen angle (pen tilt) data indicative of the angle formed by the pen axis relative to the sensor surface or to the normal to the sensor surface. It is observed that a pen held normal to the sensor surface tends to apply more pressure to the sensor surface than a pen that is tilted to thereby extend in a direction more parallel to the sensor surface. Thus, the pen angle/tilt data may be correlated to a parameter vn (velocity) similarly to how the pen pressure data may be correlated to vn.

For example, a function may be used which codifies a relationship in which the more straight (i.e., closer to the normal to the sensor surface) the pen is held relative to the sensor surface (i.e., more pressure), the slower the velocity (vn) becomes. Once vn is derived from the angle/tilt data, the functions similar to those used to transform vn to radius and/or alpha information described above may be used. That is, the pen angle/tilt data may be correlated to vn, which is then converted to radius and/or alpha information. On the other hand, it may also be observed that a pen held normal to the sensor surface tends to produce a narrower stroke than a tilted pen that tends to produce (draw) a wider stroke, perhaps due to an increased contact area between the tilted pen tip and the sensor surface. In this case suitable functions may be used which codify such relationship, in which the more straight the pen is held relative to the sensor surface, the faster the velocity (vn) becomes to produce a narrower stroke. Once vn is derived from the angle/tilt data, vn can then be converted to radius and/or alpha information using the functions described above. What functions should be used to transform the angle/tilt data to vn depends on the type of pen (or pen tip type) and the type of "paper" that the sensor surface is supposed to simulate (e.g., Japanese paper, carbon paper, regular paper, copy paper, photographic paper, ink absorbing paper, etc.) It may further be observed that a pen held normal to the sensor surface tends to produce a wider and darker stroke than a tilted pen that tends to produce a narrower and finer (more transparent) stroke. Then, without first correlating the angle/tilt data to vn and converting vn to radius and/or alpha information for each point, suitable functions may be used that transform the pen angle/tilt data directly to radius and/or alpha information in some embodiments. Similarly, in some embodiments, suitable functions may be used that transform the pen pressure data, if available, directly to radius and/or alpha information instead of first converting the pressure data to vn and then converting vn to radius and/or alpha information for each point.

[4] Ink Data Processing Section/Decoder (FIGS. 64-66)

FIG. 64 is a diagram illustrating a relationship between the ink data processing section 100R and various applications 300-1,300-2, 300-n, according to embodiments of the present invention. Ink data processing section 100R corresponds to 100R in FIG. 22 of the first embodiment.

As shown in FIG. 45, the ink data processing section 100R is essentially a software library which, in response to requests from various applications 300, extracts the ink data 200 stored in a file or message format in a memory ("RAM") or various types of media (e.g., HardDisk) to a memory location and in the data format usable by the applications. For example, when the application 300-1 is a drawing processing application (utilizing graphic processing section 300 in FIG. 5), the ink data processing section 100R outputs to the graphic processing section 300 necessary data objects "Stroke", "Point", etc. (wherein each stroke and/or point is associated with radius and/or alpha information), but does not output unnecessary data objects "Author", etc. As another example, when the application 300-2 requires only author information for the purpose of determining e-conference participants, for example, the ink data processing section 100R outputs data object Author in metadata object 250. In embodiments of the present invention, the ink data processing section 100R is realized as an ink data reproducing process S200 executed by a processor, as will be described in FIG. 65. Below, the ink data reproducing process S200 will be described in connection with a drawing process wherein the application 300 is a drawing application 300-1.

FIG. 65 is a flow diagram illustrating the ink data reproducing process S200 of reproducing (or extracting) generated ink data 200 to obtain radius and alpha information, as well as X and Y coordinate data, and outputting the obtained information and data, in response to a request from the drawing application 300-1, according to embodiments of the present invention. The drawing application 300-1 may then use the radius and alpha information to give more realistic looks and nuanced expressions to the strokes as drawn/rendered on a screen (see FIGS. 68-72). Essentially, the ink data reproducing process S200 is a reverse process to the process of generating (formatting) the ink data S140 described in reference to FIG. 57 above.

<Reproduction or Extraction of Data Object InkDataFile>

In step S2001, the context information (INPUT 2) (or configuration information) for the ink data 200 that includes the stroke to be processed is extracted, such as the decimal-Precision value. The reproduction processing reversely corresponds to the encoding processing in step S1401 of FIG. 57.

In step S2002, the strokesCount value included in the data object InkDataFile, as shown in FIG. 48L, is extracted. If the strokesCount value is not available, for example, in real-time type applications, step S2002 may be omitted and the process may instead determine when to end the processing by reproducing the data indicating the last of all strokes included in the InkDataFile.

<Reproduction of Data Object "Stroke">

The following steps starting with step S2003 included in a larger rectangle in dotted lines in FIG. 65 are performed for each of the N (strokesCount) number of strokes included in the InkDataFile. As a result, N number of stroke objects are reproduced and outputted.

In step S2005, "variableAlpha" in the data object "stroke" (see FIG. 48L) is extracted. As described above, the variable Alpha value (TRUE/FALSE) indicates whether the stroke being processed includes an alpha value that is variable along the length of the stroke.

In step S2006, "pointsCountvalue," which indicates the number of point objects included in the stroke object 210, is obtained. If the pointsCountvalue is not available, for example, in real-time type applications, step S2006 may be omitted and the process may instead determine the end of processing by reproducing the data indicating the end of a stroke being processed.

<Reproduction of Data Object "Point">

The following steps starting from step S2007 included in a smaller rectangle in dotted lines in FIG. 65 are performed for each of the pointsCount number of point objects included in the stroke object 210 being reproduced. As a result, the pointsCount number of point objects are reproduced and outputted.

In step S2009, it is determined whether alpha of the stroke being processed is variable or not, i.e., it is determined whether "variable Alpha" is TRUE or not.

In step S2011, after it is determined in step S2009 that "variableAlpha" is TRUE, XY coordinate values as well as the radius and alpha values are decoded and reproduced for the point and are outputted. The step is to reverse (convert) the data encoded in step S1411 of FIG. 57 back to a data format requested by (usable by) a particular application that is requesting the reproduced ink data 200.

In step S2013, after it is determined in step S2009 that "variableAlpha" is FALSE, XY coordinate values and the radius value are decoded and reproduced for the point and are outputted, while the alpha value is set as a fixed value for the entire stroke, as will be more fully described below in the lower portion of FIG. 66. The step is to reverse (convert) the data encoded in step S1413 of FIG. 57 back to a data format requested by (usable by) a particular application that is requesting the reproduced ink data 200.

Accordingly, the ink data reproducing process S200 extracts XY coordinate values and the radius value, as well as the alpha value if any, from data object "point."

FIG. 66 illustrates an implementation example of steps S2011 and S2013 of FIG. 65 described above, according to embodiments of the present invention.

Lines 01-07 in the upper portion of FIG. 66 are pseudo-code corresponding to step S2011 of FIG. 65, when the XY coordinate values as well as both the radius and alpha values are extracted for the point, in case the alpha value is variable along the length of the stroke including the point (i.e., different points forming the stroke may have different alpha values).

Lines 08-14 in the lower portion of FIG. 66 are pseudocode corresponding to step S2013 of FIG. 65, when the XY coordinate values and the radius value are extracted for the point while the alpha value is set as a fixed value (e.g., "1.0" in the illustrated example), in case the alpha value is not variable along the length of the stroke including the point (i.e., all points forming the stroke have the same alpha value).

In FIG. 66, the sections indicated by "A" and "B" show how the decimal Precision value, described above, is utilized in implementations of embodiments of the present invention. Specifically, using an inverse function of the function shown in FIG. 58 above, in step S2011, input X, Y and radius and alpha data are first converted (cast) back from int (integer) to float (floating point number) data type, as shown in "INV_B" in FIG. 66. Thereafter the X, Y and radius data are divided by the decimalPrecision value indicative of the resolution (magnification), as shown in "INV_A" in the upper portion of FIG. 66.

In step S2013 shown in the lower portion of FIG. 66, similarly to step S2011, input X, Y and radius data are first cast to float (floating point number) data type, and thereafter divided by the decimalPrecision value. On the other hand, the alpha value is set as a fixed value, such as "1.0" in the illustrated example.

Thus, when the application 300 is a drawing application, for example, which requires input data to be in "float" data type, the generated ink data 200 including data in integer type are reproduced (decoded) back to the requested floating point number data type, or any other non-integer original data type as requested by the application 300.

[5] Ink Data Drawing Process (FIG. 67)

FIG. 67 is a flow diagram illustrating a drawing process S300-1 executed by the drawing application 300-1 (and graphic processing section 300 in FIG. 5), which utilizes the ink data 200 to draw (render) strokes on a screen according to embodiments of the present invention.

In step S200, the process causes the ink data processing section 100R to obtain and reproduce InkDataFile to extract information regarding strokes and points included in each stroke (e.g., radius and alpha information), as described above, such that the extracted information can be used as input data for the drawing process S300-1.

Next, a drawing (rasterization) style object associated with the stroke object 210 being processed is determined. As shown in FIG. 48B, the ink data 200 is structured such that each stroke object 210 (in the stroke model sub-domain) is associated with one or more drawing style objects (in the rasterization sub-domain) that define the appearance of the stroke object 210 when it is drawn (rendered, rasterized, etc.) on a screen. While there are many types of drawing style objects, in the illustrated embodiment of FIG. 67, two options are available: a scattering style object and a shapefill style object (see FIG. 48).

When the scattering style object is selected, in sub-process S300-1S, first, a vertex (point) array is derived for each stroke wherein the vertex array consists of a set of sparsely located discrete points. The process of deriving a vertex array uses attribute values generated by ink data processing section 100, such as "spacing" and "range" values. The process of deriving a vertex array may also use the context information (INPUT 2) received from an application or an operating system. For example, contextual information about the paper type, which the screen is supposed to simulate (e.g., Japanese paper, carbon paper, regular paper, copy paper, photographic paper, ink absorbing paper, etc.) may be used to increase or decrease the number of sparsely located discrete points in the vertex array. The generated vertex array represents a series of particles. In the illustrated embodiment, the GPU, which is controlling the drawing process S300-1S, applies a first vertex shader to the generated vertex array to give a defined size to each of the particles based on the "radius" value of each point. The GPU also applies a first fragment shader to the array of particles to give a defined level of transparency (or opacity) to each of the particles based on the "alpha" value of each point. The drawing process S300-1S thus draws the given stroke in the style of "scattering" particles (see FIG. 48F).

When the shapefill style object is selected, in sub-process S300-1F, first, spline segments are derived for each stroke wherein each spline segment is a sufficiently smooth polynomial function defined for a portion of the continuous stroke curve. That is, a set of spline segments defines curve segments, which connect at vertexes to together represent the stroke. The GPU applies a second vertex shader to the set of spline segments to give a defined size to each of the circles centered at the vertexes along the stroke based on the "radius" value of each vertex (point). The GPU also applies a second fragment shader to the set of spline segments to give a defined level of transparency (or opacity) to each of the circles based on the "alpha" value of each vertex (point). The drawing process S300-1F thus draws the given stroke in the style of "shape filling" (see FIG. 48F).

[6] Effects: Ink Data Drawing Examples (FIGS. 68-72)

FIGS. 68-72 illustrate various drawing rendering examples, which are used to illustrate the effects of the ink data generating method, ink data reproducing method, and ink data drawing (rendering) method, according to embodiments of the present invention. In FIGS. 68-72, "s" indicates a starting position of a stroke and "e" indicates an ending position of the stroke. In all cases, it is assumed that the velocity of pen movement is increasing (accelerating) from "s" toward "e."

Figure 68:
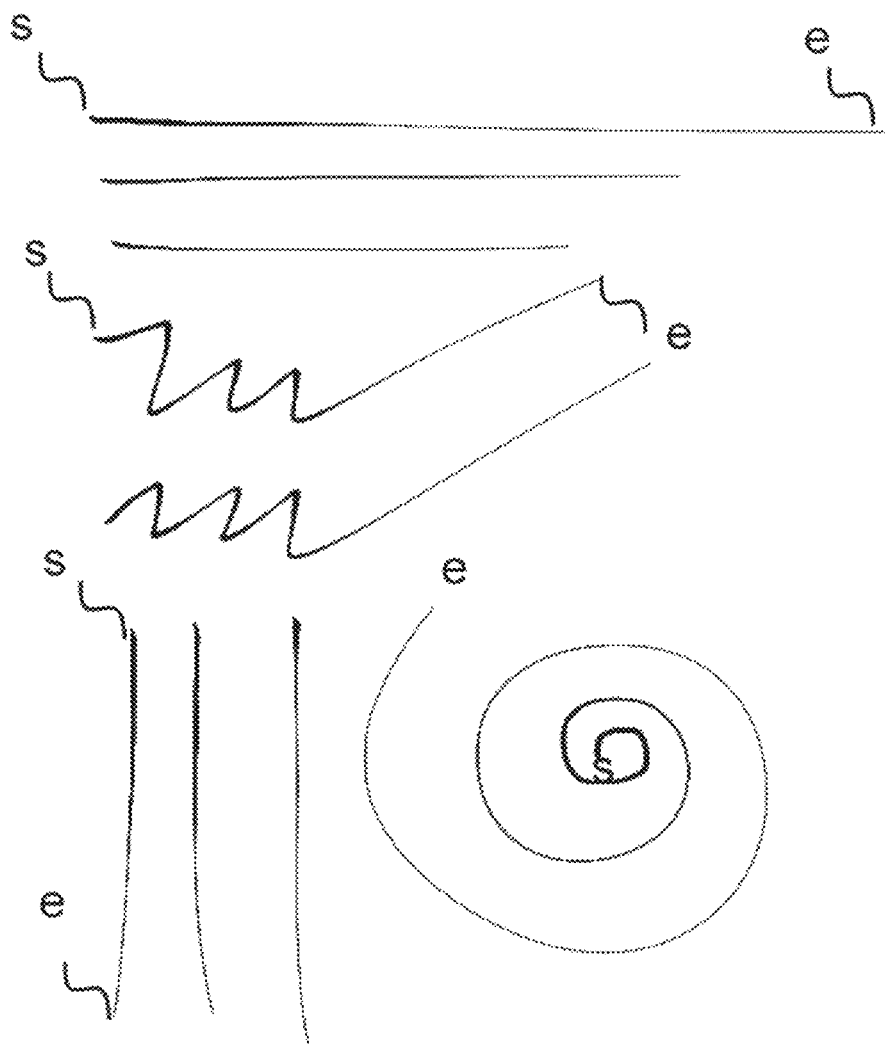
FIG. 68 illustrates drawing rendering examples resulting from input of the ink data generated based on the attenuate (damping) function of FIG. 54, according to third embodiments of the present invention.

FIG. 68 illustrates drawing rendering examples resulting from input of the ink data generated based on the attenuate (damping) function of FIG. 54, according to embodiments of the present invention. With the attenuate function, when velocity increases, radius decreases. Thus, in all of the drawing examples illustrated in FIG. 68, the width of a stroke decreases from "s" toward "e." In these examples, alpha (transparency) is set as a fixed value.

The rendering examples are in accordance with the observation described above, that line width that increases due to pen pressure corresponds to the area into which ink seeps out in paper [Observation A] and that the faster a pen moves the shorter time period the pen has to have ink seep out at each point [Observation B]. Even when a given pen event data input does not include pressure information, the ink data processing section according to embodiments of the present invention is capable of obtaining velocity information for each point and calculating radius information for each point based on the velocity information. The generated ink data thus includes radius information for each of at least some of the points. When the ink data 200 is rendered (drawn) on a screen, the radius information may be used to give the drawn stroke a realistic look and nuanced expressions that closely simulate the appearance of a real stroke in ink hand-drawn on paper.

Figure 69:
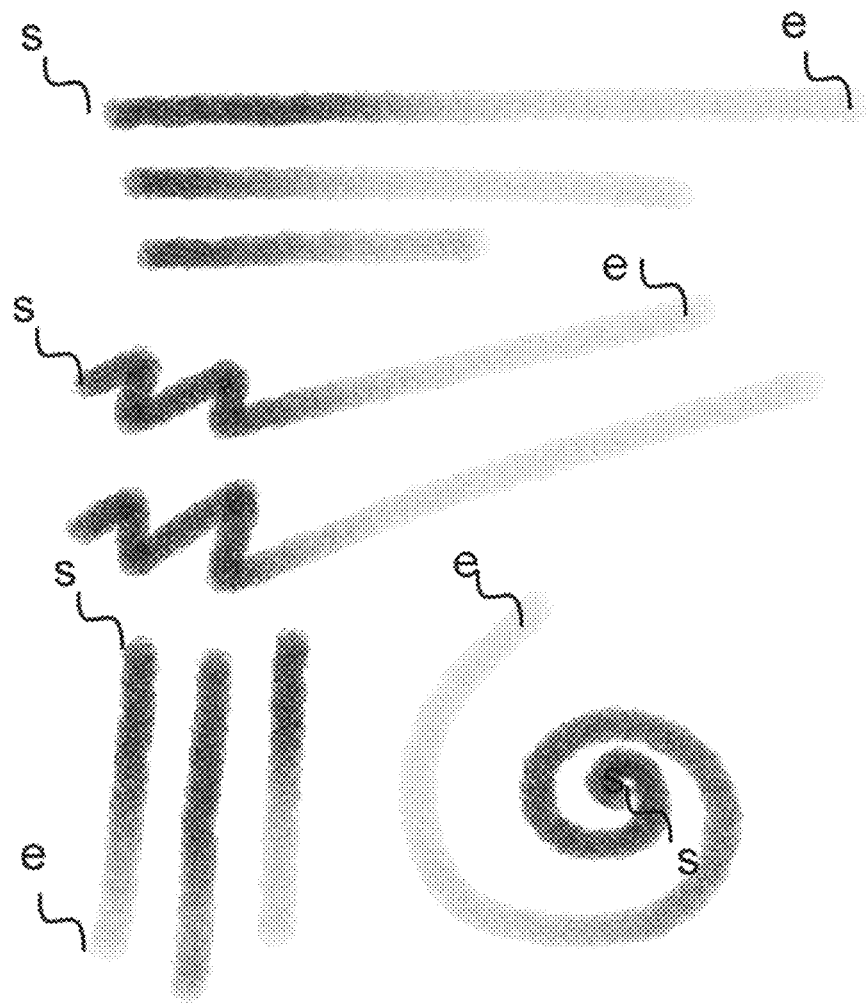
FIG. 69 illustrates drawing rendering examples resulting from input of the ink data generated based on the power function of FIG. 56, according to third embodiments of the present invention.

FIG. 69 illustrates drawing rendering examples resulting from input of the ink data 200 generated based on the power function of FIG. 56, according to embodiments of the present invention. With the power function, when velocity increases, alpha (transparency) increases. Thus, in all of the drawing examples illustrated in FIG. 69, the stroke becomes lighter and more transparent (i.e., the darkness decreases) from "s" toward "e." In these examples, radius is set as a fixed value.

The rendering examples are in accordance with the observation described above, that ink darkness that increases due to pen pressure corresponds to the area into which ink seeps out in paper [Observation C] and that the faster a pen moves the smaller amount of ink seeps out from the pen at each point (because the pen is in contact at each point for a shorter time period) [Observation D]. Even when a given pen event data input does not include pressure information, the ink data processing section according to embodiments of the present invention is capable of obtaining velocity information for each point and calculating alpha information for each point based on the velocity information. The generated ink data 200 thus includes alpha information for each of at least some of the points. When the ink data 200 is rendered (drawn) on a screen, the alpha information may be used to give the drawn stroke a realistic look and nuanced expressions that closely simulate the appearance of a real stroke in ink hand-drawn on paper.

Figure 70:
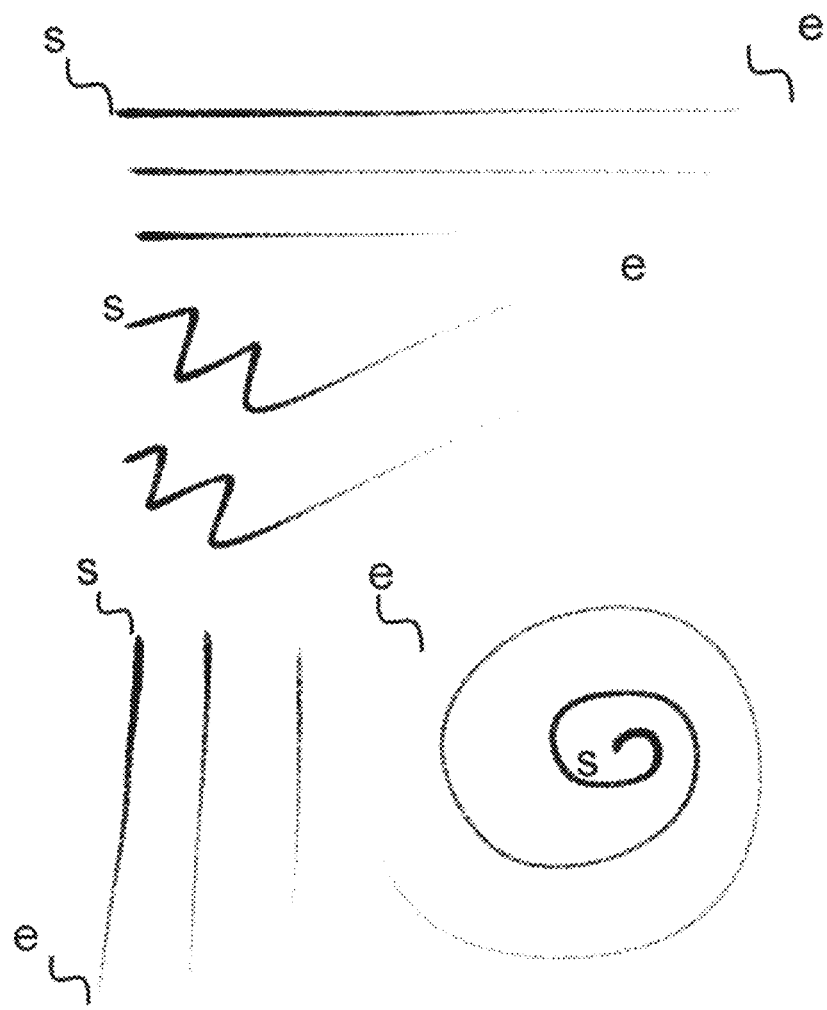
FIG. 70 illustrates drawing rendering examples resulting from input of the ink data generated based on both of the attenuate function of FIG. 54 and the power function of FIG. 56, according to third embodiments of the present invention.

FIG. 70 illustrates drawing rendering examples resulting from input of the ink data 200 generated based on both the attenuate function of FIG. 54 and the power function of FIG. 56, according to embodiments of the present invention. With the attenuate function, when velocity increases radius decreases, while with the power function, when velocity increases alpha (transparency) increases. Thus, in all of the drawing examples illustrated in FIG. 70, the width of a stroke decreases from "s" toward "e" while at the same time the stroke becomes lighter and more transparent (i.e., the darkness decreases) from "s" toward "e." Even when a given pen event data input does not include pressure information, the ink data processing section according to embodiments of the present invention is capable of obtaining velocity information for each point and calculating radius and alpha information for each point based on the velocity information. The generated ink data 200 thus includes radius and alpha information for each of at least some of the points. When the ink data 200 is rendered (drawn) on a screen, the radius and alpha information may be used to give the drawn stroke a realistic look and nuanced expressions that closely simulate the appearance of a real stroke in ink hand-drawn on paper.

FIG. 71 illustrates drawing rendering examples, which show effects of other functions (sigmoid and periodic functions) of FIG. 54 as used in step S1207_07 of FIG. 52, for special types of pens such as a pen having a particularly soft pen tip, according to embodiments of the present invention.

The drawing examples on the left-hand side result from the "SIGMOID" function of FIG. 54, in which attenuation occurs in steps, as opposed to exponentially as in the "attenuate" function. Thus, in each of the resulting drawn (rendered) strokes, the radius (width) of a stroke is decreasing in steps, from a wider portion to a narrower portion, as opposed to decreasing gradually as in the examples of FIG. 68. In the "SIGMOID (INCR)" function of FIG. 56, increase occurs in steps, as opposed to the "SIGMOID (DECR)" function of FIG. 54, in which attenuation occurs in steps. Thus, the drawing examples resulting from the "SIGMOID (INCR)" function of FIG. 56 have appearances similar to those of the drawing examples on the left-hand side of FIG. 71, but with the positions of "s" and "e" switched.

The drawing examples on the right-hand side of FIG. 71 result from the "PERIODIC" function of FIG. 54, in which the radius output changes (increases and decreases) periodically. Thus, in each of the resulting drawn (rendered) strokes, the radius (width) of a stroke changes periodically from "s" toward "e."

Figure 72:
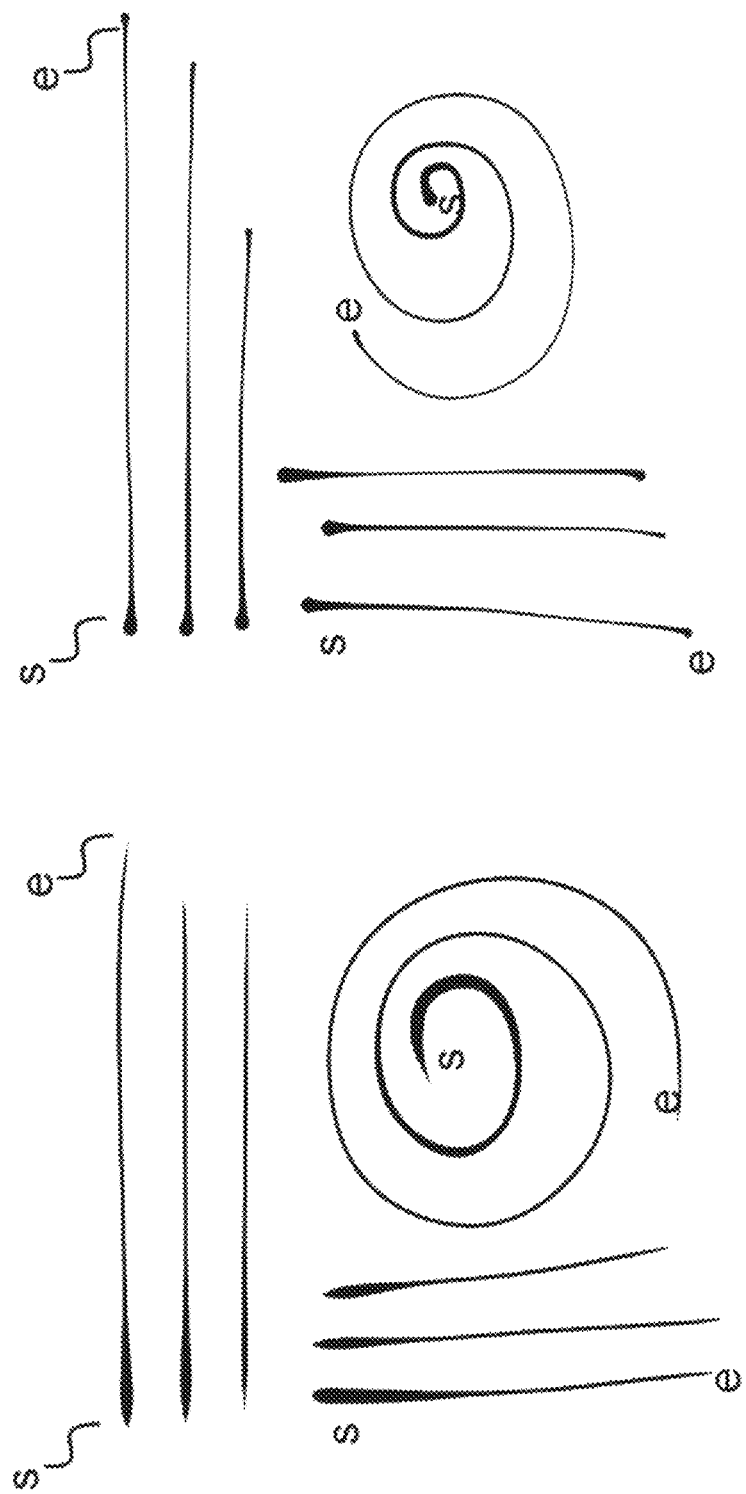
FIG. 72 illustrates drawing rendering examples, which show effects of using special values as the radii of the beginning and ending points of a stroke to be drawn, according to third embodiments of the present invention.

FIG. 72 illustrates drawing rendering examples, which show effects of using special values as the radii of the beginning point(s) and ending point(s) added in step S1207_04 of FIG. 52, according to embodiments of the present invention.

Specifically, in step S1207_02 of FIG. 52, a special value is set as a radius for each of the beginning point(s) and ending point(s) added to the beginning and ending of the stroke, respectively.

The left-hand side of FIG. 72 illustrates drawing examples when the radii of the beginning and ending points are set as zero ("0"). This means that no matter how fast or slow a user is moving a pen at the beginning or at the end of a stroke, the radius (width) of the beginning and ending points of the stroke is essentially ignored in the resulting drawing.

The right-hand side of FIG. 72 illustrates drawing examples when the radii of the beginning and ending points are set larger than (e.g., twice) the normally calculated radii, i.e., the radii that are calculated according to various embodiments of the present invention using various functions as described above. As shown, this results in the beginning and ending points of each stroke being accentuated, similarly to how, when a user draws a stroke with a pen on paper, the beginning and ending points of each stroke often appear accentuated on paper (because the pen is often paused at the beginning and ending of a pen stroke).

As described above, according to the ink data processing section, ink data generation method, ink data processing section, ink data reproduction method and ink data drawing method of various embodiments of the present invention, device-independent ink data may be generated and used to render (draw) strokes having realistic appearances. The ink data 200 is structured such that it can be shared by various types of devices and applications, some supporting pressure data and others not supporting pressure data. The ink data structure defines radius and/or alpha values for each of the points forming each stroke, and the radius and/or alpha values can be used, in place of pressure data, to give realistic appearances and nuanced expressions to the strokes drawn on a screen which closely simulate the appearances of actual strokes in ink hand-drawn on paper.

Though in the above description, pressure is described mostly as pen pressure applied by a pen, with respect to devices capable of obtaining (measuring) pressure applied by a finger, for example, pressure may mean finger pressure. Thus, in the present description, the term "pen pressure" is to be understood synonymously as "pressure," and the term "pen" is to be understood synonymously as "indicator" which may include pens (styluses), fingers, and any other implements, equipment and elements that a user may utilize to indicate a position on an input device.

Though in the above description, alpha is used to indicate the degree of transparency (greater alpha means greater transparency), a parameter that indicates the degree of opacity may also be used, such that a greater value of the parameter indicates a greater degree of opacity.

Though the ink data processing section is generally described as a separate entity from various applications that request reproduced ink data 200 from the ink data processing section, they may be jointly or integrally formed based on connections via library links, for example.

Fourth Embodiment

A fourth embodiment of the present invention is directed to systems and methods that receive pen event data which is based on a user's hand drawing motion and receive context information (INPUT 2) which is provided by an application or an operating system supporting the hand drawing motion. The context information (INPUT 2) includes information about the pen event data, such as the type of pen, author ID, etc. The systems and methods generate ink data 200 including stroke objects 210, metadata objects 250, and drawing style objects 230, based on the received pen event data and the received context information (INPUT 2). The systems and methods may further receive a manipulation information from the application or operating system supporting the hand drawing motion and generate a manipulation object, which forms part of the ink data, based on the received pen event data, the received context information (INPUT 2), and the received manipulation information.

Background of the Fourth Embodiment

A framework is desired that will permit digitized hand-drawn input data, or "ink data," to be shared among different operation systems, different applications, different services, different image formats, different pre-existing standards of strokes, etc. In short, unification of stroke data models is desired.

Hyper Text Markup Language (HTML) is one example of a successful unifying framework. HTML has been widely adopted as a common language to mark up (1) "text," which is essentially a set number of character code combinations, with (2) meta tags that mark up how the text should be characterized or described when displayed. For example, meta tags indicate font size, color, column, row, group, table, etc., which are commonly interpreted by different types of browsers to specify the appearance of text. Such common language allows for generation of a document that can be displayed on different devices in different computing environments in substantially the same manner (though there may be some minor variations and differences due to each browser implementation, for example).

The same is desired for hand-drawn input data. That is, a common language is desired that defines (1) "strokes" (or "traces" or "paths" inputted by a user's hand drawing motion), and (2) "objects" that characterize or describe the "strokes" such as the strokes' color, texture, offset position, etc. Such common language (or information model), hereinafter referred to as the "stroke language (SL)," will allow generation of a digital document that can be displayed on different devices in different computing environments in substantially the same manner (the same appearance), though there may be some minor variations and differences due to each rendering engine implementation, for example.

Some data structures configured to represent hand-drawn strokes in a manner sharable amongst different applications, such as InkML, ISF and JOT data structures, are known as described in Documents (D1), (D2) and (D5) above.

Briefly, InkML (D1) is provided for the purpose of representing ink inputted with an electronic pen or stylus by using a markup language that describes the inputted data. For example, InkML defines a data structure for a stroke, wherein the data structure <trace> contains a sequence of data generated by an input device, where the format of this data is specified in a separate data structure <traceformat> using a number of <channel> elements.

ISF (D2) is provided for the purpose of storing ink data in a binary form intended to be used in mobile devices like PDA, tablet PC and others that are using a stylus as an input mechanism. For example, ISF defines a data structure for a stroke, wherein the data structure TAG_STROKE contains a sequence of data generated by an input device, where the format of this data is specified in a separate data structure TAG_STROKE_DESC_BLOCK using various tags like TAG_NOX, TAG_BUTTONS and others. ISF involves compression encoding and is capable of generating static (persistent) streams using the method of picking the most suitable compression technique for every data type. For example, they use combinations of delta encoding and tuned version of Huffman algorithm for input coordinates, pressure levels and other stylus-generated data, and LZ algorithm for custom properties like custom drawing attributes.

JOT (D5) is provided for the purpose of exchanging data inputted by an electronic pen or stylus between different machines with various operating systems and architectures. For example, JOT defines a data structure for a stroke, wherein the data structure tag_INK_POINT describes a single pen event and its characteristics such as its position, force (pressure), rotation, etc.

Also, different standards not limited to processing hand-drawn strokes exist for the purpose of describing vector graphics in an input-independent manner. SVG 1.1 (D3) is one such example. Version 1.1 of SVG includes a path element, which relies on lines and Bezier curves for the purpose of representing strokes.

Summary of the Fourth Embodiment

Embodiments of the present invention may be understood as addressing one or more of three aspects, in particular ASPECT THREE.

Systems and methods are provided for generating, converting, and otherwise processing ink data 200 that is defined by a novel language (or information model), to achieve one or more aspects of the invention described above.

Embodiments of the invention are directed to outputting ink data 200 including stroke objects, which are statically described by metadata objects and/or dynamically controlled or manipulated by drawing style objects and manipulation objects. The stroke objects, metadata objects, drawing style objects and manipulation objects collectively form the ink data 200, which may be stored in a recording format (e.g., a stroke file format (SFF)) or in a transmission format (e.g., a stroke message format (SMF)).

The stroke objects according to embodiments of the present invention may have variable stroke width (i.e., width that varies along the length of a stroke) and variable stroke color or transparency (alpha)/opacity (i.e., color or transparency/opacity that varies along the length of a stroke), as in the third embodiments described above. The stroke objects according to embodiments of the present invention may be defined using suitable interpolation methods such as a Catmull-Rom spline method, and use special parameters to describe the beginning and/or ending of any partial stroke, as in the first embodiments described above.

Embodiments of the invention are directed to a method of generating ink data 200 which, depending on a connection/coupling status with a remote host, for example, is capable of dynamically manipulating remote (remotely located) stroke objects as well as dynamically manipulating local stroke objects.

Description of the Fourth Embodiment

Figure 73:
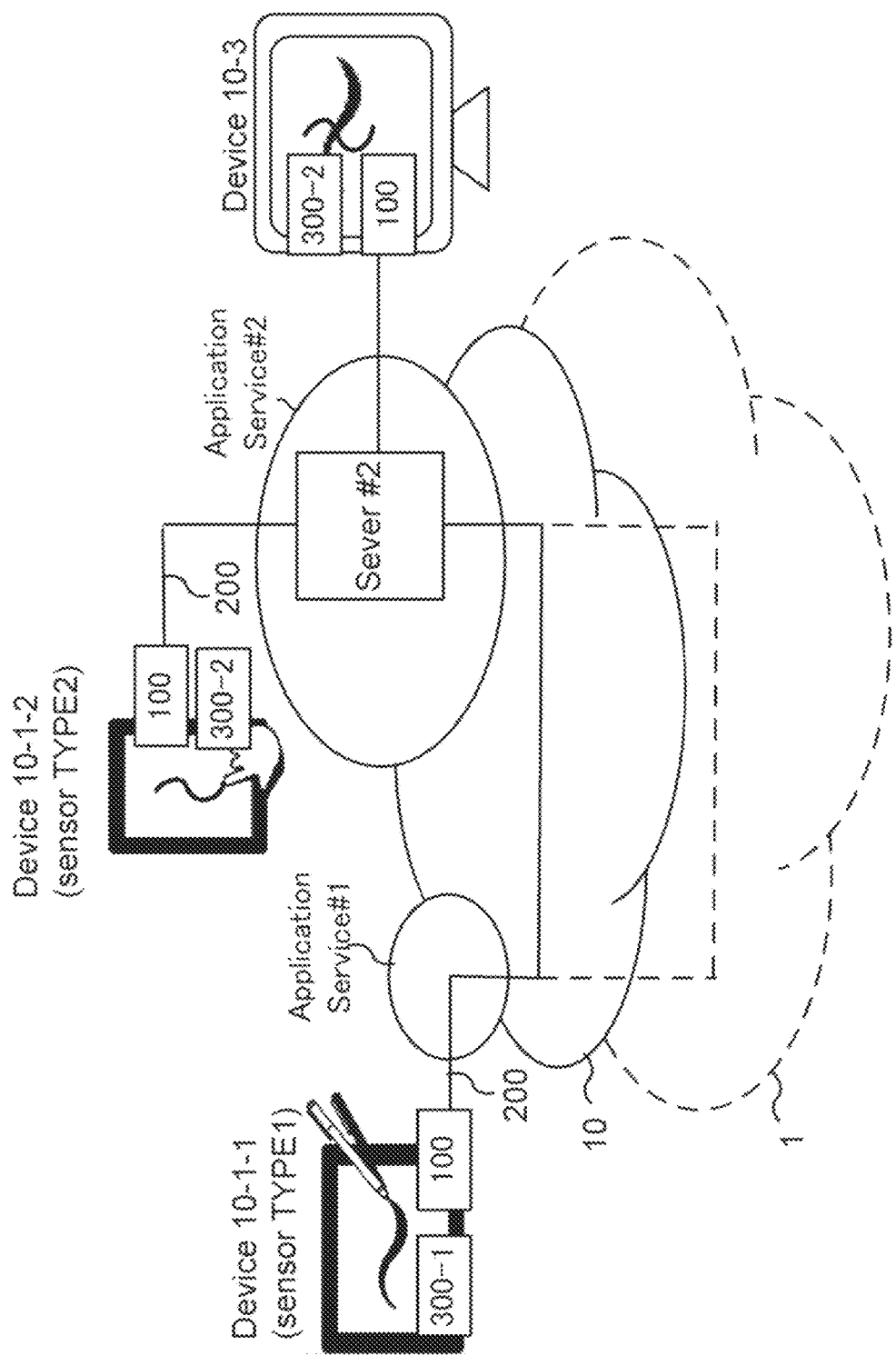
FIG. 73 is a diagram illustrating an overall system in which ink data are utilized, according to fourth embodiments of the present invention.

FIG. 73, is a diagram illustrating an overall system in which ink data 200 is utilized, according to embodiments of the present invention. As compared to the system described in FIG. 1, the system of FIG. 73 additionally includes a Server #2 supporting Application Service #2 which is accessed by Device 10-1-2 and Device 10-1-3. Application Service #1 and Application Service #2 in FIG. 73 may both utilize and exchange the ink data 200 via the ink data exchange infrastructure 10. In FIG. 73, Device 10-1 is a pen-type input device capable of outputting pen pressure data, and generates the ink data 200 using Application 300-#1 provided by Application Service #1. Application 300-1 links a TCP/IP library and libraries for ink data processing section 100 and graphic processing section 300 (not shown in figure) that implements an ink data generation method of the present invention. The generated ink data 200 may then be outputted in a suitable output form (e.g., in packets) corresponding to the destination media (e.g., a network).

Device 10-1-2 is a tablet-type input device capable of receiving hand-drawn input made by a user's finger. The sensor of Device 10-1-2 is not capable of outputting pen pressure data, but may still generate the ink data 200 using Application 300-2 provided for Application Service #2. Application 300-2 links or utilizes libraries like the TCP/IP stack and libraries for ink data processing section 100 on Server #2 that implements an ink data generation method of the present invention. The generated ink data 200 may then be outputted in a suitable output form (e.g., in packets) corresponding to the destination media (e.g., a network).

Device 10-3 is a desktop-type PC that subscribes to Application Service #2. Device 10-3 may process (e.g., render on its display screen or redistribute) the ink data 200 outputted from Device 10-1-1 or Device 10-1-2, using Application 300-2 provided by Application Service #2. Application 300-2 dynamically links or utilizes libraries like the TPC/IP stack and libraries for ink data processing section 100 that implements an ink data reproduction method of the present invention.

Figure 74:
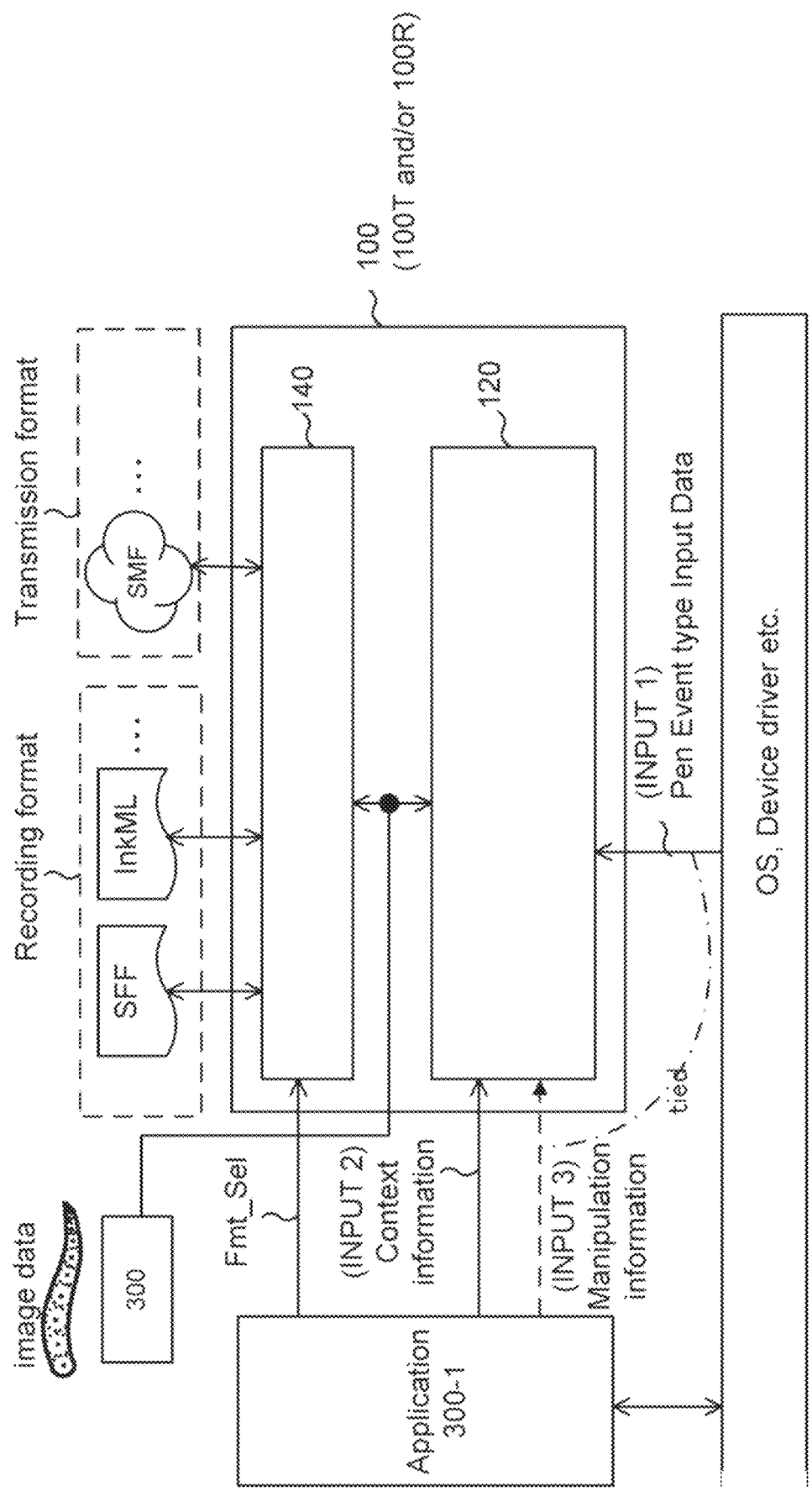
FIG. 74 is a functional block diagram of an ink data processing section according to fourth embodiments of the present invention.

FIG. 74 is a block diagram of an ink data processing section 100 according to embodiments of the present invention. The ink data processing section 100 corresponds to the ink data processing section 100 shown in FIG. 6. The ink data processing section 100 may be implemented as a library dynamically or statically linked to an application, such as a drawing application 300-1 utilizing graphic processing section 300 in FIG. 6. The ink data processing section 100 includes an ink data generation section 120 and an ink data formatting section 140. The ink data generation section 120 generally inputs/includes/receives three types of information: 1) PenEvent type input information ("INPUT 1"), 2) Context information ("INPUT 2"), and 3) manipulation information ("INPUT 3").

INPUT 1:

"PenEvent type input data," or simply input data or pen event data, is inputted from an OS, device driver, API for obtaining data from an input device such as a pen tablet sensor. The input data may be from a variety of input devices, as illustrated on the left hand side of FIG. 92. The input data is not limited to raw data from an input device, and may include pen event data generated by processing raw data, such as InkML and ISF data.

INPUT 2:

Context information indicates context that is used to support input of the PenEvent type input data described above. The context information may include, for example, date and time information regarding a stroke (e.g., when the stroke is inputted), pen type, pen color, pen ID, author ID, the resolution and sampling rate of an input device, etc., which are provided by the application (Application 300-1) or the OS used to generate the stroke.

INPUT 3:

A manipulation information is a command to indicate that the next stroke to be entered is to form a manipulation object used to manipulate a pre-existing stroke object 210, instead of a normal stroke object 210. Such command may be entered by a user activation of a switch or button associated with an input device, and is provided to the ink data generation section 120 from the application 300-1. For example, when a user wishes to "slice" a pre-existing stroke object 210, the user issues a manipulation information and makes a hand-drawing motion to slice the pre-existing object. In view of the manipulation information, the ink data generation section 120 uses the user's slicing motion to slice the pre-existing stroke instead of drawing another stroke based on the user's slicing motion.

The ink data generation section 120 inputs/receives these three types of information (INPUT 1, INPUT 2 and INPUT 3) and generates a group of objects according to the definition of the stroke language (SL) as shown in FIG. 48B described above in reference to the third embodiments.

The ink data formatting section 140 is separate from the ink data language handling section 120 that generates the ink data including various objects. In FIG. 74, from below to above, i.e., in the output direction, a group of objects generated by the ink data generation section 120 is inputted to the ink data formatting section 140, which outputs data in a "recording format" or in a "transmission format." In FIG. 74, from above to below, i.e., in the input direction, data in a recording format or in a transmission format is inputted to the ink data formatting section 140, which reproduces a group of objects and provides the reproduced group of objects to the ink data generation section 120. In the following figures, SL means a stroke language (see FIG. 48B), SFF means a Stroke File Format which is one type of recording format, and SMF means a Stroke Message Format which is one type of transmission format.

Figure 75:
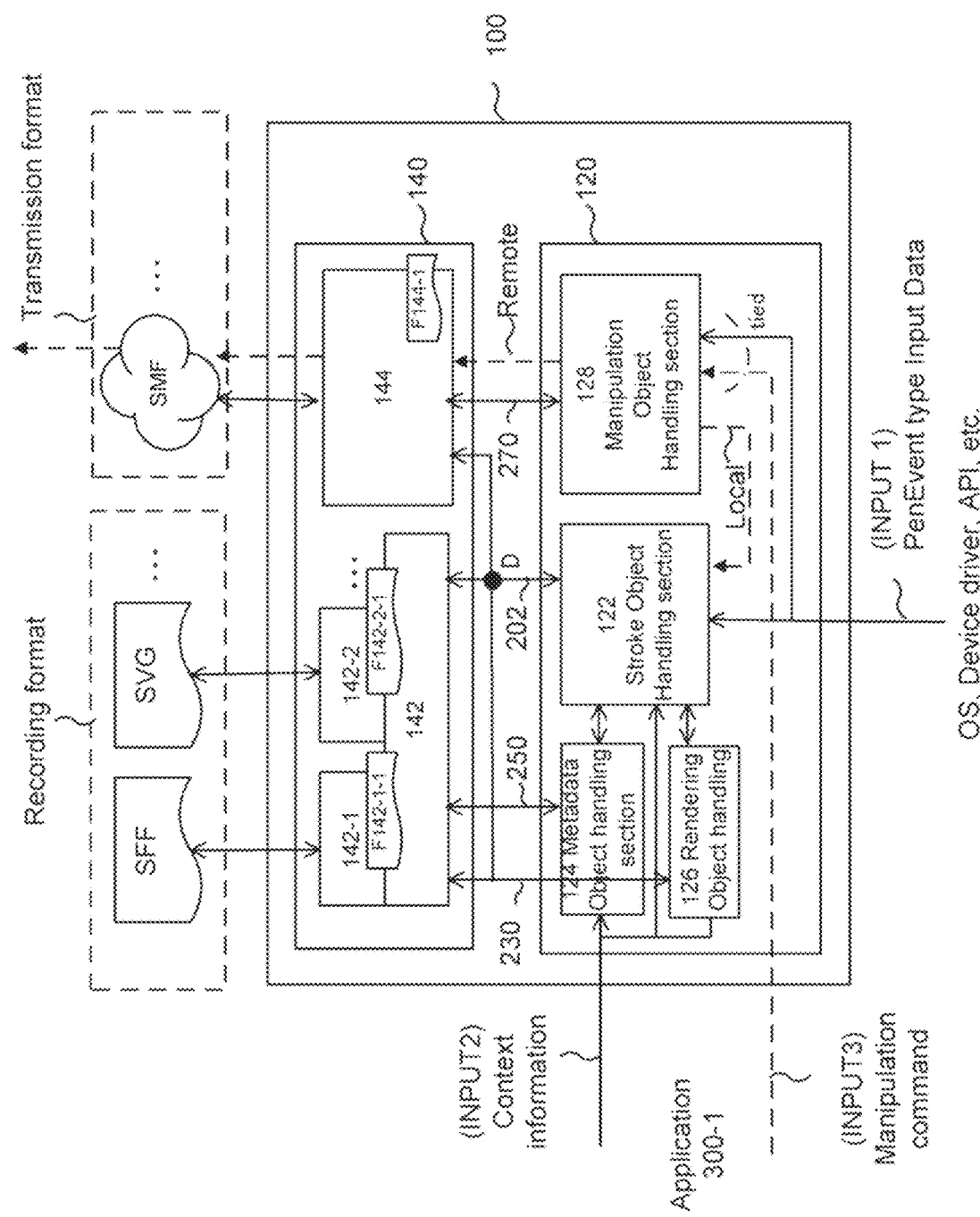
FIG. 75 is a more detailed functional block diagram of the ink data processing section of FIG. 74, according to fourth embodiments of the invention.

FIG. 75 is a more detailed functional block diagram of the ink data processing section of FIG. 74, according to various embodiments of the invention. The ink data processing section 100 in this figure corresponds to the ink data processing section 100 shown in FIG. 6

The ink data generation section 120 includes a stroke object 210 handling section 122, a metadata object handling section 124, a rendering (drawing style) object handling section 126 and a manipulation object handling section 128.

The stroke object handling section 122 receives the PenEvent type input data as input (INPUT 1), and in reference to the context information (INPUT 2), generates stroke objects 210 that form the core of the stroke language.

The metadata object handling section 124, based on the PenEvent type input data (INPUT 1) and the context information (INPUT 2), generates a metadata object 250 that describes the stroke object 210. A metadata object contains non-drawing related information about the stroke object 210, such as date and time information, author ID and pen ID, which does not impact the appearance of the stroke object 210 as drawn on a screen.

The rendering (drawing style) object handling section 126, based on the stroke object generated in the stroke object handling section 122 and in reference to the context information (INPUT 2), generates a drawing style object 230 that controls rendering (drawing) of the stroke object 210 and defines how the stroke object 210 appears when rendered on a screen.

The manipulation object handling section 128, upon receipt of a manipulation information ("INPUT 3" in FIG. 75), uses the next "stroke" received as INPUT 1 to generate a manipulation object 270 configured to manipulate the state of a pre-existing stroke object 210 that may exist locally ("Local") or remotely over a network ("Remote").

Accordingly, the ink data generation section 120 generates a group of objects based on the stroke language, as shown in FIG. 48B, based on the three types of input information ("INPUT 1," "INPUT 2" and "INPUT 3" in FIG. 75).

The ink data formatting section 140 includes a recording format data processing section 142 configured to output a file in a recording format such as the SFF, InkML and JPEG formats, and an ink data communication section 144 configured to output a message in a transmission format such as the SMF format. Data defined by the stroke language according to definitions of these various formats are outputted, such as in an SFF structure description file (schema file) (F142-1-1), an SVG structure description file (F142-2-1), and an SMF structure description file (F144-1). Thus, it becomes possible to generate and reproduce various objects pursuant to the stroke language, wherein the objects can be inputted and outputted in a variety of recording formats and/or transmission formats. While the file ink data formatting section 140 as illustrated supports two recording formats, SFF and SVG, it may support more than two recording formats, or may support only one recording format when the application 300-1 does not need to support all possible file formats.

Output from the manipulation object handling section 128 (e.g., manipulation object 270 in FIG. 75) may be arranged in an SMF message and transmitted over a network to manipulate (e.g., slice) one or more pre-existing stroke objects that exist remotely.

<Methods of Generating Language Objects>

FIGS. 76-83B are functional block diagrams and flowcharts illustrating the structure and operation of the stroke object handling section 122, the metadata object handling section 124, the rendering (drawing style) object handling section 126, and the manipulation object handling section 128, according to embodiments of the present invention.

<SM (Stroke Model): Apparatus/Method for Generating Stroke Object>

Figure 76:
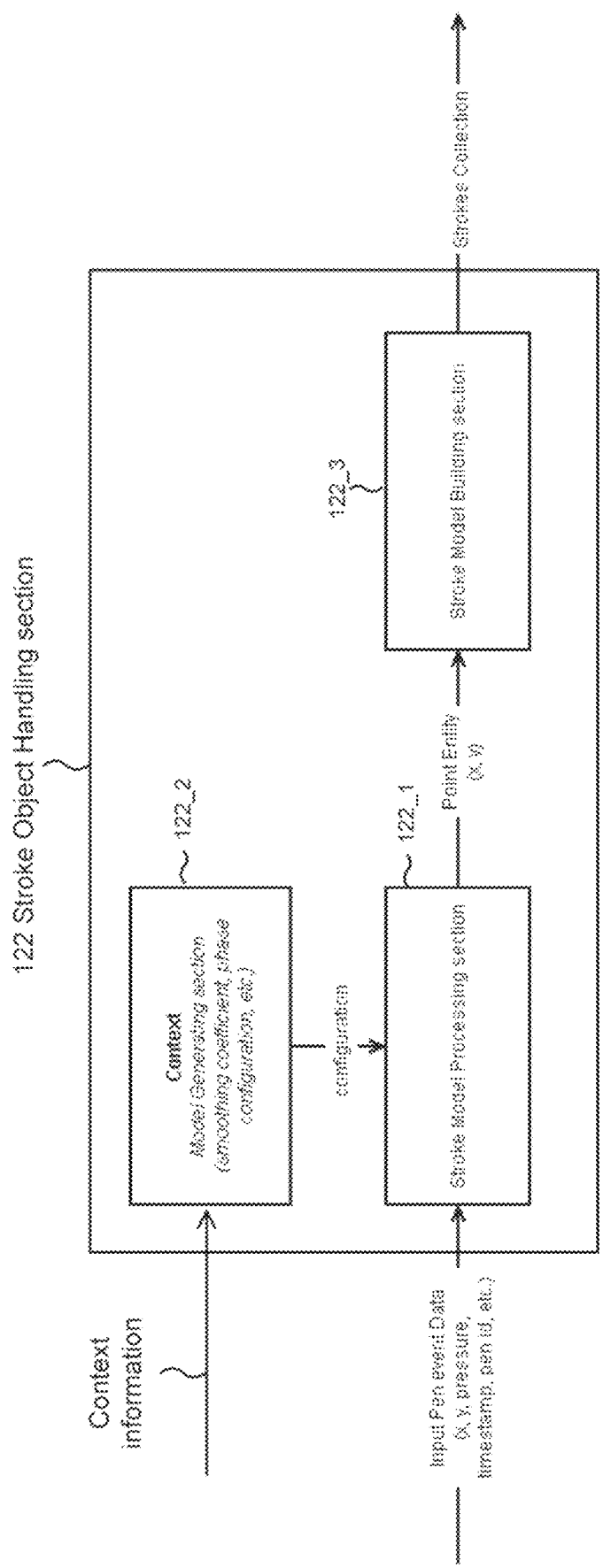
FIG. 76 is a functional block diagram of a stroke object handling section (122) of FIG. 75.

FIG. 76 is a functional block diagram of a stroke object handling section 122 of FIG. 75. The stroke object handling section 122 includes a stroke model processing section (122_1) which inputs pen event data ("INPUT 1"), or pen event type data such as inkML data, and which outputs point objects. Each point object includes x and y coordinates of the point and may also include radius and alpha values as attributes of the point, as described in reference to the third embodiments above, such that the outputted point object may be represented as (x, y, radius, alpha). The stroke object handling section 122 includes a model generating section (122_2), which receives context information ("INPUT 2") and prepares a configuration to be outputted to the stroke model processing section (122_1) for use in generating point objects. The stroke object handling section 122 further includes a stroke model builder section (122_3), which assembles the generated point objects that together form a stroke into a stroke object 210. The stroke object handling section 122 thus outputs a plurality of generated stroke objects.

Figure 77A:
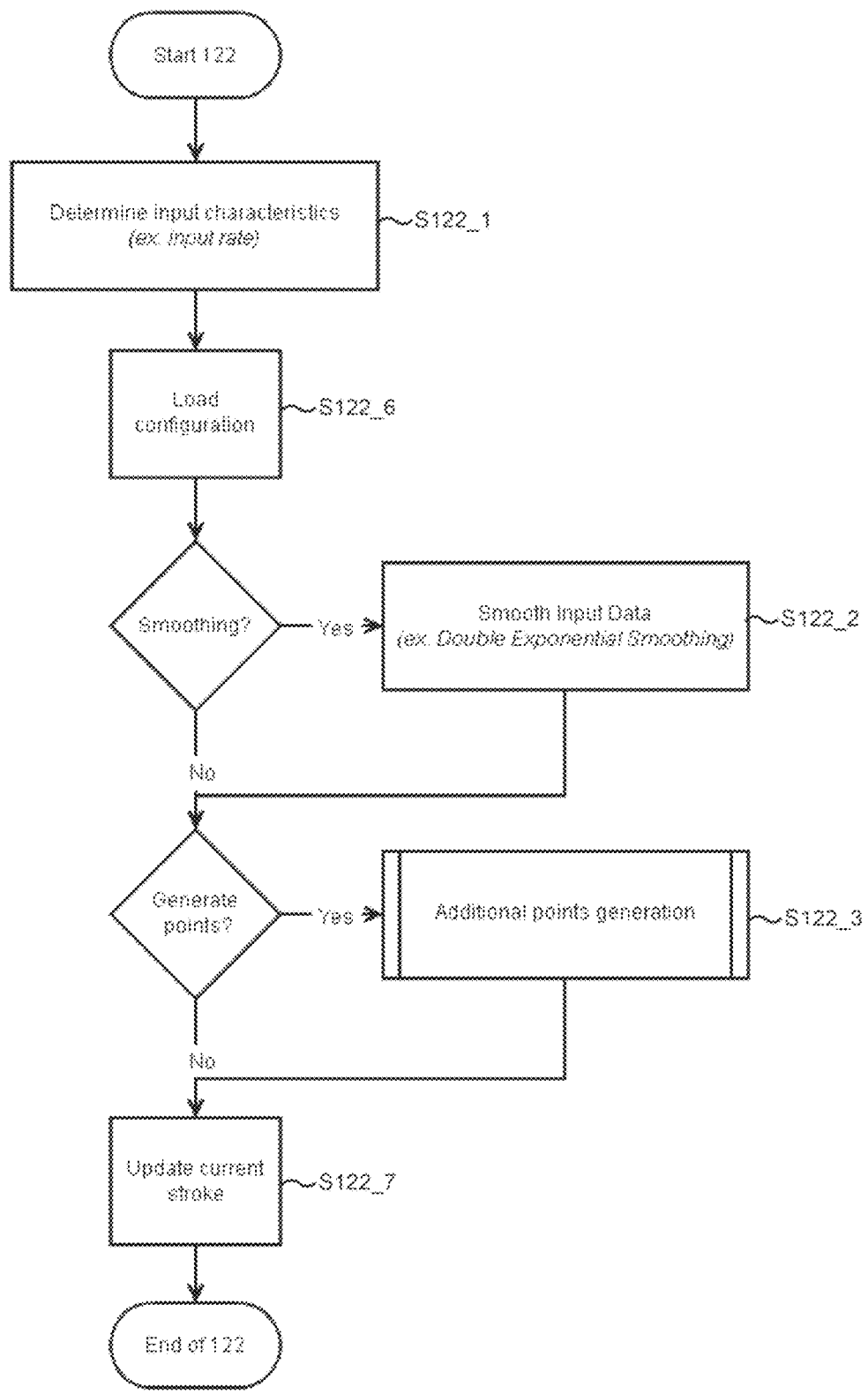
FIGS. 77A and 77B are flowcharts illustrating a method of generating a stroke object.

FIG. 77A is a flowchart illustrating a process of generating a stroke object 210. In S122_1 the model generating section 122_2 processes the context information ("INPUT 2") to extract parameters, such as input rate, used to define a configuration. In S122_6, the defined configuration is loaded to the stroke model processing section 122_1 and used to generate point objects. If the configuration directs the stroke model processing section 122_1 to apply smoothing, then in S122_2 the stroke model processing section 122_1 applies smoothing to the array of points to generate smoothed point objects. For example, a double exponential smoothing algorithm may be used, which may be configured with a suitable window size, smoothing data factor, and trend smoothing factor. If the configuration directs that no smoothing is to be applied, S122_2 is skipped. If the configuration directs the stroke model processing section 122_1 to generate additional points, then in S122_3 the stroke model processing section 122_1 generates additional points and appends them to the beginning and/or the ending of a stroke. The steps like S_122_2 and S_122_3 are executed before S122_7 depending on the context information processed in the model generating section 122_2. As another example, position values of the point objects that form a stroke object 210 may depend on the interpolation method (e.g., a Catmull-Rom spline method) specified in the configuration loaded in S122_6. In step S122_7 the stroke model building section 122_3 assembles the generated point objects to form a new stroke object 210 or update a pre-existing stroke object 210.

Figure 77B:
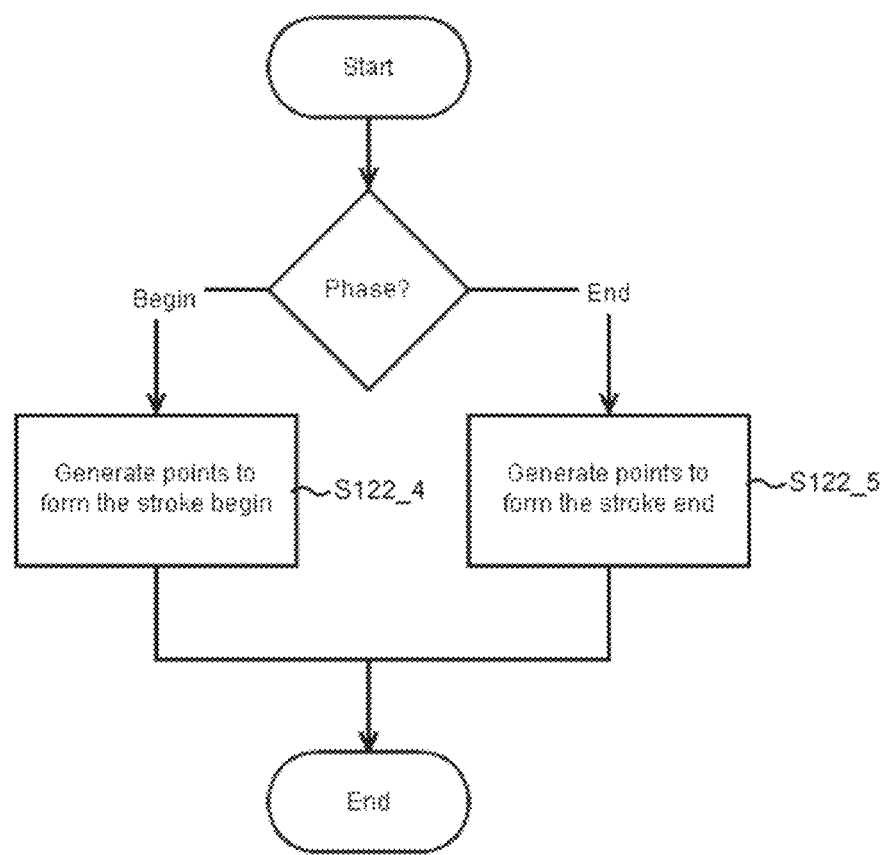

FIG. 77B describes a detailed algorithm of S122_3 of FIG. 77A, wherein additional points are generated and appended to the beginning and/or the ending of a stroke. As shown, depending on the phase of the point being processed, a different algorithm can be executed. Phase of a point indicates a position of the point relative to a stroke to which the point belongs. For example, if the phase is "begin" indicating that the point is a beginning point of a stroke ("end" is analogous, indicating an ending point of a stroke), then in S122_4 (S122_5 for "end" phase) one or more (e.g., 3) points are generated and appended to form the beginning (ending) of the stroke. Similar to S122_7 in FIG. 77A, position values of the point objects generated and added in S122_4 (S122_5) may depend on the interpolation method (e.g., a Catmull-Rom spline method) specified in the configuration loaded in S122_6. If the phase is "middle," indicating that the point is in the middle section of a stroke, then no additional points are generated for that point.

<MD (MetaData): Apparatus/Method for Generating Metadata Object>

Figure 78:
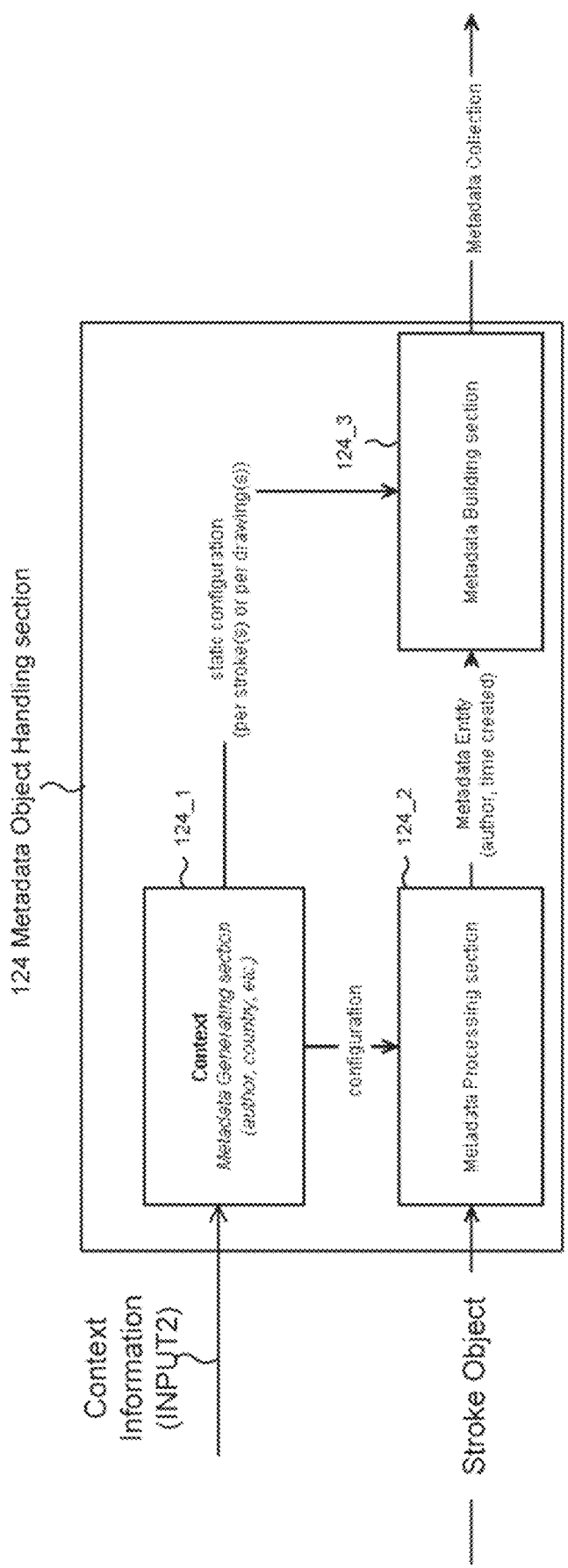
FIG. 78 is a functional block diagram of a metadata object handling section (124) of FIG. 75.

FIG. 78 is a functional block diagram of a metadata object handling section 124 of FIG. 75. The metadata object handling section 124 includes a metadata generating section 124-1, which receives context information ("INPUT 2") and extracts metadata therefrom such as author ID, location, etc. At least some of such metadata is arranged into a configuration and sent to a metadata processing section 124_2, which processes a stroke object 210 received from the stroke object handling section 122 pursuant to the configuration. A metadata object 250 is to be generated to describe the received stroke object 210. The metadata processing section 124_2 extracts metadata, such as time information, from the received stroke object 210 and sends the extracted metadata to a metadata building section 124_3. The metadata generating section 124_1 also sends static configuration(s) extracted from the context information to the metadata building section 124_3. Typically, a static configuration is common for an entire drawing. The metadata building section 124_3 builds a metadata object 250 based on the metadata received from the metadata generating section 124_1 and the metadata processing section 124_2.

Figure 79:
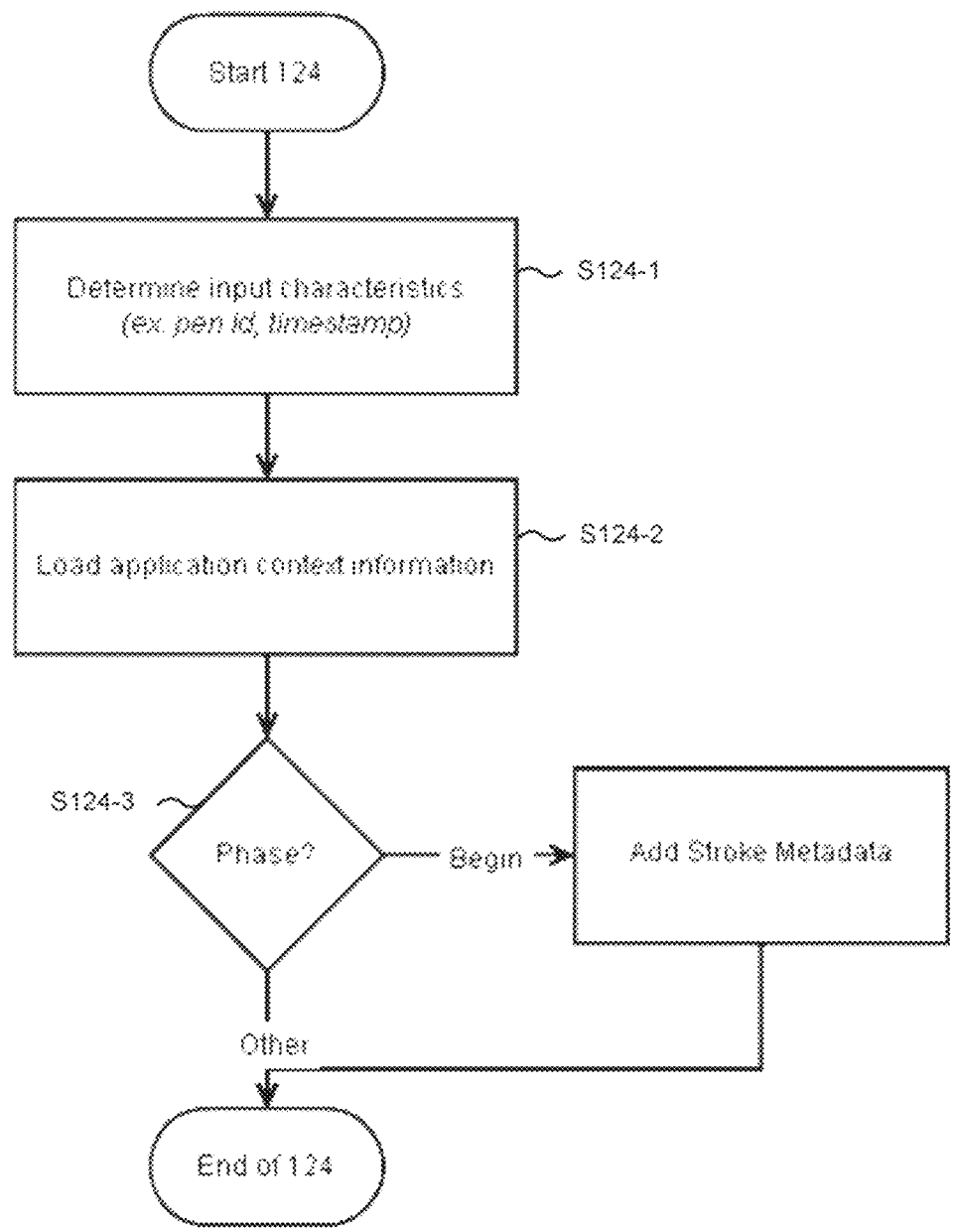
FIG. 79 is a flowchart illustrating a method of generating a metadata object.

FIG. 79 is a flowchart illustrating a process of generating a metadata object 250. In S124_1 the metadata generating section 124_1 and the metadata processing section 124_2 extract metadata from their respective input, such as pen ID, timestamp, etc. In S124_2, the extracted metadata as application context information is loaded to the metadata building section 124_3. In S124_3, the phase of the point being processed is determined. If the point is a beginning point of a stroke object 210, then a metadata object 250 is generated and associated with the point. Since typically only one metadata object 250 is needed per stroke object 210, a metadata object 250 need not be generated and associated with the rest of the points other than the beginning point.

<R (Rasterization): Apparatus/Method for Generating Rendering (Drawing Style) Object>

Figure 80:
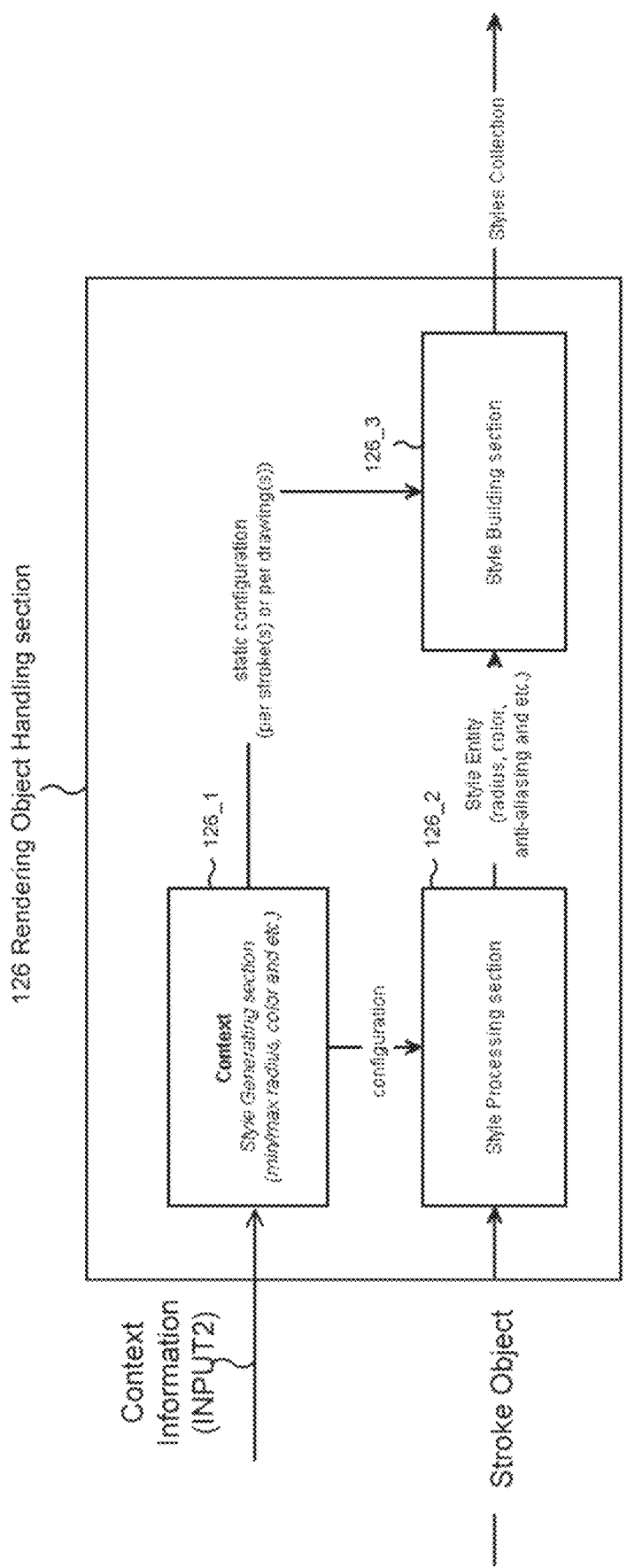
FIG. 80 is a functional block diagram of a rendering (drawing style) object handling section (126) of FIG. 75.

FIG. 80 is a functional block diagram of a rendering (drawing style) object handling section 126 of FIG. 75. The rendering object handling section 126 includes a style generating section 126_1, which receives context information ("INPUT 2") and extracts information such as min/max radius information, min/max velocity information, min/max pressure information, color information, etc. At least some of such information is arranged into a configuration and sent to a style processing section 126_2, which processes a stroke object 210 received from the stroke object handling section 122 pursuant to the configuration. A drawing style object 230 is to be generated to define how to draw (render) the received stroke object 210. The style processing section 126_2 extracts style related parameters, such as (variable) radius, (variable) color, (variable) alpha (transparency) and anti-aliasing parameters, from the received stroke object 210 and the configuration and sends the extracted information to a style building section 126_3. The style generating section 126_1 also sends static configuration(s) extracted from the context information to the style building section 126_3. Typically, a static configuration is common for an entire drawing. For example, if all strokes in a drawing have the same composition blending mode, the mode value is a static configuration.

Figure 81:
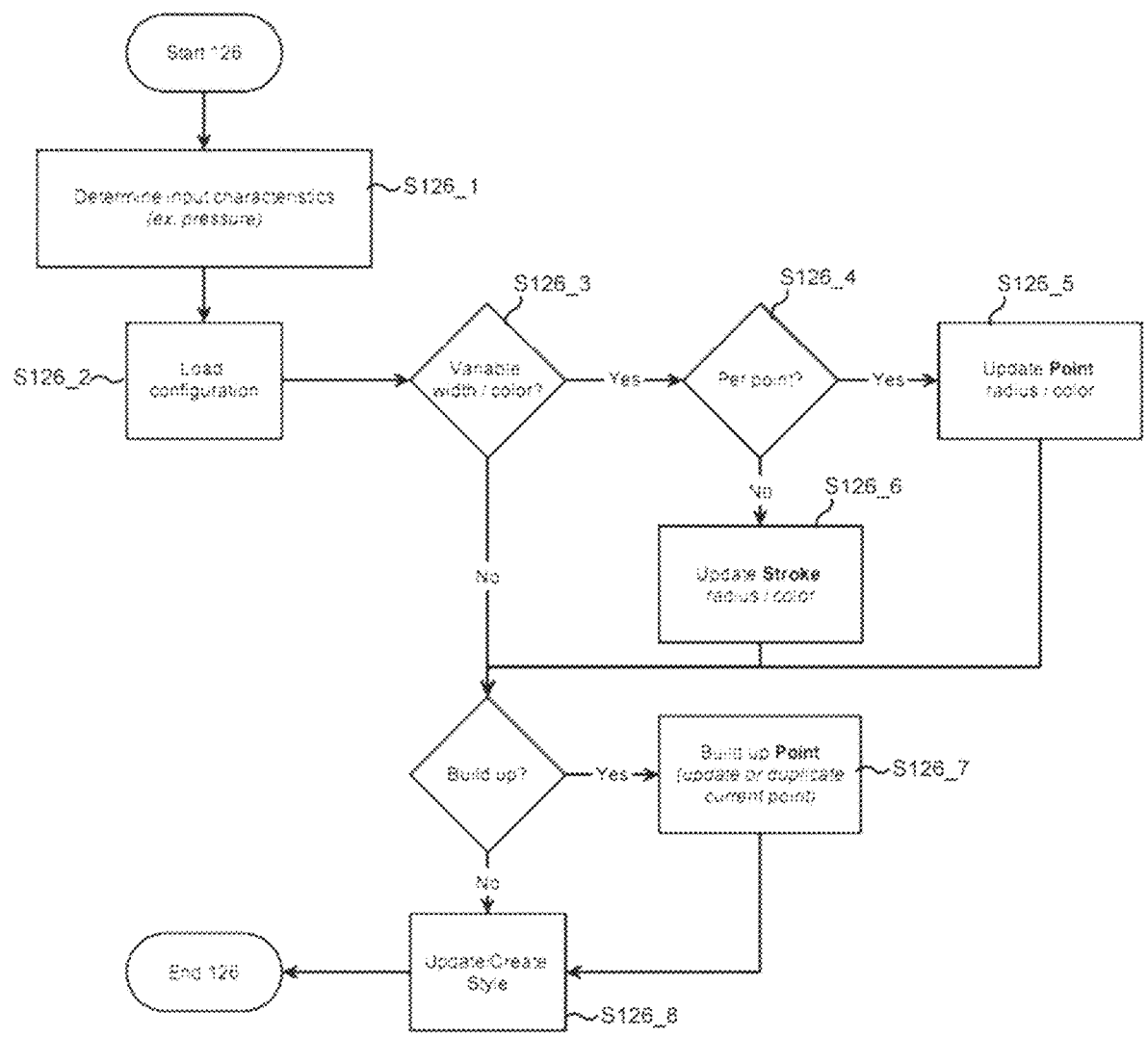
FIG. 81 is a flowchart illustrating a method of deriving a (drawing) style object and its cascading properties.

FIG. 81 is a flowchart illustrating a process of generating a style object. In step S126_1, the style processing section 126_2 determines input characteristics, such as pressure data, timestamp data, position data, etc. based on the stroke object 210 and the context information available from the application. In S126_2 a suitable configuration is loaded depending on the characteristics determined in step S126_1. For example, if a selected tool in the application is a ballpoint pen and the input characteristics contain pressure data, then a configuration for a pressure-based ballpoint pen is loaded. As another example, if a selected tool is a ballpoint pen and the input characteristics do not contain pressure data but include a timestamp, then a configuration for a velocity-based ballpoint pen is loaded (because velocity can be derived from timestamp information). In step S126_3 the loaded configuration is examined to determine whether width (or color) is variable or not. Then in step S126_4 it is determined whether width (or color) is variable per point, meaning that a stroke can have width or color that varies along its length. If "yes," then in S126_5 a cascading style property radius (and/or color) is generated per each point object. Otherwise in S126_6 a cascading style property is generated for the stroke object 210.

Another example for optional cascading property is a build up property. Build up property is used to simulate an extra ink spillage when the input device is in both static position and down state. A real world analogy for this property is the behavior of a watercolor brush on a soft paper. When the watercolor brush is in a static position, the soft paper soaks in paint and therefore the contact point becomes darker and bigger. In step S126_7 a build up property is generated for each point object if the inputted stroke object 210 satisfies the build up conditions specified by the configuration loaded in S126_2. For example if a user does not produce any movement in the down state and a build up algorithm is activated in the loaded configuration, then in step S126_7 the current (last-generated) point is duplicated or updated, to increase the points density in this particular position.

Other steps similar to the previously described steps may be executed before S126_8 depending on the loaded configuration in S126_2. In step S126_8, a style object is generated. All of the cascading style properties updated in steps S126_5, S126_6 and S126_7 and others are assembled into a style object in S126_8.

<M (Manipulation): Apparatus/Method for Generating Manipulation Object>

Figure 82:
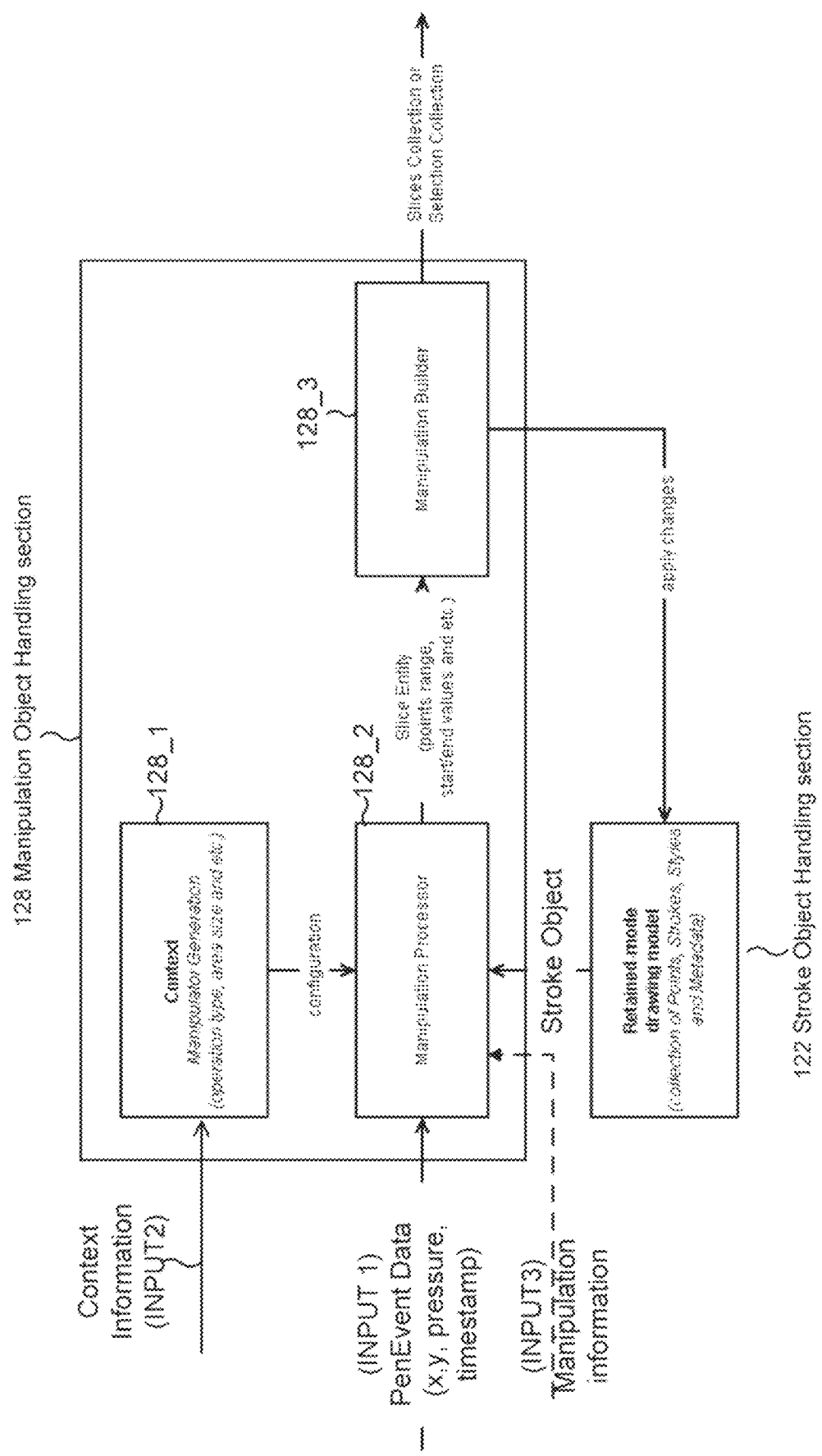
FIG. 82 is a functional block diagram of a manipulation object handling section (128) of FIG. 75.

FIG. 82 is a functional block diagram of a manipulation object handling section 128 of FIG. 75. The manipulation object handling section 128 includes a manipulator generation section 128_1, which receives and processes context information ("INPUT 2") to prepare a configuration for use by a manipulation processor 128_2. The manipulation processor section 128_2 processes pen event data ("INPUT 1") in reference to the configuration received from the manipulator generation section 128_1 and also in reference to a manipulation information ("INPUT 3") received from the application, to thereby generate a manipulation entity, such as a slice entity. A manipulation builder 128_3 receives the manipulation entity, such as the slice entity, and builds a manipulation object, such as a slice object 274. A manipulation object is configured to execute a defined operation on a pre-existing stroke object 210. For example, a slice object 274 is used to slice a pre-existing stroke object 210 into two slice pieces. A collection of manipulation (e.g., slice) objects generated by the manipulation builder 128_3 may be sent over a network to be executed on pre-existing stroke object(s) that exist remotely, or may be executed locally on pre-existing stroke object(s) generated and stored in the stroke object handling section 122. As illustrated, the manipulation processor 128_2 may also receive stroke object(s) from the stroke object handling section 122, based on which to generate manipulation entities.

Figure 83A:
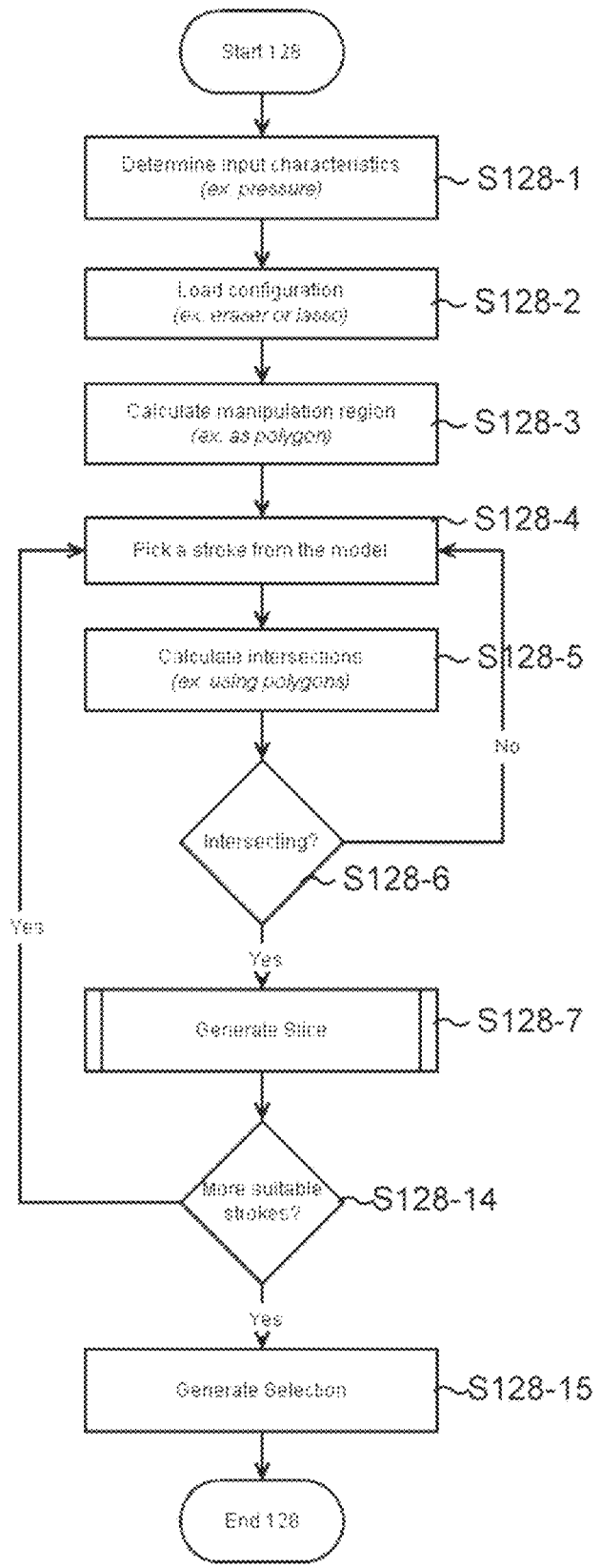
FIGS. 83A and 83B are flowcharts illustrating a method of deriving a manipulation object, such as a slice object.

FIG. 83A is a flowchart illustrating a process of generating a manipulation object. In step S128_1 input characteristics, such as pressure, position, and timestamp information, are extracted from INPUT 1 and INPUT, and also a manipulation information (INPUT 3) is received. In step S128_2, a suitable configuration is loaded, wherein the configuration is determined from the extracted input characteristics and application context information ("INPUT 2"). In step S128_3, new input is processed according to the loaded configuration and to form a manipulation object. For example, if the new input is a polygon shape, the polygon shape defines a manipulation region. For example, if a manipulation object to be generated is a lasso tool, the polygon shape defines the scope of the lasso tool. In S128_4 one pre-existing stroke object 210 is selected out of plural pre-existing stroke objects, and in S128_5, any intersections between the selected pre-existing stroke object 210 and the manipulation region (e.g., the polygon shape) are calculated. If no intersections are found in S128-7, another pre-existing stroke object 210 is selected and steps S128_4, S128_5 and S128_6 are repeated until at least one intersection with one pre-existing stroke is found. When an intersection between a pre-existing stroke object 210 and the manipulation region is found, in S128-7, a slicing manipulation object is generated, which is configured to "slice" the pre-existing stroke object 210 at the intersection. In S128_14 it is determined if there are more pre-existing stroke objects with which the manipulation region may intersect. If "yes," the process returns to step S128_4. If all of the pre-existing stroke objects are checked for their intersections with the manipulation region, in S128_15 the generated slice object(s) are assembled into a collection of slice object(s).

Figure 83B:
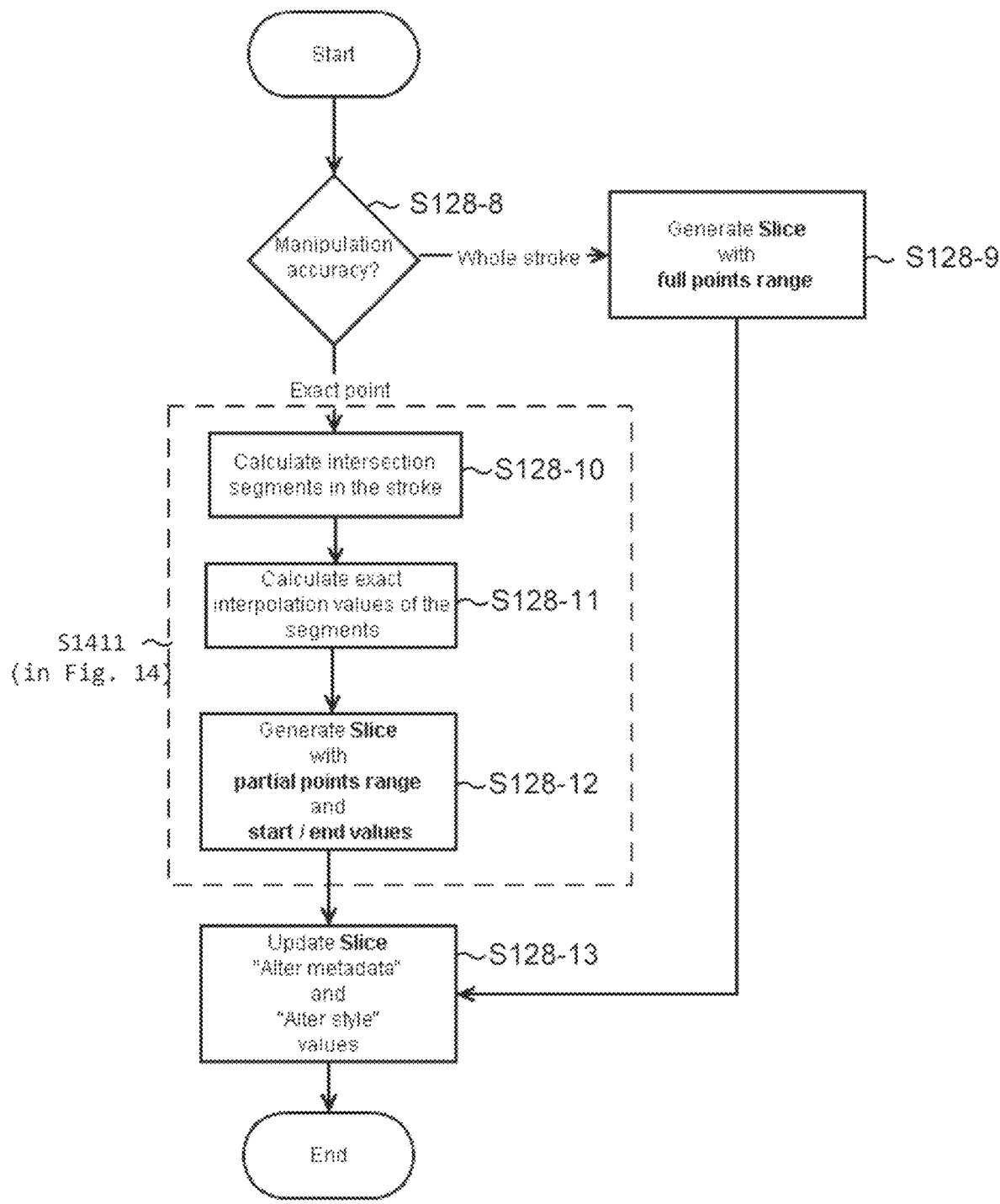

FIG. 83B is a flow chart illustrating a process of generating a slice object. In S128_8 the configuration loaded in S128_2 is used to determine "manipulation accuracy." If the manipulation accuracy is "whole stroke," then in S128_9 a slice object 274 is generated, which slices a pre-existing stroke object 210 to generate two slice pieces wherein each of the pieces is defined by a sub-set of the original point objects forming the pre-existing stroke object 210. In other words, even when the intersection with the manipulation region lies between two adjacent point objects of the pre-existing stroke object 210, the exact location of the intersection is not used to define the two slice pieces.

If the manipulation accuracy is "exact point," in S128_10, the intersected (curve) segment between two adjacent point objects is found, wherein the intersected segment is where the manipulation region intersects the pre-existing stroke object 210. One or more intersected segments are found. In S128_11 each of the intersected segments is processed to find the exact location of the intersection using an interpolation method, for example. In S128_12, for each intersected segment, two slice pieces are generated, each having the exact location of the intersection as an ending position or a starting position. In S128_13 the generated slice pieces are updated to respectively become new stroke objects, and each of the newly created stroke objects is associated with a metadata object 250 and a drawing style object 230.

As described above, the ink data processing section 100 and its associated method generate stroke objects as well as objects associated with the stroke objects 210, including metadata objects 250, rasterization drawing style objects 230, and manipulation objects 270.

Configuration and operation of the ink data formatting section 140 are now described in detail in reference to FIGS. 84-90C.

Figure 84:
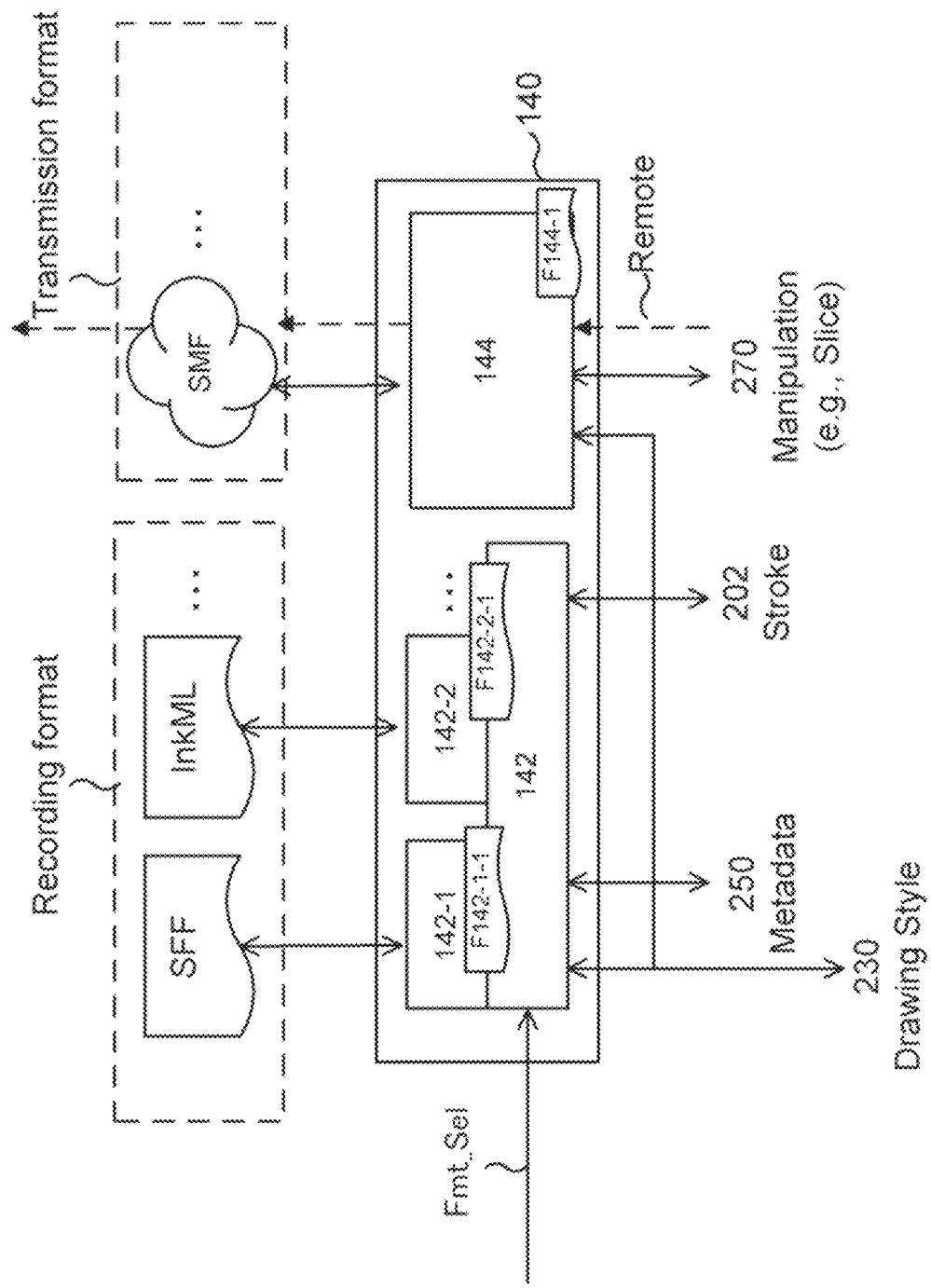
FIG. 84 is a functional block diagram of an ink data ink data formatting section (140) of FIG. 75.

FIG. 84 is a functional block diagram of the ink data formatting section 140 of FIG. 75. As described above in reference to FIG. 75, the ink data formatting section 140 includes a recording format data processing section 142 that outputs a file in a recording format such as the SFF, InkML and JPEG formats, and an ink data communication section 144 that outputs various objects (stroke objects 210, metadata objects 250, drawing style objects 230 and manipulation objects 270) in a transmission format. Thus, it is possible to generate and reproduce various objects pursuant to the stroke language, which can be inputted and outputted in a variety of recording formats and/or transmission formats.

The recording format data processing section 142 is configured to arrange stroke objects, metadata objects and drawing style objects in a recording format. Sub-sections 142-1, 142-2, et seq. are processing sections configured to arrange objects pursuant to respective output file formats.

The ink data communication section 144 arranges manipulation objects, such as slice objects 274, in a stroke message format suitable for (real time) transmission over a network to a remote device. A manipulation object arranged in a transmission format can be executed on any pre-existing stroke objects that exist locally or that may exist remotely over a network.

Figure 85:
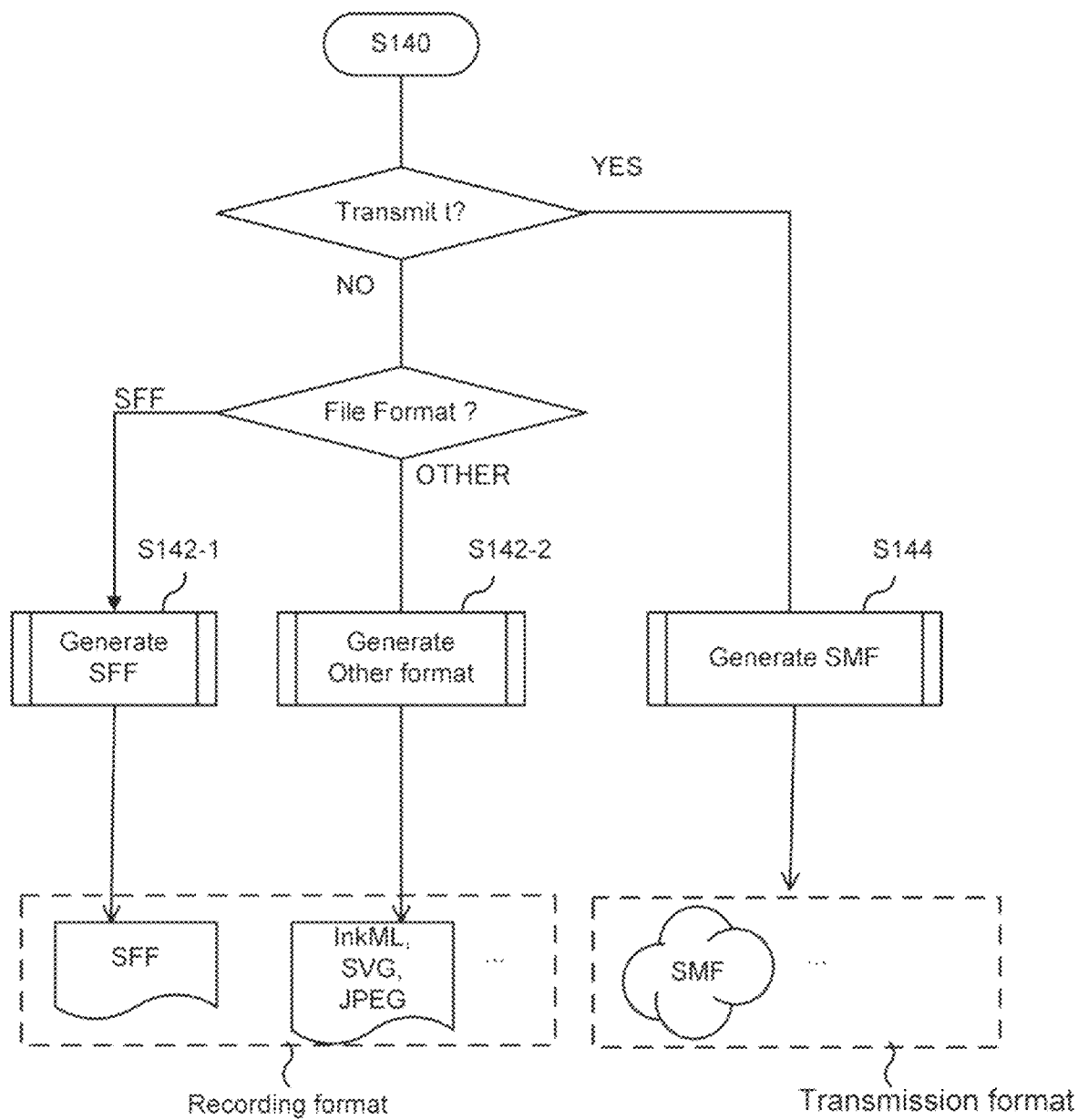
FIG. 85 is a flowchart illustrating a process performed in the ink data ink data formatting section of FIG. 84.

FIG. 85 is a flowchart illustrating a process performed in the ink data formatting section 140. First, it is determined whether an object needs to be transmitted. The determination may be made based on whether a stroke object 210, which is locally structured at the present time, is shared with any remote terminal. If yes, in step S144, the object is arranged in a Stroke Message Format (SMF) to be transmitted over a network. If, on the other hand, it is determined that the object is not to be transmitted, the object is arranged in a suitable recording format selected from a plurality of recording formats. If a Stroke File Format (SFF) is to be used as an output format, in step S142-1 an SFF generation process is performed. If other formats such as the SVG and JPEG formats are to be used, in step S142-2, for example, an SVG generation process is performed to output an SVG format file that includes the stroke language information based on expansion of SVG.

Figure 86:
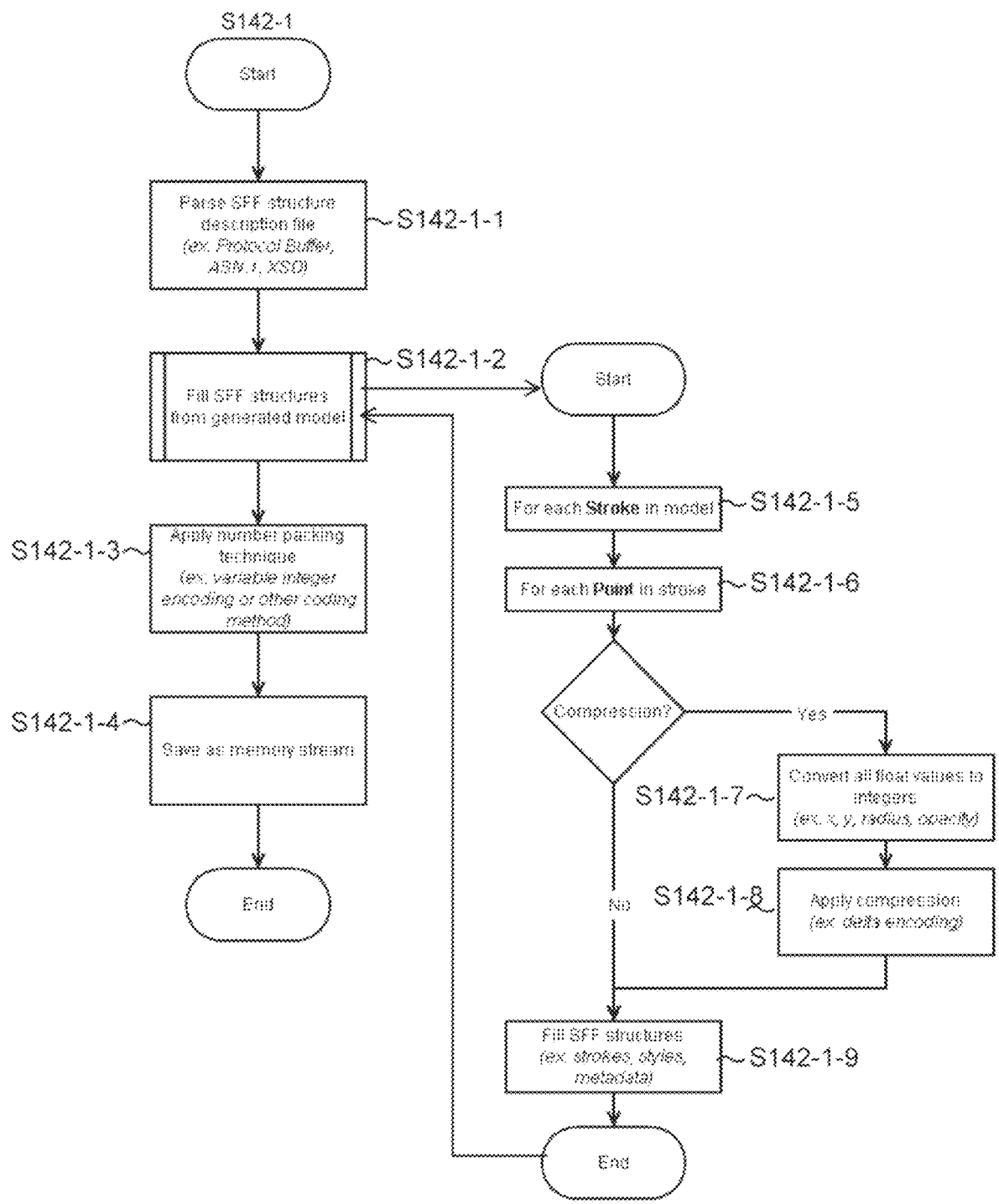
FIG. 86 is a flowchart illustrating a method of outputting a stroke file format (SFF) data.

FIG. 86 is a flowchart illustrating a process of outputting a stroke file format (SFF) data. In S142-1-1, an SFF structure description file (F142-1-1) is parsed to generate an SFF structure. The SFF structure is described using an interface description language. Each software application that uses SFF needs to understand (parse) the description file in order to properly work with SFF data. For example, if the SFF structure is expressed using the Protocol Buffers IDL then stub classes generated by a Protocol Buffers compiler are loaded in S142-1-1. In S142-1-2, the SFF structure is filled in with various objects generated in the ink data generation section 120 of FIG. 75. In S142-1-3 the SFF structure is processed using various techniques for optimal memory representation of abstract data types, such as a variable integer encoding technique and an exponential-Golomb code technique. In S142-1-4, the generated memory representation of the SFF structure is packed into a memory stream. The generated memory stream may be saved in a file system or a file structure.

S142-1-2 may include multiple steps for appropriately filling the SFF data structure. For each stroke object 210 included in the ink data being processed (S142-1-5) and for each point object included in the stroke object 210 being processed (S142-1-6), it is determined whether a compression operation is to be performed. If "yes," in S142-1-7 all floating-point values are converted to fixed-point precision values and represented as integers. Any loss of precision can be compensated for in the stroke object handling section 122 or in the rendering object handling section 126 by rounding point object floating-point values to the desired precision. In S142-1-8 a compression algorithm, such as delta encoding, is applied to the generated integer values. In S142-1-9, the objects that have undergone the compression process, if compression is applied, are used to fill the SFF structure.

Figure 87:
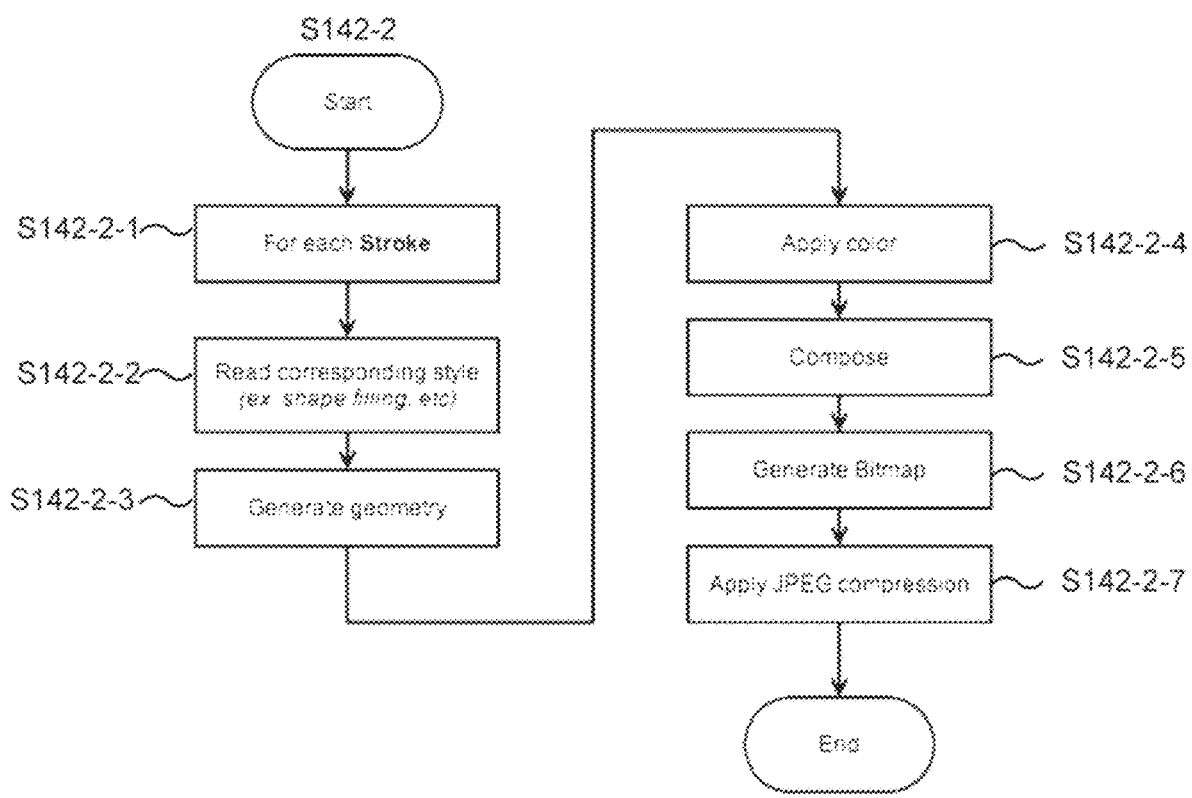
FIG. 87 is a flowchart illustrating a method of outputting JPEG format data.

FIG. 87 is a flowchart illustrating a process of outputting JPEG format data. For each stroke object 210 included in the ink data being processed (S142-2-1), in S142-2-2 all drawing style objects that are linked with the stroke object 210 are retrieved and all rasterization (drawing) properties defined in the drawing style objects are loaded (e.g., mixing and texture properties). At this time all cascading values, such as color and radius values, are resolved. In S142-2-3 geometry of the stroke is generated using a CPU or GPU. In S142-2-3 the stroke is rasterized (drawn) by applying all rasterization/graphical information on the generated geometry, such as color, texture, etc., using a CPU or GPU. In S142-2-5 all rasterized strokes are composed together. In S142-2-6 a bitmap is generated that contains all of the stroke objects as rendered (drawn, rasterized). In S142-2-7 the bitmap data is compressed using a JPEG algorithm.

Figure 88:
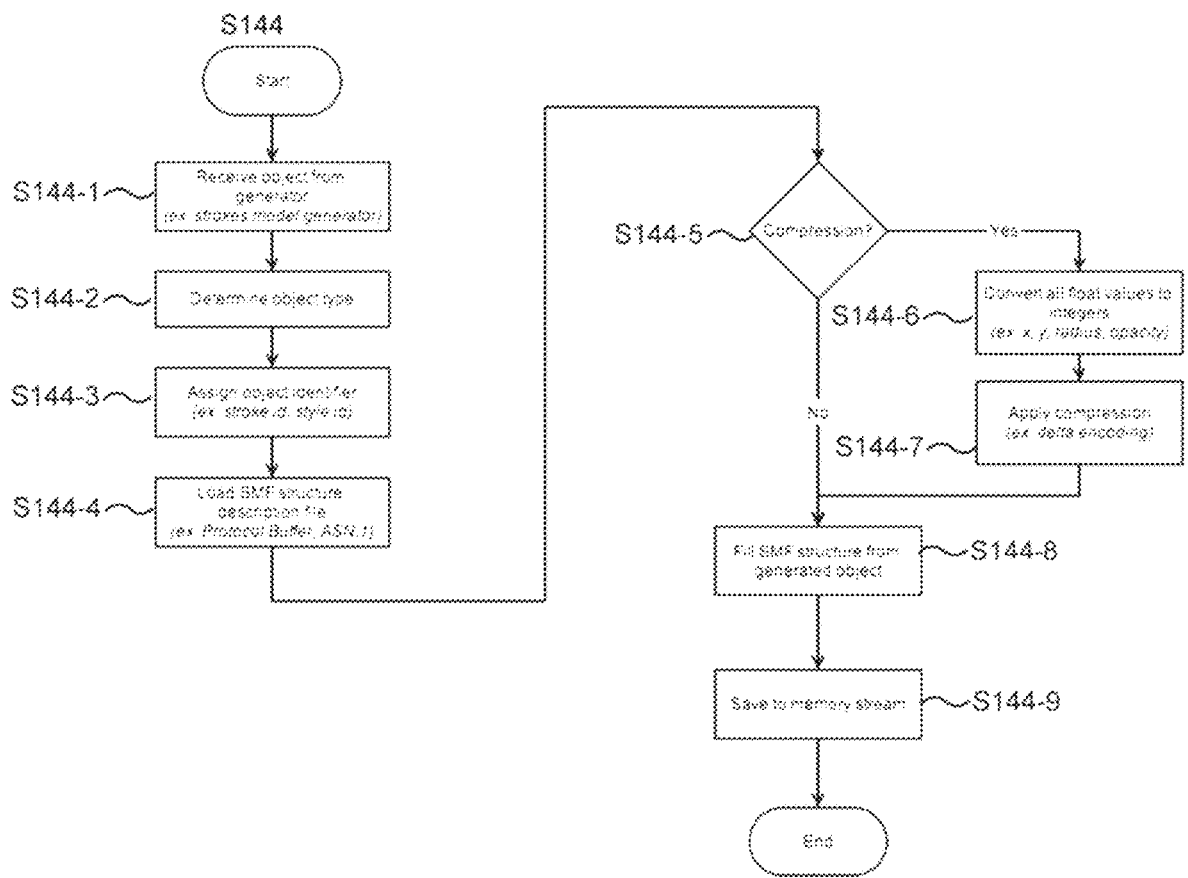
FIG. 88 is a flowchart illustrating a method of outputting a stroke messaging format (SMF) data.

FIG. 88 is a flowchart illustrating a process of outputting a stroke messaging format (SMF) data. In S144-1 an object is received from one of the object handling sections 122, 124, 126 or 128 of FIG. 75. In S144-2 the object type is determined as a stroke object 210, a metadata object 250, a drawing style object 230, or a manipulation object. In S144-3 an identifier (e.g., a stroke ID, a style ID) is assigned to the object to indicate a connection between the object and the rest of the objects in the ink data 200 being processed. In S144-4 an SMF structure description file (F144-4) is parsed and the SMF structure corresponding to the determined object type is loaded. For example, if the SMF structure is expressed using the Protocol Buffers IDL, then stub class generated by a Protocol Buffers compiler are loaded. In S144-5, it is determined whether a compression operation is to be performed on the determined object. If "yes," in S144-6 all floating-point values (e.g., x, y, radius, opacity, transparency) are converted to fixed-point precision values and represented as integers. In S144-7 a compression algorithm, such as delta encoding, is applied to the generated integer values. In S144-8, the objects that have undergone the compression process, if compression is applied, are used to fill the SMF structure. In S144-9 the SMF data is saved into a memory stream.

FIG. 89 is a functional block diagram that explains input processing of data (SFF/JPEG and SMF) that have been outputted in various file formats and transmission formats.

In FIG. 89, an ink data output handling section 140T illustrated on the left hand side performs the output processing described above. The ink data 200 is outputted in a recording format such as the SFF format and the JPEG format, or in a transmission format such as the SMF format.

These files and/or messages outputted in various formats may then be inputted (received) by an ink data input handling section 140R illustrated on the right hand side of FIG. 89. In various embodiments, the ink data input processing and the ink data output processing are carried out in the same processing section(s) that share the same libraries, such as in the same sub-section 142-1 (both IN and OUT) and sub-section 142-2 (both IN and OUT).

The recording format data processing section 142 in the ink data input handling section 140R removes format-dependent data from the inputted data, extracts information regarding the ink data objects of various types, and outputs the extracted information regarding the ink data objects to the ink data generation section 120 on the receiving side.

The ink data communication section 144R in the ink data input handling section 140R extracts manipulation objects from the received packets or messages, and directs each extracted manipulation operation to be executed (applied) to pre-existing stroke objects in the ink data generation section 120 on the receiving side.

Figure 90A:
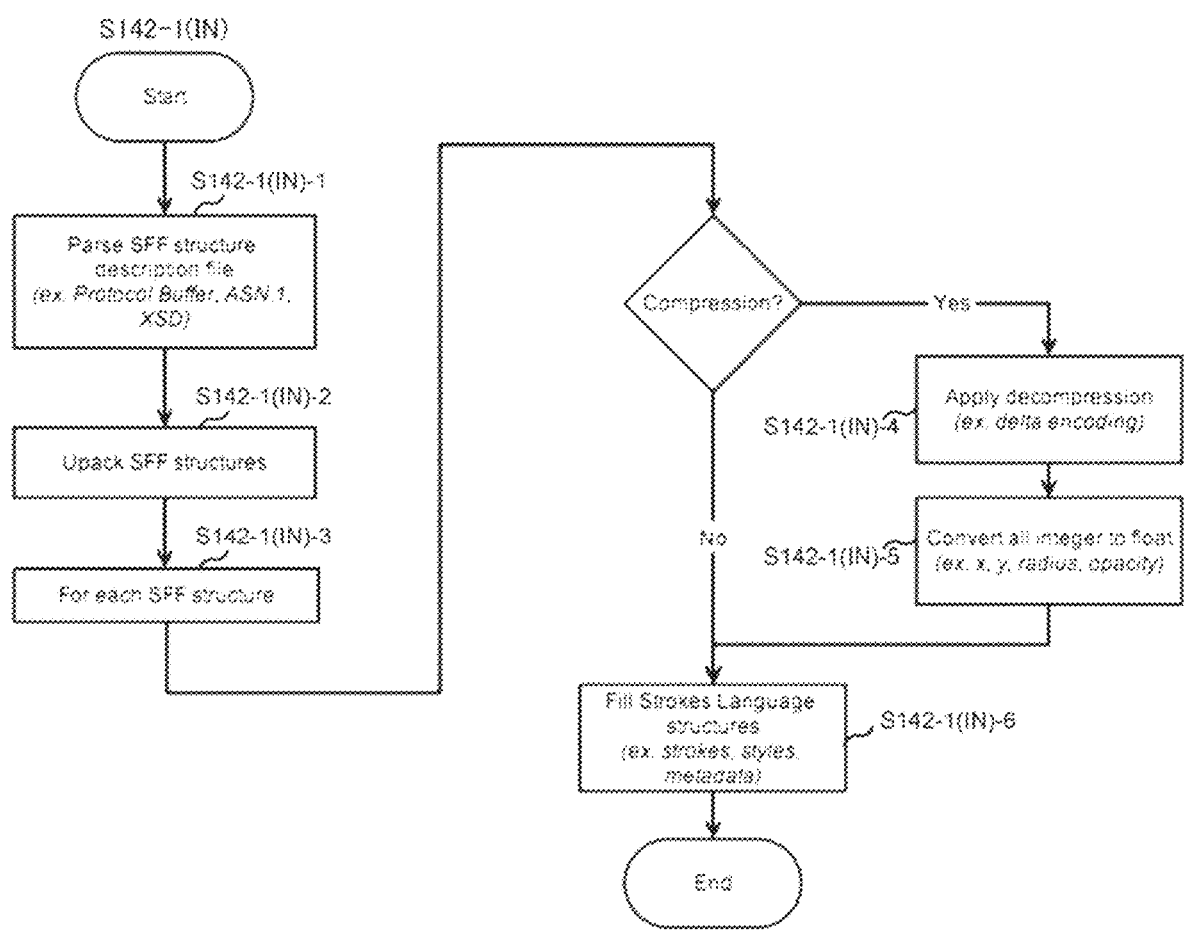
FIG. 90A is a flowchart of processing to interpret and reproduce an object arranged in an SFF file.

FIG. 90A is a flowchart of a process to interpret and reproduce an object arranged in an SFF file. In S142-1(IN)-1, an SFF structure description file is parsed to generate an SFF structure. In S142-1(IN)-2 the SFF structure is unpacked. One or more SFF structures are unpacked, and for each of the unpacked SFF structures (S142-1(IN)-3), it is determined whether the unpacked SFF structure is compressed. If "yes," in S142-1(IN)-4, the unpacked SFF structure is decompressed, and in S142-1(IN)-5, decompressed fixed-point values represented as integers are converted back to floating-point representation. In S142-1(IN)-6, a corresponding Strokes Language object is created (e.g., a stroke object 210, drawing style object 230, metadata object 250).

Figure 90B:
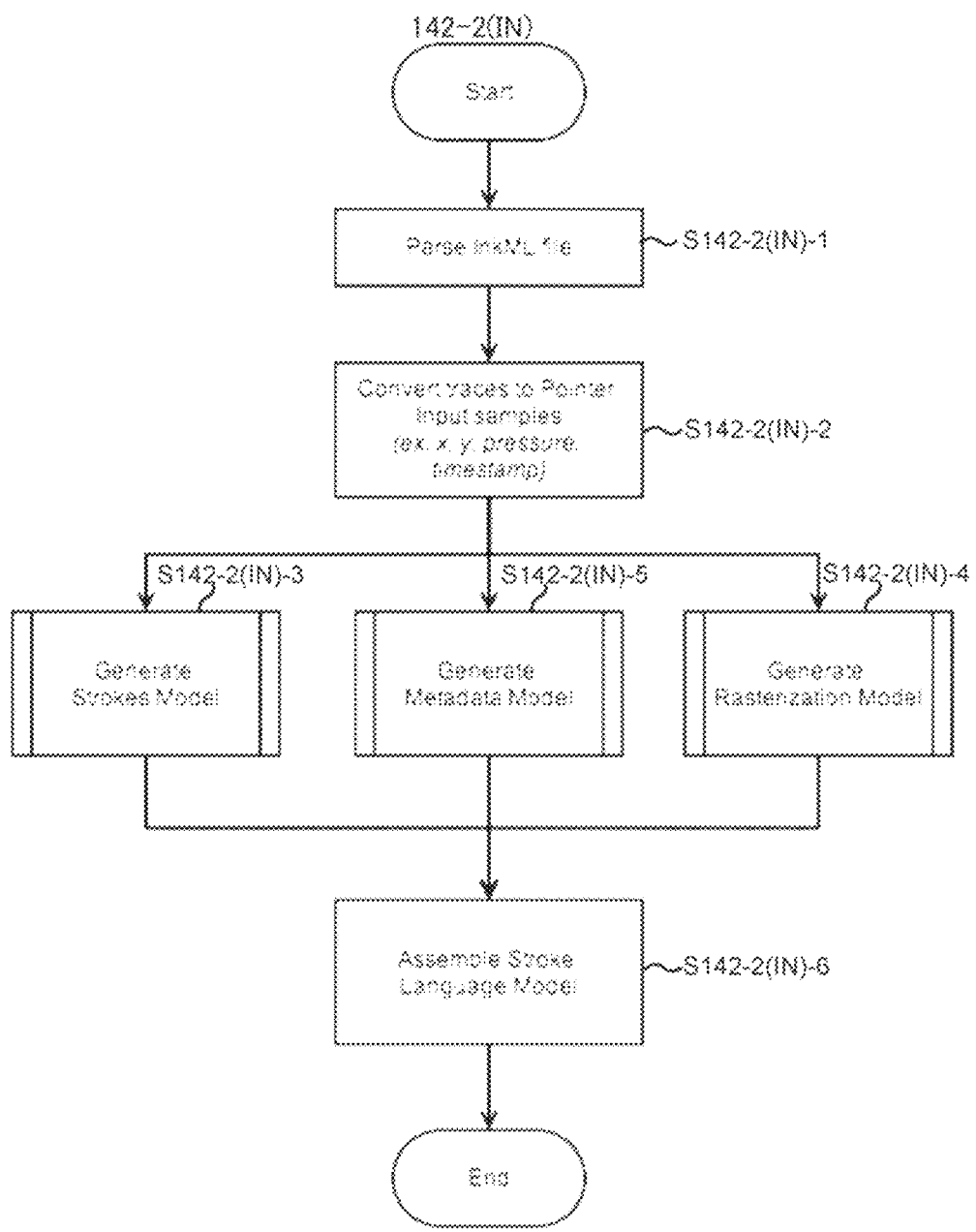
FIG. 90B is a flowchart of processing to interpret and reproduce an object based on input in InkML.

FIG. 90B is a flowchart of a process to interpret and reproduce an object based on input in InkML. In S142-2 (IN)-1, an InkML file is parsed and loaded in memory. In S142-2(IN)-2 trace objects are converted to pointer input event samples. This process involves extracting input data, such as position, pressure, angle, tilt and timestamp data, and modeling the extracted input data into a pointer input event sequence. In step S142-2(IN)-3 the pointer input event sequence is passed to the stroke object handling section 122, which also receives context information based on the data contained in the InkML file (e.g., if there is a pressure channel or not). The stroke object handling section 122 generates stroke objects. In step S142-2(IN)-5, the metadata object handling section 124 generates metadata objects. In step S142-2(IN)-4, the rasterization (drawing style) object handling section 126 generates drawing style objects.

Figure 90C:
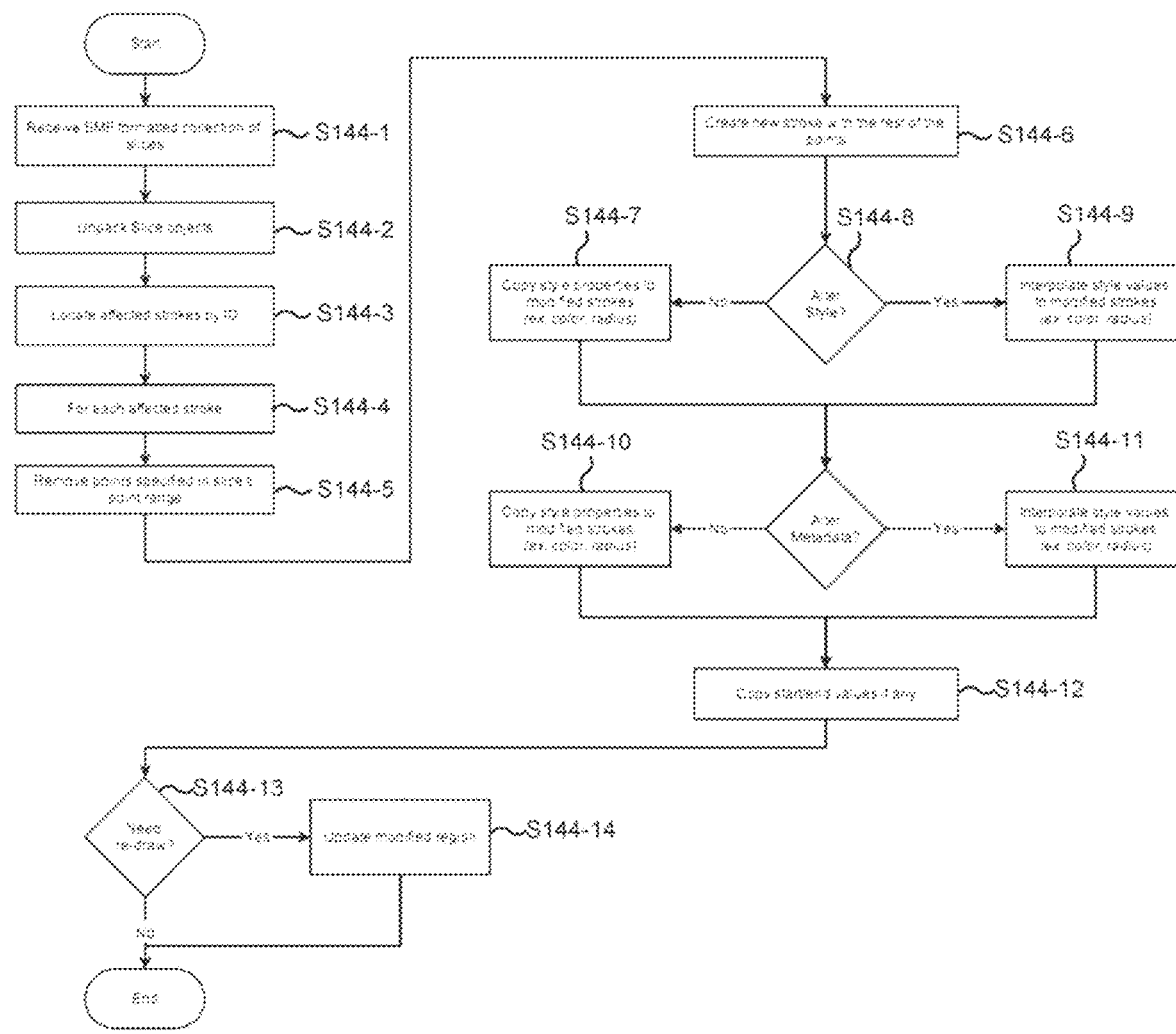
FIG. 90C is a flowchart illustrating a process of receiving and executing a manipulation (slice) object in SMF.

FIG. 90C is a flowchart illustrating a process of receiving and executing a manipulation (slice) object in SMF. In S144-1 a collection of slice objects 274 in SMF are received. In S144-2 slice objects 274 are unpacked. In S144-3 pre-existing stroke objects are traversed to locate the stroke objects affected by the slice objects 274 unpacked in S144-2. In S144-4 the affected stroke objects are traversed. In S144-5 every affected stroke object 210 is modified (sliced) using the corresponding slice object. All point objects within the point range specified in the corresponding slice object are removed (erased). In S144-6 one or two new stroke objects are created, if desired. For example, if the removed point objects are in the middle of a stroke object 210 that is sliced, then the beginning portion of the original stroke object 210 may form a new stroke object 210 and the ending portion of the original stroke object 210 may form another new stroke object 210. In S144-8 the slice object is examined to determine whether the style properties of the affected stroke should be modified or not. If the style properties should be modified, S144-9 sets new style property values for the newly created stroke object(s). Otherwise S144-7 simply copies the style property values of the original stroke object 210 onto the newly created stroke object(s). The same process is applied for metadata. If the metadata should be modified, then S144-11 applies new metadata to the newly generated stroke objects. Otherwise S144-10 simply copies the metadata of the original stroke object 210 onto the newly created stroke object(s). In S144-12 the values of startParameter 301 and endParameter 303 of the original stroke object 210 may be copied onto the newly created stroke object(s). The process described above is repeated for all of the affected stroke objects. In S144-13 a check is performed to determine whether there is a need to redraw the current screen. If "yes," in S144-14 the stroke objects in a modified region that have been sliced by one or more of the slice objects 274 are drawn (rendered) on the screen.

Effects of Embodiments 1-4

FIG. 91 is a diagram explaining the effect of using an ink data 200 processing device (101) of FIG. 75 to address ASPECT ONE described above. Manipulation objects according to various embodiments of the present invention permit transmission of manipulation operation contents using a transmission format, to thereby readily synchronize the states of the stroke objects situated at multiple locations. For example, assume that one device on the left hand side and two devices on the right hand side of FIG. 91 (respectively corresponding to Devices 10-1-1, 10-1-2, 10-1-3 in FIG. 1 and FIG. 73) are executing a real-time collaboration application. Assume further that the devices are sharing a stroke object 210 to be processed, which has not been sliced yet. Then, the following operation is possible according to embodiments of the present invention.

1. First, the device on the left hand side performs a slice manipulation operation on the stroke object 210 having a defined stroke width WIDTH.
2. Next, the ink data 200 processing device 101 (the manipulation object handling section 128) generates a manipulation object based on the slice manipulation operation.
3. Next, the ink data processing device 101 modifies its local stroke object 210 by performing the slice manipulation operation on the local stroke object 210 (see "Local" arrow in FIG. 75). This process may be performed prior to or in parallel with step 2 above.
4. Next, the ink data processing device 101 (the ink data communication section 144) formats the manipulation object in an SMF data and transmits the SMF data to a network (see "Remote" arrow in FIG. 75).
5. Devices 10-1-2 and 10-3 that receive the manipulation object in the SMF data extract the stroke IDs associated with the manipulation object, and perform the manipulation operation (slice operation) on each of the stroke objects identified by the extracted stroke IDs. As a result, the (sliced) states of the stroke objects identified by the extracted stroke IDs are synchronized among Device #1 on the left hand side and Devices 10-1-2 and 10-3 on the right hand side.

Therefore, the ink data processing method according to embodiments of the present invention is capable of manipulating stroke data dynamically, both locally and remotely across a network between two remotely located devices, in real time or at different times.

FIG. 92 is a diagram explaining the effect of using an ink data processing device (101) of FIG. 75 to address ASPECT TWO described above.

The left hand side of FIG. 92 shows device-dependent raw data on the input side, and the right hand side of FIG. 92 shows data to be included in output files as final products. The left hand side shows four types of input data that can be used to generate strokes, as follows:

1. A sequence of point coordinates obtained by Type 1 device, i.e., a simpler device such as a device incorporating a capacitive type touch sensor.
2. A sequence of point coordinates as well as a sequence of pen pressure information obtained by Type 2 device capable of obtaining pen pressure information.
3. Type N data including various details such as pen rotation angles, pen pressure, X-direction pen tilt angle, Y-direction pen tilt angle, etc., as obtainable by a combination of professional-grade hardware and an application used to generate computer graphics, for example.
4. Standardized data, such as InkML, which may represent azimuth, elevation, and pen orientation information.

As described above in reference to ASPECT TWO, in general, the information that needs to be reproduced based on hand-drawn input data is not "how" the hand-drawn data was inputted, such as at what angle a pen (stylus) was held and how much pen pressure was applied, etc. Rather, the information that needs to be reproduced is the "result" of such pen operation, which includes one or more strokes that were generated by the pen operation. Thus, it is desirable to use a stroke model that makes the hand-drawn input data as abstract and generalized as possible, i.e., that processes the hand-drawn input data to the right-hand side of FIG. 92 as much as possible. Such stroke model can then absorb differences that may exist among different devices, which record the "how" in various specific (non-abstract) manners.

The far right-hand side of FIG. 92 shows the data structure or file format included in image files as final products of the ink data processing according to embodiments of the present invention. The middle portion of FIG. 92 shows intermediate vector data, which may result from the ink data 200 processing according to embodiments of the present invention, suitable for use in various applications such as textizing, signature verification, annotation and real-time collaboration applications. The intermediate vector data includes the pre-existing SVG data (D3) that defines vector graphics in an input-independent manner, i.e., in a manner not oriented to pen-input. As such, SVG does not readily permit varying or adjusting pen-oriented data such as stroke width, stroke color, and stroke transparency and, as a result, is not particularly suited for marking up (characterizing) stroke data. On the other hand, the Stroke Language (SL) based intermediate vector data according to embodiments of the present invention provides various objects, such as metadata objects, rendering objects and manipulation objects, which are configured to mark up, characterize, or operate on stroke objects derived from the raw input data.

Figure 93:
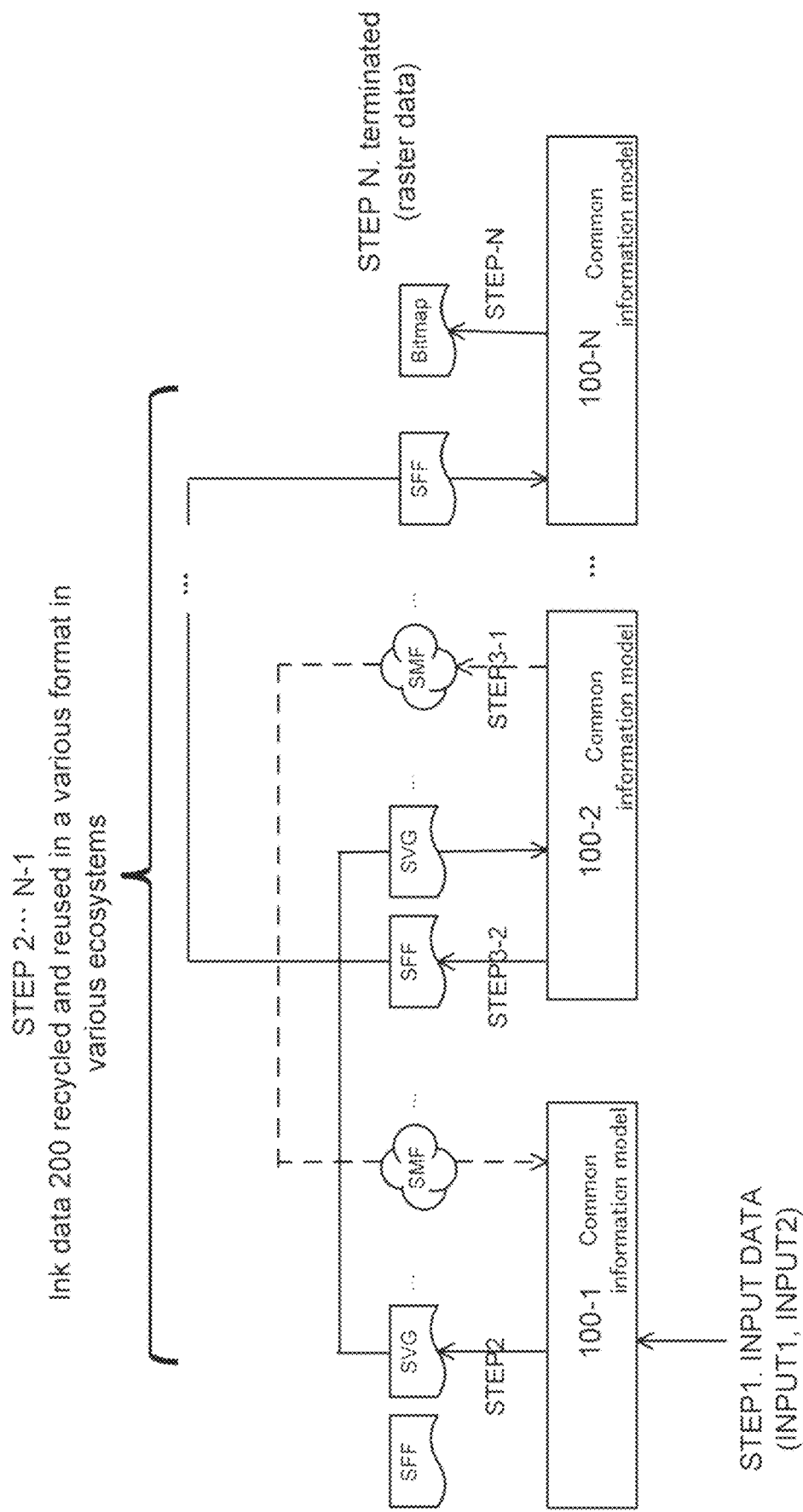
FIG. 93 is a diagram explaining the effect of using an ink data processing device (101) of FIG. 75 to address ASPECT THREE.

FIG. 93 is a diagram explaining the effect of using an ink data processing device (101) of FIG. 75 to address ASPECT THREE described above. The provision of the common stroke language (or the common information model that defines the language semantics and syntax), which is not tied to a specific format but may be used with a variety of formats, permits extending the life cycle of an ink data ecosystem. In FIG. 93, 100-1, 100-2 . . . 100-N represent different applications in which the ink data processing method according to embodiments of the present invention is embedded. When raw "input data" is inputted to the application 100-1 ("STEP1" in FIG. 93), the ink data generation section 120 of the application 100-1 abstracts the raw input data into objects in the stroke language (or the information model defining the stroke language). The objects are then converted to a recording format or a transmission format ("first format," or SVG in the illustrated example) and outputted ("STEP2" in FIG. 93). The application 100-2 receives and interprets the data in SVG to extract the objects in the stroke language for rendering or manipulation. The application 100-2 may format the objects in another recording format or a transmission format ("second format," or SFF in "STEP3-2" of FIG. 93). The data in SFF is then outputted to be received by an application 100-N, which interprets the data in SFF to extract the objects in the stroke language for rendering or manipulation. The application 100-N may format the objects in yet another recording format or a transmission format ("third format," or Bitmap) to be outputted. Thus, as compared to the JOT in (D5) for example which processes an ink data structure using a single format, embodiments of the present invention are capable of processing the ink data in a variety of formats, thereby extending the life cycle of the ink data 200. In the illustrated example of FIG. 93, the ink data 200 is usable by the application 100-1, by the application 100-2, and by further applications including the last application 100-N.

It should be appreciated by those skilled in the art that each of the elements, devices, steps and processes described above may be combined with other elements, devices, steps and processes, or may be further divided into sub-elements, sub-devices, sub-steps and sub-processes, depending on each implementation and application. Still further, the steps and processes may be executed in a single processor, or may be distributedly executed in multiple processors, depending on each implementation and application.

The invention claimed is:

1. A method of outputting ink data implemented in a device including a position input sensor in real time, the ink data including stroke objects that are vector data configured to reproduce paths formed by operating a pointer, the method comprising:
    an input step of receiving pen event data representative of a user's hand-drawn motion on a sensor surface;
    an ink data generating step of generating a stroke object based on the pen event data, the stroke object including a sequence of point positions, and the stroke object formed of a plurality of curve segments including a starting curve segment and an ending curve segment which are respectively defined by four control points according to a defined curve interpolation algorithm;
    a decision step of determining whether to apply smoothing to the sequence of point positions based on context information received from an application supporting the pen event data;
    a suffixing step of suffixing point objects to serve as additional control points to an end portion of the stroke object to absorb a spatial lag created, as a result of the smoothing, between the last position of the pen event data before the smoothing is applied and a smoothed position of the last position resulting from the smoothing, wherein two of the additional control points correspond to the last position, and another of the additional control points is placed within the spatial lag; and
    an output step of outputting the stroke object including the sequence of point positions that are smoothed to have new coordinate values, in response to the decision step determining to apply smoothing, wherein the stroke object further includes the additional control points and the ending curve segment is defined by four control points including the two additional control points that correspond to the last position and the additional control point placed in the spatial lag.

2. The method of claim 1, further comprising:
    selecting a smoothing algorithm for the smoothing based on a sampling rate of the pen event data indicated in the context information.

3. The method of claim 2, wherein selecting a smoothing algorithm includes selecting a smoothing algorithm having a greater smoothness strength when the sampling rate is lower and selecting a smoothing algorithm having a lesser smoothness strength when the sampling rate is higher.

4. The method of claim 1, wherein the suffixing step includes determining position(s) of the point objects to be suffixed as the additional control points in reference to the original positions of the point objects before the smoothing is applied.

5. The method of claim 1, further comprising outputting an indicator indicative of whether the smoothing is applied or not in the ink data, in response to the decision step determining to apply smoothing.

6. The method of claim 1, further comprising outputting a filter parameter identifying a smoothing filter type in the ink data, in response to the decision step determining to apply smoothing.

7. The method of claim 1, further comprising converting attributes of the stroke object from a floating data type to an integer data type.

8. The method of claim 1, further comprising outputting a decimalPrecision parameter used to convert non-integers to integers at a beginning of the outputted ink data.

9. The method of claim 1, wherein, of the two of the additional control points corresponding to the last position, one indicates an ending point of the ending curve segment and another defines a curvature of the ending curve segment.

10. The method of claim 1, wherein, of the four control points defining the ending curve segment, two control points other than the two additional control points corresponding to the last position are part of a set of control points defining a curve segment that precedes the ending curve segment.

11. A computer-implemented method of drawing, on an electronic display device in real time, a path drawn by a pen on a sensor surface coupled to the electronic display device, the method comprising:
    an input step of sequentially receiving coordinates data of positions indicated by a pen on a sensor surface to produce a path, wherein the path is formed of a plurality of curve segments including a starting curve segment and an ending curve segment which are respectively defined by four control points according to a defined curve interpolation algorithm;
    an output step of sequentially outputting smoothed coordinates data of positions resulting from applying smoothing to the coordinates data of positions received in the input step, wherein a spatial lag is created, as a result of the smoothing, between the coordinates data of the last position that is most recently indicated by the pen on the sensor surface and the smoothed coordinates data of the last position resulting from applying the smoothing to the coordinates data of the last position;
    a suffixing step of adding suffix coordinates data of additional positions to serve as additional control points, wherein two of the additional control points correspond to the last position that is most recently indicated by the pen on the sensor surface, and another of the additional control points is placed within the spatial lag to absorb the spatial lag; and
    a drawing step of drawing the positions including the last position that is most recently indicated by the pen on the sensor surface, using the smoothed coordinates data and the suffix coordinates data, to draw the path including the ending curve segment, which is defined by four control points including the two additional control points that correspond to the last position and the additional control point placed within the spatial lag, as a temporary visual preview on the electronic display device.

12. The method of claim 11, comprising repeating the suffixing step of adding suffix coordinates data of additional positions every time the last position that is most recently indicated by the pen on the sensor surface is updated anew.

13. The method of claim 12, comprising ignoring the suffix coordinates data of the additional positions in finalization of ink data to be stored representative of the positions indicated by the pen on the sensor surface.

14. The method of claim 1, wherein the two of the additional control points corresponding to the last position are generated with one of the two being duplicated to create another one of the two.

15. The method of claim 1, wherein the defined curve interpolation algorithm is a Catmull-Rom curve algorithm.

16. The method of claim 11, wherein the two of the additional control points corresponding to the last position are generated with one of the two being duplicated to create another one of the two.

17. The method of claim 11, wherein the defined curve interpolation algorithm is a Catmull-Rom curve algorithm.

18. The method of claim 11, wherein the drawing step of drawing the path formed of the plurality of curve segments includes sliding sets of four control points to draw corresponding curve segments which are respectively defined by the sets of four control points.

* * * * *